United States Patent
Morris et al.

(10) Patent No.: US 10,427,456 B2
(45) Date of Patent: *Oct. 1, 2019

(54) WHEEL ASSEMBLIES REMOVABLE WITHOUT TOOLS

(71) Applicant: GEO PLASTICS, Los Angeles, CA (US)

(72) Inventors: Michael Abraham Morris, Rancho Palos Verdes, CA (US); William Michael Palleva, Cerritos, CA (US)

(73) Assignee: GEO Plastics, Los Angeles, CA (US)

( * ) Notice: Subject to any disclaimer, the term of this patent is extended or adjusted under 35 U.S.C. 154(b) by 144 days.

This patent is subject to a terminal disclaimer.

(21) Appl. No.: 15/588,239

(22) Filed: May 5, 2017

(65) Prior Publication Data

US 2017/0239986 A1    Aug. 24, 2017

Related U.S. Application Data

(63) Continuation of application No. 14/956,069, filed on Dec. 1, 2015, now Pat. No. 9,724,964, which is a
(Continued)

(51) Int. Cl.
*B60B 27/06*    (2006.01)
*B60B 37/10*    (2006.01)
(Continued)

(52) U.S. Cl.
CPC ............ *B60B 27/065* (2013.01); *B60B 27/02* (2013.01); *B60B 37/04* (2013.01); *B60B 37/10* (2013.01);
(Continued)

(58) Field of Classification Search
CPC ....... B60B 27/02; B60B 27/06; B60B 27/065; B60B 37/04; B60B 37/10; B60B 2200/41; B65F 1/1473
See application file for complete search history.

(56) References Cited

U.S. PATENT DOCUMENTS 277,425 A    5/1883    Patterson
353,218 A    11/1886   Harrington
(Continued)

FOREIGN PATENT DOCUMENTS

CN    1304363        7/2001
CN    101181922      5/2008
(Continued)

OTHER PUBLICATIONS

Baby Jogger Chariots All Terrain Pushchairs, URL:http://www.pushchairs.co.uk/acatalog/city_elite_wheels.html, retrieved from internet Apr. 9, 2012.
(Continued)

*Primary Examiner* — Kip T Kotter

(74) *Attorney, Agent, or Firm* — Knobbe Martens Olson & Bear, LLP

(57) ABSTRACT

A hub or wheel assembly includes a retaining element, biasing element, and hand-maneuverable release mechanism. The housing includes an axle bore configured to receive an axle and a pin sleeve including a first end in fluid communication with the axle bore, a second end, and a conduit between the first end and the second end. The retaining element is within the conduit and is configured to operatively engage a groove in an axle. The biasing element is within the conduit and is configured to bias the retaining element towards the axle bore. The hand-maneuverable release mechanism is configured to displace the retaining element away from the axle bore.

24 Claims, 64 Drawing Sheets

Related U.S. Application Data continuation of application No. 13/761,066, filed on Feb. 6, 2013, now Pat. No. 9,205,703, which is a continuation-in-part of application No. 13/652,273, filed on Oct. 15, 2012, now Pat. No. 8,590,984.

(60) Provisional application No. 61/596,112, filed on Feb. 7, 2012, provisional application No. 61/680,861, filed on Aug. 8, 2012.

(51) Int. Cl.
| | |
|---|---|
| B60B 37/04 | (2006.01) |
| B60B 27/02 | (2006.01) |
| B65F 1/14 | (2006.01) |
| B60B 19/00 | (2006.01) |
| B60B 3/00 | (2006.01) |
| B60B 5/02 | (2006.01) |

(52) U.S. Cl.
CPC .............. *B65F 1/1473* (2013.01); *B60B 3/00* (2013.01); *B60B 5/02* (2013.01); *B60B 19/00* (2013.01); *B60B 2200/41* (2013.01); *B60B 2360/32* (2013.01); *B60B 2360/322* (2013.01); *B60B 2360/324* (2013.01); *B60B 2900/112* (2013.01); *B60B 2900/113* (2013.01); *B60B 2900/115* (2013.01); *B60B 2900/212* (2013.01); *B60B 2900/30* (2013.01); *B60B 2900/331* (2013.01); *B60B 2900/531* (2013.01); *B60B 2900/572* (2013.01)

(56) References Cited

U.S. PATENT DOCUMENTS

| | | | |
|---|---|---|---|
| 1,491,559 | A | 4/1924 | Slick |
| 1,553,054 | A | 9/1925 | Vial et al. |
| 2,117,947 | A | 5/1938 | De Rome et al. |
| 2,574,918 | A | 11/1951 | Haislip |
| 2,588,901 | A | 3/1952 | Weikart |
| D221,833 | S | 9/1971 | Haydock |
| 4,392,690 | A | 7/1983 | Anderson |
| 4,392,759 | A | 7/1983 | Cook |
| 4,452,420 | A | 6/1984 | Lundquist |
| 4,621,723 | A | 11/1986 | Carlson |
| 4,692,049 | A | 9/1987 | Engle |
| 5,029,946 | A | 7/1991 | Liao |
| D327,048 | S | 6/1992 | Markling et al. |
| D328,053 | S | 7/1992 | Markling |
| 5,215,356 | A | 6/1993 | Lin |
| 5,326,186 | A | 7/1994 | Nyberg |
| D352,687 | S | 11/1994 | Markling |
| 5,476,275 | A | 12/1995 | Baechler et al. |
| 5,482,305 | A | 1/1996 | Jeffries et al. |
| 5,494,340 | A | 2/1996 | Cheng |
| 5,507,566 | A | 4/1996 | Chen |
| 5,716,107 | A | 2/1998 | Parker et al. |
| 5,820,107 | A | 10/1998 | Hall |
| 6,024,416 | A | 2/2000 | Chen et al. |
| 6,095,535 | A | 8/2000 | Steinat et al. |
| 6,170,920 | B1 | 1/2001 | Markling |
| D444,283 | S | 6/2001 | Konkle |
| 6,273,520 | B1 | 8/2001 | Liao |
| 6,276,759 | B1 | 8/2001 | Lan |
| 6,349,994 | B1 | 2/2002 | Chapman |
| 6,361,121 | B1 | 3/2002 | Morris |
| 6,375,274 | B1 | 4/2002 | Morris |
| 6,464,305 | B2 | 10/2002 | Markling |
| 6,520,597 | B1 | 2/2003 | Markling |
| 6,523,910 | B1 | 2/2003 | Lin |
| 6,637,835 | B2 | 10/2003 | Morris |
| 6,666,526 | B1 | 12/2003 | Cummins |
| 6,722,744 | B1 | 4/2004 | Shieh |
| 6,886,893 | B1 | 5/2005 | Fisch et al. |
| 6,896,335 | B2 | 5/2005 | Markling |
| 6,910,742 | B2 | 6/2005 | Flood et al. |
| 6,913,324 | B2 | 7/2005 | Markling |
| 6,938,964 | B2 | 9/2005 | Flood et al. |
| 7,070,246 | B2 | 7/2006 | Chen |
| 7,108,335 | B2 | 9/2006 | Morris |
| D542,003 | S | 5/2007 | Morris |
| D567,730 | S | 4/2008 | Polka |
| D570,070 | S | 5/2008 | Morris |
| 7,377,597 | B2 | 5/2008 | Morris |
| 7,434,892 | B2 | 10/2008 | Mercat et al. |
| 7,481,498 | B1 | 1/2009 | Morris |
| D586,071 | S | 2/2009 | Morris |
| D586,072 | S | 2/2009 | Morris |
| 7,494,145 | B2 | 2/2009 | Schroeder et al. |
| 7,571,966 | B2 | 8/2009 | Chen et al. |
| 7,591,592 | B2 | 9/2009 | Beirne et al. |
| 7,614,707 | B2 | 11/2009 | Jabbour, Jr. et al. |
| D632,044 | S | 2/2011 | Morris |
| D640,439 | S | 6/2011 | Morris |
| 8,002,363 | B2 | 8/2011 | Cheng |
| 8,037,911 | B2 | 10/2011 | Morris |
| 8,113,594 | B2 | 2/2012 | Jones et al. |
| 8,147,005 | B2 | 4/2012 | Morris |
| 8,590,984 | B2 | 11/2013 | Morris et al. |
| 8,616,657 | B2 | 12/2013 | Morris |
| 8,616,658 | B2 | 12/2013 | Morris |
| 8,689,845 | B2 | 4/2014 | Morris |
| RE45,101 | E | 9/2014 | Morris |
| 9,010,877 | B2 | 4/2015 | Morris |
| 9,205,703 | B2 | 12/2015 | Morris et al. |
| 9,266,391 | B2 | 2/2016 | Morris |
| 9,724,964 | B2 * | 8/2017 | Morris ................... B60B 37/04 |
| 10,189,307 | B2 | 1/2019 | Morris |
| 2001/0001222 | A1 | 5/2001 | Markling |
| 2002/0068499 | A1 | 6/2002 | Huntsberger et al. |
| 2003/0085611 | A1 | 5/2003 | Markling |
| 2003/0197423 | A1 | 10/2003 | Liao |
| 2004/0070262 | A1 | 4/2004 | Markling |
| 2006/0261669 | A1 | 11/2006 | Dreyer |
| 2007/0164601 | A1 | 7/2007 | Mercier et al. |
| 2008/0042487 | A1 | 2/2008 | Chen et al. |
| 2009/0127923 | A1 | 5/2009 | Morris |
| 2010/0052412 | A1 | 3/2010 | Morris |
| 2012/0049612 | A1 | 3/2012 | Vogler et al. |
| 2012/0074663 | A1 | 3/2012 | Parker et al. |
| 2016/0082773 | A1 | 3/2016 | Morris et al. |
| 2016/0136998 | A1 | 5/2016 | Morris |
| 2017/0239990 | A1 | 8/2017 | Morris |

FOREIGN PATENT DOCUMENTS

| | | |
|---|---|---|
| CN | 101711204 | 5/2010 |
| CN | 102001399 | 4/2011 |
| DE | 3312590 | 10/1984 |
| DE | 8507012 | 5/1985 |
| DE | 8628385 | 12/1986 |
| DE | 8704624 | 5/1987 |
| DE | 8712211 | 11/1987 |
| DE | 4411096 | 11/1994 |
| EP | 0 508 902 | 10/1992 |
| EP | 0 726 172 | 8/1996 |
| EP | 0 808 729 | 11/1997 |
| EP | 1 477 331 | 11/2004 |
| EP | 2 327 629 | 6/2011 |
| FR | 2 808 243 | 11/2001 |
| WO | WO 99/62728 | 12/1999 |

OTHER PUBLICATIONS

City Elite Assembly Instructions, <URL:http://www.babyjogger.com/images/document/Instructions/2012_City_Elite_Single_USA.pdf, retrieved from internet Apr. 9, 2012.
Final Office Action issued in U.S. Appl. No. 13/652,273, dated May 2, 2013.
First Action Interview Office Action Summary issued in U.S. Appl. No. 13/652,273, dated Mar. 27, 2013.
First Action Interview Pilot Program Pre-Interview Communication issued in U.S. Appl. No. 13/652,273, dated Feb. 5, 2013.

(56) References Cited

OTHER PUBLICATIONS

International Search Report and Written Opinion issued in PCT/US13/24990, dated Apr. 29, 2013.
Notice of Allowance issued in U.S. Appl. No. 13/652,273, dated Jun. 18, 2013.
Office Action issued in U.S. Appl. No. 13/761,066, dated Apr. 29, 2015.
Notice of Allowance issued in U.S. Appl. No. 13/761,066, dated Aug. 6, 2015.
Office Action issued in Chinese Application No. 201380018742.0, dated Mar. 29, 2016.
Office Action issued in Australian Application No. 2013217109, dated Mar. 29, 2016, in 2 pages.
Office Action issued in Mexican Application No. MX/a/2014/008956, dated Sep. 19, 2016, in 2 pages.
Office Action issued in Chinese Application No. 201380018742.0, dated Nov. 9, 2016, in 8 pages.
Third party submission in U.S. Appl. No. 13/673,655, dated May 15, 2013.
U.S. Appl. No. 11/944,322 U.S. Pat. No. 8,147,005, Wheel and Hub Assembly, filed Nov. 21, 2007 Apr. 3, 2012.
U.S. Appl. No. 13/866,850 U.S. Pat. No. RE45101, Wheel and Hub Assembly, filed Apr. 19, 2013 Sep. 2, 2014.
U.S. Appl. No. 13/406,211 U.S. Pat. No. 8,616,657, Wheel Assembly, filed Feb. 27, 2012 Dec. 31, 2013.
U.S. Appl. No. 13/673,655 U.S. Pat. No. 8,616,658, Wheel and Hub Assembly, filed Nov. 9, 2012 Dec. 31, 2013.
U.S. Appl. No. 14/085,535 U.S. Pat. No. 9,010,877, Wheel Assemblies, filed Nov. 20, 2013 Apr. 21, 2015.
U.S. Appl. No. 14/678,371 U.S. Pat. No. 9,266,391, Wheel Assemblies, filed Apr. 3, 2015 Feb. 23, 2016.
U.S. Appl. No. 15/003,468, Wheel Assemblies, filed Jan. 21, 2016.
U.S. Appl. No. 15/588,057, Wheel Assemblies, filed May 5, 2017.
U.S. Appl. No. 09/507,595, U.S. Pat. No. 6,375,274, Plastic Wheel Assembly and Improved Mounting Sleeve Therefor, filed Feb. 18, 2000, Apr. 23, 2002.
U.S. Appl. No. 09/687,669 U.S. Pat. No. 6,361,121, Plastic Wheel Assembly and Mounting Sleeve Therefor, filed Oct. 12, 2000 Mar. 26, 2002.
U.S. Appl. No. 10/044,621 U.S. Pat. No. 6,637,835, Plastic Wheel Assembly and Improved Mounting Sleeve Therefor, filed Jan. 9, 2002 Oct. 28, 2003.
U.S. Appl. No. 11/059,153 U.S. Pat. No. 7,377,597, Wheel Assembly Having Wheel- Mounting Sleeve and Retainer, filed Feb. 15, 2005 May 27, 2008.
U.S. Appl. No. 29/240,855 U.S. Pat. No. D. 542,003, Wheel, filed Oct. 17, 2005 May 1, 2007.
U.S. Appl. No. 11/481,442 U.S. Pat. No. 7,481,498, Injection-Molded Wheel Having a Plurality of Recesses in a Rim Portion, filed Jul. 5, 2006 Jan. 27, 2009.
U.S. Appl. No. 29/264,490 U.S. Pat. No. D. 570,070, Wheel, filed Aug. 9, 2006 May 27, 2008.
U.S. Appl. No. 29/012,057 U.S. Pat. No. D. 352,687, Injection-Molded Wheel, filed Aug. 23, 1993 Nov. 22, 1994.
U.S. Appl. No. 29/297,936 U.S. Pat. No. D. 586,071, Wheel, filed Nov. 21, 2007 Feb. 3, 2009.
U.S. Appl. No. 29/297,939 U.S. Pat. No. D. 586,072, Wheel, filed Nov. 21, 2007 Feb. 3, 2009.
U.S. Appl. No. 12/204,718 U.S. Pat. No. 8,037,911, Wheel Including Tread, filed Sep. 4, 2008 Oct. 18, 2011.
U.S. Appl. No. 13/247,915 U.S. Pat. No. 8,689,845, Wheel Including Tread, filed Sep. 28, 2011 Apr. 8, 2014.
U.S. Appl. No. 29/352,330 U.S. Pat. No. D. 632,044, Wheel, filed Dec. 18, 2009 Feb. 1, 2011.
U.S. Appl. No. 29/381,644 U.S. Pat. No. D. 640,439, Wheel, filed Dec. 21, 2010 Jun. 21, 2011.
U.S. Appl. No. 13/652,273 U.S. Pat. No. 8,590,984, Wheel and Hub Assemblies Removable Without Tools, filed Oct. 15, 2012 Nov. 26, 2013.
U.S. Appl. No. 13/761,066 U.S. Pat. No. 9,205,703, Wheel and Hub Assemblies Removable Without Tools, filed Feb. 6, 2013 Dec. 8, 2015.
U.S. Appl. No. 14/956,069 U.S. Pat. No. 9,724,964, Assemblies Removable Without Tools, filed Dec. 1, 2015 Aug. 8, 2017.
U.S. Appl. No. 14/956,069, Assemblies Removable Without Tools, filed Dec. 1, 2015.
Supplemental European Search Report issued in EP Application No. 13746494.7, dated Nov. 6, 2017, in 10 pages.

\* cited by examiner

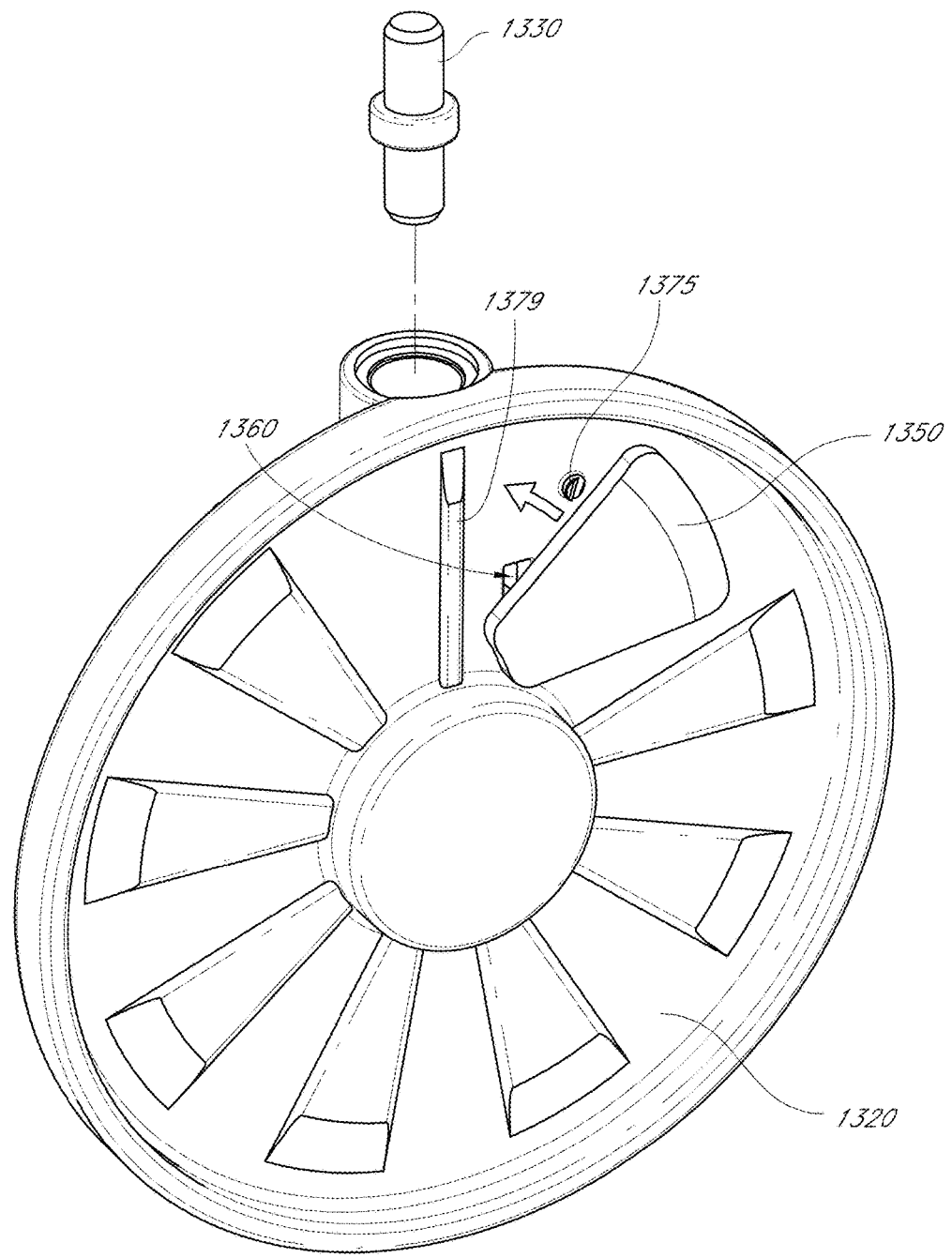
FIG. 11Gii

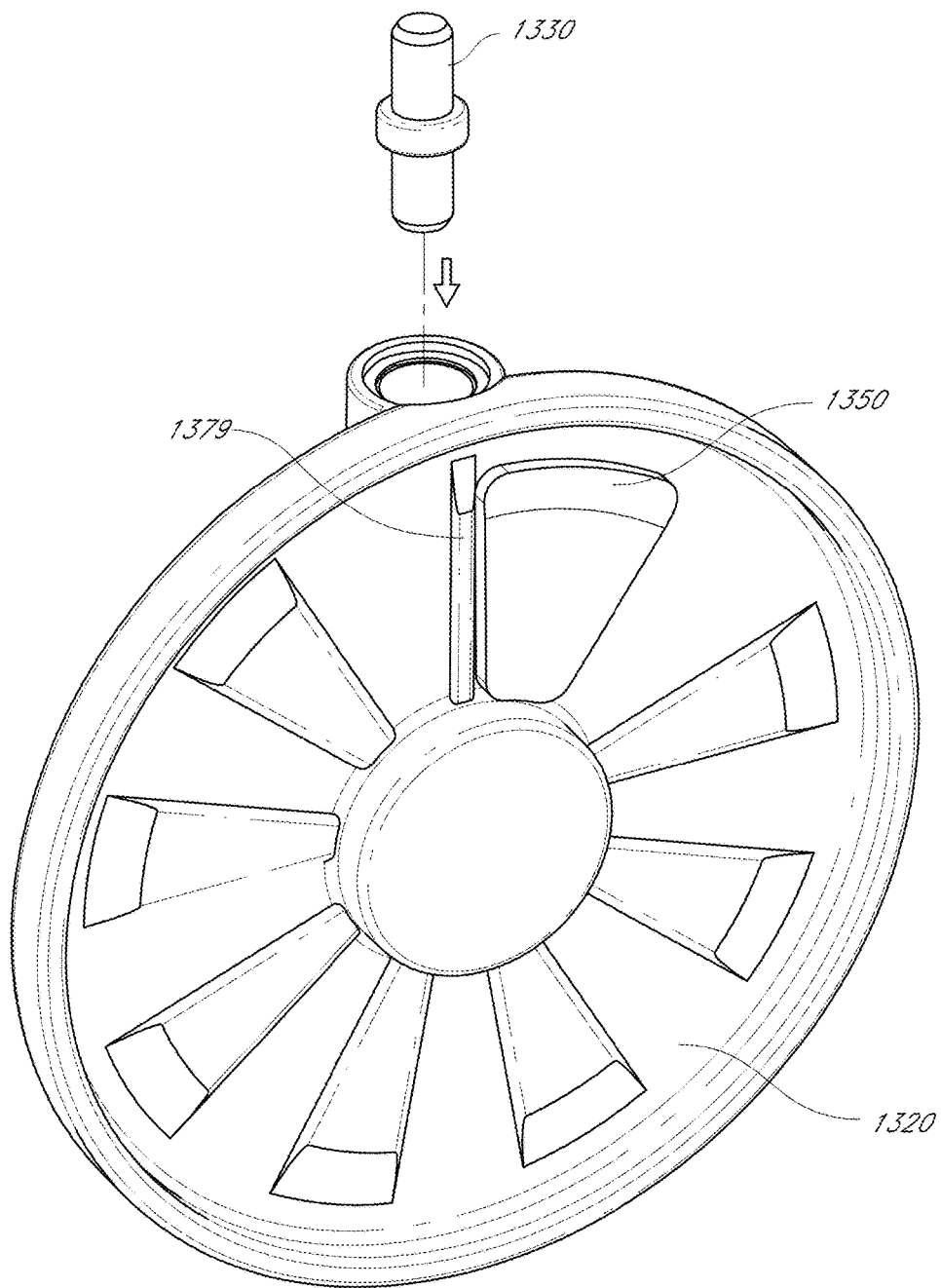
FIG. 11Giii

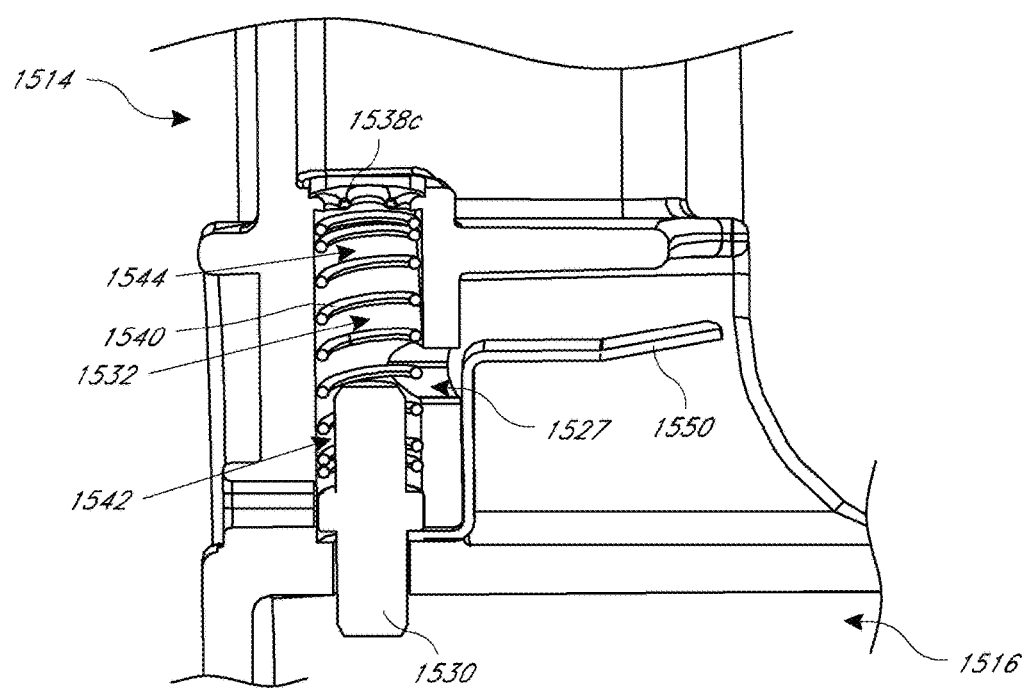
FIG. 13Fii

WHEEL ASSEMBLIES REMOVABLE WITHOUT TOOLS

CROSS-REFERENCE TO RELATED APPLICATIONS

The present application is a continuation of U.S. patent application Ser. No. 14/956,069, filed Dec. 1, 2015 and issued as U.S. Pat. No. 9,724,964 on Aug. 8, 2017, which is a continuation of U.S. patent application Ser. No. 13/761,066, filed on Feb. 6, 2013 and issued as U.S. Pat. No. 9,205,703 on Dec. 8, 2015, which claims priority benefit of U.S. Provisional Patent App. No. 61/596,112, filed on Feb. 7, 2012, and U.S. Provisional Patent App. No. 61/680,861, filed Aug. 8, 2012, and which U.S. patent application Ser. No. 13/761,066 is a continuation-in-part of U.S. patent application Ser. No. 13/652,273, filed on Oct. 15, 2012 and issued as U.S. Pat. No. 8,590,984 on Nov. 26, 2013, which claims priority benefit of U.S. Provisional Patent App. No. 61/596,112, filed on Feb. 7, 2012, and U.S. Provisional Patent App. No. 61/680,861, filed Aug. 8, 2012, each of which is incorporated herein by reference in its entirety.

BACKGROUND

Field

The present application generally relates to wheel assemblies and the manner of their mounting to and removal from an axle, and, more particularly, to wheel and hub assemblies used on refuse carts and the like.

Description of Related Art

The use of plastic wheels on a variety of products has dramatically increased in recent years. One area in which such plastic wheels have been widely employed is on wheeled refuse or garbage carts or bins of the type commonly employed by homeowners for their trash and recyclables. These carts traditionally have plastic wheels that are mounted on the ends of a metal axle by a hub member or push-on hat fastener (sometimes referred to as a "pawl nut"). The wheel hub is hammered onto the end of the axle to hold the wheel in place. Removal of such plastic wheels in order to replace or repair the wheel or the cart can be difficult because the hammered push-on hat fasteners or hubs require special tools for their removal, or essentially must be destroyed to remove them from the axle. Sometimes this process also damages the axles. Wheel-mounting sleeve assemblies have been devised which snap-on to a pre-machined axle to hold the wheel to the axle. However, these snap-on wheel assemblies have been unduly complex, visually unappealing, and poorly suited to the shock loading and vibration commonly encountered.

SUMMARY

The design of some wheel and hub assemblies limits the method of removing the wheel assembly from the axle to prying the wheel off or removing it with a tool via a tool passageway in the retainer housing of the hub assembly. The limits of wheel assembly removal can create difficulties when a user seeks to remove the wheel for repair, maintenance, distribution, transportation for sale, and the like, and does not have a tool or does not have an appropriate tool for wheel assembly removal. Additionally, a tool passageway initially covered by a membrane may not be effective in thwarting unwanted removal by vandals once the membrane has been punctured. At least one aspect of the present invention is the realization of the advantages that may be gained from a hand-maneuverable release mechanism. A hand-maneuverable release mechanism, or pressure release mechanism, or touch release mechanism, or finger-maneuverable release mechanism, can present additional options for wheel assembly removal. A hand-maneuverable release mechanism can allow a user to remove the wheel assembly from an axle without the use of a tool. A hand-maneuverable release mechanism can increase the efficiency of wheel assembly and/or removal. A hand-maneuverable release mechanism can inhibit accidental removal or unwanted removal by vandals due to the ability of the hand-maneuverable release mechanism to be at least partially hidden (e.g., by the body of a cart, camouflaged by wheel markings), or could be visually or otherwise identifiable. Certain hand-maneuverable release mechanisms may be pulled radially outward to pull a retaining element radially outward, may be pushed radially inward and leveraged to pull a retaining element radially outward, and/or may be rotated to pull a retaining element radially outward. A conveyance, such as a refuse cart, may include a wheel assembly including a hand-maneuverable release mechanism. An axle assembly may include a wheel assembly including a hand-maneuverable release mechanism, for example to help ensure the number of wheel assemblies corresponds to the number of axles during shipment.

In some embodiments, a hub assembly comprises a housing, a retaining element, a biasing element, and a hand-maneuverable release mechanism. The housing includes an axle sleeve and a pin sleeve. The axle sleeve includes an axle bore configured to receive an axle. The pin sleeve includes a first end, a second end, and a conduit between the first end and the second end. The first end is in fluid communication with the axle bore. The retaining element is within the conduit. The retaining element is configured to operatively engage a groove in an axle. The biasing element is within the conduit and is configured to bias the retaining element towards the axle bore. The hand-maneuverable release mechanism is configured to displace the retaining element away from the axle bore. The release mechanism includes a tab, a lifter connected to the tab, and a connector coupled to the tab and coupled to the lifter. The tab is configured to be manipulated by a hand of a user. The lifter is configured to interact with the retaining element. Movement of the tab is configured to cause movement of the lifter.

In some embodiments, the hub assembly comprises a restraining element configured to inhibit at least one of the retaining element and the biasing element from exiting the second end of the pin sleeve. In some embodiments, the restraining element comprises a plug mechanically coupled to the second end of the pin sleeve. In some embodiments, the retaining element includes a lip configured to interact with the release mechanism. In some embodiments, the lifter includes a fork including prongs on two sides of the lip of the retaining element. In some embodiments, the release mechanism is configured to displace the retaining element upon manipulation of the tab away from the axle bore. In some embodiments, the release mechanism is configured to displace the retaining element upon manipulation of the tab towards the axle bore. In some embodiments, the housing includes a bearing surface configured to increase leverage between the release mechanism and the retaining element. In some embodiments, the connector is substantially orthogonal to the tab and to the lifter. In some embodiments, the connector is connected to at least one of the tab and the lifter at an obtuse angle. In some embodiments, the release mechanism is on a same side of the hub assembly as the axle bore. In some embodiments, the release mechanism further comprises a guide arm coupled to the tab. In some embodiments, the release mechanism comprises buttressing features. In some embodiments, the housing includes an end wall including plurality of false release mechanisms. In some embodiments, the housing includes a tool passageway on an opposite side of the hub assembly from the release mechanism. In some embodiments, the housing includes a spacer configured to space the hub assembly from a body of a conveyance. In some embodiments, the spacer comprises a guiderail. In some embodiments, a wheel assembly comprises a wheel and the hub assembly inserted in the wheel. In some embodiments, an axle assembly comprises an axle, the wheel assembly coupled to the axle, and a second wheel assembly coupled to the axle. In some embodiments, a conveyance comprises the wheel assembly. In some embodiments, the conveyance comprises a refuse cart.

In some embodiments, a hub assembly comprises a retainer housing, a retaining element, a biasing element, and a hand-maneuverable release mechanism. The retainer housing includes an axle sleeve a pin sleeve. The axle sleeve includes an axle bore configured to receive an axle. The pin sleeve includes a first end, a second end, and a conduit between the first end and the second end. The first end in fluid communication with the axle bore. The retaining element is within the conduit of the pin sleeve. The retaining element is configured to operatively engage a groove in an axle. The biasing element is within the conduit of the pin sleeve and is configured to bias the retaining element towards the axle. The hand-maneuverable release mechanism is configured to displace the retaining element away from the axle bore.

In some embodiments, the release mechanism is on a same side of the hub assembly as the axle bore. In some embodiments, the release mechanism is on an opposite side of the hub assembly from the axle bore. In some embodiments, the retainer housing includes an end wall including a stop. In some embodiments, the retainer housing includes a protrusion configured to interact with a groove in the hand-maneuverable release mechanism. In some embodiments, the hub assembly further comprises a cover coupled to the retainer housing. In some embodiments, the retainer housing includes an end wall including plurality of false release mechanisms. In some embodiments, the release mechanism includes a tab and a lifter connected to the tab. The tab is configured to be manipulated by a hand of a user. The lifter is configured to interact with the retaining element. Movement of the tab is configured to cause movement of the lifter. In some embodiments, the release mechanism further comprises a connector coupled to the tab and coupled to the lifter. In some embodiments, the connector is substantially orthogonal to the tab and to the lifter. In some embodiments, the connector is substantially non-orthogonal to the tab and to the lifter. In some embodiments, the connector is connected to at least one of the tab and the lifter at an obtuse angle. In some embodiments, the release mechanism further comprises a guide arm coupled to the tab. In some embodiments, the lifter is at least partially in an aperture in the retaining element. In some embodiments, the lifter includes an arcuate member at least partially surrounding the retaining element. In some embodiments, the arcuate member totally surrounds the retaining element. In some embodiments, the lifter includes a fork including a prong on at least one side of the retaining element. In some embodiments, the fork includes prongs on two sides of the retaining element. In some embodiments, the tab includes a weakened portion. In some embodiments, the tab is configured to bend along the weakened portion. In some embodiments, the tab is configured to break along the weakened portion. In some embodiments, the lifter is substantially parallel to the axle bore. In some embodiments, the lifter is substantially orthogonal to the axle bore. In some embodiments, the lifter at least partially covers a portion of the retaining element. In some embodiments, the retaining element comprises a lip and the portion of the retaining element comprises the lip. In some embodiments, the lifter completely covers the retaining element. In some embodiments, the tab is substantially orthogonal to the retaining element. In some embodiments, the tab is substantially non-orthogonal to the retaining element. In some embodiments, the release mechanism further comprises an arm coupled to the tab. In some embodiments, the release mechanism further comprises a projection coupled to the tab. In some embodiments, the projection includes a groove configured to interact with a projection extending from the retainer housing. In some embodiments, the arm is on the opposite side of the retainer housing from the axle bore, the arm is on the opposite side of the retainer housing from the axle bore. In some embodiments, the release mechanism is integrated with the retaining element in a hand-maneuverable retaining element. In some embodiments, wherein the release mechanism includes a body, an arm extending outwardly from the body, a ramped portion extending downward from the body, and a lifter extending inwardly from the body. In some embodiments, the retainer housing includes a lifting projection configured to interact with the ramped portion. In some embodiments, upon movement of the arm, the ramped portion interacts with the lifting projection to translate the movement of the arm into longitudinal movement of the lifter away from the axle bore. In some embodiments, the release mechanism is configured to displace the retaining element upon manipulation of a tab away from the axle bore. In some embodiments, the release mechanism is configured to displace the retaining element upon manipulation of a tab towards the axle bore. In some embodiments, the release mechanism comprises metal. In some embodiments, the release mechanism comprises plastic. In some embodiments, the release mechanism comprises buttressing features. In some embodiments, the retainer housing includes a bearing surface configured to increase leverage between the release mechanism and the retaining element. In some embodiments, the retainer housing includes a tool passageway. In some embodiments, the retainer housing includes a tamper-evident membrane covering the tool passageway. In some embodiments, the tool passageway is on an opposite side of the hub assembly from the release mechanism. In some embodiments, the retaining element includes a lip configured to interact with the release mechanism. In some embodiments, the first end of the pin sleeve includes a shoulder extending into the conduit and wherein the lip is wider than the shoulder. In some embodiments, the hub assembly further comprises a restraining element configured to inhibit at least one of the retaining element and the biasing element from exiting the second end of the pin sleeve. In some embodiments, the restraining element configured includes a tail configured to at least partially occlude a channel in the pin sleeve. In some embodiments, the retainer housing includes a spacer configured to space the hub assembly from a cart body. In some embodiments, the spacer comprises a guiderail. In some embodiments, the axle sleeve comprises a guiderail.

In some embodiments, a hub assembly comprises a retaining element, a hand-maneuverable release mechanism, and a tool passageway. The retaining element is configured to operatively engage a groove in an axle. The hand-maneuverable release mechanism is configured to displace the retaining element away from the groove in an axle. The tool passageway is configured to permit tooled access to the retaining element.

In some embodiments, a conveyance comprises the hub assembly. In some embodiments, a wheel assembly comprises a wheel and the hub assembly inserted in the wheel. In some embodiments, the release mechanism is at least partially obscured by the wheel. In some embodiments, the biasing element abuts a portion of the wheel. In some embodiments, a conveyance comprises the wheel assembly. In some embodiments, the release mechanism is modifiable to inhibit manipulation upon coupling to the conveyance. In some embodiments, an axle assembly comprises an axle, the wheel assembly coupled to the axle, and a second wheel assembly coupled to the axle. The second wheel assembly comprises a wheel and a hub assembly including a retainer housing, a retaining element, and a biasing element. The retainer housing includes an axle sleeve and a pin sleeve. The axle sleeve includes an axle bore configured to receive an axle. The pin sleeve including a first end, a second end, and a conduit between the first end and the second end. The first end is in fluid communication with the axle bore. The retaining element is within the conduit of the pin sleeve. The retaining element is configured to operatively engage a groove in an axle. The biasing element is within the conduit of the pin sleeve and is configured to bias the retaining element towards the axle bore. In some embodiments, the retainer housing of the second wheel assembly includes a tool passageway. In some embodiments, a conveyance comprises the axle assembly. In some embodiments, the conveyance is a refuse cart.

In some embodiments, a method of manufacturing a hub assembly comprises providing a retainer housing including an axle sleeve including an axle bore configured to receive an axle and a pin sleeve including a first end, a second end, and a conduit between the first end and the second end, the first end in fluid communication with the axle bore, the first end including a shoulder extending into the conduit; at least partially inserting a hand-maneuverable release mechanism in the pin sleeve; positioning a retaining member in the pin sleeve, the retaining element configured to secure a wheel on an axle by operatively engaging a groove in the axle; and positioning a biasing element in the pin sleeve, the biasing element configured to bias the retaining member towards the axle bore.

In some embodiments, at least partially inserting the release mechanism in the pin sleeve comprises sliding a portion of the release mechanism along a channel in the pin sleeve. In some embodiments, at least partially inserting the release mechanism in the pin sleeve comprises inserting a portion of the release mechanism in channel in the pin sleeve and rotating the release mechanism. In some embodiments, positioning the retaining member in the pin sleeve is after at least partially inserting the release mechanism in the pin sleeve. In some embodiments, the method comprises forming the retainer housing. In some embodiments, the method comprises occluding the second end of the pin sleeve. In some embodiments, the method comprises coupling the hub assembly to a wheel to form a wheel assembly. In some embodiments, the method comprises forming the wheel. In some embodiments, the method comprises coupling the wheel assembly to a conveyance. In some embodiments, the method comprises coupling the wheel assembly to an axle. In some embodiments, the method comprises coupling a second wheel assembly to the axle. In some embodiments, the method comprises removing the wheel assembly from the axle. In some embodiments, the method comprises re-coupling the wheel assembly to the axle.

In some embodiments, a method of removing a hub assembly from an axle comprises manually manipulating a tab of a release mechanism to cause a retaining member to at least partially extend out of an axle bore of a retainer housing.

In some embodiments, manipulating the tab includes moving the tab radially outward. In some embodiments, manipulating the tab includes moving the tab radially inward. In some embodiments, manipulating the tab includes rotating the tab. In some embodiments, rotating the tab is in a plane substantially orthogonal to the axle bore.

In some embodiments, the wheel and hub assemblies may be a single integrated component such that the wheel comprises an axle bore configured to receive an axle and a pin sleeve. The pin sleeve including a first end, a second end, and a conduit between the first end and the second end. The first end is in fluid communication with the axle bore. A retaining element is within the conduit of the pin sleeve. The retaining element is configured to operatively engage a groove in an axle. A biasing element is within the conduit of the pin sleeve and is configured to bias the retaining element towards the axle bore.

In some embodiments, the restraining element may comprise a deformation in the pin sleeve. The deformation may be all around the pin sleeve, in a single location, in a plurality of locations, etc. In some embodiments the deformation comprises a plurality of legs extending into the conduit. Some embodiments include four legs that are spaced by about 90° around a circumference of the pin sleeve. In some embodiments, the deformation comprises an annular rim around the circumference of the pin sleeve. In some embodiments, the deformation may create angular edges at the second end of the pin sleeve. These angular edges may be created through increased heat and/or pressure in various parts of the second end of the pin sleeve. In some embodiments, the deformation may create a square-like shape.

In some embodiments, a method of making a wheel assembly comprises occluding a pin sleeve of a wheel, the wheel assembly including, in the pin sleeve, a retaining element, a biasing element, and a hand-maneuverable release mechanism configured to displace the retaining element away from the axle bore, the wheel including an axle bore in fluid communication with another end of the pin sleeve and a conduit extending between the end and the another end, wherein after occluding the pin sleeve the biasing element is inhibited from exiting the end of the pin sleeve.

For purposes of summarizing the invention and the advantages achieved over the prior art, certain objects and advantages of the invention are described herein. Of course, it is to be understood that not necessarily all such objects or advantages need to be achieved in accordance with any particular embodiment. Thus, for example, those skilled in the art will recognize that the invention may be embodied or carried out in a manner that achieves or optimizes one advantage or group of advantages as taught or suggested herein without necessarily achieving other objects or advantages as may be taught or suggested herein.

All of these embodiments are intended to be within the scope of the invention herein disclosed. These and other embodiments will become readily apparent to those skilled in the art from the following detailed description having reference to the attached figures, the invention not being limited to any particular disclosed embodiment(s).

BRIEF DESCRIPTION OF THE DRAWINGS

These and other features, aspects, and advantages of the present disclosure are described with reference to the drawings of certain embodiments, which are intended to illustrate certain embodiments and not to limit the invention.

FIG. 5I is a top perspective view of a yet still further example embodiment of a hand-maneuverable release mechanism.

FIG. 11I is a top perspective, partial cross-sectional, and partial cutaway view of the hub assembly of FIG. 11A along the line 11F-11F of FIG. 11B with a hand-maneuverable release mechanism in a release position.

FIG. 13Fii is a cross-sectional view of a portion of yet another example embodiment of a wheel assembly.

DETAILED DESCRIPTION

Although certain embodiments and examples are described below, those of skill in the art will appreciate that the invention extends beyond the specifically disclosed embodiments and/or uses and obvious modifications and equivalents thereof. Thus, it is intended that the scope of the invention herein disclosed should not be limited by any particular embodiments described below.

Figure 1:
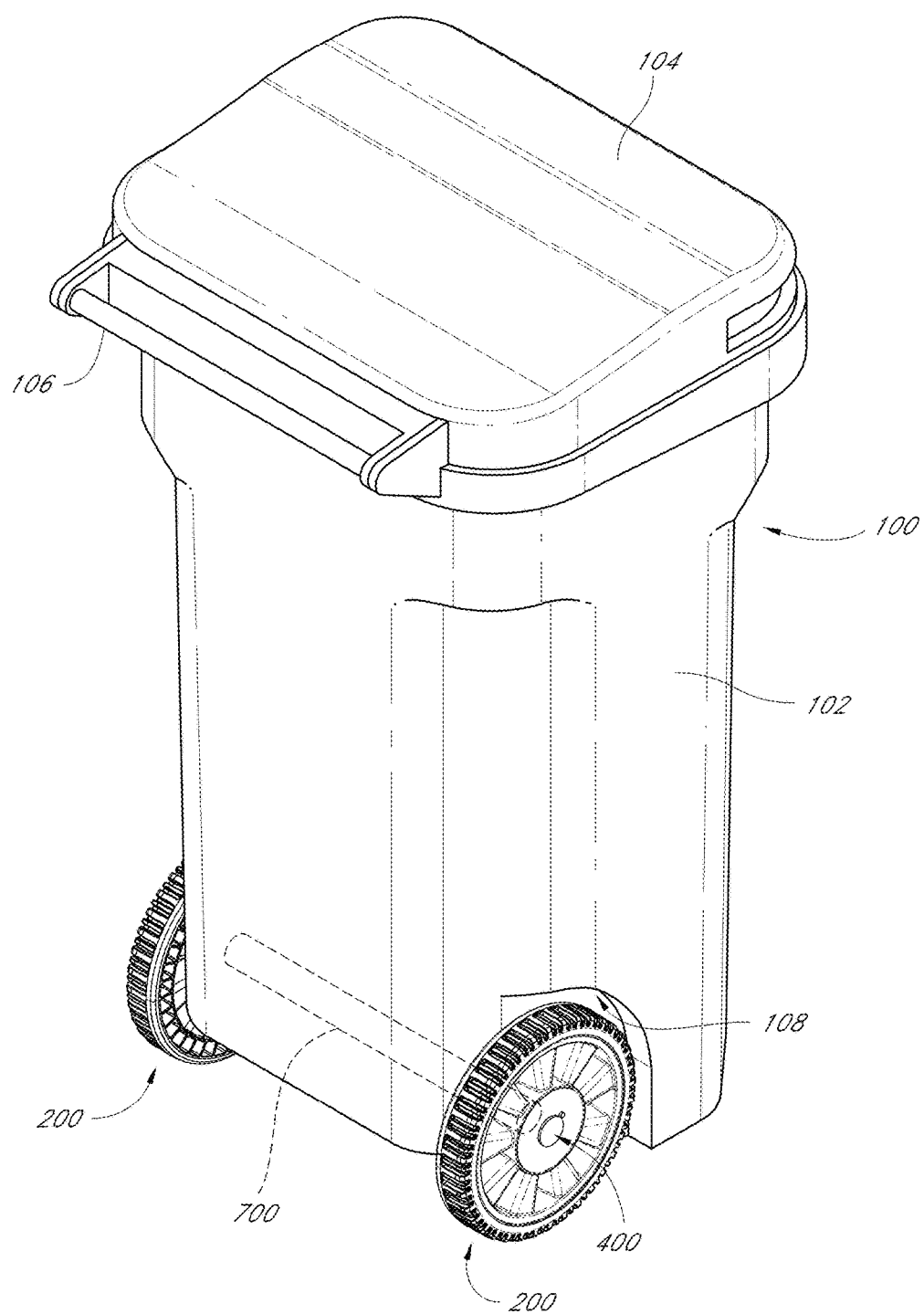
FIG. 1 is a top perspective view of a refuse cart including a wheel assembly mounted thereto.

The wheel assemblies described herein can be used in connection with numerous wheeled devices. FIG. 1 illustrates an example embodiment of a refuse cart 100 comprising a plurality of wheel assemblies 200 mounted on an axle 700 to the lower end of the cart body 102. A hinged lid 104 optionally can be provided, and the cart 100 can be tilted or tipped about the wheel assemblies 200 using handle 106 so as to enable rolling of the cart 100 for the transport of refuse, for example between a location for filling the cart 100 and a location for pickup by a refuse disposal company. The lower end of the cart body 102 optionally includes a wheel well or recess area 108 configured to receive wheel assemblies 200, for example to protect the wheel assemblies 200 and/or as a cosmetic structure. As described in detail below, the wheel assemblies 200 are secured on the axle 700 by a hub assembly 400. The wheel assemblies described herein are also suitable for use with other wheeled products such as wagons, wheeled food and beverage coolers, barbecues, wheeled toys, small refuse containers, golf carts, scooters, bicycles, luggage, toys, lawn and garden products, garage products, furniture, equipment, computers (e.g., servers), and the like.

Figure 2A:
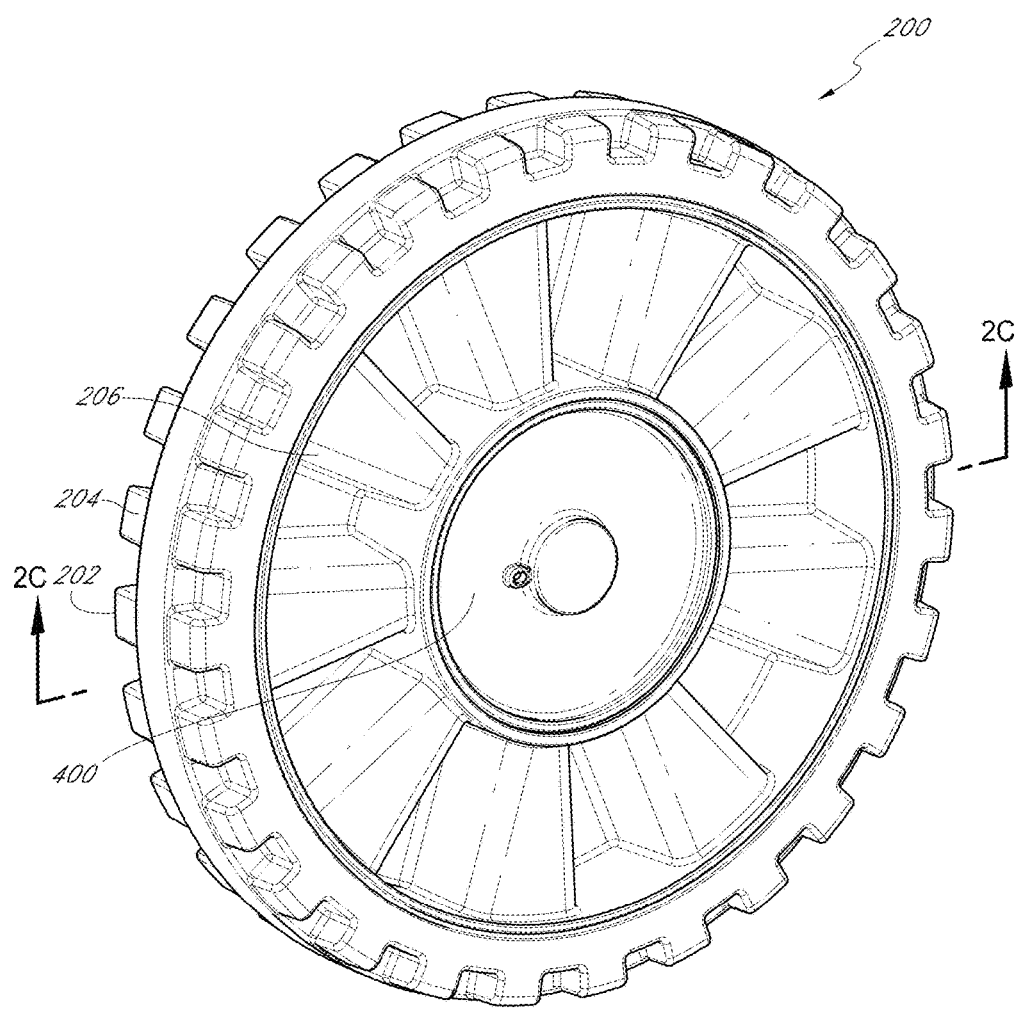
FIG. 2A is a top perspective view of a side of an example embodiment of a wheel assembly.
Figure 2B:
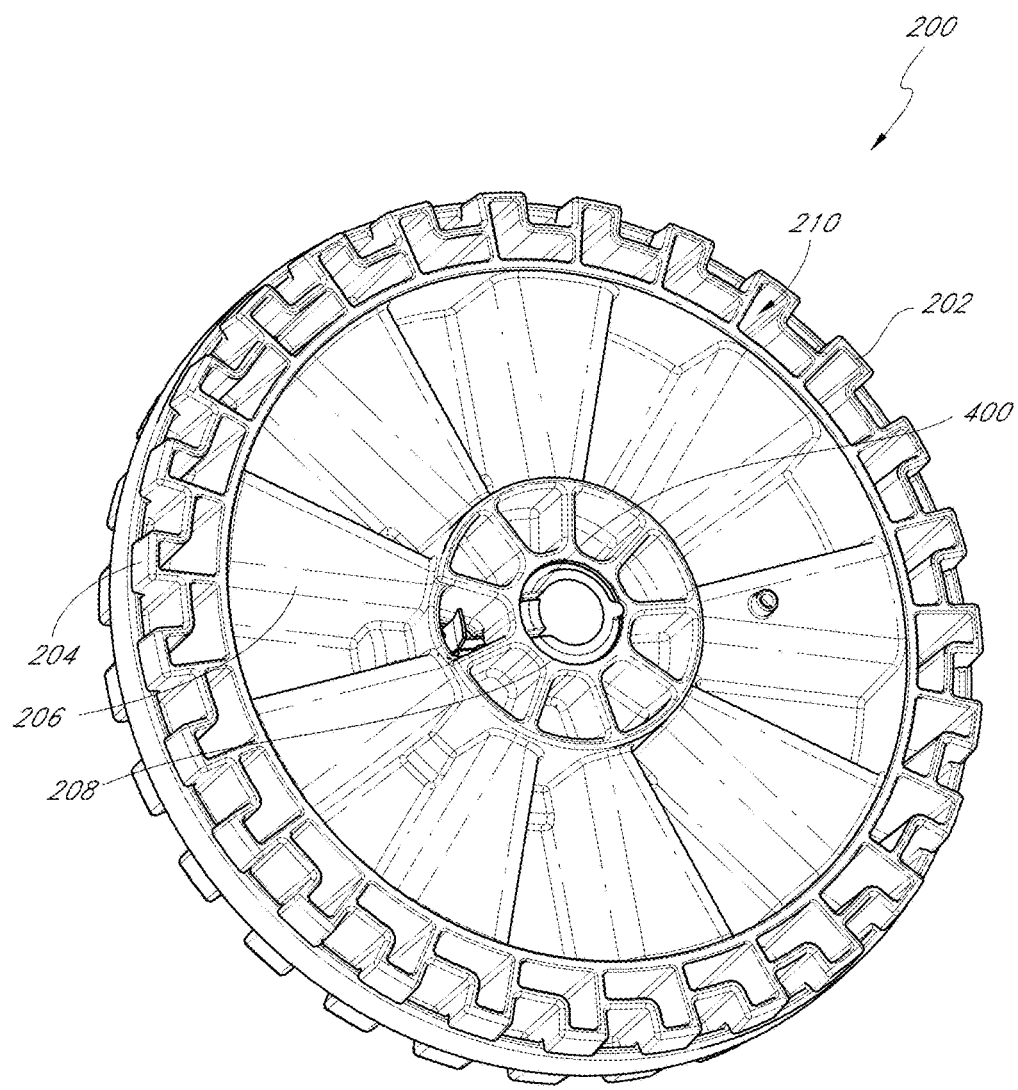
FIG. 2B is a bottom perspective view of another side of the wheel assembly of FIG. 2A.

FIG. 2A is a top perspective view of a side of an example embodiment of a wheel assembly 200 (e.g., an "outer" side when the wheel assembly 200 is mounted to a cart 100 via an axle 700). FIG. 2B is a bottom perspective view of another side of the wheel assembly 200 of FIG. 2A (e.g., an "inner" side when the wheel assembly 200 is mounted to a cart 100 via an axle 700).

When viewing a cart 100 comprising a wheel assembly 200, a user can generally see the entire outer side of the wheel assembly 200, but at least a portion of the inner side of the wheel assembly 200 can be at least partially obscured by the lower end of the cart body 102 (e.g., as depicted in FIG. 1). The wheel assembly 200 comprises a wheel 202 and a hub assembly 400 coupled to (e.g., mounted in) the wheel 202.

The wheel 202 of the wheel assembly 200 illustrated in FIGS. 2A and 2B is injection molded. In certain embodiments, injection molding the wheel 202 includes coupling a male mold and a female mold and injecting molten material therebetween. After the material has sufficiently hardened, the wheel 202 is removed from the molds. In certain embodiments, tread 204 and/or spokes 206 are integrally formed during the molding process. The tread 204 can help the wheel 202 to frictionally engage a surface during rolling movement (e.g., if coupled to an axle in a manner in which axle rotation causes rotation of the wheel assembly 200) and/or can enhance the appearance of the wheel 202 (e.g., as a decorative feature). In some embodiments, the wheel 202 comprises a smooth tread. The spokes 206 can help evenly distribute forces acting on the wheel 202 and can enhance the appearance of the wheel 202. Other features of the wheel 202 may also be integrally formed by modifying the mold. The injection molding process can form corrugated and/or hollow interior surfaces 210 that can reduce the amount of material used in creation of the wheel 202. Certain recesses 210 can provide strength by being certain shapes, for example as described in U.S. Pat. No. 7,481,498, issued on Jan. 27, 2009 for "Injection-Molded Wheel Having a Plurality of Recesses in a Rim Portion," which is incorporated herein by reference in its entirety. In certain embodiments, the wheel 202 comprises plastic (e.g., high density polyethylene (HDPE) (e.g., high molecular weight HDPE)).

In some embodiments, the wheel is blow molded. Further information about blow molded wheels can be found, for example, in U.S. Pat. No. 8,147,005, issued on Apr. 3, 2012 for "Wheel and Hub Assembly," which is incorporated herein by reference in its entirety. Rolling surfaces of wheels, for example being smooth or including treads 204, may be integrated into the molding process or may be formed in a multi-step process known as multi-shot molding. Further information about multi-shot molding can be found, for example, in U.S. Pat. No. 8,037,911, issued on Oct. 18, 2011 for "Wheel Including Tread Coupled to Rim," which is incorporated herein by reference in its entirety.

It will be appreciated that wheel assemblies 200 described herein may comprise wheels manufactured using other processes (e.g., rotational or compression molding) and/or having other features. For example, the wheel may comprise materials such as wood, metal, rubber, combinations thereof, etc.

Figure 2C:
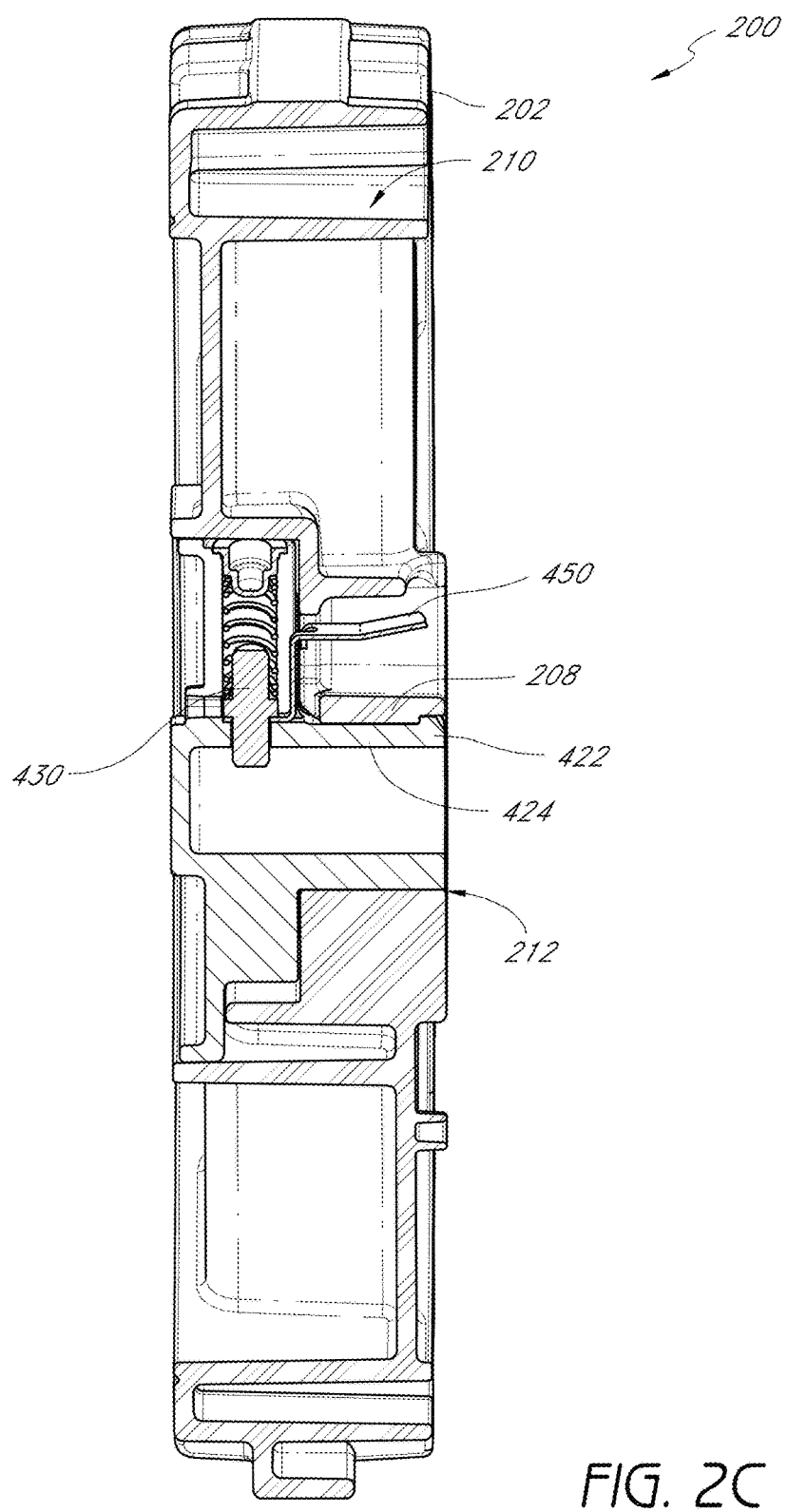
FIG. 2C is a top perspective and cross-sectional view of the wheel assembly of FIG. 2A along the line 2C-2C of FIG. 2A.

FIG. 2C is a top perspective and cross-sectional view of the wheel assembly 200 of FIG. 2A along the line 2C-2C of FIG. 2A. In the wheel assembly 200 embodied in FIG. 2C, a hub assembly 400 is inserted into a sleeve bore 212 of the wheel 202. In some embodiments, a wheel mounting sleeve or axle sleeve 424 may be centered within the wheel 202 such that an axle 700 inserted into the wheel mounting sleeve 424 (e.g., into a hub assembly 400 coupled to a wheel 202) can uniformly rotate. In some embodiments, the hub assembly 400 includes an axle bore 416 configured to receive an axle 700 so that the wheel assembly 200 may be mounted on a cart 100, a retaining element 430 which extends into the axle bore 416 configured to engage a groove 702 in the axle 700 so that the wheel assembly may be secured on the axle 700, and a hand-maneuverable release mechanism 450 for convenient removal of the wheel assembly 200 from the axle 700. The hand-maneuverable release mechanism 450 may be a pressure release mechanism, a touch release mechanism, and/or a finger (e.g., digit, thumb) maneuverable release mechanism.

Figure 2D:
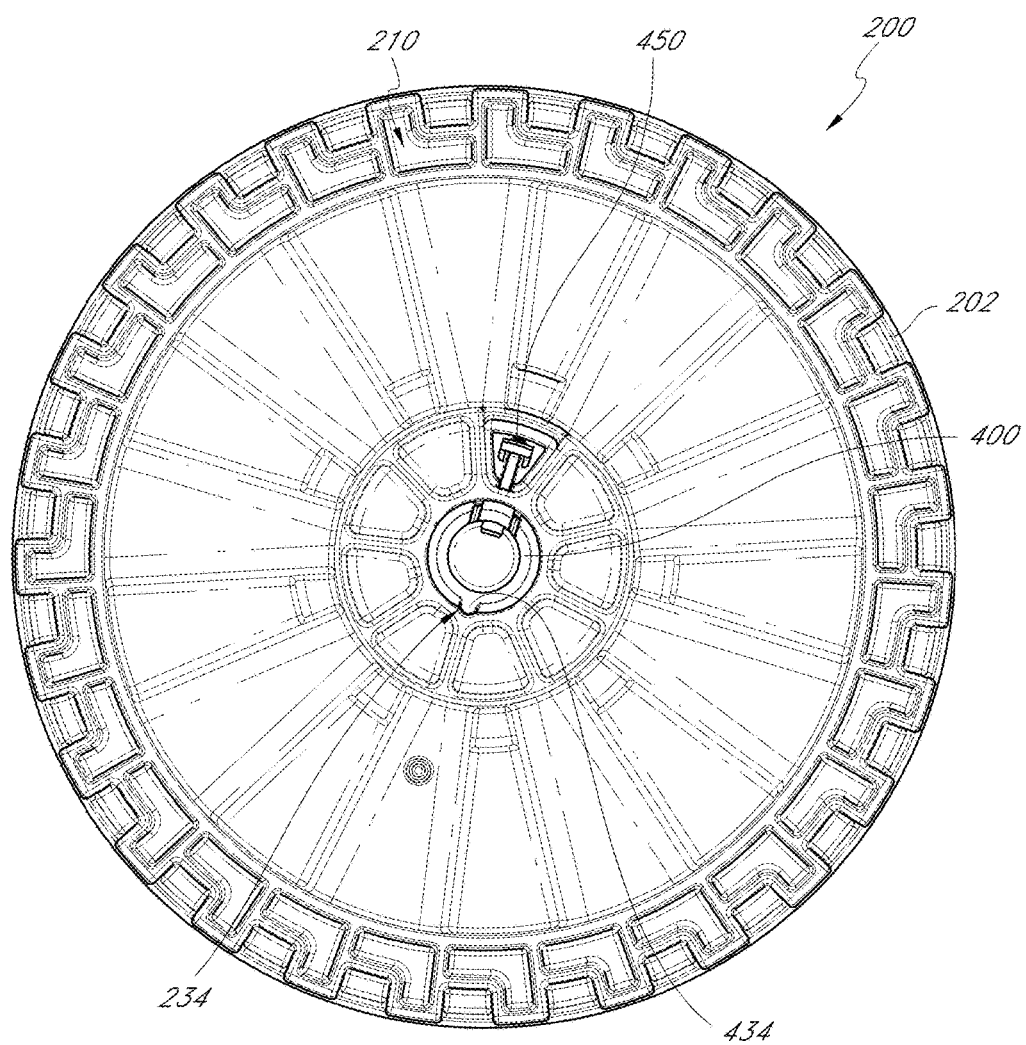
FIG. 2D is an elevational view of the side of FIG. 2B of the wheel assembly of FIG. 2A.

FIG. 2D is an elevational view of the side of FIG. 2B of the wheel assembly 200 of FIG. 2A. When the wheel assembly 200 is attached to a cart 100, this "inner" side may be at least partially obscured from view by a lower end 102 of the cart 100. In certain embodiments, the wheel 202 may contain a cutout or protrusion to provide visual and/or tactile identification of a hand-maneuverable release mechanism 450 and provide access to the hand-maneuverable release mechanism 450. The term "cutout" does not necessarily mean that material was removed, and can mean that material is omitted during the formation of the object. In some embodiments, the wheel assembly 400 may include a wheel mounting sleeve 424 including a guiderail 434 corresponding to a cutout 234 in the wheel 202. In some embodiments, the wheel assembly 400 may include a wheel mounting sleeve 424 including a recess corresponding to a projection in the wheel 202. The guiderail 434 and cutout 234 or other types of corresponding features may enable automated or semi-automated assembly of the hub assembly 400 to the wheel 202, for example by self-keying alignment or registration of corresponding features.

Figure 2E:
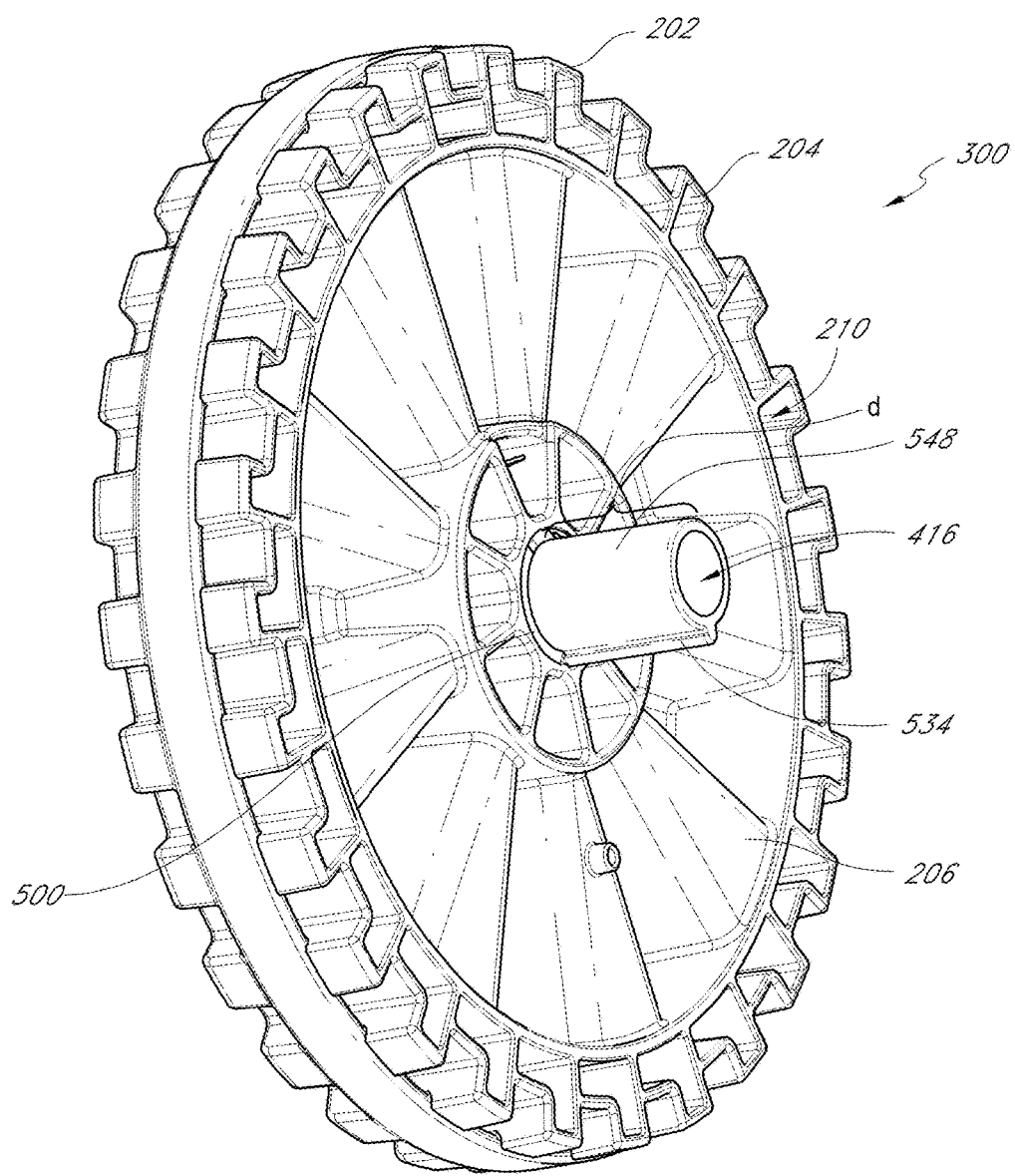
FIG. 2E is a side perspective view of another example embodiment of a wheel assembly.

FIG. 2E is a side perspective view of another example embodiment of a wheel assembly 300 (e.g., an "inner" side when the wheel assembly is mounted to a cart 100 via an axle 700). The wheel assembly 300 comprises a wheel 202 and a hub assembly 500 coupled to (e.g., mounted in) the wheel 202. The hub assembly 500 comprises a spacer 548. The spacer 548 is configured to space the wheel assembly 300 from the cart body 102 by a distance d. The distance d may be between about 0.25 inches and about 3 inches (approx. between about 0.6 cm and about 7.6 cm), between about 0.5 inches and about 3 inches (approx. between about 1.2 cm and about 7.6 cm), between about 1 inch and about 3 inches (approx. between about 2.5 cm and about 7.6 cm), combinations thereof, and the like. Other distances d are also possible (e.g., greater than about 3 inches (greater than approx. about 7.6 cm), less than about 0.25 inches (less than approx. about 0.6 cm)). The spacer 548 restricts the longitudinal movement of the wheel assembly 300 once mounted to the cart 100 by the axle 700, inhibiting or preventing the wheel assembly 300 other than the spacer 548 from coming into contact with the cart 100. By inhibiting or preventing contact between the wheel assembly 300 other than the spacer 548 and the cart 100, the spacer 548 can reduce friction that could result from such contact. Friction between the wheel 202 of the wheel assembly 300 and the cart 100 could cause damage to the wheel 202 and/or the cart 100, and/or could impede rotation of the wheel assembly 300 and/or movement of the cart 100.

A spacer separate from a wheel assembly is also possible. For example, prior to mounting the wheel assembly 200 to an axle 700, a separate spacer (e.g., a length of pipe (e.g., comprising HDPE, polyvinylchloride, metal, wood, etc.)) may be positioned over the axle 700. The inner side of the wheel mounting sleeve 424 would abut the outer end of the spacer, and the inner end of the spacer would abut the cart 100, which can inhibit or prevent contact between the wheel assembly 200 and the cart 100. In some embodiments, a separate spacer is not completely annular, for example including a slot through which the separate spacer can be positioned over the axle 700, and/or between the wheel assembly 200 and the cart 100, after the wheel assembly 200 has been coupled to the axle 700.

The wheel 202 in the wheel assembly 300 illustrated in FIG. 2E may also be injection or blow molded, and may include any or all of the characteristics illustrated in FIGS. 2A and 2B (e.g., treads 204, spokes 206, and hollow interior surfaces 210). It will also be appreciated that wheel assembly 300 described herein may comprise wheels manufactured using other processes (e.g., rotational or compression molding) and/or having other features. For example, the wheel may comprise materials such as wood, metal, rubber, combinations thereof, etc.

Figure 3A:
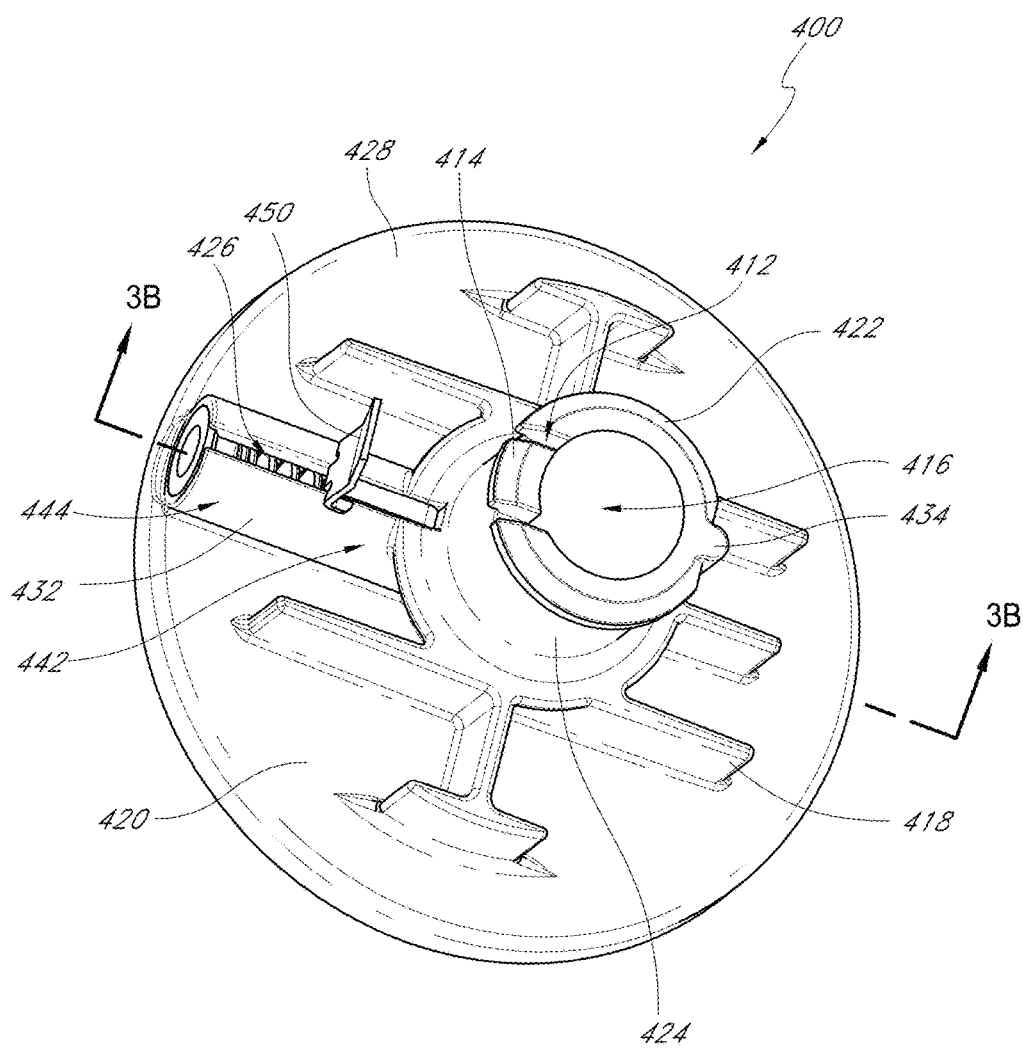
FIG. 3A is a bottom perspective view of an example embodiment of a hub assembly.
Figure 3B:
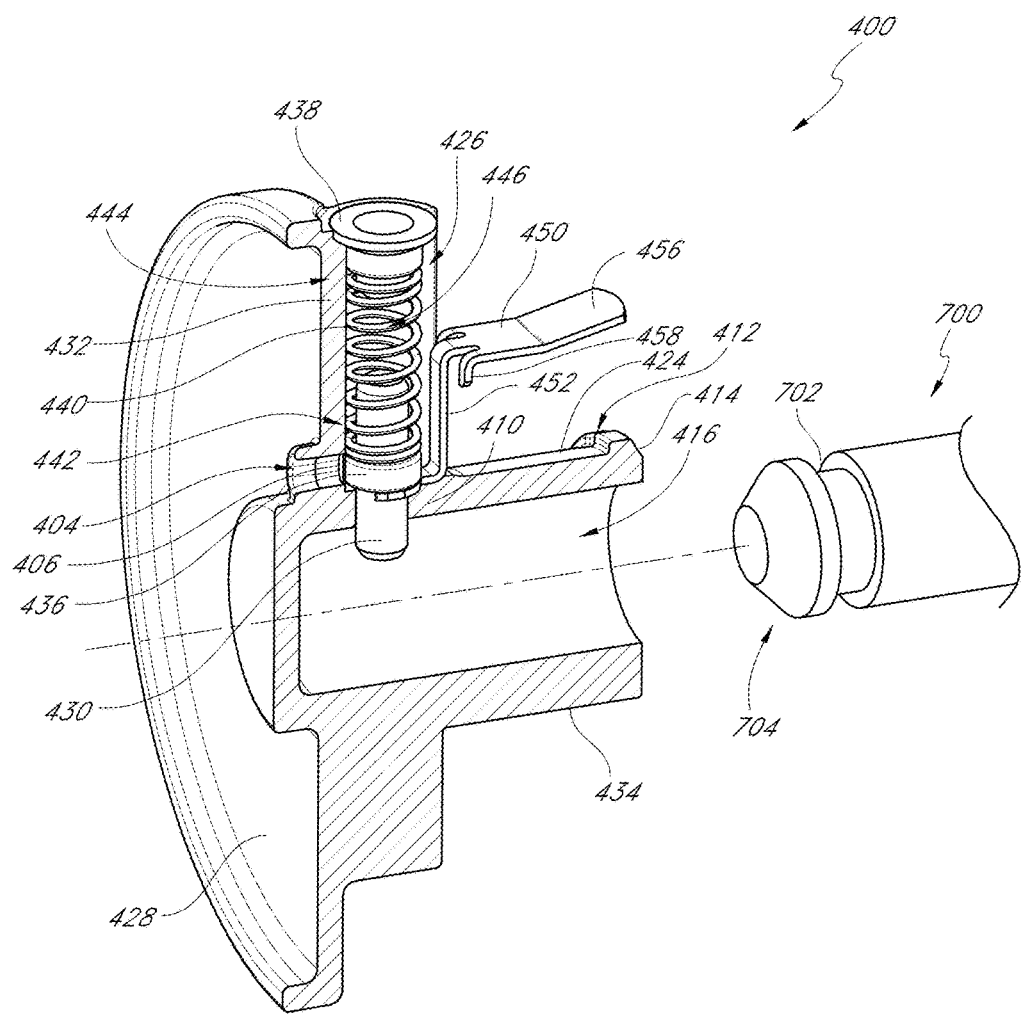
FIG. 3B is a top perspective and partial cross-sectional view of an example embodiment of the hub assembly of FIG. 3A along the line 3B-3B of FIG. 3A and an axle.

FIG. 3A is a bottom perspective view of an example embodiment of a hub assembly 400 (e.g., an "inner" side when the hub assembly 400 is coupled to a wheel 202 that is mounted to a cart 100 via an axle 700). FIG. 3B is a top perspective and partial cross-sectional view of the hub assembly 400 of FIG. 3A along the line 3B-3B of FIG. 3A, with the retaining element 430, the biasing element 440, the restraining element 438, and the hand-maneuverable release mechanism 450 in elevational view. The hub assembly 400 comprises a retainer housing 420, a retaining element 430, a biasing element 440, a restraining element 438, and a hand-maneuverable release mechanism 450. The retainer housing 420 includes a wheel mounting sleeve 424 including an axle bore 416 configured to receive an axle 700 and configured to be inserted within a sleeve bore of a wheel 202. The retainer housing 420 also includes a pin sleeve 432 including a first end 442, a second end 444, and a conduit 446 between the first end 442 and the second end 444. The first end 442 optionally includes a shoulder 410 extending into the conduit 446. The pin sleeve 432 includes an axial channel 426 which may run the length of the pin sleeve 432 to allow for insertion of the hand-maneuverable release mechanism 450 from the second end 444 of the pin sleeve 432. In some embodiments, the hand-maneuverable release mechanism 450 is inserted into a portion of the pin sleeve 432 (e.g., proximate to the first end 442) and rotated. Other methods of assembling a hub assembly 400 are also possible. The retaining element 430 is disposed within the conduit 446 of the pin sleeve 432. The retaining element 430 is configured to operatively engage a groove 702 in an axle 700. In some embodiments, the retaining element 430 comprises a pin. In certain embodiments, an axle 700 has a chamfered end 704 such that the retaining element 430 is transversely displaced relative to the movement of the axle 700. In certain alternative embodiments, the retaining element 430 is shaped (e.g., chamfered) such that it is transversely displaced relative to the movement of an axle 700 (e.g., without a chamfered end). In some embodiments, the retaining element 430 is configured (e.g., dimensioned) to reduce (e.g., decrease, minimize, prevent) rubbing of the sides of the groove 702 in the axle 700 by the sides of the retaining element 430. In some embodiments, the retaining element 430 comprises metal (e.g., stainless steel), which may be more resistant to damage from typical usage of the wheel assembly 200, 300 than plastic. Metal may also be better suited to shock loading and vibration than plastic. However, other materials (e.g., plastic) are also possible.

The retaining element 430 optionally includes a lip 436 that is wider than the shoulder 410. The optional lip 436 and shoulder 410 can interact to inhibit the retaining element 430 from exiting the first end 442 of the pin sleeve 432. In hub assemblies comprising a retaining element without a lip and a retainer housing without a shoulder, the retaining element may be pushed by the biasing element 440 into the axle bore 416, where it may become lost (e.g., by becoming displaced from the hub assembly) or damaged (e.g., by being crushed by the axle 700), although some embodiments described herein can avoid these issues. Other shapes and types of retaining elements 430 are also possible. For example, the retaining element 430 may be shaped to always have a certain orientation within the conduit 446 (e.g., having a flat side that inhibits rotation of the retaining element 430 within the conduit 446 (e.g., a flat side on the lip 436)). Such an embodiment may be useful for proper engagement of a chamfered retaining element 430 with a non-chamfered axle 700. For another example, the lip 436 may be longitudinally thicker, which can stabilize the retaining element 430 by reducing the chance of the retaining element 430 from pivoting within the conduit 446. Other possible shapes for the retaining element 430 include those that can aid in engaging the retaining element 430 with the biasing element 440 and/or the hand-maneuverable release mechanism 450 (e.g., as described with respect to FIG. 5F).

The biasing element 440 is disposed within the conduit 446 of the pin sleeve 432. The biasing element 440 is configured to bias the retaining element 430 towards the axle bore 416. The biasing element 440 may comprise a coil spring (e.g., as illustrated in FIG. 3B), a leaf spring, and the like. In some embodiments, the biasing element 440 comprises metal (e.g., stainless steel), which may be more resistant to damage from typical usage of the wheel assembly 200, 300 than plastic and which may be better suited to shock loading and vibration than plastic. However, other materials (e.g., plastic) are also possible. Other shapes and types of biasing elements 440 are also possible. In certain embodiments, the retaining element 430 and the biasing element 440 are disposed in a cartridge that can be disposed in the pin sleeve 432. The addition of layers such as a cartridge body would not depart from the invention disclosed herein. In some embodiments, the biasing element 440 within the pin sleeve 432 is in a relaxed position (e.g., the biasing element 440 only applies force to the retaining element 430 and the restraining element 438 upon being compressed). In certain embodiments, the biasing element 440 within the pin sleeve 432 is in a compressed state such that the biasing element 440 applies force to the retaining element 430 and the restraining element 438 regardless of the position of the retaining element 430. The restraining element 438 is stationary, but the retaining element 430 can move longitudinally within the pin sleeve 432 and compress the biasing element 440.

The restraining element 438 is configured to inhibit the retaining element 430 and/or the biasing element 440 from exiting the second end 444 of the pin sleeve 432, at least prior to coupling the hub assembly 400 to a wheel 202. The restraining element 438 may comprise a plug, a threaded plug, a deformation in the pin sleeve 432, a plurality of ledges extending radially into the pin sleeve 432, a disc insertable in a slot in the pin sleeve 432, and the like. The omission of the restraining element 438, for example so that the biasing element 440 would abut a wall of a wheel 202, would not depart from the invention disclosed herein.

The hand-maneuverable release mechanism 450 is configured to displace the retaining element 430 away from the axle bore 416. The hand-maneuverable release mechanism 450 may comprise a tab 456 or other means for user interaction, a lifter 454, which interacts with the retaining element 430, and a connector 452 connecting the lifter 454 and the tab 456. The hand-maneuverable release mechanism 450 also comprises optional guide arms 458. Additional examples of hand-maneuverable release mechanisms 450, some of which are described in detail with respect to FIGS. 5A-5J, can include an angled connector, different shapes and configurations of lifters, the omission of guide arms, and different shapes and configurations of tabs.

In some embodiments, two or more of the internal elements of the hub assembly 400 may be integrated. For example, the retaining element 430 and the biasing element 440 may comprise a single piece of plastic or metal, or two pieces of plastic or metal that are coupled (e.g., welded, adhered). For another example, the biasing element 440 and the restraining element 438 may comprise a single piece of plastic or metal, or two pieces of plastic or metal that are coupled (e.g., welded, adhered). For yet another example, the retaining element 430, the biasing element 440, and the restraining element 438 may comprise a single piece of plastic or metal, or multiple pieces of plastic or metal that are coupled (e.g., welded, adhered). For still another example, the retaining element 430 and the hand-maneuverable release mechanism 450 may comprise a single piece of plastic or metal, or two pieces of plastic or metal that are coupled (e.g., welded, adhered). For still yet another example, the retaining element 430, the hand-maneuverable release mechanism 450, and the biasing element 440 may comprise a single piece of plastic or metal, or multiple pieces of plastic or metal that are coupled (e.g., welded, adhered). Other combinations are also possible.

In certain embodiments, the retainer housing 420 includes a plurality of raised projections 418. The raised projections 418 can provide a number of advantages. In certain embodiments, the raised projections 418 may increase an amount of surface area that makes contact with the wheel 202. In certain embodiments, the raised projections 418 properly orient the retainer housing 420 with the wheel 202. In some embodiments, the raised projections 418 allow the retainer housing 420 to be properly aligned (e.g., in a vibratory feeder) for assembly (e.g., automated assembly) with other components of the hub assembly 400 (e.g., the retaining element 430, the biasing element 440, the restraining element 438, and/or the hand-maneuverable release mechanism 450). In certain such embodiments, at least some of the plurality of projections 418 may have a common endpoint. In some embodiments, the raised projections 418 allow the hub assembly 400 to be properly aligned (e.g., in a vibratory feeder) for assembly (e.g., automated assembly with other components of the wheel assembly 200 (e.g., the wheel 202)). In certain such embodiments, the assembled hub assembly 400 and the wheel 202 may be automatically assembled (e.g., substantially without human interaction). In some embodiments, the raised projections 418 reinforce a junction or interface between an end wall 428 of the retainer housing 420 and the wheel mounting sleeve 424, which can enhance the distribution of loads (e.g., traverse torque caused by movement of the wheel assembly 200 generally along the longitudinal axis of the axle 700).

In some embodiments, the wheel mounting sleeve 424 comprises an annular rib 422 configured to engage a wall 208 of a sleeve bore 212 of a wheel 202 (e.g., as illustrated in FIG. 2C). The annular rib 422 has a width that is wider than the width of the sleeve bore 212. In certain embodiments, the wheel mounting sleeve 424 is press-fit into a sleeve bore 212 of a wheel 202 until the annular rib 422 resiliently snaps out from the sleeve bore 212. In some embodiments, the annular rib 422 comprises an axial slot 412 that can facilitate passage of the annular rib 422 through the sleeve bore 212. The axial slot 412 can also extend into the wheel mounting sleeve 424, although there may be a tradeoff between the flexibility and strength of the wheel mounting sleeve 424. In certain embodiments, the annular rib 422 comprises two axial slots 412 and a tooth 414 between the axial slots 412. In a relaxed position, the tooth 414 has a width that is wider than the sleeve bore 212. The axial slots 412 can assist in radially inward flexing of the tooth 414 as it is urged through the sleeve bore 212. In some embodiments, the wheel mounting sleeve 424 has a substantially uniform surface. In certain such embodiments, the hub assembly 400 may be coupled to a wheel 202 by welding, adhesive, heat expansion, combinations thereof, and the like. In some embodiments, the wheel mounting sleeve 424 comprises a recess and the wheel 202 may include a protrusion configured to engage the recess.

In certain embodiments, the retainer housing 420 is injection molded. Injection molding may allow stricter tolerances than blow molding because the thicknesses of the components may be controlled based on the spacing between the male and female molds. In some embodiments, the end wall 428, the wheel mounting sleeve 424, and the pin sleeve 432 are integrally formed, although the pieces may also be separately formed and coupled (e.g., welded, adhered). In certain embodiments in which the elements are integrally formed, injection molding can increase throughput by reducing the number of downstream steps (e.g., eliminating trimming or boring steps because the conduit 446 and the axle bore 416 may be formed open at least one end). Other features of the retainer housing 420 may also be integrally formed (e.g., the raised projections 418). In certain embodiments, the retainer housing 420 comprises plastic (e.g., high density polyethylene (HDPE) (e.g., high molecular weight HDPE)).

Figure 3C:
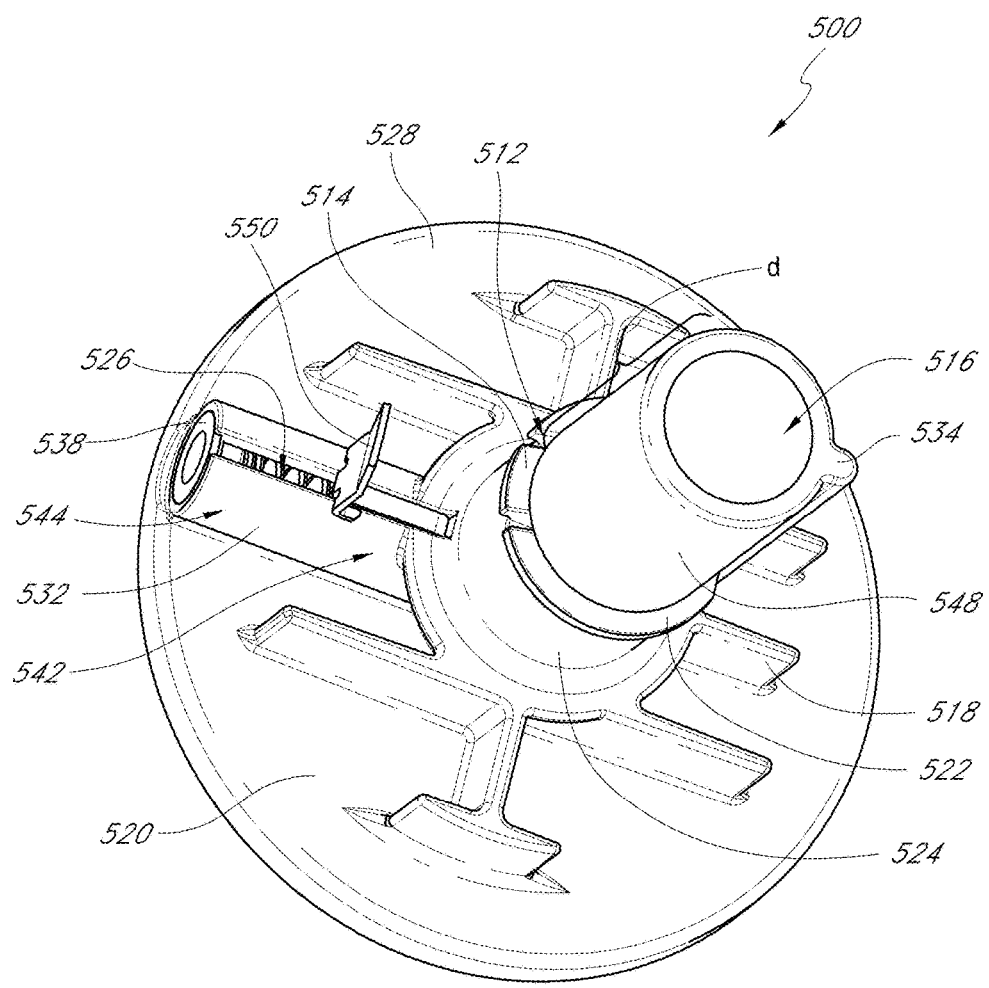
FIG. 3C is a bottom perspective view of another example embodiment of a hub assembly.

FIG. 3C is bottom perspective view of another example embodiment of a hub assembly 500 (e.g., an "inner" side when the hub assembly 500 is mounted to a wheel 202 that is mounted to a cart 100 via an axle 700). The hub assembly 500 comprises a retainer housing 520, a retaining element 530, a biasing element 540, a restraining element 538, and a hand-maneuverable release mechanism 550, for example sharing certain features with the retainer housing 520, the retaining element 530, the biasing element 540, the restraining element 538, and/or the hand-maneuverable release mechanism 550 described with respect to FIG. 3A. The inner components of the hub assembly 500 and their interaction, and/or the other features of the retainer housing 520, may be the same as or similar to the components of the hub assembly 400 and the retainer housing 420. The hub assembly 500 also illustrates two optional features of the retainer housing 520, which may be separately or jointly incorporated into the retainer housing 520 or other retainer housings described herein.

In certain embodiments, the retainer housing 520 optionally comprises a spacer 548 longitudinally extending from the wheel mounting sleeve 524 (e.g., from the annular rib 522). In certain such embodiments, the spacer 548 is integrally formed with the retainer housing 520. Such integral forming can increase the strength of the junction or interface between the spacer 548 and the wheel mounting sleeve 524 versus embodiments in which the spacer 548 is coupled (e.g., welded, adhered) to the wheel mounting sleeve 524. Integral forming can also ensure correct radial and/or longitudinal sizing of the spacer 548, for example to have a suitable interface with the wheel mounting sleeve 524 and/or the desired distance d from the cart body 102. The distance d may be between about 0.25 inches and about 3 inches (approx. between about 0.6 cm and about 7.6 cm), between about 0.5 inches and about 3 inches (approx. between about 1.2 cm and about 7.6 cm), between about 1 inch and about 3 inches (approx. between about 2.5 cm and about 7.6 cm), combinations thereof, and the like. Other distances d are also possible (e.g., greater than about 3 inches (greater than approx. about 7.6 cm), less about 0.25 inches (less than approx. about 0.6 cm)). Integral forming can also ensure correct radial positioning of the spacer 548, for example to be substantially concentric (e.g., concentric) with the wheel mounting sleeve 524 and/or to bear on a certain portion of the wheel assembly 500 (e.g., the wheel mounting sleeve 524). The spacer 548 may be fully annular (e.g., as illustrated in FIG. 3B), partially annular, or another shape. FIG. 2E illustrates a wheel assembly 300 comprising the hub assembly 500. A separate spacer, for example as described herein, is also possible.

In some embodiments, the wheel mounting sleeve 524 and/or the spacer 548 optionally include a guide rail 534. The guide rail 534 can provide a number of advantages. In some embodiments, the guide rail 534 may properly orient the retainer housing 520 with the wheel 202. For example, the guide rail 534 may allow the retainer housing 520 to be properly aligned for assembly (e.g., automated or semi-automated assembly) with the wheel 202, for example by rotating the hub assembly 500 until the guide rail 534 is able to pass through a complementary cutout 234 in the wheel 202. Certain such embodiments may reduce or eliminate the need for an alignment fixture during assembly. In certain such embodiments, the hub assembly 500 and the wheel 202 may be automatically or semi-automatically assembled (e.g., substantially without human interaction, totally without human interaction). In some embodiments, the hub assembly 500 and the wheel 202 may be at least partially manually or fully manually assembled (e.g., by a person using a tool such as a rubber mallet).

In some embodiments, the annular rib 522 may be indented, decreased, beveled, shaved, differently sized, and the like proximate to the guide rail 534 (e.g., as illustrated in FIG. 3C). In certain such embodiments, the guide rail 534 can guide rotational positioning of the hub assembly 500 throughout insertion into a wheel 202. In the embodiment illustrated in FIG. 3C, the guiderail 534 extends the entire length of the spacer 548 and the wheel mounting sleeve 524. In some embodiments, the guiderail 534 extends only part of the length of the spacer 548 and/or the wheel mounting sleeve 524. In some embodiments, initiating correct alignment between the hub assembly 500 and the wheel 202 is sufficient, for example because further coupling of the hub assembly 500 and the wheel 202 lacks rotation. In some embodiments, the guiderail 534 extends intermittently along the length of the spacer 548 and/or the wheel mounting sleeve 524 (e.g., a first portion proximate to the outer end of the spacer 548 and a second portion proximate to the outer end of the wheel mounting sleeve 524). In some embodiments, alignment between the hub assembly 500 and a wheel 202 may be based at least partially on a recess in a spacer and/or a wheel mounting sleeve and a protrusion in a wheel. Other sets of corresponding alignment features are also possible.

Referring again to FIGS. 3A and 3B, the hub assembly 400 comprises a guide rail 434. Referring again to FIG. 3B, a portion of the retaining element 430 protrudes through the first end 442 of the pin sleeve 432 and through the wheel mounting sleeve 424 and into the axle bore 416, where it can interact with a groove 702 in an axle 700. As an axle 700 is inserted into the axle bore 416, the axle 700 pushes the retaining element 430 into the pin sleeve 432. In the illustrated embodiment, the axle 700 has a beveled end, so the retaining element 430 is longitudinally displaced upon a transverse force applied by the axle 700. In some embodiments, the axle 700 does not have a beveled end, but the retaining element 430 has a beveled end so the retaining element 430 is longitudinally displaced upon a transverse force applied by the axle 700. In some embodiments, both the axle 700 and the retaining element 430 have beveled ends so the retaining element 430 is longitudinally displaced upon a transverse force applied by the axle 700. Once the axle 700 is extended until the groove 702 is aligned with the retaining element 430, the retaining element 430, acted upon by the biasing element 440, extends out of the pin sleeve 432 and into the groove 702. Once engaged, the retaining element 430 interacts with the groove 702 to inhibit or prevent the hub assembly 400 from becoming detached from the axle 700 unless acted upon by a specific force (e.g., the hand-maneuverable release mechanism 450, a tool, etc.).

If a user wishes to detach the hub assembly 400 or a wheel assembly 200 comprising the hub assembly 400 from an axle 700, the hand-maneuverable release mechanism 450 may be manipulated. Manipulation of the hand-maneuverable release mechanism causes the hand-maneuverable release mechanism 450 to longitudinally displace the retaining element 430 towards the second end 444 of the pin sleeve 432 and at least partially out (e.g., entirely out) of the axle bore 416, allowing an axle 700 to be removed from the axle bore 416.

In some embodiments, the hand-maneuverable release mechanism 450 interacts with a retaining element 430 via a lip 436 on the retaining element 430. In certain embodiments, a lifter 454 and/or another portion of the hand-maneuverable release mechanism 450 is positioned under a lip 436 on a retaining element 430. In some embodiments, a post 466 is inserted into an aperture 472 in a retaining element 430, for example as described herein with respect to FIG. 5F.

Figure 3D:
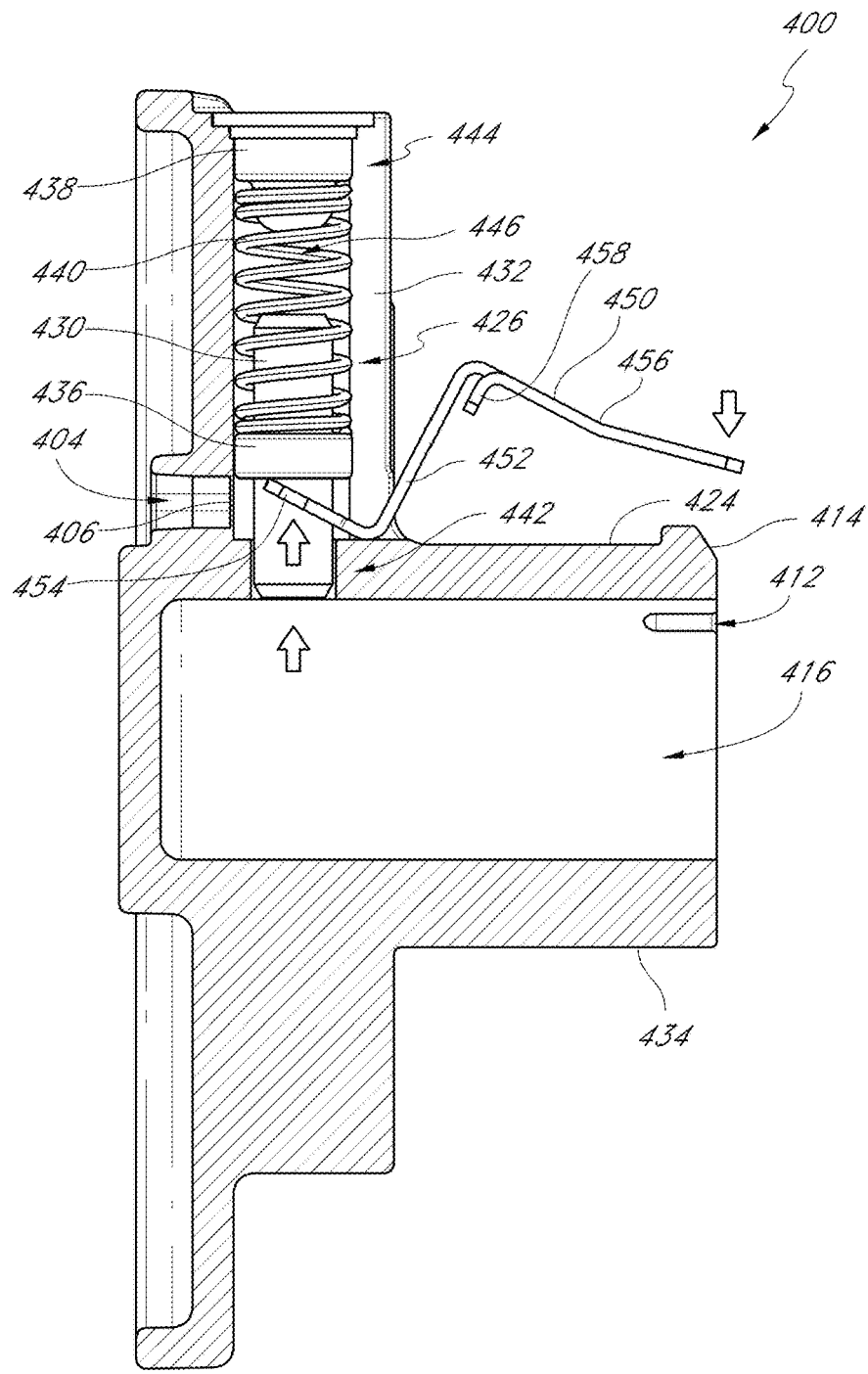
FIG. 3D is a partial cross-sectional view of the hub assembly of FIG. 3A along the line 3B-3B of FIG. 3A with a hand-maneuverable release mechanism in a release position.

In some embodiments, the hand-maneuverable release mechanism 450 is configured to displace the retaining element 430 upon manipulation of the tab 456 towards the axle bore 416. In certain embodiments, a wheel mounting sleeve 424 or other surface acts as a bearing surface upon which the hand-maneuverable release mechanism 450 pivots the lifter 454 upward; lifting the retaining element 430 out of the axle bore 416. FIG. 3D is a partial cross-sectional view of the hub assembly 400 of FIG. 3A along the line B-B of FIG. 3A, with the retaining element 430, the biasing element 440, the restraining element 438, and the hand-maneuverable release mechanism 450 in elevational view.

The hand-maneuverable release mechanism 450 is in a release position, having been pushed radially inward or towards the axle bore 416, or in a direction opposite to a direction of travel of the retaining element 430. The release position allows the retaining element 430 to disengage from the axle 700.

Figure 3E:
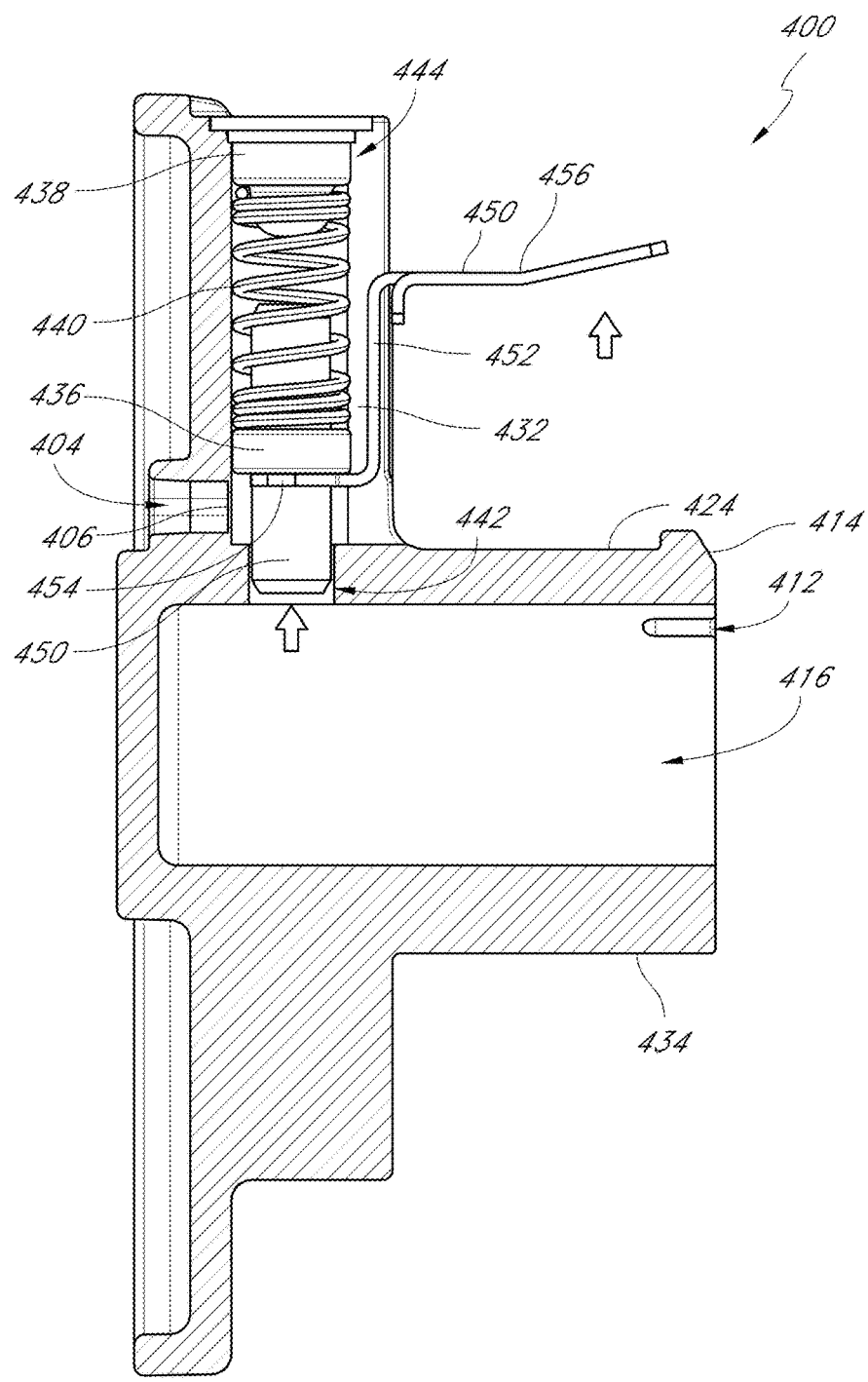
FIG. 3E is a partial cross-sectional view of the hub assembly of FIG. 3A along the line 3B-3B of FIG. 3A with a hand-maneuverable release mechanism in a release position.

In some embodiments, the hand-maneuverable release mechanism 450 is configured to displace the retaining element 430 upon manipulation of the tab 456 away from the axle bore 416. In certain embodiments, pulling the tab 456 of the hand-maneuverable release mechanism 450 also pulls the lifter 454, lifting the retaining element 430 out of the axle bore 416. FIG. 3E is a partial cross-sectional view of the hub assembly 400 of FIG. 3A along the line 3B-3B of FIG. 3A, with the retaining element 430, the biasing element 440, the restraining element 438, and the hand-maneuverable release mechanism 450 in elevational view. The hand-maneuverable release mechanism 450 is in a release position, having been pulled radially outward or away from the axle bore 416, or in the same direction as a direction of travel of the retaining element 430. The release position allows the retaining element 430 to disengage from the axle 700.

In some embodiments, after the retaining element 430 is in a release position, for example as illustrated in FIGS. 3D and 3E, the biasing element 440 may cause the retaining element 440 to return to a locking position, for example as illustrated in FIG. 3B, without further action by the user. Automatic return of the retaining element 440 to the locking position may help ensure that a wheel assembly 200 is locked to an axle 700. In some embodiments, after the retaining element 430 is in the release position, for example as illustrated in FIGS. 3D and 3E, the retaining element 440 does not return to the locking position, for example as illustrated in FIG. 3B, and further action by a user returns the retaining element 440 to the locking position. For example, the retainer housing 420 or other part of the hub assembly 400 may include a detent or other mechanism configured to hold or maintain the retaining element 430 in the release position, and a user may manipulate the hand-maneuverable release mechanism 450 to cause the retaining element 430 to be in the locking position. Manual or semi-automatic return of the retaining element 440 to the locking position may reduce metal shear on the biasing element 440 during distribution, for example because the biasing element 440 may already be compressed when a wheel assembly 200 is coupled to an axle 700 and/or may reduce force used when coupling a wheel assembly 200 to an axle 700. Manual or semi-automatic return of the retaining element 440 to the locking position may allow a hub assembly 400, for example including a non-beveled retaining element 430, to be coupled to a non-beveled axle, or other combinations of retaining elements and axles not amenable to automatic insertion. In some embodiments, the retaining element 430 in the release position of FIG. 3D may return to the locking position without further action by the user, and the retaining element 430 in the release position of FIG. 3E may return to the locking position upon further action by the user, or vice versa.

Figure 4:
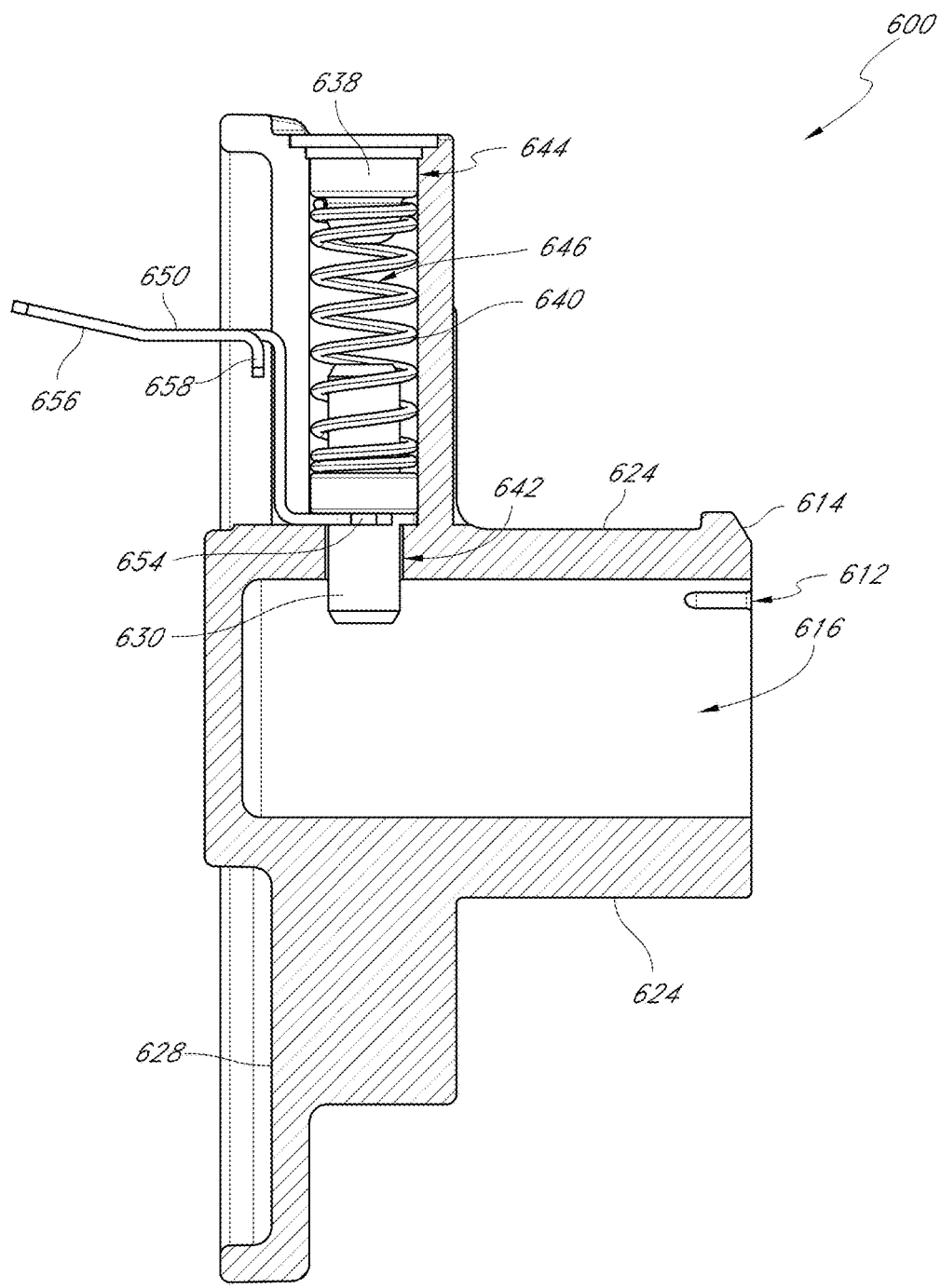
FIG. 4 is a partial cross-sectional view of another example embodiment of a hub assembly.

FIG. 4 is a partial cross-sectional view of a hub assembly 600 comprising a hand-maneuverable release mechanism 650 on a side of the hub assembly 600 opposite a wheel mounting sleeve 624, with the retaining element 630, the biasing element 640, the restraining element 638, and the hand-maneuverable release mechanism 650 in elevational view. The hand-maneuverable release mechanism 650 may function or operate similarly to the hand-maneuverable release mechanism 450, for example by longitudinally displacing a retaining element 630 towards a second end 644 of a pin sleeve 632 and at least partially out (e.g., entirely out) of an axle bore 616, allowing an axle 700 to be removed from the axle bore 616. Location of the hand-maneuverable release mechanism 650 on a side opposite the wheel mounting sleeve can allow the hub assembly 600 to be used with existing wheels, for example that do not have cutouts for a hand-maneuverable release mechanism. The hub assembly 600 may be preferable for blow-molded wheels because the creation of slots or cutouts during blow-molding may be difficult or impractical. In certain embodiments, the hand-maneuverable release mechanism 650 blends into the design of the hub assembly 600. For example, the end wall 628 of the retainer housing may include protrusions designed to mimic the tab 656 of the hand-maneuverable release mechanism 650.

Figure 5A:
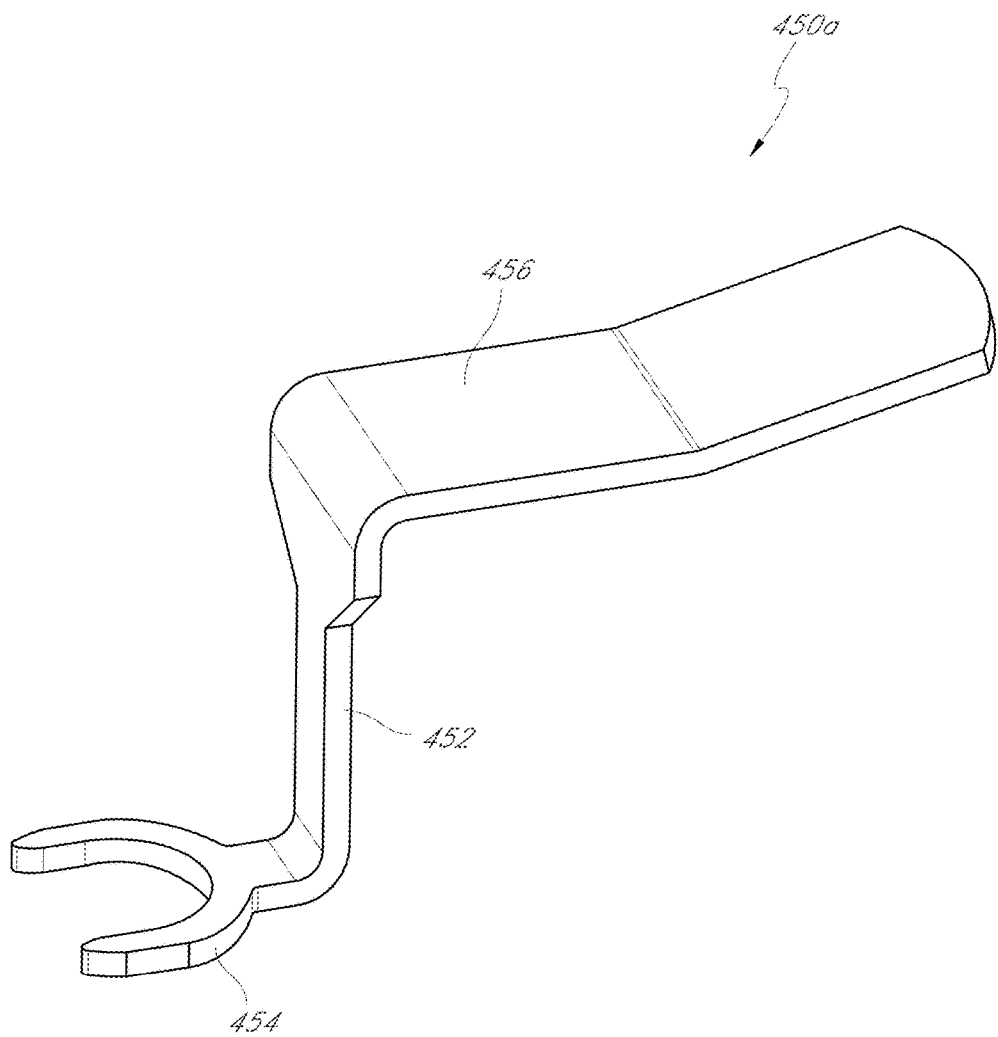
FIG. 5A is a top perspective view of an example embodiment of a hand-maneuverable release mechanism.

FIG. 5A is a top perspective view of an example embodiment of a hand-maneuverable release mechanism 450a. The embodiment illustrated in FIG. 5A includes a tab 456, which may be manipulated toward and/or away from an axle bore 416 or radially inward and/or outward, a lifter 454, which can act on a retaining element 430 (e.g., lifting the retaining element 430 away from an axle bore 416), and a connector 452 connecting the tab 456 and the lifter 454. The lifter 454 includes a plurality (e.g., two) of generally arcuate prongs, which are configured to straddle a retaining element 430. The connector 452 may protect components in the pin sleeve 432, for example the retaining element 430 and the biasing element 440, by inhibiting dirt and/or debris from entering the pin sleeve 432 through the axial channel 426, which could otherwise interfere with operation of the components. The tab 456 includes a bent portion, although other ergonomic designs are also possible (e.g., concavities, texture, and the like).

Figure 5B:
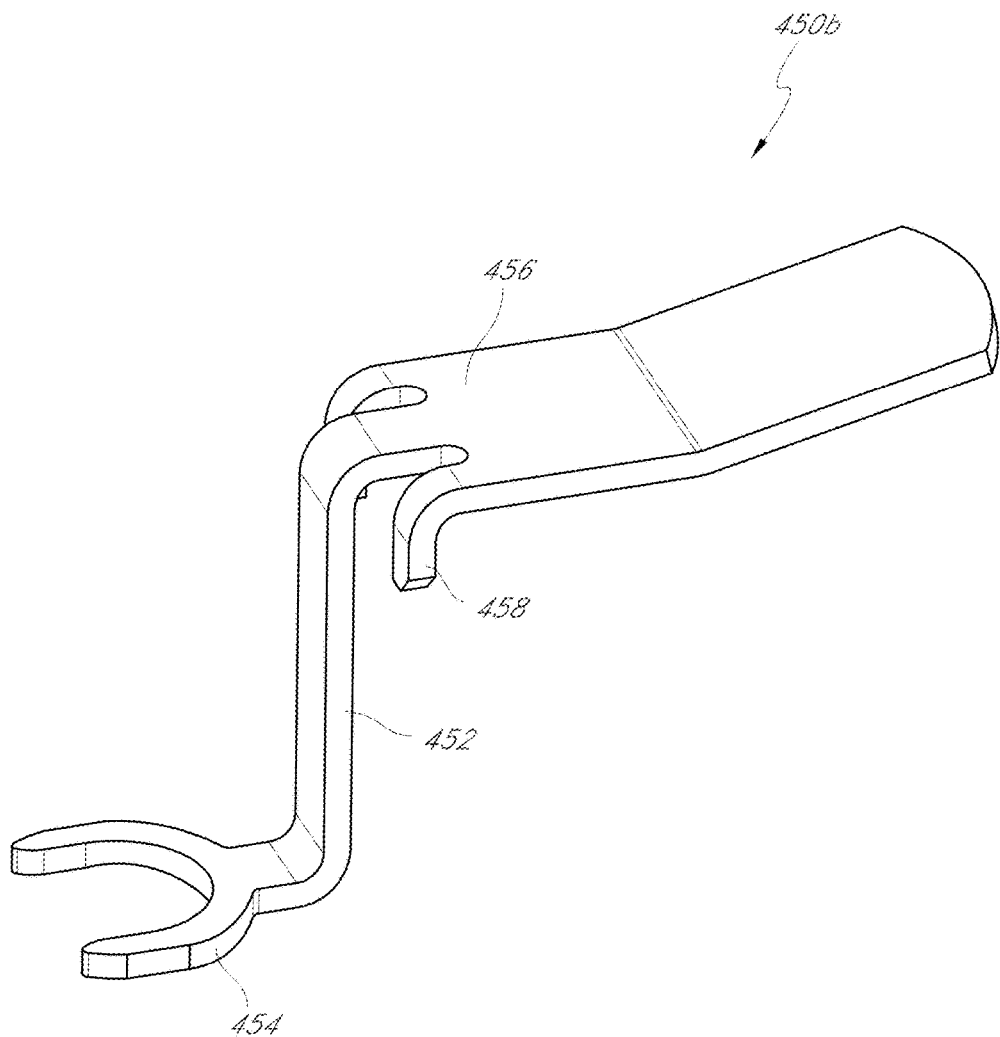
FIG. 5B is a top perspective view of another example embodiment of a hand-maneuverable release mechanism.

FIG. 5B is a top perspective view of an example embodiment of a hand-maneuverable release mechanism 450b. The embodiment illustrated in FIG. 5B includes a tab 456, which may be manipulated toward and/or away from an axle bore 416 or radially inward and/or outward, a lifter 454, which can act on a retaining element 430 (e.g., lifting the retaining element 430 away from an axle bore 416), and a connector 452 connecting the tab 456 and the lifter 454. The lifter 454 includes a plurality (e.g., two) of generally arcuate prongs, which are configured to straddle a retaining element 430. The connector 452 may protect components in the pin sleeve 432, for example the retaining element 430 and the biasing element 440, by inhibiting dirt and/or debris from entering the pin sleeve 432 through the axial channel 426, which could otherwise interfere with operation of the components. The embodiment illustrated in FIG. 5B also includes optional guide arms 458, which may inhibit the tab 456 from entering a pin sleeve 432 and/or inhibit the hand-maneuverable release mechanism 450b from being jammed or thrusted inward. The guide arms 458 may also inhibit rotation of the hand-maneuverable release mechanism 450b during operation (e.g., by acting as a bearing surface against the pin sleeve 432) and/or add structural stability to the tab 456. The tab 456 includes a bent portion, although other ergonomic designs are also possible (e.g., concavities, texture, and the like).

Figure 5C:
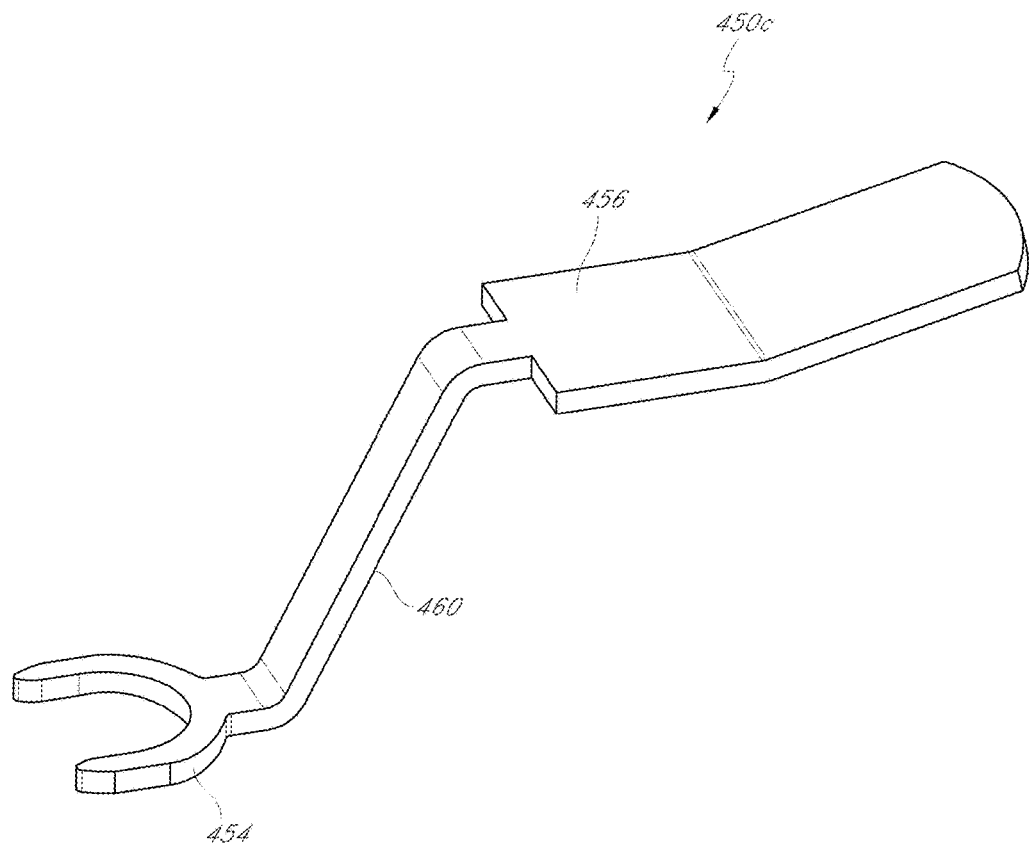
FIG. 5C is a top perspective view of still another example embodiment of a hand-maneuverable release mechanism.

FIG. 5C is a top perspective view of another example embodiment of a hand-maneuverable release mechanism 450c. The embodiment illustrated in FIG. 5C includes a tab 456, which may be manipulated toward and/or away from an axle bore 416 or radially inward and/or outward, a lifter 454, which can act on a retaining element 430 (e.g., lifting the retaining element 430 away from an axle bore 416), and a connector 460 connecting the tab 456 and the lifter 454. In contrast to the connectors 452 illustrated in FIGS. 5A and 5B, which are substantially orthogonal to the plane of the lifter 454 and the tab 456, the connector 460 is angled with respect to the plane of the lifter 454 and the tab 456. In some embodiments, an angled connector 460 may provide increased torque for embodiments in which the tab is manipulated toward an axle bore 416 or radially inward. In contrast to the embodiment illustrated in FIG. 5B, the embodiment illustrated in FIG. 5C does not include guide arms 458.

Figure 5D:
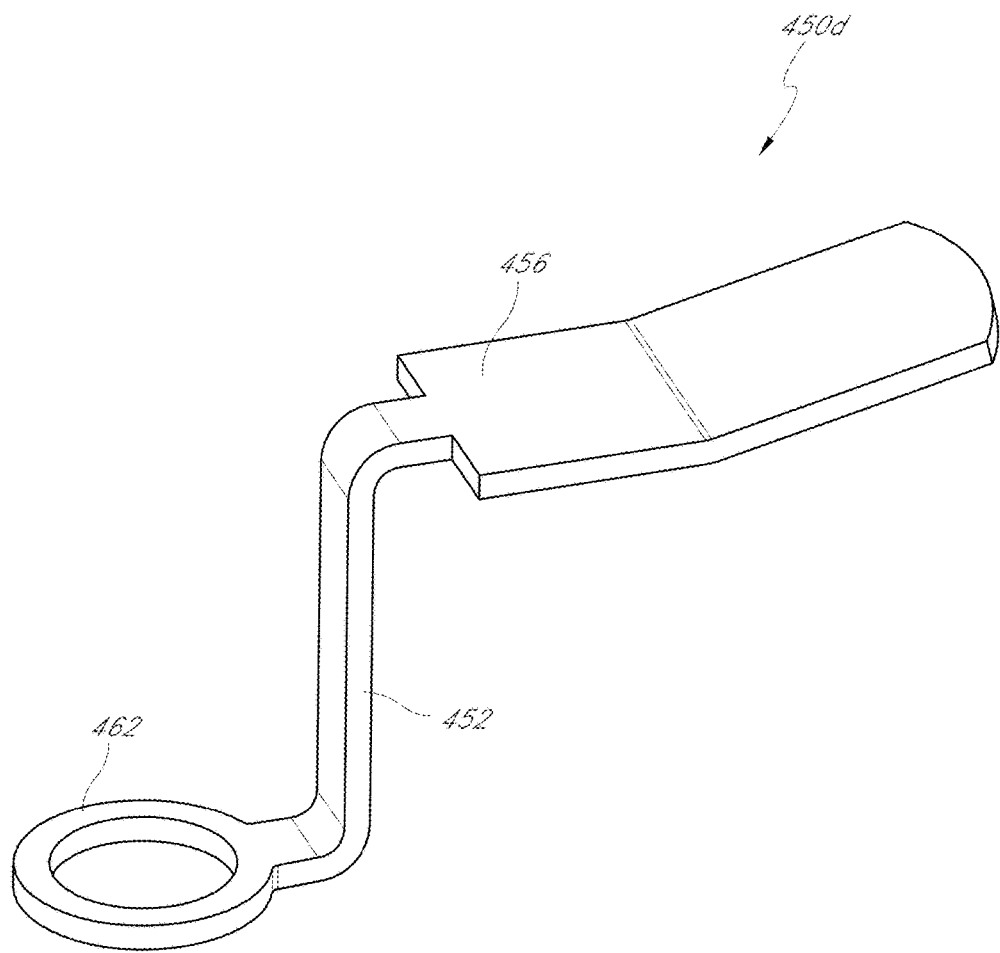
FIG. 5D is a top perspective view of yet another example embodiment of a hand-maneuverable release mechanism.

FIG. 5D is a top perspective view of yet another example embodiment of a hand-maneuverable release mechanism 450d. The embodiment illustrated in FIG. 5D includes a tab 456, which may be manipulated toward and/or away from an axle bore 416 or radially inward and/or outward, a lifter 462, which can act on a retaining element 430 (e.g., lifting the retaining element 430 away from an axle bore 416), and a connector 452 connecting the tab 456 and the lifter 462. The lifter 462 includes a circular continuous arm configured to surround a retaining element 430. An arcuate lifter 462 may provide better engagement with a retaining element 430, for example in embodiments in which the hand-maneuverable release mechanism 450d is manipulated away from an axle bore 416 or radially outward. Other arcuate shapes are also possible. For example, the lifter 462 may be oval in shape and/or truncated at the end opposite the connector 452. For another example, the lifter 462 may comprise a hook or elongated hook extending greater than about 90°, greater than about 180°, greater than about 270°, less than about 360°, combinations thereof, and the like, around the retaining element 430. Certain arcuate shapes may reduce or eliminate friction or binding that may be caused by interaction between the lifter 462, the retaining element 430, and/or the pin sleeve 432. In some embodiments, for example in embodiments in which the hand-maneuverable release mechanism 450d is configured to only be manipulated away from an axle bore 416 or radially outward, friction or binding between the lifter 462, the retaining element 430, and/or the pin sleeve 432 may be desirable to inhibit or prevent the retaining element 430 from being lifted away from an axle bore 416 upon manipulation of the tab 456 towards the axle bore 416 or radially inward, but to allow the retaining element 430 to be lifted away from an axle bore 416 upon manipulation of the tab 456 away from the axle bore 416. In contrast to the embodiment illustrated in FIG. 5B, the embodiment illustrated in FIG. 5D does not include guide arms 458.

Figure 5E:
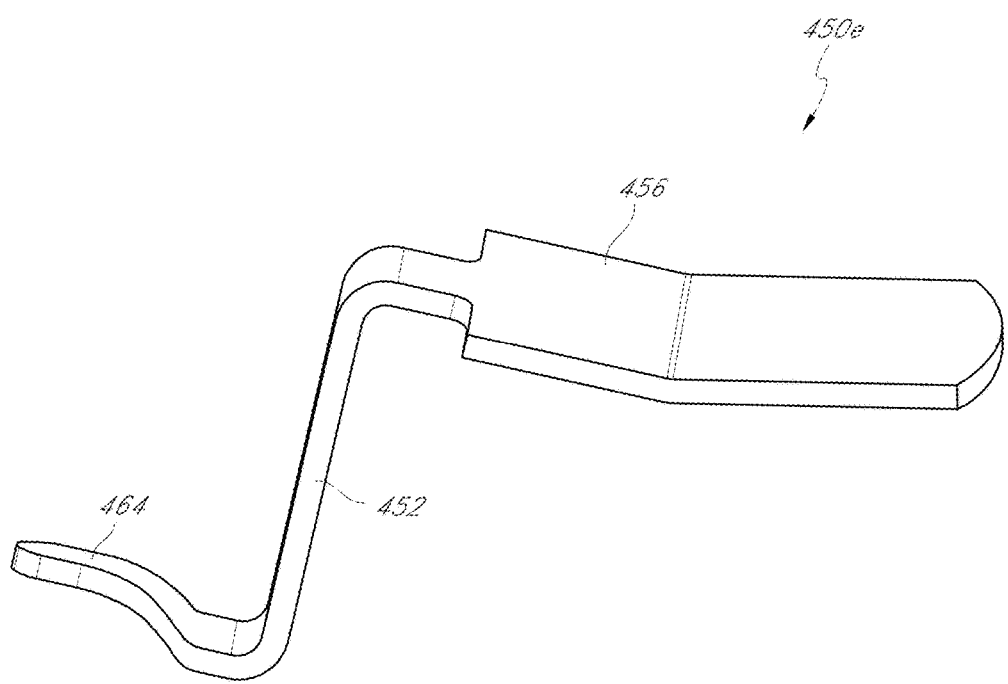
FIG. 5E is a top perspective view of yet still another example embodiment of a hand-maneuverable release mechanism.

FIG. 5E is a top perspective view of still another example embodiment of a hand-maneuverable release mechanism 450e. The embodiment illustrated in FIG. 5E includes a tab 456, which may be manipulated toward and/or away from an axle bore 416 or radially inward and/or outward, a lifter 464, which can act on a retaining element 430 (e.g., lifting the retaining element 430 away from an axle bore 416), and a connector 452 connecting the tab 456 and the lifter 464. The lifter 464 includes a single, generally-arcuate prong, which is configured to abut a portion of a retaining element 430. A single prong may reduce the material used in the production of the hand-maneuverable release mechanism 450e. A single prong may also reduce or eliminate friction or binding that may be caused by interaction between the lifter 464, the retaining element 430, and/or the pin sleeve 432. In contrast to the embodiment illustrated in FIG. 5B, the embodiment illustrated in 5E does not include guide arms 458.

Figure 5F:
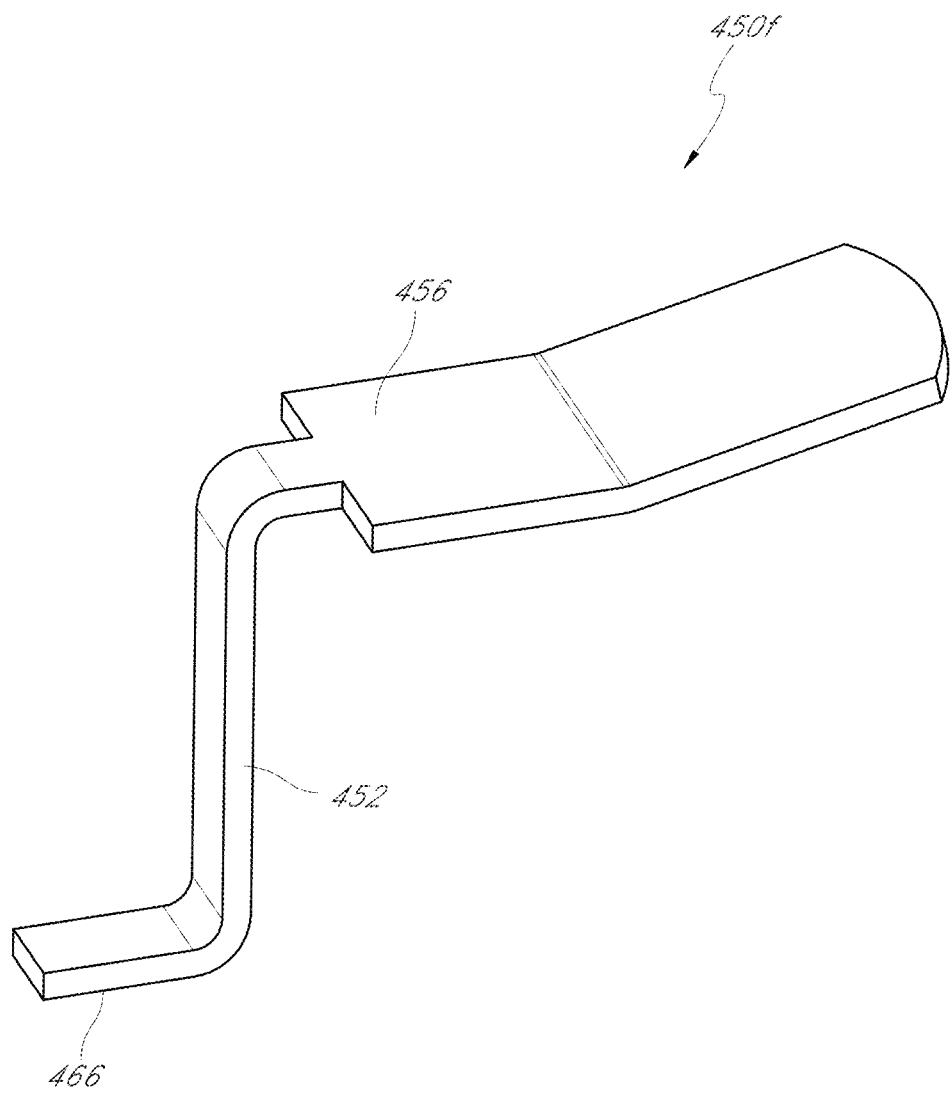
FIG. 5F is a top perspective view of a further another example embodiment of a hand-maneuverable release mechanism.
Figure 5G:
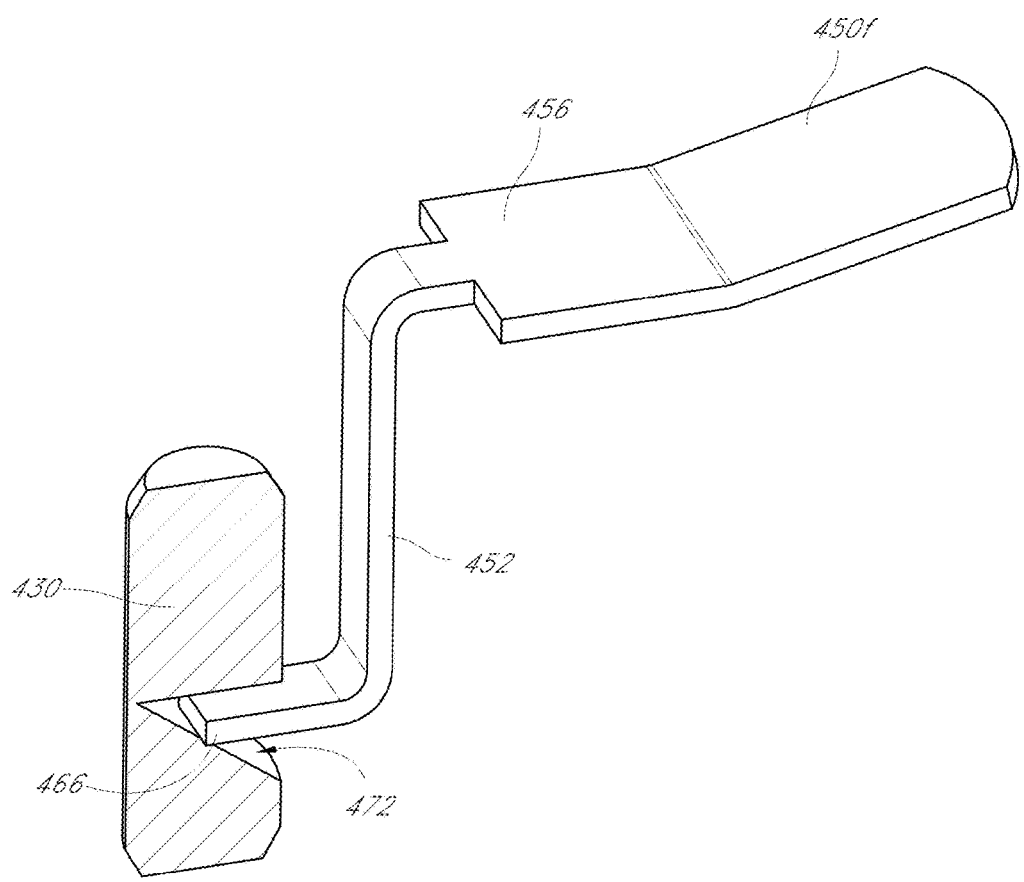
FIG. 5G is a top perspective and partial cross-sectional view of the hand-maneuverable release mechanism of FIG. 5F and a retaining element.

FIG. 5F is a top perspective view of yet still another example embodiment of a hand-maneuverable release mechanism 450*f*. The embodiment illustrated in FIG. 5F includes a tab 456, which may be manipulated toward and/or away from an axle bore 416 or radially inward and/or outward, a lifter 466, which can act on a retaining element 430 (e.g., lifting the retaining element 430 away from an axle bore 416), and a connector 452 connecting the tab 456 and the lifter 466. The lifter 466 comprises a post, which may have a rectangular cross section (e.g., as illustrated in FIG. 5F), a round cross section, and the like. In contrast to the embodiment illustrated in FIG. 5B, the embodiment illustrated in FIG. 5F does not include guide arms 458. FIG. 5G is a top perspective and partial cross-sectional view of the hand-maneuverable release mechanism 450*f* of FIG. 5F inserted into an aperture 472 in a retaining element 430. In some embodiments, the aperture 472 includes an angled or tapered feature (e.g., as illustrated in FIG. 5G) or is large enough that, when the tab 456 is pushed towards the axle bore 416 or radially inward, the lifter 466 may pivot within the retaining element 430, thereby engaging the retaining element 430 and moving the retaining element 430 longitudinally away from the axle bore 416. In some embodiments, for example in embodiments in which the hand-maneuverable release mechanism 450 is configured to only be manipulated away from an axle bore 416 or radially outward, the aperture 472 is small enough that the lifter 466 cannot pivot. In certain such embodiments, friction or binding between the lifter 466, the retaining element 430, and/or the pin sleeve 432 may be desirable to inhibit or prevent the retaining element 430 from being lifted away from an axle bore 416 upon manipulation of the tab 456 towards the axle bore 416 or radially inward, but to allow the retaining element 430 to be lifted away from an axle bore 416 upon manipulation of the tab 456 away from the axle bore 416. The retaining element 430 illustrated in FIG. 5G does not include a lip 436 because the lifter 466 of the hand-maneuverable release mechanism 450*f* can inhibit or prevent the retaining element 430 from exiting the first end 442 of the pin sleeve 432. In some embodiments, a retaining element 430 without a lip 436 may be easier to manufacture (e.g., machine (e.g., mill ends from a straight rod), cold heading (e.g., forcing ends of a straight rod together at high force until a central portion bulges), cast (e.g., from lost wax), etc.) and have a reduced cost versus a retaining element 430 with a lip 436. In some embodiments, the lack of a lip 436 on the retaining element 430 may allow the retainer housing 420 to not include a shoulder 410, which may reduce material usage and/or reduce the complexity of the retainer housing 420. In some embodiments, the hand-maneuverable release mechanism 450*f* may inhibit or prevent rotation of the retaining element 430 in a pin sleeve 432, which may allow a retaining element 430 (e.g., including a chamfered edge on one side) to be used in combination with an axle that does not include a chamfered edge. In some embodiments, the retainer housing 420 may include features configured to inhibit the retaining element 430 from falling into the axle bore 416. For example, the connector 452 of the hand-maneuverable release mechanism 450*f* may abut the pin sleeve 432 and/or the retainer housing 420 may include a protrusion proximate to the coupling between the connector 452 and the lifter 466 or heel of the hand-maneuverable release mechanism 450*f*. The features may inhibit movement of the hand-maneuverable release mechanism 450*f* only when the hand-maneuverable release mechanism 450*f* is engaged with the retaining element 430.

Figure 5H:
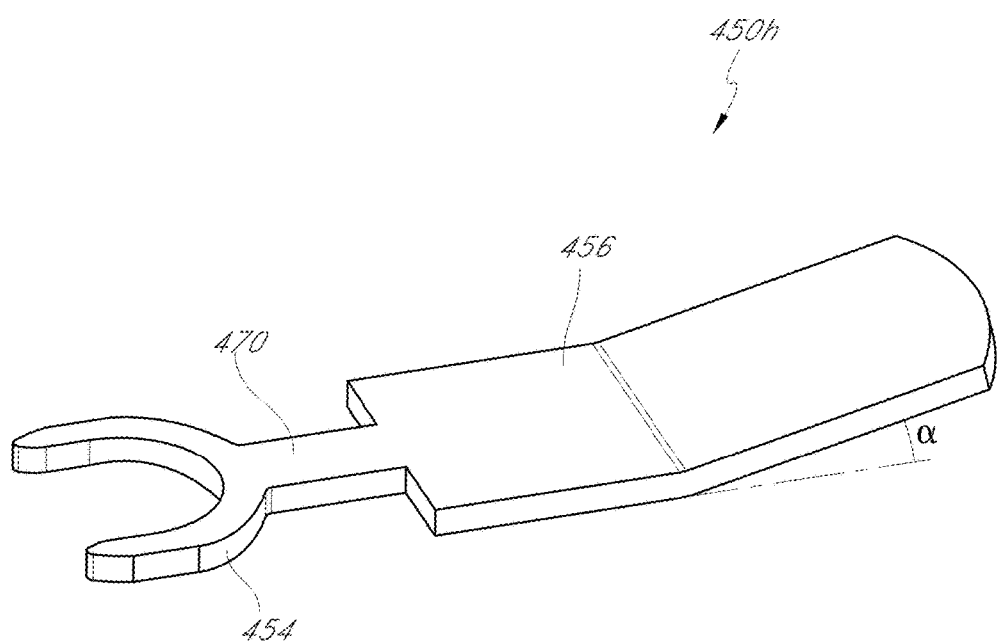
FIG. 5H is a top perspective view of a yet further example embodiment of a hand-maneuverable release mechanism.
Figure 51:
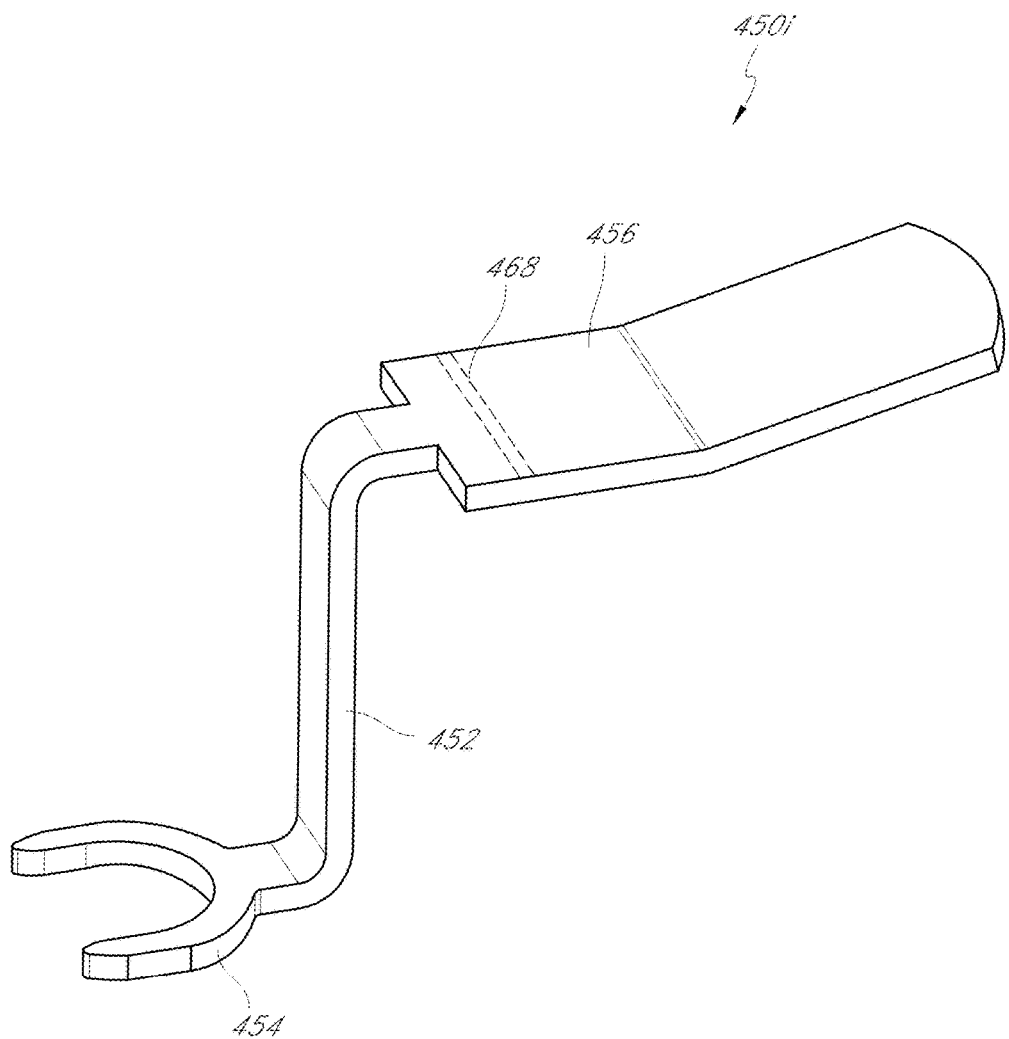

FIG. 5H is a top perspective view of a further example embodiment of a hand-maneuverable release mechanism 450*h*. The embodiment illustrated in FIG. 5H includes a tab 456, which may be manipulated toward and/or away from an axle bore 416 or radially inward and/or outward, a lifter 454, which can act on a retaining element 430 (e.g., lifting the retaining element 430 away from an axle bore 416), and a connector 470 connecting the tab 456 and the lifter 454. The tab 456 may optionally include a portion bent at an angle α. In contrast to the connectors 452 illustrated in FIGS. 5A and 5B, which are substantially orthogonal to the plane of the lifter 454 and the tab 456, and the connector 460 illustrated in 5C, which is angled with respect to the plane of the lifter 454 and the tab 456, the connector 470 illustrated in 5H is parallel with the lifter 454 and the tab 456. In some embodiments, the connector 470 may also be shortened in length. A shortened connector may reduce the material used in producing a hand-maneuverable release mechanism 450*h*, potentially reducing the production costs. In some embodiments, the retainer housing 420 of a hub assembly 400 comprising the hand-maneuverable release mechanism 450*h* includes a protrusion (e.g., bump, rail, etc.) that allows the lifter 454 to pivot upward when the tab 456 is pushed downward. In some embodiments, the bend in the tab 456 of the hand-maneuverable release mechanism allows the lifter 454 to pivot upward when the tab 456 is pushed downward. In some embodiments, upward manipulation of the hand-maneuverable release mechanism 450*h* causes direct upward movement of the retaining element 430. In certain such embodiments, the hand-maneuverable release mechanism 450*h* is coupled (e.g., fused, glued, welded, combinations thereof, and the like) to or integrated with the retaining element 430.

FIG. 5I is a top perspective view of a still further embodiment of a hand-maneuverable release mechanism 450*i*. The embodiment illustrated in FIG. 5I includes a tab 456, which may be manipulated toward and/or away from an axle bore 416 or radially inward and/or outward, a lifter 454, which can act on a retaining element 430 (e.g., lifting the retaining element 430 away from an axle bore 416), and a connector 452 connecting the tab 456 and the lifter 454. In contrast to the tab 456 in FIG. 5A, the tab 456 in FIG. 5I includes a weakened section 468 (illustrated by the dotted lines in FIG. 5I). In some embodiments, the weakened section 468 may allow a user to separate the tab 456 from the hand-maneuverable release mechanism 450*i*, providing lasting protection against accidental, casual, and/or unwanted removal. In contrast to the embodiment illustrated in FIG. 5B, the embodiment illustrated in FIG. 5I does not include guide arms 458.

Figure 5J:
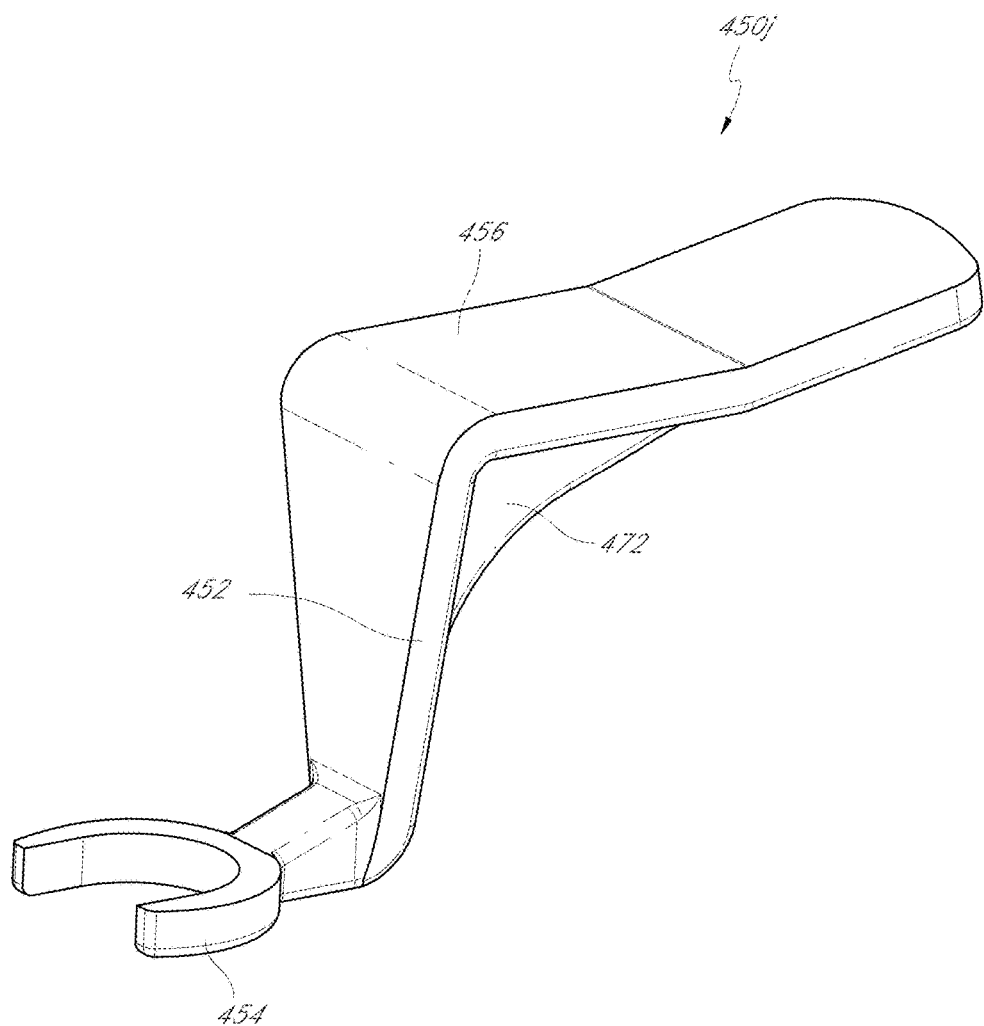
FIG. 5J is a top perspective view of a yet further still example embodiment of a hand-maneuverable release mechanism.

FIG. 5J is a top perspective view of a yet still further embodiment of a hand-maneuverable release mechanism 450*j*. The embodiment illustrated in FIG. 5J includes a tab 456, which may be manipulated toward and/or away from an axle bore 416 or radially inward and/or outward, a lifter 454, which can act on a retaining element 430 (e.g., lifting the retaining element 430 away from an axle bore 416), and a connector 452 connecting the tab 456 and the lifter 454. The hand-maneuverable mechanism 450*j* is an example of a hand-maneuverable mechanism 450 comprising (e.g., made of) plastic. A plastic hand-maneuverable release mechanism 450 may include certain features described herein (e.g., the lifter 454 may comprise any of the embodiments discussed above in FIGS. 5A-5I, as well as other embodiments). Plastic hand-maneuverable release mechanisms 450 may be more versatile (e.g., more easily able to include multiple features than could be stamped from a sheet of metal, more easily changed by changing a mold and/or removing pieces, etc.) and/or less expensive to produce than metal hand-maneuverable release mechanisms 450. In some embodiments, a hand-maneuverable release mechanism 450 comprising plastic includes certain buttressing features to improve durability and/or performance. In some embodiments, buttressing features may influence changes in certain other components of an associated hub assembly and/or wheel assembly (e.g., for clearance). In some embodiments, the hand-maneuverable release mechanism 450*j* includes a structural support member 472 between the tab 456 and the connector 452, which may, for example, inhibit the tab 456 and/or the connector 452 from bending or breaking upon manipulation. Another example of a structural support member 472, for example between the connector 452 and the lifter 454, may inhibit the lifter 454 and/or the connector 452 from bending or breaking upon manipulation of the tab 456. In certain embodiments, the thickness of a lifter 454 comprising plastic may be greater than the thickness of a lifter 454 comprising metal, for example to inhibit the parts of the lifter 454 from bending or breaking upon interaction with a retaining element 430.

In some embodiments, a retaining element 430 may be integrally formed with a hand-maneuverable release mechanism 450 to form a hand-maneuverable retaining element 480 (e.g., by injection molding and/or milling a single hand-maneuverable retaining element 480 comprising both the hand-maneuverable release mechanism 450 and the retaining element 430). In some embodiments, a retaining element 430 may be coupled to a hand-maneuverable release mechanism 450 to form a hand-maneuverable retaining element 480 (e.g., by fusing, gluing, welding, combinations thereof, and the like). The components of the hand-maneuverable retaining element 480 may comprise metal, plastic, wood, and/or other suitable materials. The components of the hand-maneuverable retaining element 480 may comprise the same material or different materials. For example, in some embodiments, the retaining element 430 comprises metal (e.g., stainless steel) and the hand-maneuverable release mechanism 450 comprises plastic (e.g., HDPE). For another example, in some embodiments, the retaining element 430 comprises plastic (e.g., HDPE) and the hand-maneuverable release mechanism 450 comprises plastic (e.g., HDPE).

Figure 5K:
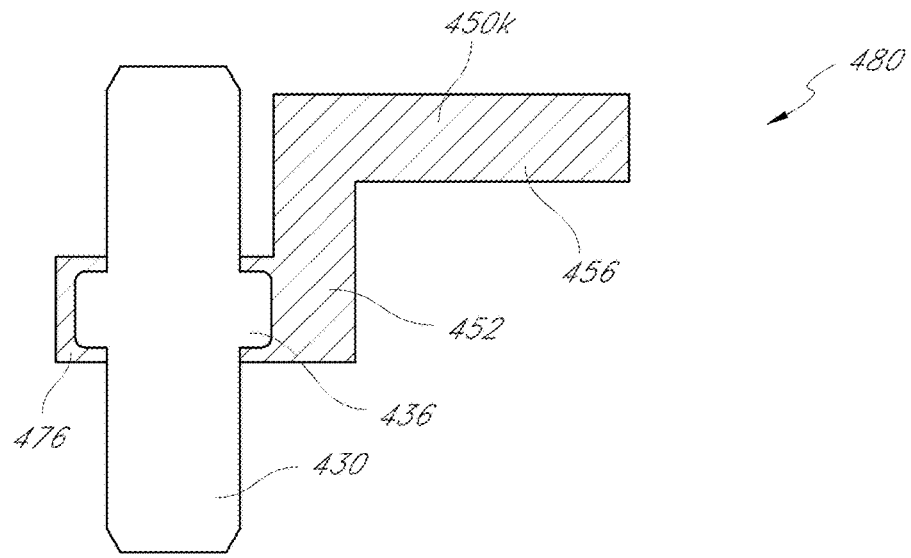
FIG. 5K is a side cross-sectional view of an example embodiment of a hand-maneuverable retaining element.

FIG. 5K is a side cross-sectional view of an example embodiment of a hand-maneuverable retaining element 480. The hand-maneuverable retaining element 480 includes a hand-maneuverable release mechanism 450*k* and a retaining element 430. The hand-maneuverable release mechanism 450*k* of the hand-maneuverable retaining element 480 includes a tab 456, which may be manipulated away from an axle bore 416 or radially outward, a lifter 476, which can act on the retaining element 430 (e.g., lifting the retaining element 430 away from an axle bore 416), and a connector 452 connecting the tab 456 and the lifter 476. In some embodiments (e.g., embodiments in which the hand-maneuverable release mechanism 450*k* comprises plastic), the hand-maneuverable release mechanism 450*k* includes buttressing features such as structural supports, for example as described herein with respect to FIG. 5J. In some embodiments, the hand-maneuverable retaining element 480 does not include a gap between the connector 452 and the tab 456 of the hand-maneuverable release mechanism 450*k* and the retaining element 430. The retaining element 430 includes a lip 436, which may provide more surface area to connect the hand-maneuverable release mechanism 450*k* to the retaining element 430 and/or inhibit the retaining element 430 from exiting the second end of the pin sleeve 432 and falling into the axle bore 416. The lip 436 may extend around a central portion of the retaining element 430 (e.g., as illustrated in FIG. 5I), or may be longitudinally offset (e.g., only a small portion of the retaining element 430 extending above the lip 436). In some embodiments, the hand-maneuverable retaining element 480 is integrally formed, for example by injection molding or milling a single piece comprising both the hand-maneuverable release mechanism 450*k* and the retaining element 430. In some embodiments, the hand-maneuverable retaining element 480 is formed by coupling (e.g., gluing, fusing, welding, combinations thereof, and the like) a separately formed hand-maneuverable release mechanism 450*k* and a separately formed retaining element 430. In some embodiments, forming the hand-maneuverable retaining element 480 includes forming (e.g., injection molding) the hand-maneuverable release mechanism 450*k* at least partially around the retaining element 430 (e.g., at least partially around the lip 436 of the retaining element 430), which was previously formed (e.g., by earlier injection molding, from metal casting or milling, etc.). In the embodiment illustrated in FIG. 5K, the lifter 476 encompasses at least part (e.g., the entirety) of the lip 436 of the retaining element 430, which may contribute to a strong bond and/or connection between the retaining element 430 and the hand-maneuverable release mechanism 450*k*, and/or may use less material than, for example, the embodiments described herein with respect to FIG. 5L. In some embodiments, the hand-maneuverable release mechanism 450*k* may inhibit or prevent rotation of the retaining element 430 in a pin sleeve 432, which may allow a retaining element 430 (e.g., including a chamfered edge on one side) to be used in combination with an axle that does not include a chamfered edge. In some embodiments, the hand-maneuverable release mechanism 450 may allow rotation of the retaining element 430 in a pin sleeve 432. The hand-maneuverable retaining element 480 illustrated in FIG. 5K may be useful in embodiments of hub assemblies and/or wheel assemblies in which the hand-maneuverable release mechanism 450 is manipulated away from the axle bore or radially outward (e.g., as opposed to being pushed towards the axle bore or radially inward).

Figure 5L:
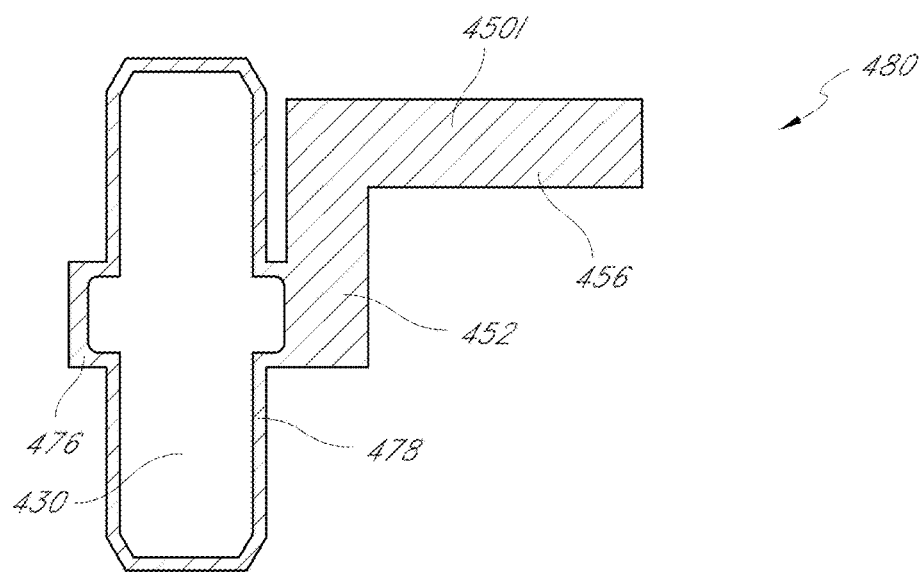
FIG. 5L is a side cross-sectional view of another example embodiment of a hand-maneuverable retaining element.

FIG. 5L is a side cross-sectional view of another example embodiment of a hand-maneuverable retaining element 480. The hand-maneuverable retaining element 480 includes a hand-maneuverable release mechanism 450*l* and a retaining element 430. The hand-maneuverable release mechanism 450*l* of the hand-maneuverable retaining element 480 includes a tab 456, which may be manipulated away from an axle bore 416 or radially outward, a lifter 478, which can act on the retaining element 430 (e.g., lifting the retaining element 430 away from an axle bore 416), and a connector 452 connecting the tab 456 and the lifter 478. In some embodiments (e.g., embodiments in which the hand-maneuverable release mechanism 450*l* comprises plastic), the hand-maneuverable release mechanism 450*l* includes buttressing features such as structural supports, for example as described herein with respect to FIG. 5J. In some embodiments, the hand-maneuverable retaining element 480 does not include a gap between the connector 452 and the tab 456 of the hand-maneuverable release mechanism 450*l* and the retaining element 430. The retaining element 430 includes a lip 436, which may provide more surface area to connect the hand-maneuverable release mechanism 450*l* to the retaining element 430 and/or inhibit the retaining element 430 from exiting the second end of the pin sleeve 432 and falling into the axle bore 416. The lip 436 may extend around a central portion of the retaining element 430 (e.g., as illustrated in FIG. 5L), or may be longitudinally offset (e.g., only a small portion of the retaining element 430 extending above the lip 436). In some embodiments, the hand-maneuverable retaining element 480 is integrally formed, for example by injection molding or milling a single piece comprising both the hand-maneuverable release mechanism 450*l* and the retaining element 430. In some embodiments, the hand-maneuverable retaining element 480 is formed by coupling (e.g., gluing, fusing, welding, combinations thereof, and the like) a separately formed hand-maneuverable release mechanism 450*l* and a separately formed retaining element 430. In some embodiments, forming the hand-maneuverable retaining element 480 includes forming (e.g., injection molding) the hand-maneuverable release mechanism 450*l* at least partially around the retaining element 430 (e.g., at least partially around the lip 436 of the retaining element and other portions of the retaining element 430), which was previously formed (e.g., by earlier injection molding, from metal casting or milling, etc.). In the embodiment illustrated in FIG. 5L, the lifter 478 encompasses at least part (e.g., the entirety) of the retaining element 430, which may contribute to a strong bond and/or connection between the retaining element 430 and the hand-maneuverable release mechanism 450. In some embodiments, the hand-maneuverable release mechanism 450*l* substantially covers (e.g., covers) the entire retaining element 430, which may, for example, inhibit corrosion (e.g., rusting) of the retaining element 430 that may occur from interaction between the retaining element 430 and other components such as a biasing element 440 and an axle 700. In some embodiments, the hand-maneuverable release mechanism 450*l* may reduce noise (e.g., noise due to a metal axle 700 rubbing a metal retaining element 430) during use of a wheel assembly 200. For example, some axles 700 include a zinc-iron coating that roughens the surface and inhibits corrosion, but can result in an irritating squeaking sound due to engagement with a metal retaining element 430. In some embodiments, at least a portion of the hand-maneuverable release mechanism 450*l* is coated with a sound-deafening material such as plastisol, polytetrafluoroethylene (PTFE), plastic, rubber, etc. Other retaining elements and hand-maneuverable release mechanisms described herein may also be at least partially coated with material configured to reduce noise and/or to inhibit corrosion of the retaining element or hand-maneuverable release mechanism. In some embodiments, the hand-maneuverable release mechanism 450*l* may inhibit or prevent rotation of the retaining element 430 in a pin sleeve 432, which may allow a retaining element 430 (e.g., including a chamfered edge on one side) to be used in combination with an axle that does not include a chamfered edge. In some embodiments, the hand-maneuverable release mechanism 450*l* may allow rotation of the retaining element 430 in a pin sleeve 432. The hand-maneuverable retaining element 480 illustrated in FIG. 5L may be useful in embodiments in which the hand-maneuverable release mechanism 450*l* is manipulated away from the axle bore or radially outward (e.g., as opposed to being pushed towards the axle bore or radially inward).

Figure 5M:
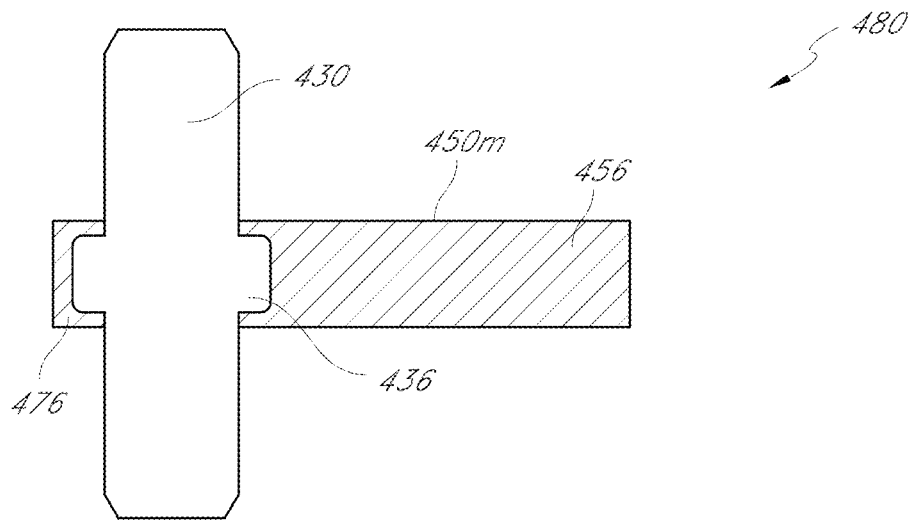
FIG. 5M is a side cross-sectional view of still another example embodiment of a hand-maneuverable retaining element.
Figure 5N:
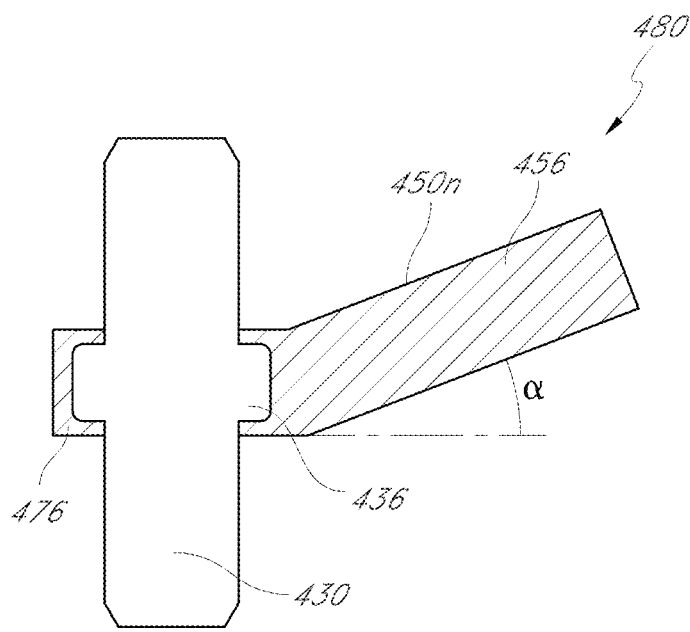
FIG. 5N is a side cross-sectional view of yet another example embodiment of a hand-maneuverable retaining element.

FIG. 5M is a side cross-sectional view of still another example embodiment of a hand-maneuverable retaining element 480. The hand-maneuverable retaining element 480 includes a hand-maneuverable release mechanism 450*m* and a retaining element 430. The hand-maneuverable release mechanism 450*m* of the hand-maneuverable retaining element 480 includes a tab 456, which may be manipulated away from an axle bore 416 or radially outward, and a lifter 476, which can act on the retaining element 430 (e.g., lifting the retaining element 430 away from an axle bore 416). In some embodiments (e.g., embodiments in which the hand-maneuverable release mechanism 450*m* comprises plastic), the hand-maneuverable release mechanism 450*m* includes buttressing features such as structural supports, for example as described herein with respect to FIG. 5J. In some embodiments, the hand-maneuverable retaining element 480 includes a buttressing feature between the tab 456 of the hand-maneuverable release mechanism 450*m* and the retaining element 430. The retaining element 430 includes a lip 436, which may provide more surface area to connect the hand-maneuverable release mechanism 450*m* to the retaining element 430 and/or inhibit the retaining element 430 from exiting the second end of the pin sleeve 432 and falling into the axle bore 416. The lip 436 may extend around a central portion of the retaining element 430 (e.g., as illustrated in FIGS. 5M and 5N), or may be longitudinally offset (e.g., only a small portion of the retaining element 430 extending above the lip 436). In some embodiments, the hand-maneuverable retaining element 480 is integrally formed, for example by injection molding or milling a single piece comprising both the hand-maneuverable release mechanism 450*m* and the retaining element 430. In some embodiments, the hand-maneuverable retaining element 480 is formed by coupling (e.g., gluing, fusing, welding, combinations thereof, and the like) a separately formed hand-maneuverable release mechanism 450*m* and a separately formed retaining element 430. In some embodiments, forming the hand-maneuverable retaining element 480 includes forming (e.g., injection molding) the hand-maneuverable release mechanism 450*m* at least partially around the retaining element 430 (e.g., at least partially around the lip 436 of the retaining element and other portions of the retaining element 430), which was previously formed (e.g., by earlier injection molding, from metal casting or milling, etc.). In the embodiment illustrated in FIG. 5M, the lifter 476 encompasses at least part (e.g., the entirety) of the lip 436 of the retaining element 430, which may contribute to a strong bond and/or connection between the retaining element 430 and the hand-maneuverable release mechanism 450*m*, and/or may use less material than, for example the embodiments described herein with respect to FIG. 5L. In contrast to the embodiment illustrated in FIG. 5K, the embodiment illustrated in FIG. 5M does not include a connector between the tab 456 and the lifter 476. The tab 456 extends straight out from the lifter 476. In some embodiments, for example as illustrated by the hand-maneuverable release mechanism 450*n* of the hand-maneuverable retaining element 480 of FIG. 5N, the tab 456 extends from the lifter 476 at an angle α. In some embodiments, the angle α is between about 5° and about 45°, between about 10° and about 30°, between about 15° and about 25°, combinations thereof, and the like. Certain embodiments lacking a connector may use less material than, for example, embodiments described herein comprising a connector 452. In some embodiments, the hand-maneuverable release mechanism 450*m* may inhibit or prevent rotation of the retaining element 430 in a pin sleeve 432, which may allow a retaining element 430 (e.g., including a chamfered edge on one side) to be used in combination with an axle that does not include a chamfered edge. In some embodiments, the hand-maneuverable release mechanism 450*m* may allow rotation of the retaining element 430 in a pin sleeve 432. The embodiment illustrated in FIG. 5M may be useful in embodiments in which the hand-maneuverable release mechanism 450*m* is manipulated away from the axle bore or radially outward (e.g., as opposed to being pushed towards the axle bore or radially inward).

Figure 5O:
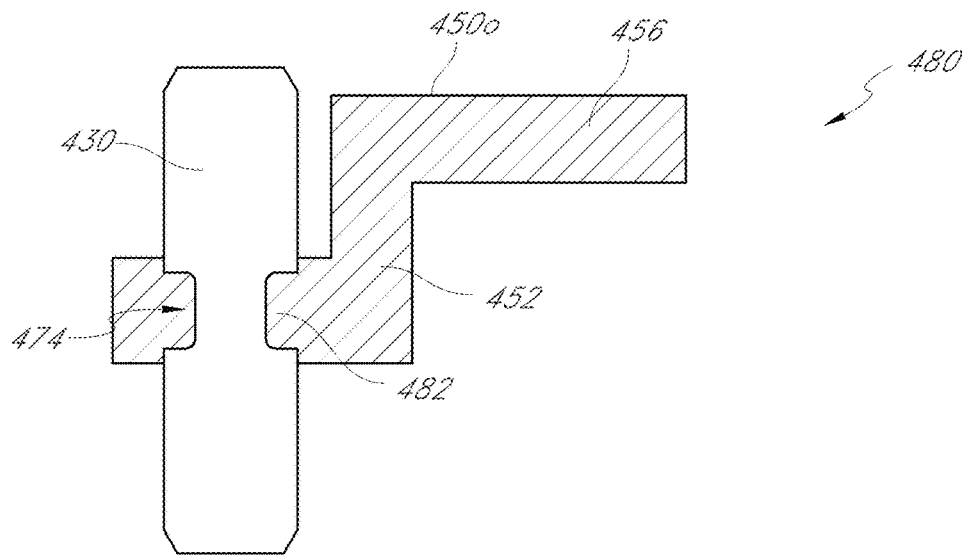
FIG. 5O is a side cross-sectional view of yet still another example embodiment of a hand-maneuverable retaining element.

FIG. 5O is a side cross-sectional view of yet still another example embodiment of a hand-maneuverable retaining element 480. The hand-maneuverable retaining element 480 includes a hand-maneuverable release mechanism 450*o* and a retaining element 430. The hand-maneuverable release mechanism 450o of the hand-maneuverable retaining element 480 includes a tab 456, which may be manipulated away from an axle bore 416 or radially outward, a lifter 482, which can act on the retaining element 430 (e.g., lifting the retaining element 430 away from an axle bore 416), and a connector 452 connecting the tab 456 and the lifter 482. In some embodiments (e.g., embodiments in which the hand-maneuverable release mechanism 450o comprises plastic), the hand-maneuverable release mechanism 450o includes buttressing features such as structural supports, for example as described herein with respect to FIG. 5J. In some embodiments, the hand-maneuverable retaining element 480 does not include a gap between the connector 452 and the tab 456 of the hand-maneuverable release mechanism 450o and the retaining element 430. The retaining element 430 includes a groove 474, which may provide more surface area to connect the hand-maneuverable release mechanism 450o to the retaining element 430 and/or structurally improve the connection between the hand-maneuverable release mechanism 450o and the retaining element 430. The retaining element 430 does not include a lip 436, but the lifter 476 may inhibit the retaining element 430 from exiting the second end of the pin sleeve 432 and falling into the axle bore 416. The groove 474 may extend around a central portion of the retaining element 430 (e.g., as illustrated in FIG. 5O), or may be longitudinally offset (e.g., only a small portion of the retaining element 430 extending above the groove 474). In some embodiments, groove 474 in a retaining element 430 may be easier to manufacture (e.g., machine or mill) and/or have reduced cost versus a retaining element 430 including a lip 436. In some embodiments, a retaining element 430 without a lip 436 may use less material than a retaining element 430 including a lip 436, which may reduce material costs. In some embodiments, use of a retaining element 430 without a lip 436 may allow the retainer housing 420 to not include a shoulder 410, which may reduce material usage and/or reduce the complexity of the retainer housing 420. In some embodiments, the hand-maneuverable retaining element 480 is integrally formed, for example by injection molding or milling a single piece comprising both the hand-maneuverable release mechanism 450o and the retaining element 430. In some embodiments, the hand-maneuverable retaining element 480 is formed by coupling (e.g., gluing, fusing, welding, combinations thereof, and the like) a separately formed hand-maneuverable release mechanism 450o and a separately formed retaining element 430. In some embodiments, forming the hand-maneuverable retaining element 480 includes forming (e.g., injection molding) the hand-maneuverable release mechanism 450 at least partially around and/or into the retaining element 430 (e.g., at least partially around and/or into the groove 474 of the retaining element 430), which was previously formed (e.g., by earlier injection molding, from metal casting or milling, etc.). In some embodiments, the hand-maneuverable release mechanism 450o may inhibit or prevent rotation of the retaining element 430 in a pin sleeve 432, which may allow a retaining element 430 (e.g., including a chamfered edge on one side) to be used in combination with an axle that does not include a chamfered edge. In some embodiments, the hand-maneuverable release mechanism 450o may allow rotation of the retaining element 430 in a pin sleeve 432. The embodiment illustrated in FIG. 5O may be useful in embodiments in which the hand-maneuverable release mechanism 450o is manipulated away from the axle bore or radially outward (e.g., as opposed to being pushed towards the axle bore or radially inward).

Figure 5P:
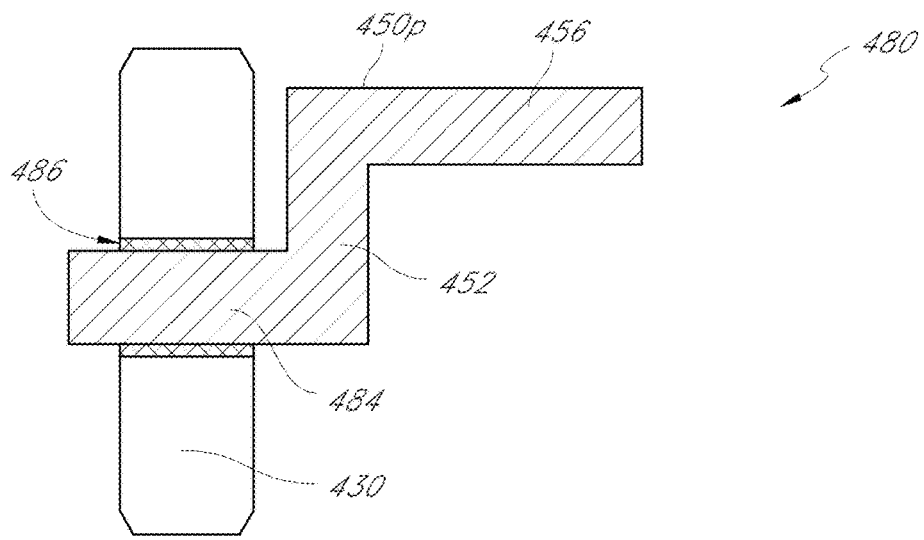
FIG. 5P is a side cross-sectional view of a further example embodiment of a hand-maneuverable retaining element.

FIG. 5P is a side cross-sectional view of a further example embodiment of a hand-maneuverable retaining element 480. The hand-maneuverable retaining element 480 includes a hand-maneuverable release mechanism 450p and a retaining element 430. The hand-maneuverable release mechanism 450p of the hand-maneuverable retaining element 480 includes a tab 456, which may be manipulated away from an axle bore 416 or radially outward, a lifter 484, which can act on the retaining element 430 (e.g., lifting the retaining element 430 away from an axle bore 416), and a connector 452 connecting the tab 456 and the lifter 484. In some embodiments (e.g., embodiments in which the hand-maneuverable release mechanism 450p comprises plastic), the hand-maneuverable release mechanism 450p includes buttressing features such as structural supports, for example as described herein with respect to FIG. 5J. In some embodiments, the hand-maneuverable retaining element 480 does not include a gap between the connector 452 and the tab 456 of the hand-maneuverable release mechanism 450p and the retaining element 430. The retaining element 430 includes an aperture 486. The aperture 486 may extend entirely through the retaining element 430 (e.g., as illustrated in FIG. 5P), or may extend partially through the retaining element 430. The aperture 486 may extend through a longitudinal axis of the retaining element 430 (e.g., as illustrated in FIG. 5P), or may be laterally offset. The aperture 486 may extend through a central portion of the retaining element 430 (e.g., as illustrated in FIG. 5P), or may be longitudinally offset (e.g., only a small portion of the retaining element 430 extending above the aperture 486). The retaining element 430 does not include a lip 436, but the lifter 484 may inhibit the retaining element 430 from exiting the second end of the pin sleeve 432 and falling into the axle bore 416. In some embodiments, an aperture 486 may be easier to manufacture (e.g., machine or mill) and/or have reduced cost versus a retaining element 430 including a lip 436. In some embodiments, a retaining element 430 without a lip 436 may use less material than retaining element 430 including a lip 436, which may reduce material costs. In some embodiments, use of a retaining element 430 without a lip 436 may allow the retainer housing 420 to not include a shoulder 410, which may reduce material usage and/or reduce the complexity of the retainer housing 420. The aperture 486 is at least partially filled by the lifter 484 of the hand-maneuverable release mechanism 450p. The aperture 486 may provide more surface area to connect the hand-maneuverable release mechanism 450p to the retaining element 430 and/or allow for a more secure bond between the retaining element 430 and the hand-maneuverable release mechanism 450p. In some embodiments, the hand-maneuverable retaining element 480 is integrally formed, for example by injection molding or milling a single piece comprising both the hand-maneuverable release mechanism 450p and the retaining element 430. In some embodiments, the hand-maneuverable retaining element 480 is formed by coupling (e.g., gluing, fusing, welding, combinations thereof, and the like) a separately formed hand-maneuverable release mechanism 450p and a separately formed retaining element 430. In some embodiments, forming the hand-maneuverable retaining element 480 includes forming (e.g., injection molding) the hand-maneuverable release mechanism 450p at least partially into the retaining element 430 (e.g., at least partially into the aperture 486 of the retaining element 430), which was previously formed (e.g., by earlier injection molding, from metal casting or milling, etc.). In some embodiments, the hand-maneuverable release mechanism 450p may inhibit or prevent rotation of the retaining element 430 in a pin sleeve 432, which may allow a retaining element 430 (e.g., including a chamfered edge on one side) to be used in combination with an axle that does not include a chamfered edge. The embodiment illustrated in FIG. 5P may be useful in embodiments in which the hand-maneuverable release mechanism 450p is manipulated away from the axle bore or radially outward (e.g., as opposed to being pushed towards the axle bore or radially inward).

Some of the features of the hand-maneuverable retaining elements 480 illustrated herein may also be adapted to retaining elements and hand-maneuverable release mechanisms described herein. For example, a metal retaining element may be coated or substantially coated with plastic, for example to inhibit corrosion. For another example, many of the retaining elements and hand-maneuverable release mechanisms described herein as being separate components may be integrated. Other components such as biasing elements and restraining elements may also be integral with, for example, retaining elements. For example, it may be possible to injection mold a single component including a retaining element, a hand-maneuverable release mechanism, a biasing element, and a restraining element, which can be inserted into a retainer housing in a single step.

In certain embodiments, a method of manufacturing a hub assembly (e.g., a hub assembly 400, 500, 600 described herein and modifications thereof) comprises positioning a portion of a hand-maneuverable release mechanism in a pin sleeve, positioning a retaining element in the pin sleeve, and positioning a biasing element in the pin sleeve. In some embodiments, the method of manufacturing the hub assembly further comprises occluding a second end of the pin sleeve (e.g., with a restraining element), for example to inhibit the retaining element and/or the biasing element from exiting the second end of a pin sleeve, at least prior to coupling the hub assembly to a wheel. Certain such embodiments can allow storage of assembled hub assemblies without danger of pieces becoming lost (which may also allow resources to be allocated without regard to quantity of wheel assembly components (e.g., hub assemblies can be made even if there are no wheels to couple them to because they can be stored without the fear of losing pieces)), transportation of assembled hub assemblies (e.g., independent of the transportation of wheels, which may be less expensively manufactured more proximate to the wheel assembly site), and/or use of automated assembly such as vibratory feeders. Other advantages are also possible. For example, if a wheel is damaged, an occluded hub assembly, which is typically the more expensive wheel assembly component, can be coupled to another wheel because all of the internal components are present upon separation from the damaged wheel. Methods of manufacturing certain of the individual components of hub assemblies are described herein (e.g., injection molding a retainer housing, rotationally inserting a hand-maneuverable release mechanism into a pin sleeve), and/or one or more of the components may be purchased and then the components assembled.

In some embodiments, a method of manufacturing a wheel assembly (e.g., a wheel assembly 200, 300 described herein and modifications thereof) comprises inserting a hub assembly (e.g., a hub assembly 400, 500, 600 described herein and modifications thereof) into a wheel (e.g., a wheel 202 described herein and modifications thereof). In some embodiments, a method of manufacturing a wheel assembly (e.g., a wheel assembly 200, 300 described herein and modifications thereof) comprises inserting a hub assembly without a restraining element into a wheel, for example so that the biasing element can abut a wall or other portion of the wheel. In some embodiments, coupling the hub assembly to the wheel comprises inserting a wheel mounting sleeve of the hub assembly into a sleeve bore of the wheel. In some embodiments, the method of manufacturing the wheel assembly comprises forming the wheel 202. In some embodiments, forming the wheel comprises deflashing the wheel, for example prior to being coupled to the hub assembly. Methods of manufacturing certain of the individual components of wheel assemblies are described herein (e.g., injection molding and blow molding of wheels, assembly of hub assemblies), and/or one or more of the components may be purchased and then the components assembled.

Without a hand-maneuverable release mechanism, disengaging a hub assembly or a wheel assembly from an axle destroyed the wheel assembly or employed various tools (e.g., through a hidden or candid tool passageway). For example, a hub assembly may include a tool passageway through which a tool (e.g., an auger or a screwdriver) could be used to manipulate the retaining element out of the axle bore. Some hub assemblies only allow access to the release mechanism through use of a specialized tool, which a service technician may not have readily available. Tool passageways generally allow users to remove the wheel for reasons such as repair, maintenance, distribution, transportation for sale, and the like, but inhibit accidental, casual, or unwanted removal (e.g., by vandals). The tool passageway may even be covered by a flashing or membrane to disguise the removal ability from a casual observer, but not from appropriate persons having knowledge of the hub assembly. Once the membrane is punctured, the disguise may be breached and the tool passageway may be apparent to vandals and the like. Removal only by tool passageway can make it difficult for appropriate parties to remove the wheels, for example during sale, distribution, repair, etc. A hub assembly or a wheel assembly including a hand-maneuverable release mechanism can allow for easy removal by a knowledgeable or appropriate user and, if placed in a position substantially hidden from view (e.g., at least partially obscured by a cart body), lasting protection against accidental, casual, and/or unwanted removal.

In some embodiments, the hub assembly 400 does not include a tool passageway 404, but can achieve certain advantages associated with a hand-maneuverable release mechanism 450 described herein. Referring again to FIGS. 3B and 3D, in some embodiments, the hub assembly 400 optionally comprises both a hand-maneuverable release mechanism 450 and a tool passageway 404. In some embodiments, the tool passageway 404 may be on an opposite side of the hub assembly 400 from the hand-maneuverable release mechanism 450. In certain embodiments, a flashing or membrane (or "puncture skin") 406 may at least partially cover the tool passageway 404. The membrane 406 is preferably thin enough to be punctured by the tool prior to engagement with the retaining element 430 (e.g., about 0.01 inches (approx. 0.25 millimeters (mm)) thick). The membrane 406 can provide evidence of tampering with the hub assembly 400. The membrane 406 may disguise the removal ability from a casual observer. Although illustrated as being in a portion of the tool passageway 404 proximate to the conduit 446, the membrane 406 may be flush with the end wall 428, flush with the outer edge of the tool passageway, or elsewhere. The tool passageway 404 may be raised with respect to the end wall 428 to help identify the tool passageway 404 if covered by a membrane 406 (e.g., as illustrated in FIG. 2A) and/or to aid in positioning of the hub assembly 400 into the wheel 202

(e.g., in embodiments not including a guide rail 434). Tool passageways and membranes may also be used with other hub assemblies described herein.

The hand-maneuverable release mechanism 450 may be manipulated, for example as described herein, to extend the retaining element 430 towards the second end 444 of the pin sleeve 432 and at least partially out (e.g., entirely out) of the axle bore 416, at which point the axle 700 may be slid out of the axle bore 416. Use of the hand-maneuverable release mechanism 450 may be by a knowledgeable or appropriate user, for example during distribution, installation, repair, etc., and may leave the tool passageway unfettered, for example to continue to provide protection against accidental, casual, and/or unwanted removal. In some embodiments, the wheel 202 may contain a cutout to provide visual and/or tactile identification of the tab 456 and provide access to the tab 456.

A tool inserted through a tool passageway 404 may be used to detach the hub assembly 400 from an axle 700. A tool may be leveraged under a lip 436 on the retaining element 430 and may extend the retaining element 430 towards the second end 444 of the pin sleeve 432 and at least partially out (e.g., entirely out) of the axle bore 416, at which point the axle 700 may be slid out of the axle bore 416. In some embodiments, a tool may act on a lip 436 of the retaining element 430 (e.g., acting as a wedge or lever to cause the retaining element 430 to move). In some embodiments, a tool may pierce or puncture the retaining element 430 such that movement of the tool causes a corresponding movement of the retaining element 430. Other interactions between a tool and the retaining element 430 are also possible (e.g., a tool may fit into a slot of a retaining element 430). Use of a tool through the tool passageway 404 may also be by a knowledgeable or appropriate user, for example if it is no longer desired to continue to provide protection against accidental, casual, and/or unwanted removal, and/or for example if a knowledgeable or appropriate user knows about the tool passageway, but not about the hand-maneuverable release mechanism 450.

The inclusion of a both a tool passageway 404 and a hand-maneuverable release mechanism 450 can allow options for wheel assembly 400 removal without increasing the likelihood of accidental, casual, and/or unintentional removal. For example, sellers of wheel assemblies 400 could sell the same wheel assembly 400 to multiple types of buyers (e.g., residential buyers who are unlikely to need frequent removal and reattachment, commercial buyers who may frequently remove and reattach wheel assemblies (e.g., for transportation purposes), etc.).

In some embodiments, the retainer housing 450 may include a dummy, mock, or false tool passageway. For example, the tool passageway could be solid enough (e.g., more solid than a puncture skin) that a tool cannot generally access the retaining element 430. For another example, the tool passageway could be on a portion of the retainer housing where the retaining element 430 is not on the other side. A dummy tool passageway may inhibit or prevent removal by users of wheel assemblies including only tool passageways (e.g., without a hand-maneuverable release mechanism 450), but allowing removal by users knowledgeable about the hand-maneuverable release mechanism 450. In some embodiments, a dummy tool passageway may allow a hub assembly or wheel assembly to maintain the appearance of a hub assembly or wheel assembly including a tool passageway. A dummy tool passageway could be used as a locator to aid in assembly (e.g., manual, semi-automated, and/or automated assembly).

Figure 6A:
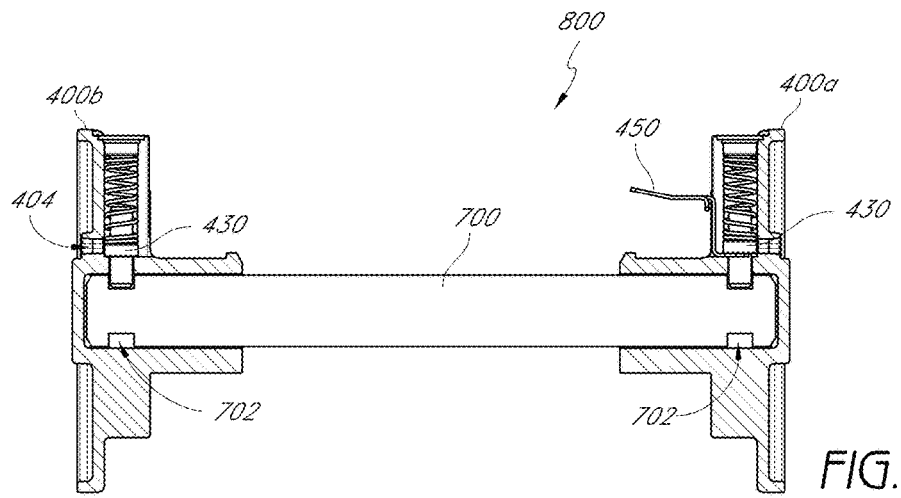
FIG. 6A is a partial cross-sectional view of an example embodiment an axle assembly.
Figure 6B:
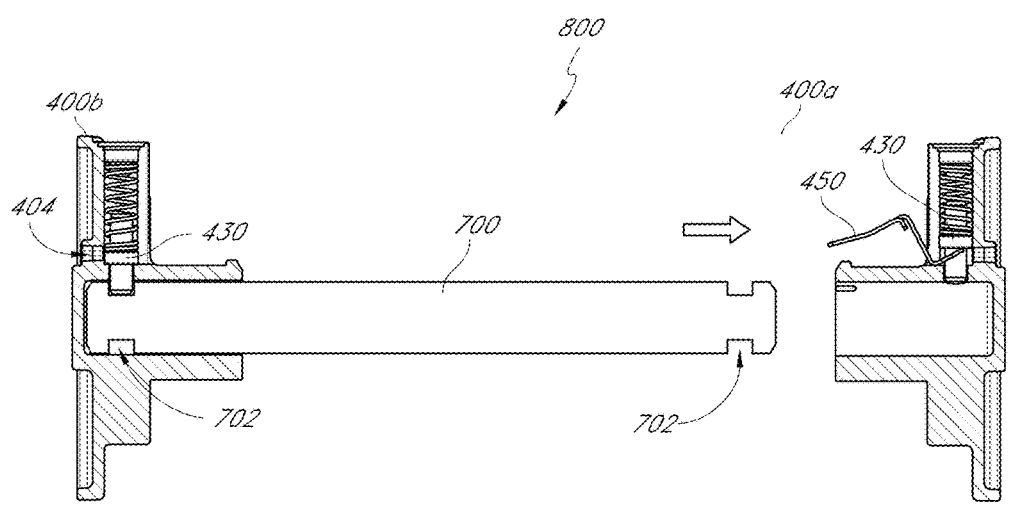
FIG. 6B is a partial cross-sectional view of the axle assembly of FIG. 6A with a hand-maneuverable release mechanism in the release position and a hub assembly disconnected from the axle.
Figure 6C:
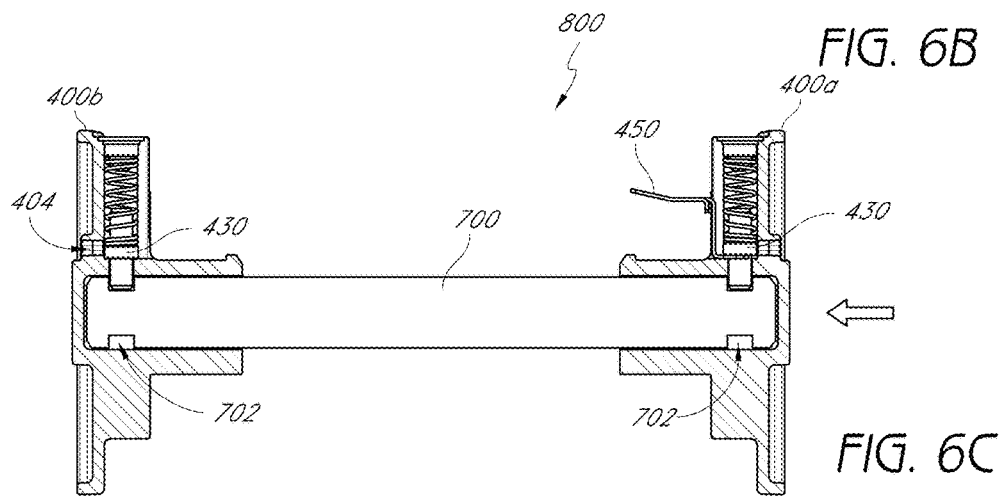
FIG. 6C is a partial cross-sectional view of the axle assembly of FIG. 6A reassembled.

FIG. 6A is a partial cross-sectional view of an example embodiment of an axle assembly 800. In some embodiments, the axle assembly 800 includes an axle 700 including a groove 702 at each end and a hub assembly at each end, which may be part of a wheel assembly. Although any of the embodiments of hub assemblies and wheel assemblies described herein, and modifications thereof, can be used in the axle assembly 800, for illustration purposes, FIG. 6A illustrates one of the hub assemblies being a hub assembly 400*a* including both a hand-maneuverable release mechanism 450 and a tool passageway 404 and the other hub assembly 400*b* including only a tool passageway 404. For example, the axle assembly 800 may include two hub assemblies 400*a* including a hand-maneuverable release mechanism 450. FIG. 6B is a partial cross-sectional view of the axle assembly 800 of FIG. 6A after the hub assembly 400*a* is disconnected from the axle 700. In this illustration, a tab 456 on the hand-maneuverable release mechanism 450 was manipulated towards an axle bore 416 and a lifter 462 was leveraged upwards, pushing a retaining element 430 away from the axle bore 416 and out of a groove 702 in the axle 700. The axle 700 was then able to be removed from the axle bore 416. The ability to remove the hub assembly using the hand-maneuverable release mechanism 450, for example without damaging the hub assembly (e.g., due to piercing of a puncture skin) may reduce the number and/or rate of returns to the manufacturer that were due to errors during distribution, which can reduce replacement and/or return costs and/or increase customer satisfaction. FIG. 6C is a partial cross-sectional view of the axle assembly 800 of FIG. 6A after the hub assembly 400*a* has been reattached to the hub 700. In some embodiments, the axle 700 need only be reinserted into the axle bore 416 to reattach the hub assembly 400*a*. In certain embodiments, an axle 700 has a chamfered end 704 such that the retaining element 430 is transversely displaced relative to the movement of the axle 700. In certain alternative embodiments, the retaining element 430 is shaped (e.g., chamfered) such that it is transversely displaced relative to the movement of an axle 700 (e.g., without a chamfered end). The ease of removal associated with the hand-maneuverable release mechanism 450 allows axle assemblies 800 to be shipped as a unit, easily disassembled, and reassembled when mounted to a cart or other device. Once mounted on the cart, the hand-maneuverable release mechanism 450 may be partially or completely hidden by the body of the cart, still inhibiting casual removal. This may reduce or eliminate improper ratios of axles to wheels when shipping, without the added inconvenience of disassembly using only a tool passageway. In some embodiments, only one hub assembly includes a hand-maneuverable release mechanism 450 for this purpose, which may limit the costs of manufacturing the axle assembly (e.g., because a hub assembly without a hand-maneuverable release mechanism 450 may be less expensive than a hub assembly with a hand-maneuverable release mechanism 450).

Figure 7A:
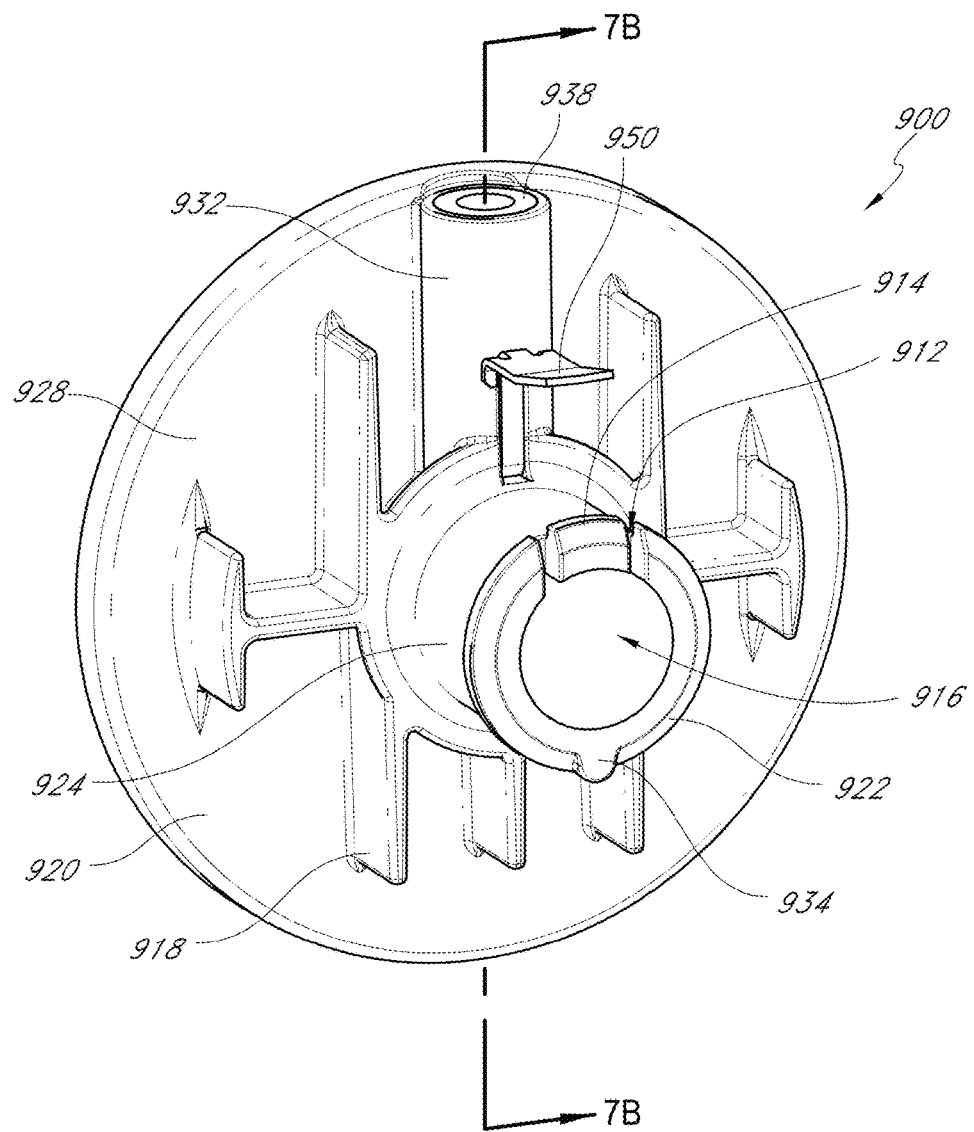
FIG. 7A is a top perspective view of still another example embodiment of a hub assembly.
Figure 7B:
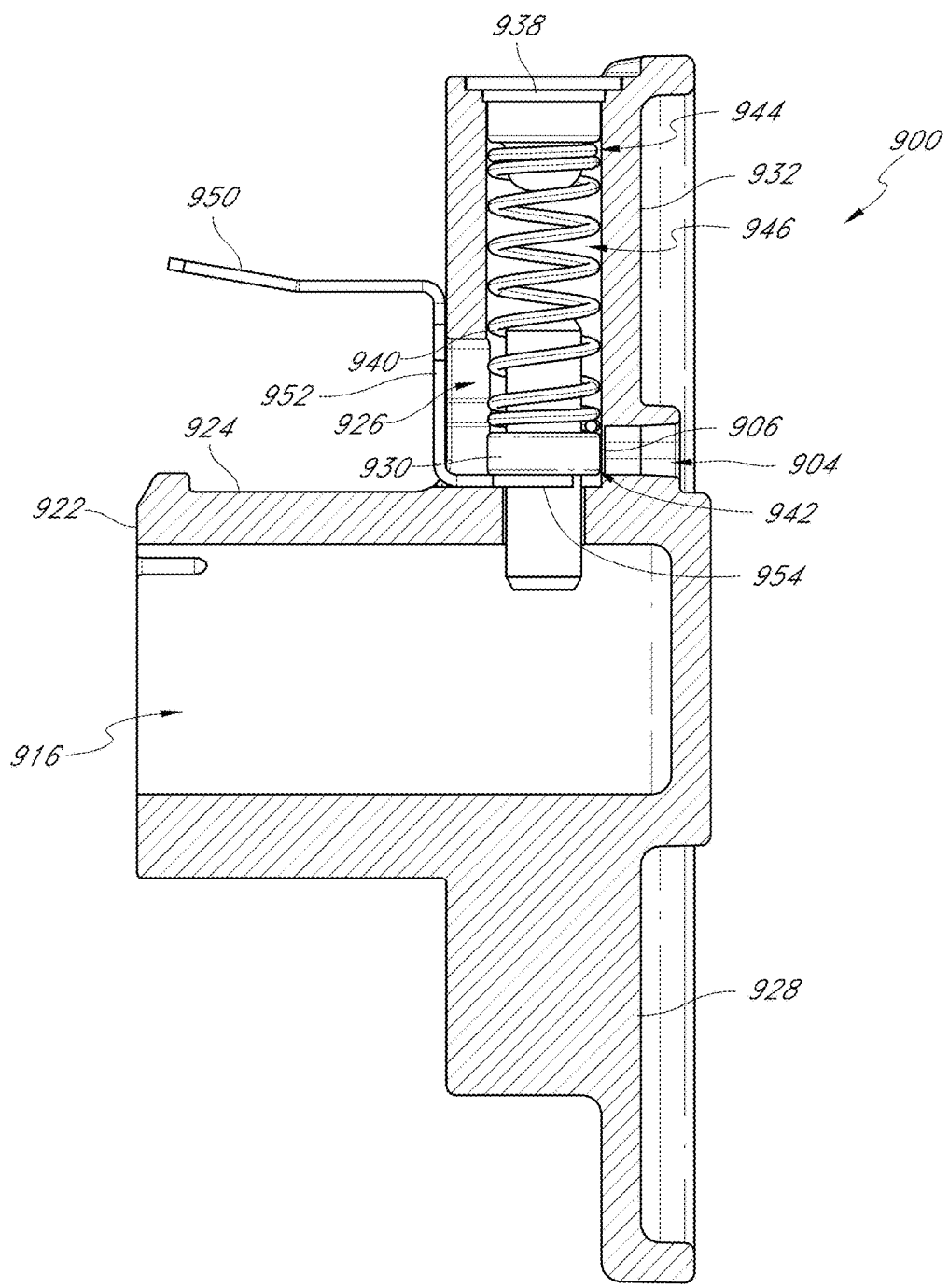
FIG. 7B is a partial cross-sectional view of the hub assembly of FIG. 7A along the line 7B-7B of FIG. 7A.

FIG. 7A is a top perspective view of still another example embodiment of a hub assembly 900. FIG. 7B is a partial cross-sectional view of the hub assembly 900 of FIG. 7A along the line 7B-7B of FIG. 7A, with the retaining element 930, the biasing element 940, the restraining element 938, and the hand-maneuverable release mechanism 950 in elevational view. The axial channel 926 only runs part of the length of the pin sleeve 932. The outer portion of the pin sleeve 932, for example a portion radially outward of the hand-maneuverable release mechanism 950, is completely annular. In some embodiments in which the hand-maneuverable release mechanism 950 is on a side of the hub assembly 900 opposite a wheel mounting sleeve 924 (e.g., as generally illustrated in FIG. 4), molding of the retainer housing 920 may include a straight core pull, for example because the end wall 928 does not include features that would impede a straight core pull. In some embodiments in which the hand-maneuverable release mechanism 950 is on the same side of the hub assembly 900 as a wheel mounting sleeve 924 (e.g., as illustrated in FIGS. 7A and 7B), molding of the retainer housing 920 may include an angled core pull, for example because features such as the annular rib 922 may impede a straight core pull. The pin sleeve 932, alone or in combination with the connector 952 at least partially occluding the axial channel 926, may inhibit debris from entering the conduit 946 of the pin sleeve 932.

In some embodiments, a method of manufacturing the hub assembly 900 comprises inserting the lifter 954 of the hand-maneuverable release mechanism 950 into the conduit 946 of the pin sleeve 932 with the plane of the lifter 454 substantially aligned with the axial channel 926, and then rotating the hand-maneuverable release mechanism 950 until the plane of the lifter 954 is substantially orthogonal to the pin sleeve 932. In some embodiments, for example in which the elements include flat surfaces and/or sharp angles, an audible or tactile snap may be triggered when the hand-maneuverable release mechanism 950 is appropriately rotated. A retaining element 930, a biasing element 940, and a restraining element 938 may then be inserted into the pin sleeve 932.

Figure 8A:
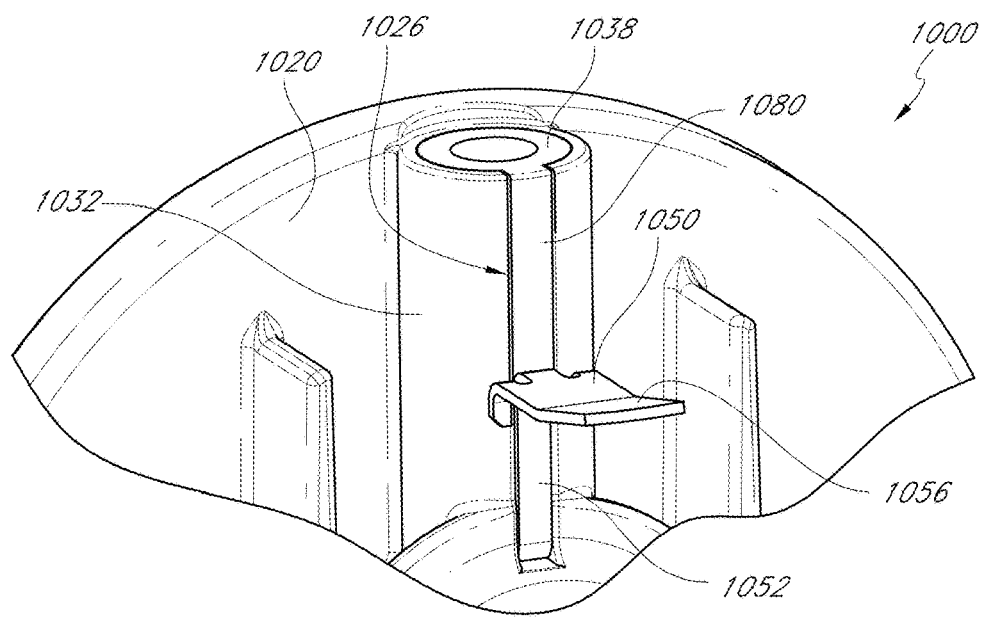
FIG. 8A is a partial top perspective view of yet another example embodiment of a hub assembly.
Figure 8B:
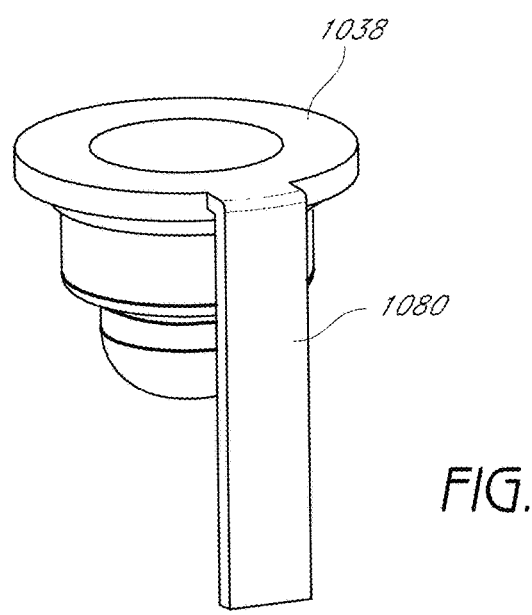
FIG. 8B is top perspective view of an example embodiment of a restraining element.

FIG. 8A is a partial top perspective view of another example embodiment of a hub assembly 1000. The axial channel 1026 runs the length of the pin sleeve 1032 (e.g., as described with respect to the pin sleeve 432 of the retainer housing 420). The hub assembly 1000 comprises a restraining element 1038 that includes a tail or protrusion 1080. FIG. 8B is top perspective view of an example embodiment of a restraining element 1038. The tail 1080 is configured to at least partially occlude the axial channel 1026. In some embodiments, the tail runs substantially the entire length of the axial channel 1026. In certain such embodiments, for example in embodiments in which the hand-maneuverable release mechanism 1050 is configured to only be manipulated towards an axle bore or radially inward, the tail 1080 may desirably inhibit or prevent the retaining element from being lifted away from an axle bore upon manipulation of the tab 1056 towards the axle bore or radially outward, but to allow the retaining element to be lifted away from an axle bore upon manipulation of the tab 1056 towards the axle bore.

The tail 1080, alone or in combination with the connector 1052 of the hand-maneuverable release mechanism 1050 at least partially occluding the axial channel 1026, may inhibit debris from entering the conduit of the pin sleeve 1032. In some embodiments, a method of manufacturing the hub assembly 1000 comprises aligning the tail 1080 with the axial channel 1026. In some embodiments, a method of manufacturing the hub assembly 1000 comprises coupling (e.g., welding, adhering) the tail 1080 to the plug portion of the restraining element 1038 after the restraining element 1038 has been coupled to the pin sleeve 1032. In certain such embodiments, the plug portion, the tail 1080, and the pin sleeve 1032 can be simultaneously welded together.

Figure 9A:
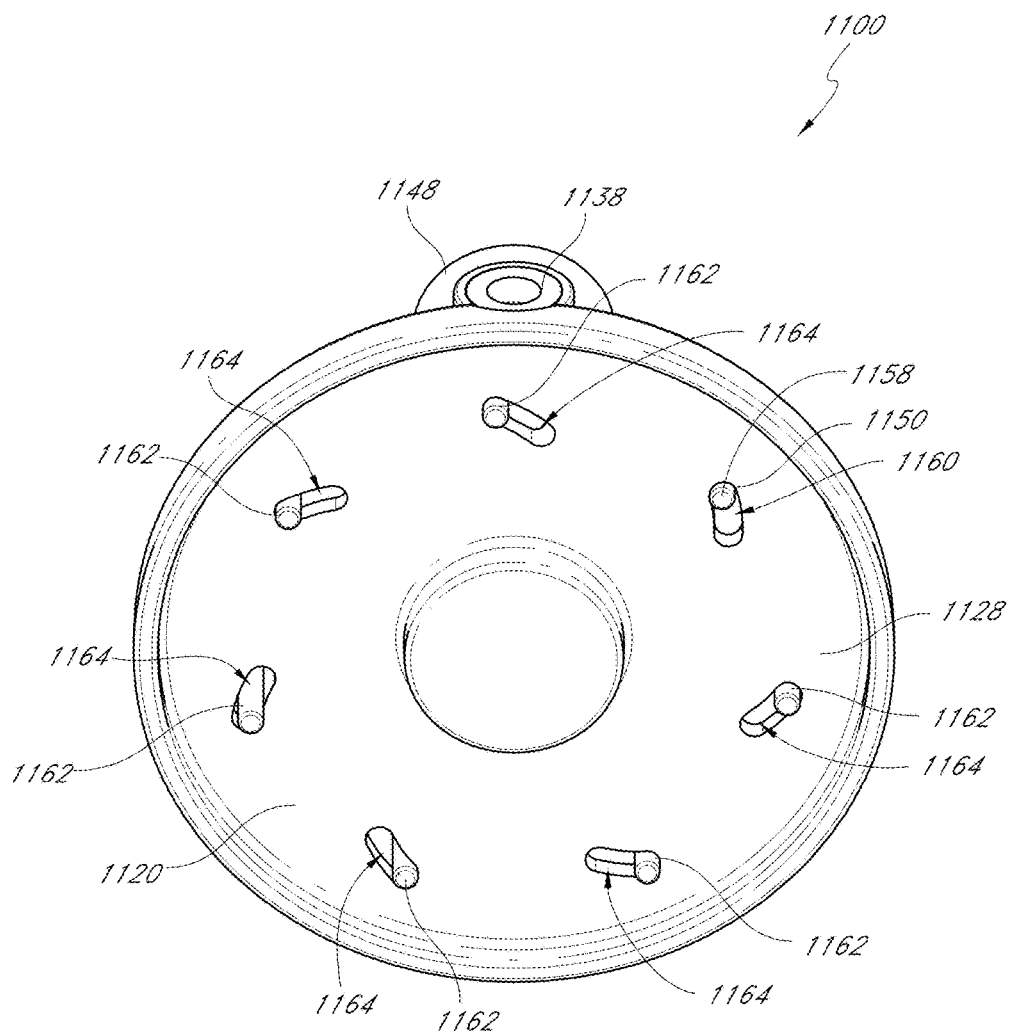
FIG. 9A is a top perspective view of a side of another example embodiment of a hub assembly.
Figure 9B:
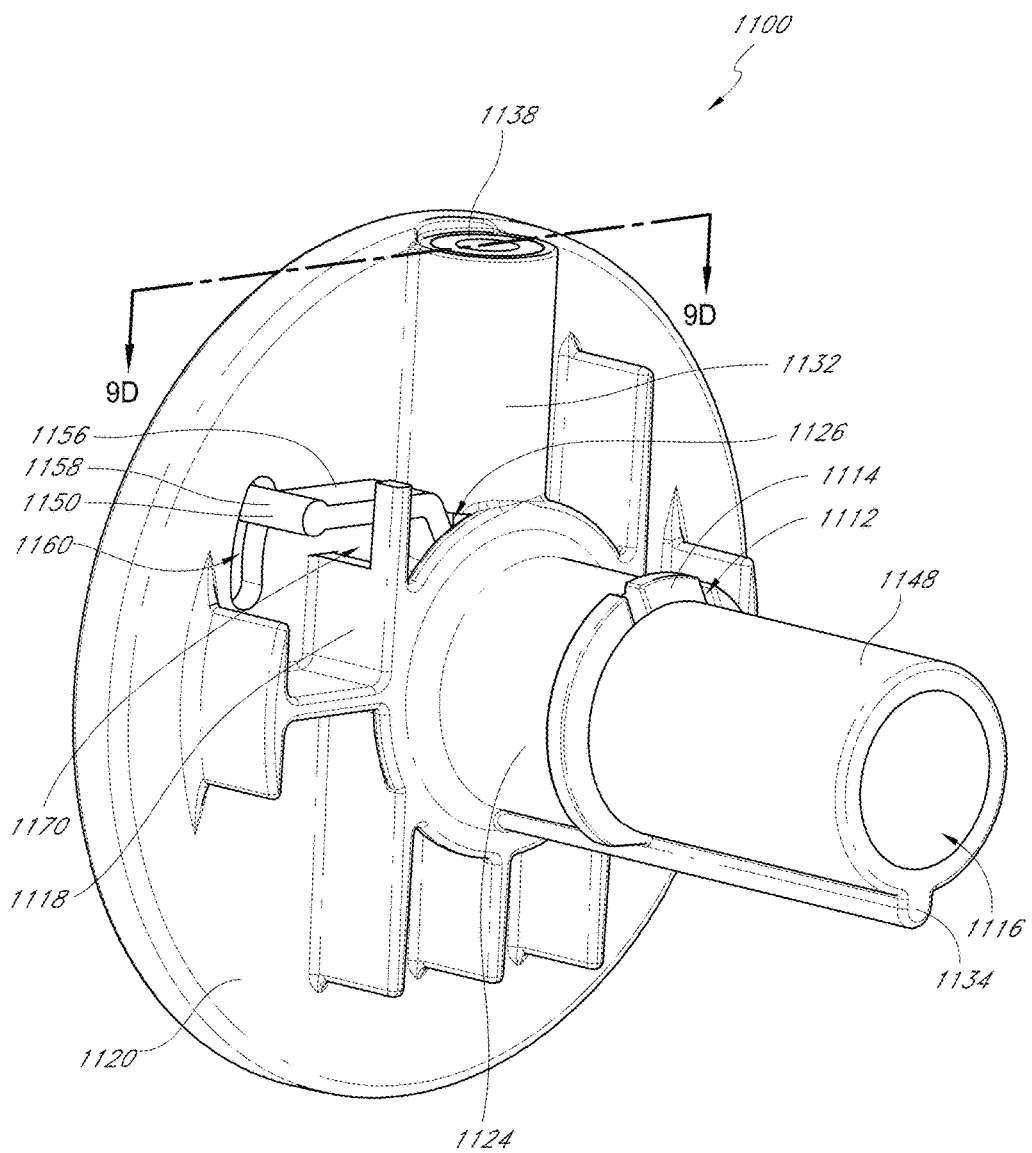
FIG. 9B is a top perspective view of another side of the hub assembly of FIG. 9A.

FIG. 9A is a top perspective view of a side of yet still another example embodiment of a hub assembly 1100 (e.g., an "outer" side when the hub assembly 1100 is mounted to a cart 100 via an axle 700). FIG. 9B is a top perspective view of another side of the hub assembly 1100 of FIG. 9A (e.g., an "inner" side when the hub assembly 1100 is mounted to a cart 100 via an axle 700). The hub assembly 1100 may comprise a retainer housing 1120, a retaining element 1130 (FIGS. 9D and 9E), a biasing element 1140 (FIGS. 9D and 9E), a restraining element 1138, a hand-maneuverable release mechanism 1150, and the like, for example as described herein. The retainer housing 1120 may include a wheel mounting sleeve 1124 at least partially defining an axle bore 1116, a pin sleeve 1132, a spacer 1148, a guiderail 1134, a plurality of raised projections 1118, and the like, for example as described herein.

The retainer housing 1120 may include a plurality of raised projections 1118. As discussed herein, the raised projections 1118 may increase the surface area that makes contact with the wheel, aid in proper orientation between the wheel and the retainer housing 1120, and/or allow for automated assembly. In some embodiments, one or more of the raised projections 1118 may include a cut-out 1170 to allow the tab 1156 and/or the arm 1158 to be manipulated toward and/or away from the axle bore 1116. In some embodiments, a cutout of a raised projection 1118 can inhibit displacement of the hand-maneuverable release mechanism 1150. For example, as illustrated in FIG. 9B, in reaction to a force on the hand-maneuverable release mechanism 1150 from the side illustrated in FIG. 9A, the hand-maneuverable release mechanism 1150 would abut the cutout portion of the raised projection 1118, which can inhibit movement of the hand-maneuverable release mechanism 1150 in the axis of the axle bore 1116. Other cutouts of raised projections 1118 and combinations are also possible. In some embodiments, the connector 1152 (FIG. 9C) of the hand-maneuverable release mechanism 1150 is longer, or the hand-maneuverable release mechanism 1150 includes other dimensions or configurations and the raised projections 1118 do not include a cut-out 1170 because the tab 1156 and/or the arm 1158 can still be manipulated toward and/or away from the axle bore 1116. Although not illustrated in FIG. 9A, the retainer housing 1120 may comprise a tool passageway (e.g., as described herein), for example as a backup in case of obstruction of the hand-maneuverable release mechanism 1150, to disguise the hand-maneuverable release mechanism 1150 from users knowledgeable about tool passageways, and the like.

Figure 9C:
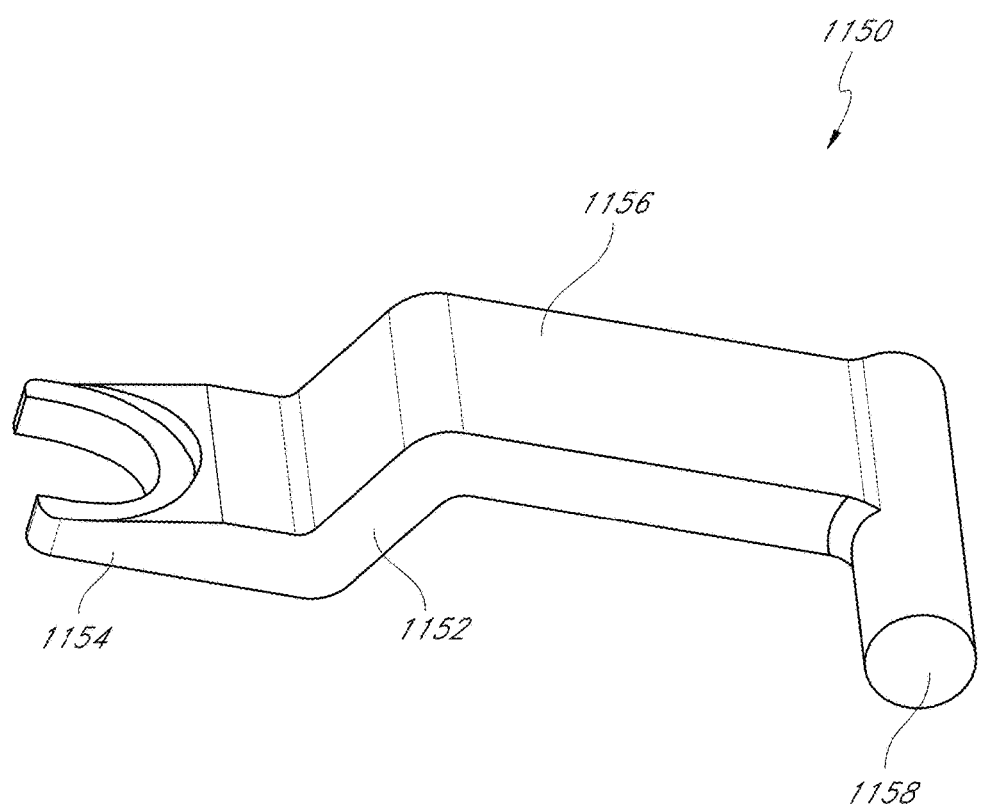
FIG. 9C is a top perspective view of an example embodiment of a hand-maneuverable release mechanism.

FIG. 9C is a top perspective view of an example embodiment of a hand-maneuverable release mechanism 1150, which may be used in combination with the hub assembly 1100 in FIG. 9A. The hand-maneuverable release mechanism 1150 includes an arm or protrusion 1158, which may be manipulated toward and/or away from an axle bore 1116 or radially inward and/or outward, a tab 1156 connected to the arm 1158, which may provide increased torque to the arm 1158, a lifter 1154, which can act on a retaining element 1130 (e.g., lifting a retaining element 1130 away from the axle bore 1116), and a connector 1152 connecting the tab 1156 and the lifter 1154.

In some embodiments, the hand-maneuverable release mechanism 1150 may be accessed and/or manipulated on the side of the hub assembly opposite the axle bore 1116 (e.g., the "outer side" illustrated in FIG. 9A) by the arm 1158. The ability of a hand-maneuverable release mechanism 1150 to be accessed and/or manipulated on the "outer side" of the hub assembly 1100 may allow for the use of the hub assembly 1100 with existing wheel molds (e.g., wheel molds not including cutouts (protrusions in a mold) specific to hub assemblies comprising a hand-maneuverable release mechanism). In an assembled hub assembly 1100, the arm 1158 extends through a slot 1160 in the retainer housing 1120. In some embodiments, the arm 1158 includes a projection (e.g., parallel to the end wall 1128) that at least partially covers or occludes the slot 1160 in the retainer housing 1120. Such a projection may inhibit dirt and/or debris from entering a conduit of the pin sleeve 1132, which could otherwise interfere with the operation of the components. In some embodiments, the projection is coupled (e.g., fused, glued, welded, combinations thereof, and the like) to the arm 1158 after the arm 1158 protrudes through the slot 1160. In some embodiments, the projection can be decorative (e.g., having the appearance of a flower, having an appearance similar to other features of the end wall 1128, etc.). In some embodiments, the hand-maneuverable release mechanism 1150 may be accessed and/or manipulated on the same side of the hub assembly as the axle bore 1116 (e.g., the "inner side" illustrated in FIG. 9B) by the arm 1158. In a wheel assembly comprising certain such hub assemblies 1100, the arm 1158 may extend through a cutout in the wheel.

In some embodiments in which the hand-maneuverable release mechanism 1150 comprises plastic, the hand-maneuverable release mechanism 1150 is injection molded. Plastic hand-maneuverable release mechanisms 1150 may be more versatile (e.g., more easily able to include multiple features than could be stamped from a sheet of metal, more easily changed by changing a mold and/or removing pieces, etc.), and/or less expensive to produce than metal hand-maneuverable release mechanisms 1150. In some embodiments, a hand-maneuverable release mechanism 1150 comprising plastic includes certain buttressing features to improve durability and/or performance. For example, a hand-maneuverable release mechanism 1150 may comprise a structural support member between the connector 1152 and the lifter 1154, between the connector 1152 and the tab 1156, between the tab 1156 and the arm 1158, and the like. In some embodiments, buttressing features may influence changes in certain other components of an associated hub assembly 1100 and/or wheel assembly (e.g., for clearance). In certain embodiments, the thickness of a lifter 1154 comprising plastic may be greater than the thickness of a lifter 1154 comprising metal, for example to inhibit the parts of the lifter 1154 from bending or breaking upon interaction with a retaining element 1130.

In some embodiments, the hand-maneuverable release mechanism 1150 may be inserted into the pin sleeve 1132 through a channel 1126 in the pin sleeve 1132 that is transverse or substantially transverse to the longitudinal axis the pin sleeve 1132, even if a longitudinal dimension is greater than a radial dimension (e.g., in contrast to the channels 426, 926, 1026 described herein, which are illustrated as extending substantially parallel to the longitudinal axis of the pin sleeve 432, 932, 1032). The channel 1126 is displaced from openings to the environment such as the slot 1160, which may inhibit dirt and debris from entering the pin sleeve 1132 that could otherwise interfere with operation of the components.

In some embodiments, the side of the retainer housing 1120 facing away from the axle bore 1116 (e.g., the end wall 1128 of the "outer side" illustrated in FIG. 9A) may include a plurality of mock or false release mechanisms 1162 including indentations or apertures 1164, forming a primarily ornamental design on the portion of the retainer housing 1120 that would be visible to a user when the hub assembly 1100 is mounted to a cart 100 via an axle 700. The design created by the mock release mechanisms 1162 may act to camouflage the release mechanism 1150, potentially detouring vandals and the like, while still providing users access to the release mechanism 1150. Although illustrated as comprising six mock release mechanisms 1162, any number of mock release mechanisms 1162 is possible as may be ornamentally desired. Other mock or false features are also possible, for example tool passageways. There may be a tradeoff between the ornamentality of the mock or false features and other concerns such as manufacturing costs.

Figure 9D:
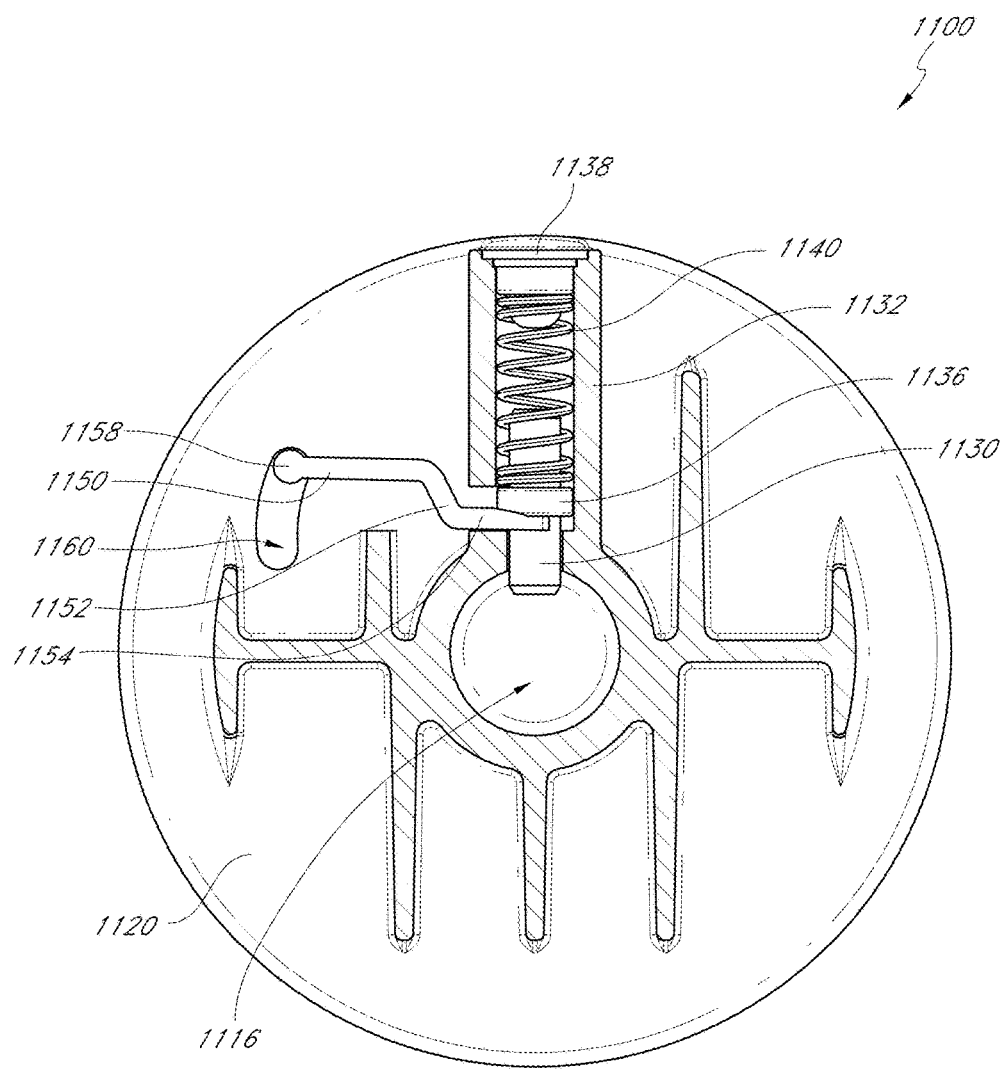
FIG. 9D is a side and partial cross-sectional view of the hub assembly of FIG. 9A along the line 9D-9D of FIG. 9B.

FIG. 9D is a side and partial cross-sectional view of the hub assembly 1100 of FIG. 9A along the line 9D-9D of FIG. 9B. The retainer housing 1120 includes a pin sleeve 1132 at least partially housing some of the other components of the hub assembly 1100. A retaining element 1130 in the pin sleeve 1132 is configured to operatively engage a groove 702 (FIGS. 1, 3B, and 6A-6C) in an axle 700 (FIGS. 1, 3B, and 6A-6C) inserted in the sleeve bore 1116. In some embodiments, the retaining element 1130 comprises a pin. In certain embodiments, an axle 700 has a chamfered end 704 (FIGS. 1, 3B, and 6A-6C) such that the retaining element 1130 is transversely displaced relative to the movement of the axle 700. In certain embodiments, the retaining element 1130 is shaped (e.g., chamfered) such that it is transversely displaced relative to the movement of an axle 700 (e.g., without a chamfered end). In some embodiments, the retaining element 1130 is configured (e.g., dimensioned) to reduce (e.g., decrease, minimize, prevent) rubbing of the sides of the groove 702 in the axle 700 by the sides of the retaining element 1130. In some embodiments, the retaining element 1130 comprises metal (e.g., stainless steel), which is may be more resistant to damage from typical usage of a wheel assembly comprising the hub assembly 1100 than plastic. Metal may also be better suited to shock loading and vibration than plastic. Other materials (e.g., plastic) are also possible. The retaining element 1130 optionally includes a lip 1136. The optional lip 1136 and the lifter 1154 can interact to inhibit the retaining element 1130 from exiting the pin sleeve 1132 into the axle bore 1116. Other shapes and types of retaining elements 1130 are also possible, including those that can aid in engaging the retaining element 1130 with the biasing element 1140 and/or the hand-maneuverable release mechanism 1150 (e.g., as described with respect to FIG. 5G).

A biasing element 1140 in the pin sleeve 1132 is configured to bias the retaining element 1130 towards the axle bore 1116. The biasing element 1140 may comprise a coil spring (e.g., as illustrated in FIG. 9D), a leaf spring, and the like. In some embodiments, the biasing element 1140 comprises metal (e.g., stainless steel), which may be more resistant to damage from typical usage of a wheel assembly comprising the hub assembly 1100 than plastic, and which may be better suited to shock loading and vibration than plastic. Other materials (e.g., plastic) are also possible. Other shapes and types of biasing elements 1140 are also possible. In certain embodiments, the retaining element 1130 and the biasing element 1140 are disposed in a cartridge that can be disposed in the pin sleeve 1132. The addition of layers such as a cartridge body would not depart from the invention disclosed herein. In some embodiments, the biasing element 1140 within the pin sleeve 1132 is in a relaxed position (e.g., the biasing element 1140 only applies force to the retaining element 1130 and the restraining element 1138 upon being compressed). In certain embodiments, the biasing element 1140 within the pin sleeve 1132 is in a compressed state such that the biasing element 1140 applies force to the retaining element 1130 and the restraining element 1138 regardless of the position of the retaining element 1130. The restraining element 1138 is stationary, but the retaining element 1130 can move longitudinally within the pin sleeve 1132 and compress the biasing element 1140.

In some embodiments, a restraining element 1138 is configured to inhibit the retaining element 1130 and/or the biasing element 1140 from exiting the pin sleeve 1132, at least prior to coupling the hub assembly 1100 to a wheel. The restraining element 1138 may comprise a plug, a threaded plug, a deformation in the pin sleeve 1132, a plurality of ledges extending radially into the pin sleeve 1132, a disc insertable in a slot in the pin sleeve 1132, and the like. The omission of the restraining element 1138, for example so that the biasing element 1140 would abut a wall of a wheel, would not depart from the invention disclosed herein.

In some embodiments, the hand-maneuverable release mechanism 1150 interacts with a retaining element 1130 via a lip 1136 of the retaining element 1130. In certain embodiments, a lifter 1154 and/or another portion of the hand-maneuverable release mechanism 1150 is positioned under a lip 1136 of a retaining element 1130. Other embodiments (e.g., those discussed with respect to FIGS. 5A-5P) may also be used.

Figure 9E:
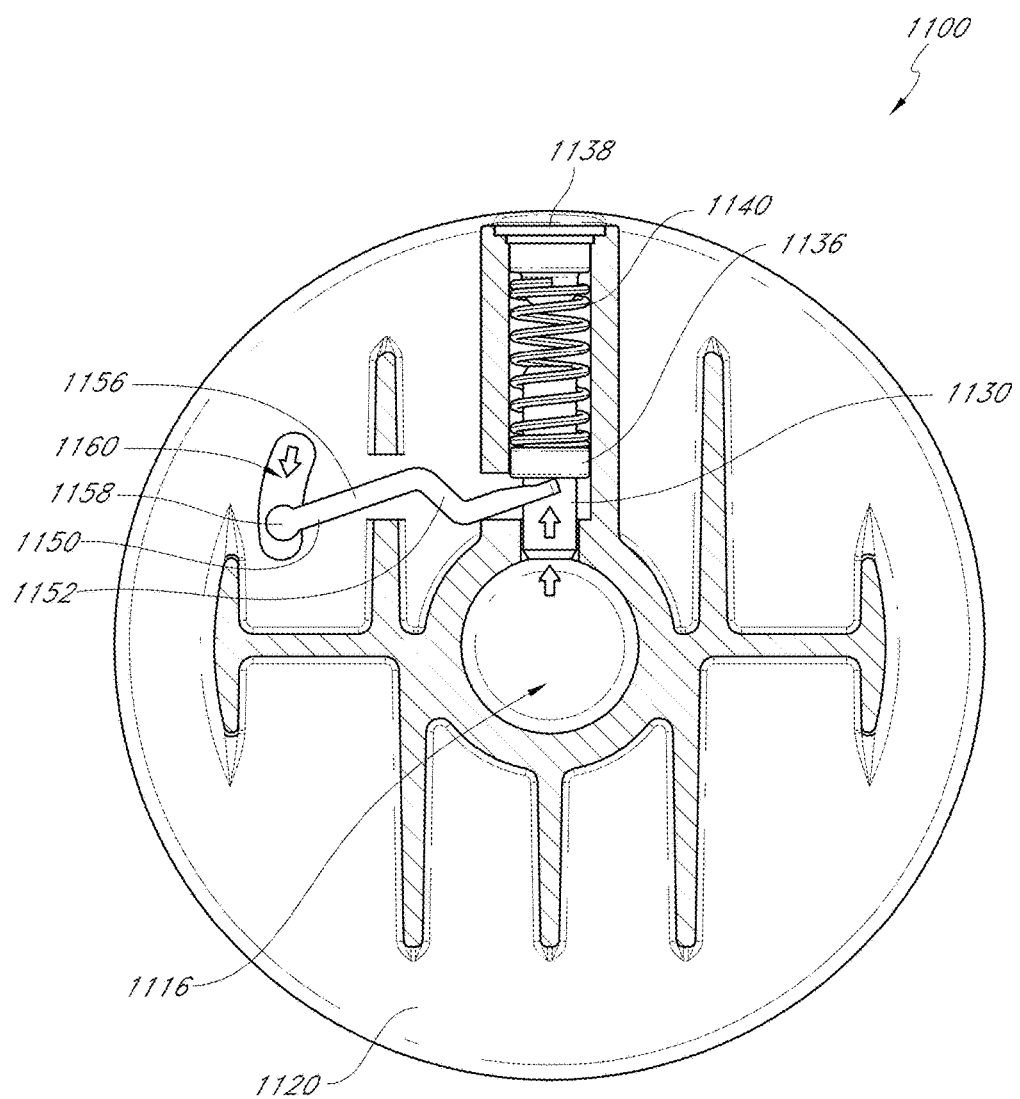
FIG. 9E is a side and partial cross-sectional view of the hub assembly of FIG. 9A along the line 9D-9D of FIG. 9B with a hand-maneuverable release mechanism in a release position.

To detach the hub assembly 1100 from an axle 700, the hand-maneuverable release mechanism 1150 may be manipulated by pushing the arm 1158 towards the other end of the slot 1160 (e.g., towards the axle bore or radially inward), which causes the tab 1156 to move towards the axle bore 1116 or radially inward and the lifter 1154 to move away from the axle bore 1116 or radially outward. Manipulation of the hand-maneuverable release mechanism 1150 causes the hand-maneuverable release mechanism 1150 to longitudinally displace the retaining element 1130 at least partially out (e.g., entirely out) of the axle bore 1116, allowing an axle 700 to be removed from the axle bore 1116. In certain embodiments, a wheel mounting sleeve 1124 or other surface acts as a bearing surface upon which the hand-maneuverable release mechanism 1150 pivots the lifter 1154 upward, lifting the retaining element 1130 out of the axle bore 1116. FIG. 9E is a side and partial cross-sectional view of the hub assembly of FIG. 9A along the line 9D-9D of FIG. 9B with the hand-maneuverable release mechanism 1150 in a release position (e.g., a position in which an axle 700 may be removed from the axle bore 1116).

Figure 10A:
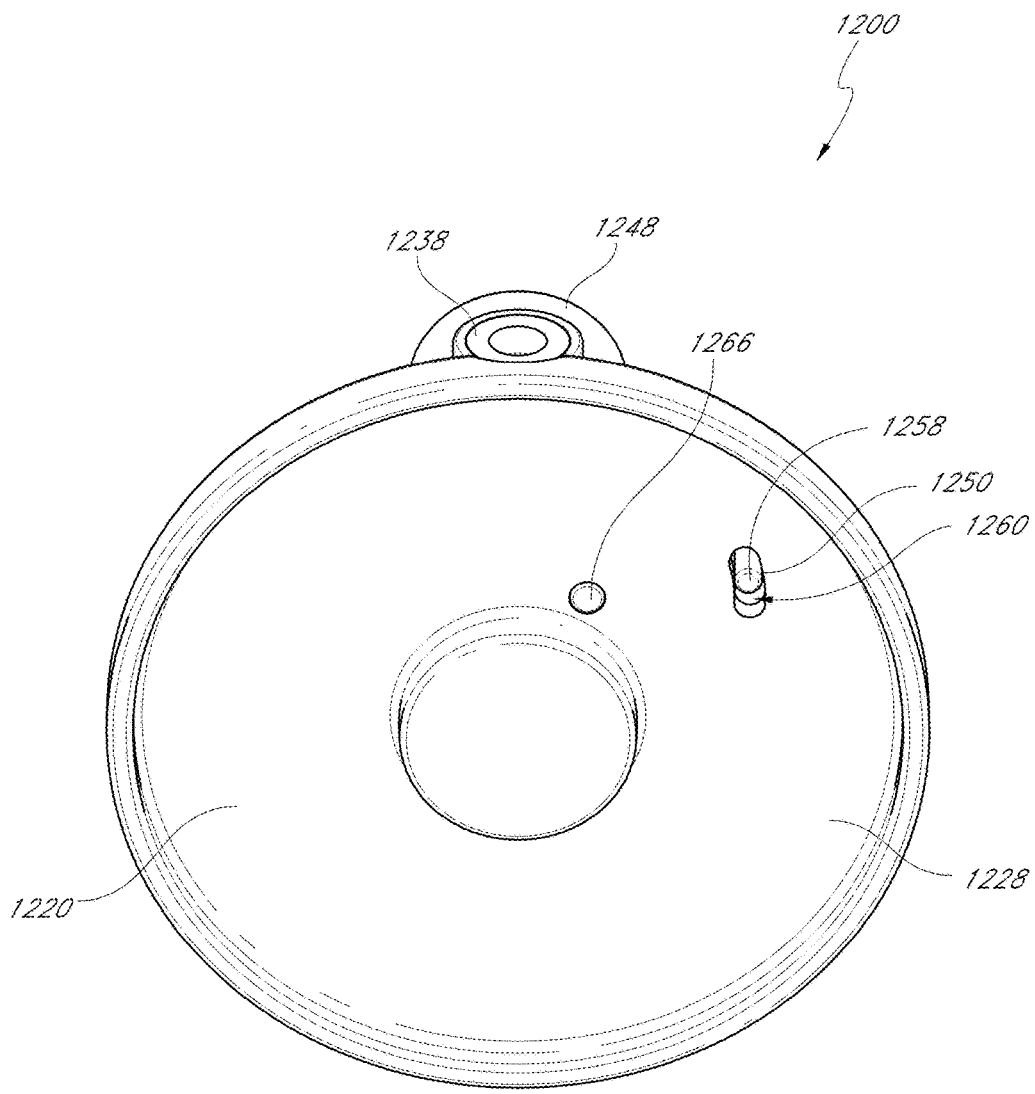
FIG. 10A is a top perspective view of a side of yet another example embodiment of a hub assembly.
Figure 10B:
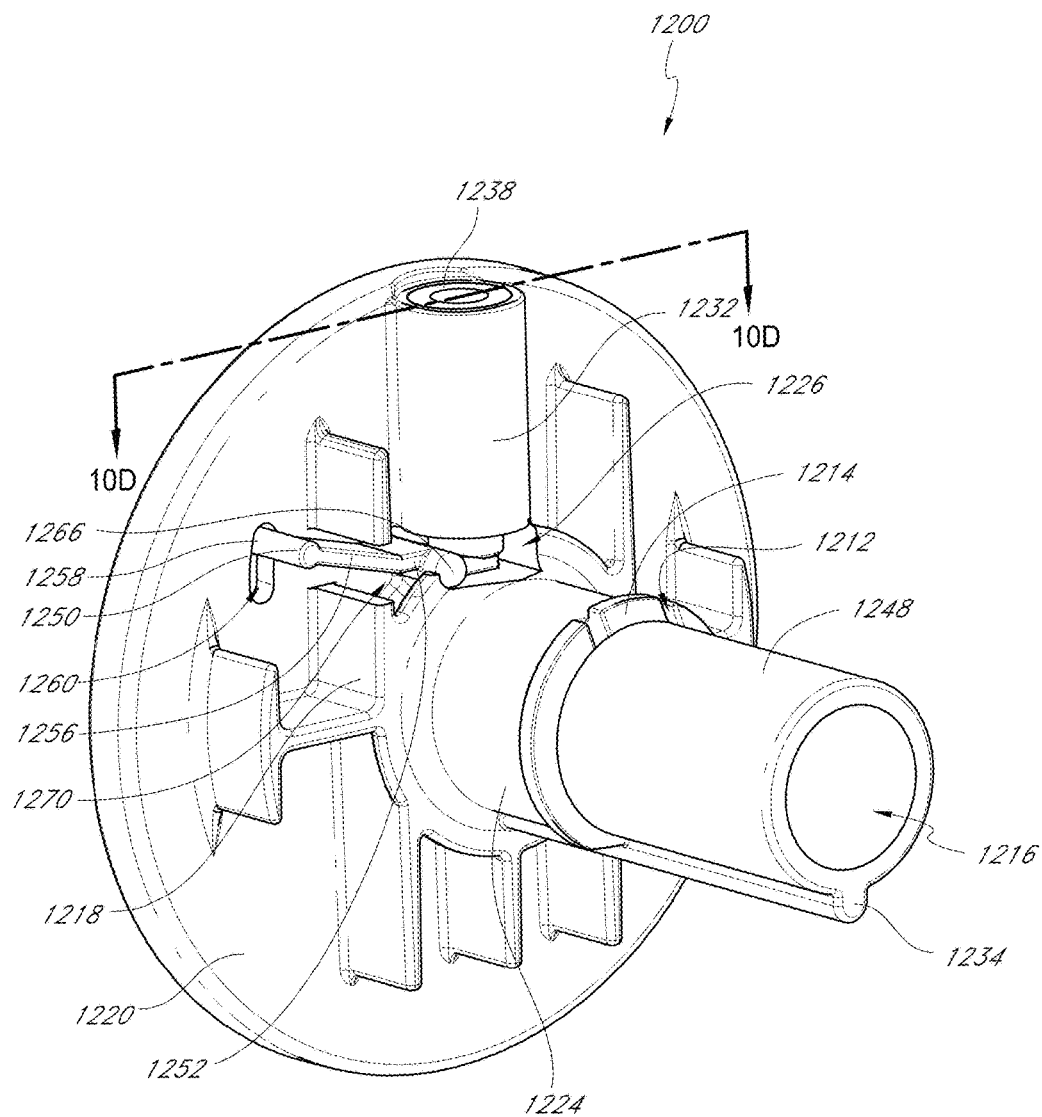
FIG. 10B is a top perspective view of another side of the hub assembly of FIG. 10A.

FIG. 10A is a top perspective view of a side of a further example embodiment of a hub assembly 1200 (e.g., an "outer" side when the hub assembly 1200 is mounted to a cart 100 via an axle 700). FIG. 10B is a top perspective view of another side of the hub assembly 1200 of FIG. 10A (e.g., an "inner" side when the hub assembly 1200 is mounted to a cart 100 via an axle 700). The hub assembly 1200 may comprise a retainer housing 1220, a retaining element 1230 (FIGS. 10D and 10E), a biasing element 1240 (FIGS. 10D and 10E), a restraining element 1238, a hand-maneuverable release mechanism 1250, and the like, for example as described herein. The retainer housing 1220 may include a wheel mounting sleeve 1224 at least partially defining an axle bore 1216, a pin sleeve 1232, a spacer 1248, a guiderail 1234, a plurality of raised projections 1218, and the like, for example as described herein.

The retainer housing 1220 may include a plurality of raised projections 1218. As discussed herein, the raised projections 1218 may increase the surface area that makes contact with the wheel, aid in proper orientation between the wheel and the retainer housing 1220, and/or allow for automated assembly. In some embodiments, one or more of the raised projections 1218 may include a cut-out 1270 to allow the hand-maneuverable release mechanism 1250 to be manipulated toward and/or away from the axle bore 1216. In some embodiments (e.g., as illustrated in FIG. 9B), the raised projections 1118 only include a partial cutout 1170, while in some embodiments (e.g., as illustrated in FIG. 10B), the cutout 1270 extends all the way through the raised projection 1218. In some embodiments, a complete cutout 1270 uses less material and/or may inhibit interference and/or friction between the raised projection 1218 and the hand-maneuverable release mechanism 1250 than partial cutouts such as the cutouts 1170. Other cutouts 1270 of raised projections 1218 are also possible.

Figure 10C:
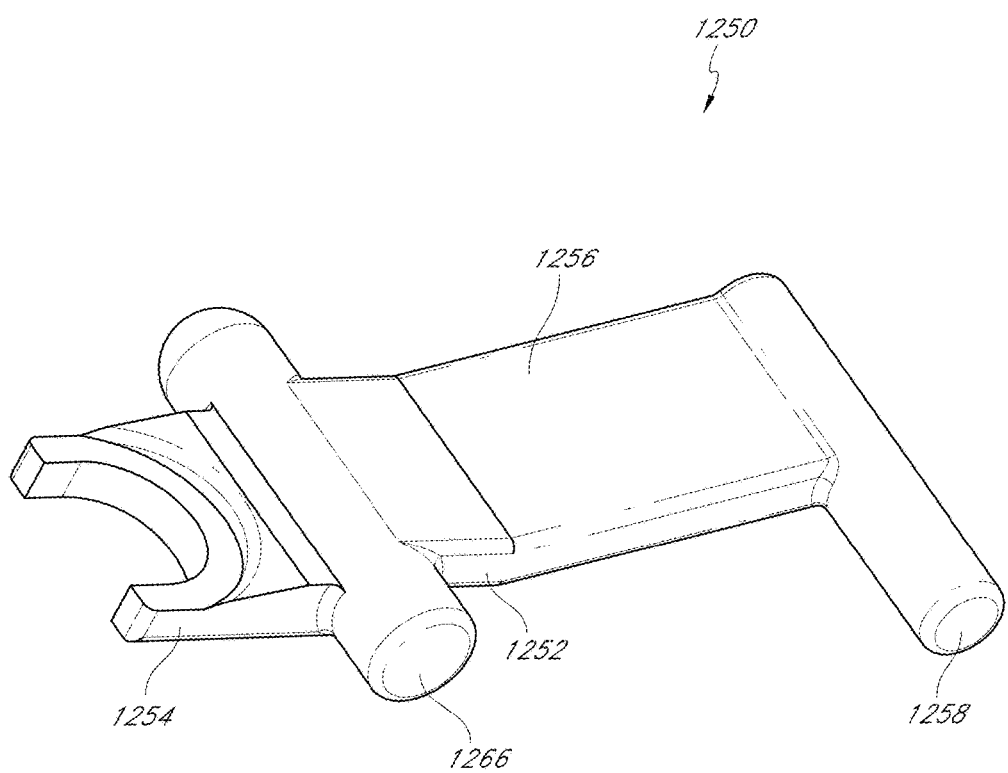
FIG. 10C is a top perspective view of another example embodiment of a hand-maneuverable release mechanism.

FIG. 10C is a top perspective view of an example embodiment of a hand-maneuverable release mechanism 1250, which may be used in combination with the hub assembly 1200 in FIG. 10A. The hand-maneuverable release mechanism 1250 includes an arm or protrusion 1258, which may be manipulated toward and/or away from an axle bore 1216 or radially inward and/or outward, a tab 1256 connected to the arm 1258, which may provide increased torque to the arm 1258, a lifter 1254, which can act on a retaining element 1230 (e.g., lifting a retaining element 1230 away from the axle bore 1216), a connector 1252 connecting the tab 1256 and the lifter 1254, and an optional rod 1266. In some embodiments, the hand-maneuverable release mechanism 1250 may be accessed and/or manipulated on the side of the hub assembly opposite the axle bore 1216 (e.g., the "outer side" illustrated in FIG. 12A) by the arm 1258. The ability of a hand-maneuverable release mechanism 1250 to be accessed and/or manipulated on the "outer side" of the hub assembly 1200 may allow for the use of the hub assembly 1200 with existing wheel molds (e.g., wheel molds not including cutouts (protrusions in a mold) specific to hub assemblies comprising a hand-maneuverable release mechanism). In an assembled hub assembly 1200, the arm 1258 extends through a slot 1260 in the retainer housing 1220. In some embodiments, the arm 1258 includes a projection (e.g., parallel to the end wall 1228) that at least partially covers or occludes the slot 1160 in the retainer housing 1120. Such a projection may inhibit dirt and/or debris from entering a conduit of the pin sleeve 1232, which could otherwise interfere with the operation of the components. In some embodiments, the projection is coupled (e.g., fused, glued, welded, combinations thereof, and the like) to the arm 1258 after the arm 1258 protrudes through the slot 1260. In some embodiments, the projection can be decorative (e.g., having the appearance of a flower, having an appearance similar to other features of the end wall 1228, etc.). In some embodiments, the hand-maneuverable release mechanism 1250 may be accessed and/or manipulated on the same side of the hub assembly as the axle bore 1216 (e.g., the "inner side" illustrated in FIG. 10B) by the arm 1258. In a wheel assembly comprising certain such hub assemblies 1200, the arm 1258 may extend through a cutout in the wheel.

In some embodiments, the hand-maneuverable release mechanism 1250 includes a rod 1266 configured to extend through a hole in the retainer housing 1220 and that is visible on the side of the hub assembly 1200 opposite the axle bore 1216 (e.g., the "outer side" illustrated in FIG. 10A). The rod 1266 may also or alternatively rest on an edge of the channel 1226 in the pin sleeve 1232 or a feature proximate to the channel 1226. When the arm 1258 is manipulated downward, toward the axle bore 1216, the rod 1266 rotates counter-clockwise looking from the side of FIG. 10B, causing the lifter 1254 to angle away from the axle bore 1216, lifting the retaining element 1230 out of the axle bore 1216. The rod 1266 may increase the stability of the hand-maneuverable release mechanism 1250 and/or inhibit lateral movement of the hand-maneuverable release mechanism 1250, while still allowing rotational movement to act on the lifter 1254 and release the retaining element 1230. In some embodiments, the appearance of the rod 1266 on the "outer side" of the hub assembly 1200 may look similar to a tool passageway and/or may serve to camouflage the presence of the hand-maneuverable release mechanism 1250. The presence of the rod 1266 on the "outer side" of the hub assembly may also contribute to a decorative or ornamental design on the hub assembly.

In some embodiments in which the hand-maneuverable release mechanism 1250 comprises plastic, the hand-maneuverable release mechanism 1250 is injection molded. Plastic hand-maneuverable release mechanisms 1250 may be more versatile (e.g., more easily able to include multiple features than could be stamped from a sheet of metal, more easily changed by changing a mold and/or removing pieces, etc.), and/or less expensive to produce than metal hand-maneuverable release mechanisms 1250. In some embodiments, a hand-maneuverable release mechanism 1250 comprising plastic includes certain buttressing features to improve durability and/or performance. For example, a hand-maneuverable release mechanism 1250 may comprise a structural support member between the connector 1252 and the lifter 1254, between the connector 1252 and the tab 1256, between the tab 1256 and the arm 1258, and the like. In some embodiments, buttressing features may influence changes in certain other components of an associated hub assembly 1200 and/or wheel assembly (e.g., for clearance). In certain embodiments, the thickness of a lifter 1254 comprising plastic may be greater than the thickness of a lifter 1254 comprising metal, for example to inhibit the parts of the lifter 1254 from bending or breaking upon interaction with a retaining element 1230.

In some embodiments, the hand-maneuverable release mechanism 1250 may be inserted into the pin sleeve 1232 through a channel 1226 in the pin sleeve 1232 that is transverse or substantially transverse to the longitudinal axis of the pin sleeve 1232, even if a longitudinal dimension is greater than a radial dimension (e.g., in contrast to the channels 426, 926, 1026 described herein, which are illustrated as extending substantially parallel to the longitudinal axis of the pin sleeve 432, 932, 1032). The channel 1226 is displaced from openings to the environment such as the slot 1260, which may inhibit dirt and debris from entering the pin sleeve 1232 that could otherwise interfere with operation of the components. In some embodiments, the channel 1226 may allow the use of less material for the pin sleeve 1232 than a pin sleeve with a longitudinal channel and/or may allow for easier manufacturing (e.g., during retraction of molds during forming the retainer housing 1120) and/or assembly (e.g., mechanical coupling of the hand-maneuverable release mechanism 1250, the retaining element 1230, and the retainer housing 1220).

In some embodiments, the side of the retainer housing 1220 facing away from the axle bore 1216 (e.g., the end wall 1228 of the "outer side" illustrated in FIG. 10A) may include a plurality of mock or false release mechanisms including indentations or apertures, for example as described herein with respect to FIG. 10A, and/or a plurality of mock or false release rods or protrusions, separately or together forming a primarily ornamental design on the portion of the retainer housing 1220 that would be visible to a user when the hub assembly 1200 is mounted to a cart 100 via an axle 700. The design created by the mock release mechanisms and/or rods may act to camouflage the release mechanism 1250 and/or rod 1266, potentially detouring vandals and the like, while still providing users access to the release mechanism 1250. Any number of mock release mechanisms and/or rods is possible as may be ornamentally desired. There may be a tradeoff between the ornamentality of the mock or false features and other concerns such as manufacturing costs.

Figure 10D:
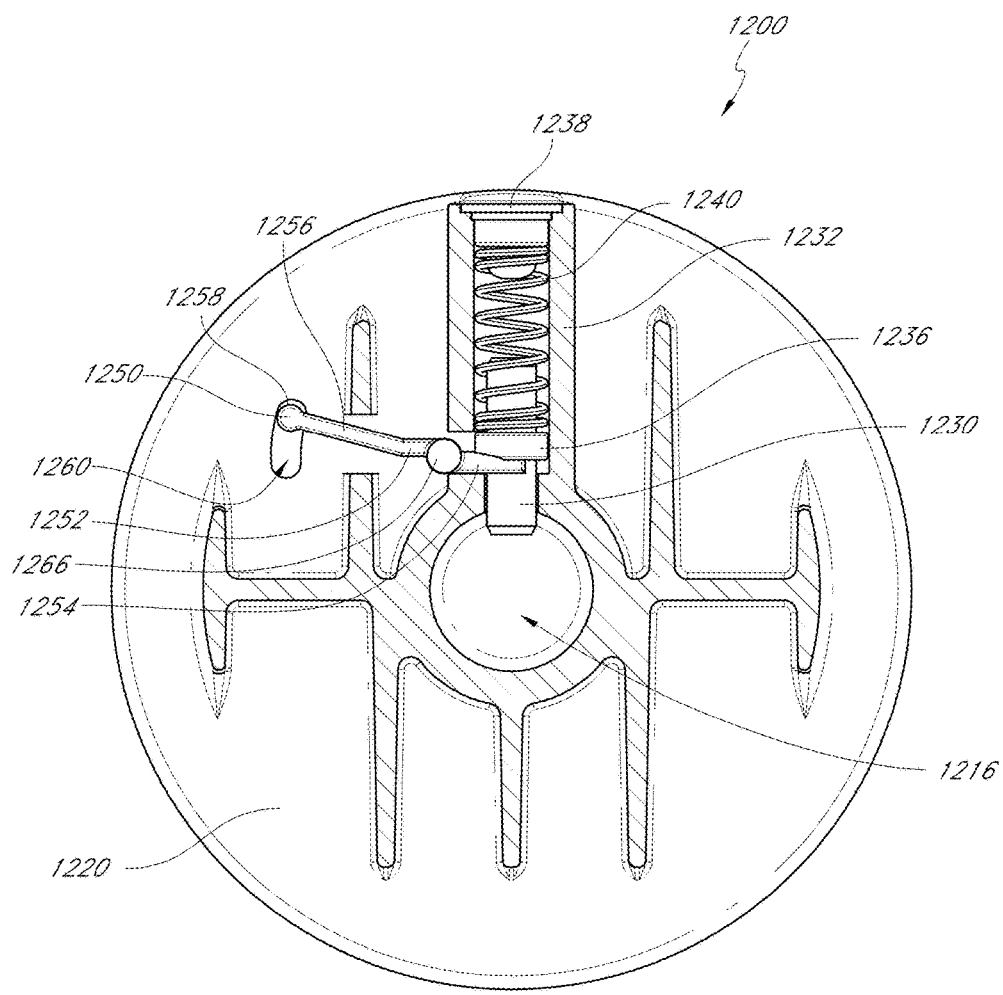
FIG. 10D is a side and partial cross-sectional view of the hub assembly of FIG. 10A along the line 10D-10D of FIG. 10B.

FIG. 10D is a side and partial cross-sectional view of the hub assembly 1200 of FIG. 10A along the line 10D-10D of FIG. 10B. The retainer housing 1220 includes a pin sleeve 1232 at least partially housing some of the other components of the hub assembly 1200. A retaining element 1230 in the pin sleeve 1232 is configured to operatively engage a groove 702 (FIGS. 1, 3B, and 6A-6C) in an axle 700 (FIGS. 1, 3B, and 6A-6C) inserted in the sleeve bore 1216. In some embodiments, the retaining element 1230 comprises a pin. In certain embodiments, an axle 700 has a chamfered end 704 (FIGS. 1, 3B, and 6A-6C) such that the retaining element 1130 is transversely displaced relative to the movement of the axle 700. In certain embodiments, the retaining element 1230 is shaped (e.g., chamfered) such that it is transversely displaced relative to the movement of an axle 700 (e.g., without a chamfered end). In some embodiments, the retaining element 1230 is configured (e.g., dimensioned) to reduce (e.g., decrease, minimize, prevent) rubbing of the sides of the groove 702 in the axle 700 by the sides of the retaining element 1230. In some embodiments, the retaining element 1230 comprises metal (e.g., stainless steel), which is may be more resistant to damage from typical usage of a wheel assembly comprising the hub assembly 1200 than plastic. Metal may also be better suited to shock loading and vibration than plastic. Other materials (e.g., plastic) are also possible. The retaining element 1230 optionally includes a lip 1236. The optional lip 1236 and the lifter 1254 can interact to inhibit the retaining element 1230 from exiting the pin sleeve 1232 into the axle bore 1216. Other shapes and types of retaining elements 1230 are also possible, including those that can aid in engaging the retaining element 1230 with the biasing element 1240 and/or the hand-maneuverable release mechanism 1250 (e.g., as described with respect to FIG. 5G).

A biasing element 1240 in the pin sleeve 1232 is configured to bias the retaining element 1230 towards the axle bore 1216. The biasing element 1240 may comprise a coil spring (e.g., as illustrated in FIG. 10D), a leaf spring, and the like. In some embodiments, the biasing element 1240 comprises metal (e.g., stainless steel), which may be more resistant to damage from typical usage of a wheel assembly comprising the hub assembly 1200 than plastic, and which may be better suited to shock loading and vibration than plastic. Other materials (e.g., plastic) are also possible. Other shapes and types of biasing elements 1240 are also possible. In certain embodiments, the retaining element 1230 and the biasing element 1240 are disposed in a cartridge that can be disposed in the pin sleeve 1232. The addition of layers such as a cartridge body would not depart from the invention disclosed herein. In some embodiments, the biasing element 1240 within the pin sleeve 1232 is in a relaxed position (e.g., the biasing element 1240 only applies force to the retaining element 1230 and the restraining element 1238 upon being compressed). In certain embodiments, the biasing element 1240 within the pin sleeve 1232 is in a compressed state such that the biasing element 1240 applies force to the retaining element 1230 and the restraining element 1238 regardless of the position of the retaining element 1230. The restraining element 1238 is stationary, but the retaining element 1230 can move longitudinally within the pin sleeve 1232 and compress the biasing element 1240.

In some embodiments, a restraining element 1238 is configured to inhibit the retaining element 1230 and/or the biasing element 1240 from exiting the pin sleeve 1232, at least prior to coupling the hub assembly 1200 to a wheel. The restraining element 1238 may comprise a plug, a threaded plug, a deformation in the pin sleeve 1232, a plurality of ledges extending radially into the pin sleeve 1232, a disc insertable in a slot in the pin sleeve 1232, and the like. The omission of the restraining element 1238, for example so that the biasing element 1240 would abut a wall of a wheel, would not depart from the invention disclosed herein.

In some embodiments, the hand-maneuverable release mechanism 1250 interacts with a retaining element 1230 via a lip 1236 of the retaining element 1230. In certain embodiments, a lifter 1254 and/or another portion of the hand-maneuverable release mechanism 1250 is positioned under a lip 1236 of a retaining element 1230. Other embodiments (e.g., those discussed with respect to FIGS. 5A-5P) may also be used.

Figure 10E:
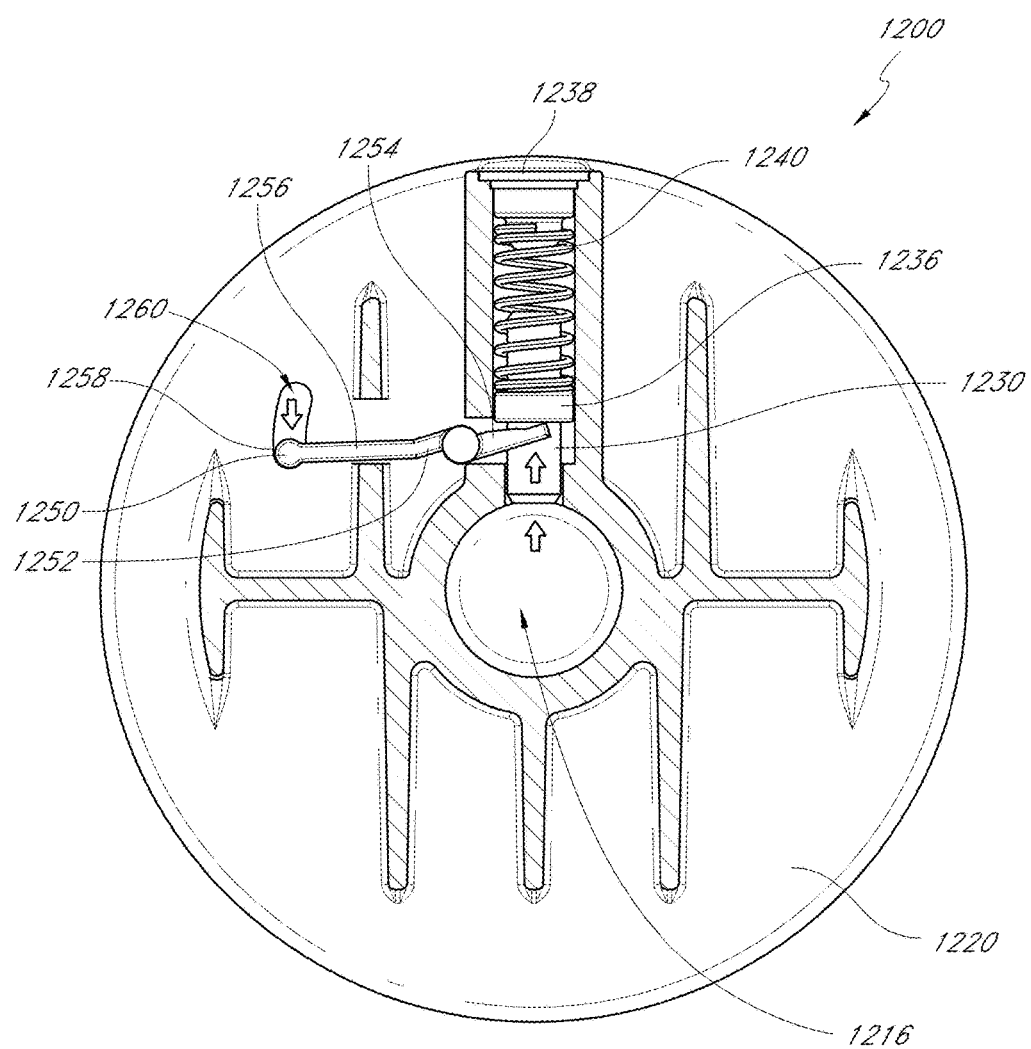
FIG. 10E is a side and partial cross sectional view of the hub assembly of FIG. 10A along the line 10D-10D of FIG. 10B with a hand-maneuverable release mechanism in a release position.

To detach the hub assembly 1200 from an axle 700, the hand-maneuverable release mechanism 1250 may be manipulated by pushing the arm 1258 towards the other end of the slot 1260 (e.g., towards the axle bore or radially inward), which causes the tab 1256 to move towards the axle bore 1216 or radially inward, the rod 1266 to rotate (e.g., counter-clockwise looking from the side of FIG. 10B), and the lifter 1254 to move away from the axle bore 1216 or radially outward. Manipulation of the hand-maneuverable release mechanism 1250 causes the hand-maneuverable release mechanism 1250 to longitudinally displace the retaining element 1230 at least partially out (e.g., entirely out) of the axle bore 1216, allowing an axle 700 to be removed from the axle bore 1216. In certain embodiments, a surface of the retainer housing 1220 acts as a bearing surface upon which the rod 1266 pivots the lifter 1254 upward, lifting the retaining element 1230 out of the axle bore 1116. FIG. 10E is a side and partial cross-sectional view of the hub assembly of FIG. 10A along the line 10D-10D of FIG. 10B with the hand-maneuverable release mechanism 1250 in a release position (e.g., a position in which an axle 700 may be removed from the axle bore 1216).

Figure 11A:
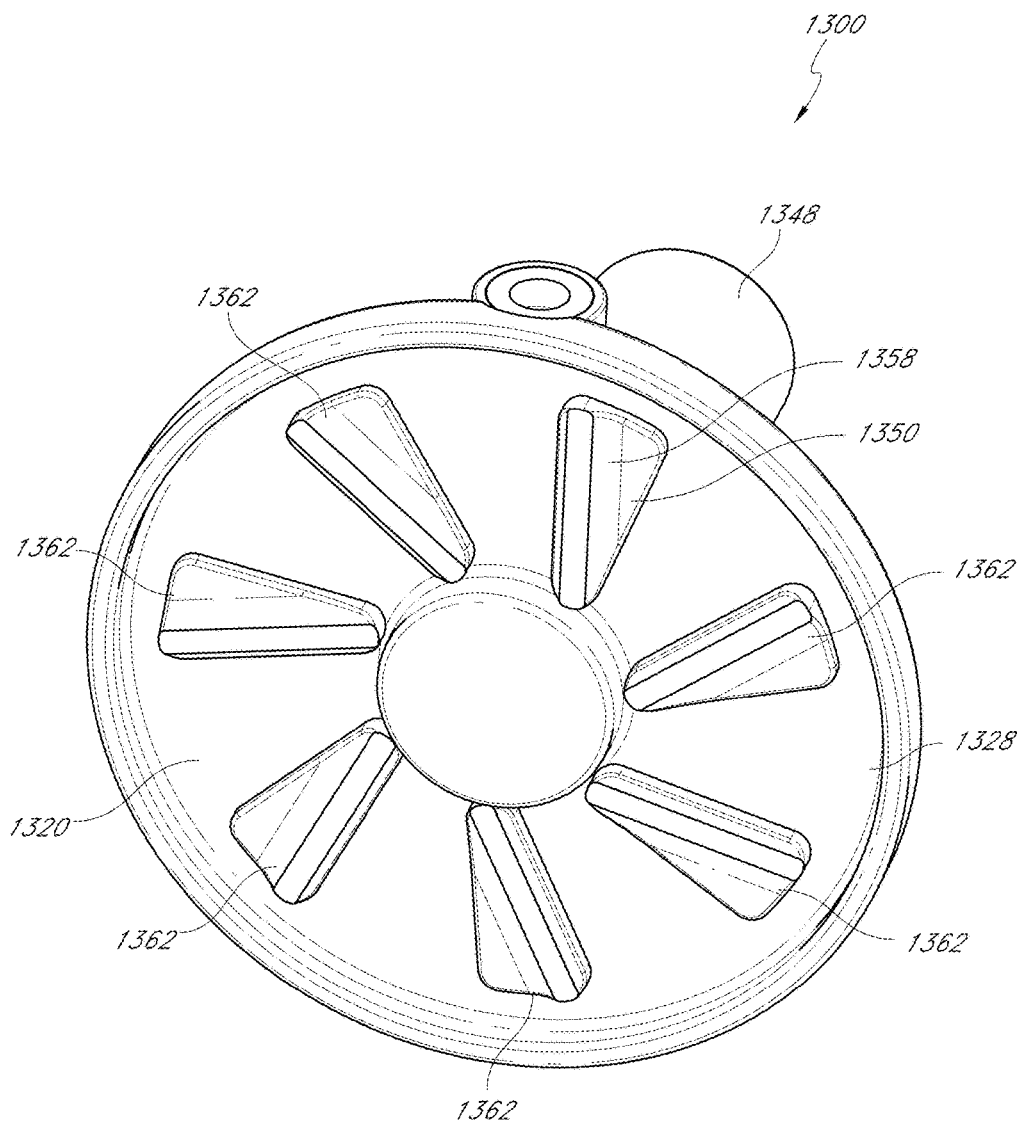
FIG. 11A is a top perspective view of a side of yet another example embodiment of a hub assembly.
Figure 11B:
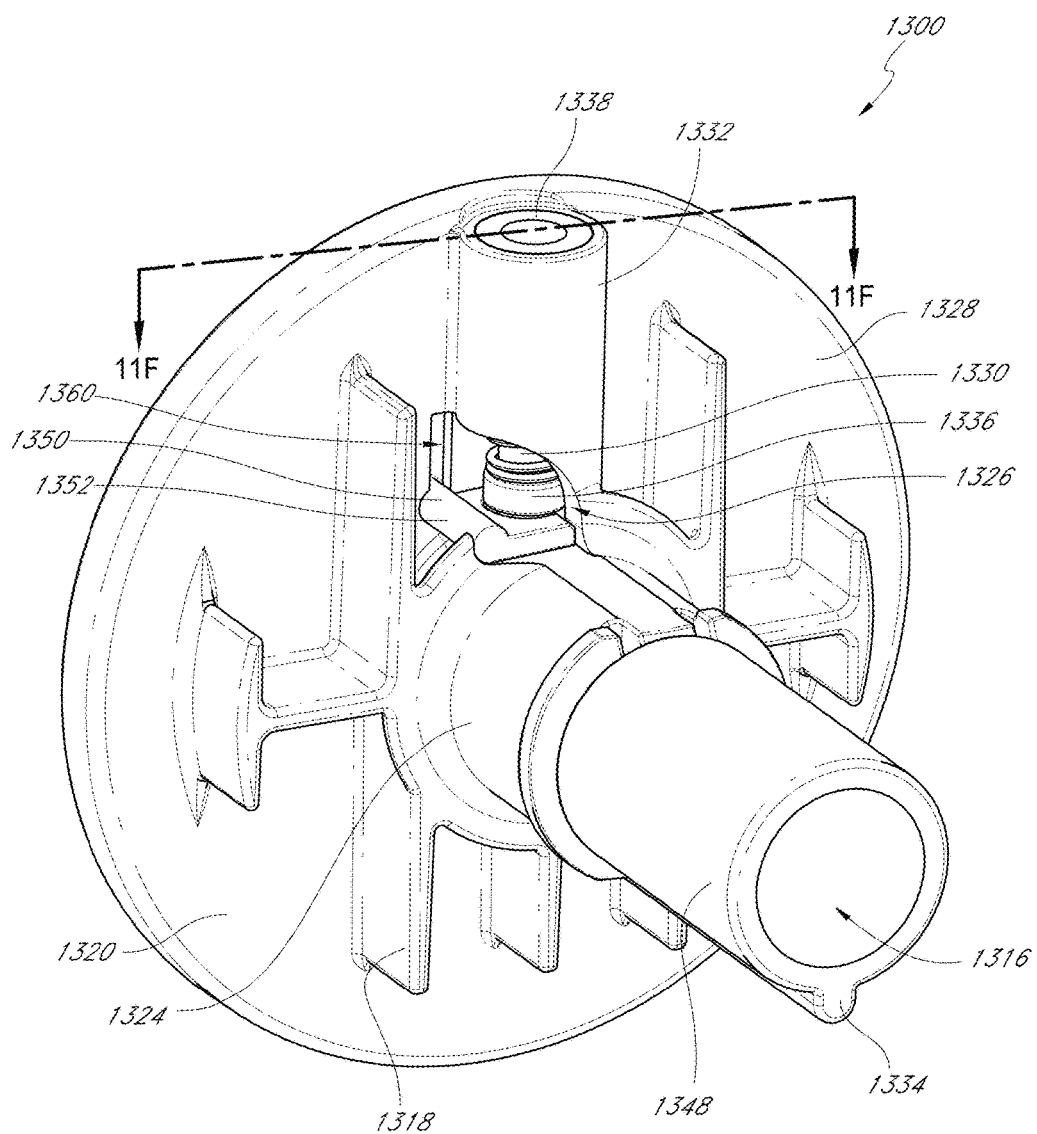
FIG. 11B is a top perspective view of another side of the hub assembly of FIG. 11A.

FIG. 11A is a top perspective view of a side of a still further example embodiment of a hub assembly 1300 (e.g., an "outer" side when the hub assembly 1300 is mounted to a cart 100 via an axle 700). FIG. 11B is a top perspective view of another side of the hub assembly 1300 of FIG. 11A (e.g., an "inner" side when the hub assembly 1300 is mounted to a cart 100 via an axle 700). The hub assembly 1300 may comprise a retainer housing 1320, a retaining element 1330 (FIGS. 11H and 11I), a biasing element 1340 (FIGS. 11H and 11I), a restraining element 1338, a hand-maneuverable release mechanism 1350, and the like, for example as described herein. The retainer housing 1320 may include a wheel mounting sleeve 1324 at least partially defining an axle bore 1316, a pin sleeve 1332, a spacer 1348, a guiderail 1334, a plurality of raised projections 1318, and the like, for example as described herein. Although not illustrated in FIG. 11A or 11E, the retainer housing 1320 may comprise a tool passageway (e.g., as described herein), for example as a backup in case of obstruction of the hand-maneuverable release mechanism 1350, to disguise the hand-maneuverable release mechanism 1350 from users knowledgeable about tool passageways, and the like.

Figure 11C:
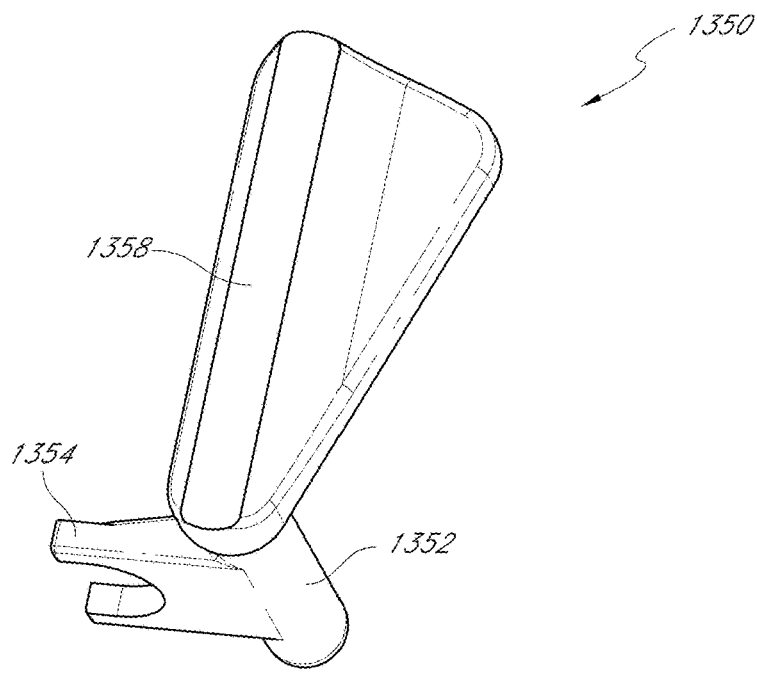
FIG. 11C is a bottom perspective view of a side of another example embodiment of a hand-maneuverable release mechanism.
Figure 11D:
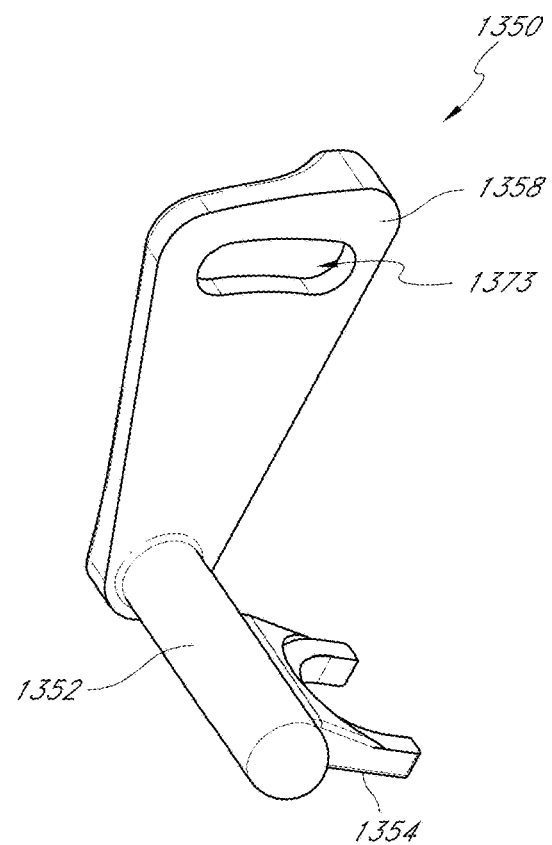
FIG. 11D is a top perspective view of another side of the hand-maneuverable release mechanism of FIG. 11C.

FIG. 11C is a bottom perspective view of a side of another example embodiment of a hand-maneuverable release mechanism 1350, which may be used in combination with the hub assembly 1300 in FIG. 11A (e.g., an "outer" side when the hand-maneuverable release mechanism 1350 is inserted into the hub assembly 1300). FIG. 11D is a top perspective view of another side of the hand-maneuverable release mechanism 1350 of FIG. 11C (e.g., an "inner" side when the hand-maneuverable release mechanism 1350 is inserted into the hub assembly 1300). The hand-maneuverable release mechanism 1350 includes an arm or protrusion 1358, which may be manipulated toward an axle bore 1316, radially inward, and/or clockwise looking from the side of FIG. 11A or 11C, a lifter 1354, which can act on a retaining element 1330 (e.g., lifting a retaining element 1330 away from the axle bore 1316), and a connector or rod 1352 connecting the arm or protrusion 1358 and the lifter 1354. The arm 1358 is connected directly to the connector 1352, which may decrease the quantity of materials used for production of the hand-maneuverable release mechanism 1350. The hand-maneuverable release mechanism 1350 may comprise plastic, metal, wood, rubber, combinations thereof, etc. The hand-maneuverable release mechanism 1350 may be integrally formed or may comprise a plurality of components coupled together.

In some embodiments, the hand-maneuverable release mechanism 1350 may be accessed and/or manipulated on the side of the hub assembly opposite the axle bore 1316 (e.g., the "outer side" illustrated in FIG. 11A) by the arm 1358. The ability of a hand-maneuverable release mechanism 1350 to be accessed and/or manipulated on the "outer side" of the hub assembly 1300 may allow for the use of the hub assembly 1300 with existing wheel molds (e.g., wheel molds not including cutouts (protrusions in a mold) specific to hub assemblies comprising a hand-maneuverable release mechanism). In an assembled hub assembly 1300, the connector 1352 extends through a slot 1360 in the retainer housing 1320. The arm 1358 may cover the slot 1360 of the retainer housing 1320, which may inhibit dirt and/or debris from entering a conduit of the pin sleeve 1332, which could otherwise interfere with the operation of the components. In some embodiments, the arm 1358 has a shape (e.g., triangular, trapezoidal, or fan-like) surface texture, varying thickness, combinations thereof, and the like, that allows for easier user manipulation (e.g., ability to grip and/or move the arm 1358). In some embodiments, the side of the arm 1358 facing the retainer housing 1320 includes a groove 1373. The groove 1373 may allow for less material to be used in producing the hand-maneuverable release mechanism 1350 than in a hand-maneuverable release mechanism 1350 not including a groove 1373. In some embodiments, the hand-maneuverable release mechanism 1350 may be accessed and/or manipulated on the same side of the hub assembly as the axle bore 1316 (e.g., the "inner side" illustrated in FIG. 11B) by the arm 1358. In a wheel assembly comprising certain such hub assemblies 1300, the arm 1358 may extend through a cutout in the wheel.

In some embodiments in which the hand-maneuverable release mechanism 1350 comprises plastic, the hand-maneuverable release mechanism 1350 is injection molded. Plastic hand-maneuverable release mechanisms 1350 may be more versatile (e.g., more easily able to include multiple features than could be stamped from a sheet of metal, more easily changed by changing a mold and/or removing pieces, etc.) and/or less expensive to produce than metal hand-maneuverable release mechanisms 1350. In some embodiments, a hand-maneuverable release mechanism 1350 comprising plastic includes certain buttressing features to improve durability and/or performance. In some embodiments, buttressing features may influence changes in certain other components of an associated hub assembly 1300 and/or wheel assembly (e.g., for clearance). In certain embodiments, the thickness of a lifter 1354 comprising plastic may be greater than the thickness of a lifter 1354 comprising metal, for example to inhibit the parts of the lifter 1354 from bending or breaking upon interaction with a retaining element 1330.

In some embodiments, the hand-maneuverable release mechanism 1350 may be inserted into the pin sleeve 1332 through an axial channel 1326 in the pin sleeve 1332. In some embodiments, the hand-maneuverable release mechanism 1350 may be oriented so that the lifter 1354 is parallel with the pin sleeve 1332, inserted through the slot 1360 in the retainer housing 1320, and then rotated through the channel 1326 in the pin sleeve 1332. Other methods of the hand-maneuverable release mechanism are also possible.

Figure 11E:
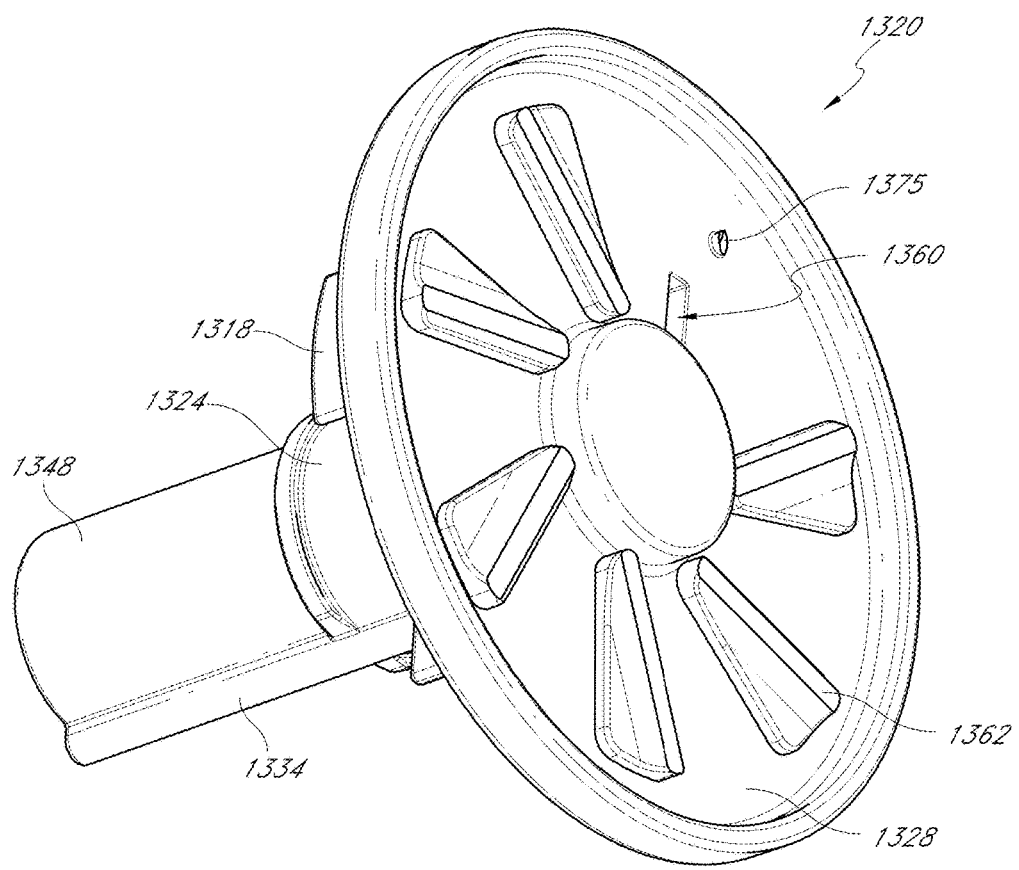
FIG. 11E is a bottom perspective view of an example embodiment of a retainer housing.

FIG. 11E is a bottom perspective view of an example embodiment of a retainer housing 1320. In the embodiment illustrated in FIG. 11E, the side of the retainer housing 1320 facing away from the axle bore 1316 includes a protrusion 1375. The protrusion 1375 may interact with the groove 1373 in the arm 1358 to inhibit the movement of the arm 1358. For example, when the release mechanism 1350 is in a "locked position" (e.g., when the retaining element 1330 is protruding into the axle bore 1316), the protrusion 1375 may inhibit the retaining element 1330 from protruding too far into the axle bore 1316 because rotation of the arm 1358 is limited by interaction between the protrusion 1375 and the sides of the groove 1373. When the hand-maneuverable release mechanism 1350 is in a "release position" (e.g., when the retaining element 1330 is not protruding into the axle bore 1316), the protrusion 1375 may inhibit the retaining element 1330 from protruding too far into the pin sleeve 1332 (and, e.g., disengaging the lifter 1354) because rotation of the arm 1358 is limited by interaction between the protrusion 1375 and the sides of the groove 1373.

In some embodiments, the side of the retainer housing 1320 facing away from the axle bore 1316 (e.g., the end wall 1328 of the "outer side" illustrated in FIGS. 11A and 11E) may include a plurality of mock or false release mechanisms 1362 forming a primarily ornamental design on the portion of the retainer housing 1320 that would be visible to a user when the hub assembly 1300 is mounted to a cart 100 via an axle 700. The design created by the mock release mechanisms 1362 may act to camouflage the release mechanism 1350, potentially detouring vandals and the like, while still providing users access to the release mechanism 1350. Although illustrated as comprising six mock release mechanisms 1362, any number of mock release mechanisms 1362 is possible as may be ornamentally desired. Other mock or false features are also possible, for example tool passageways. There may be a tradeoff between the ornamentality of the mock or false features and other concerns such as manufacturing costs.

Figure 11F:
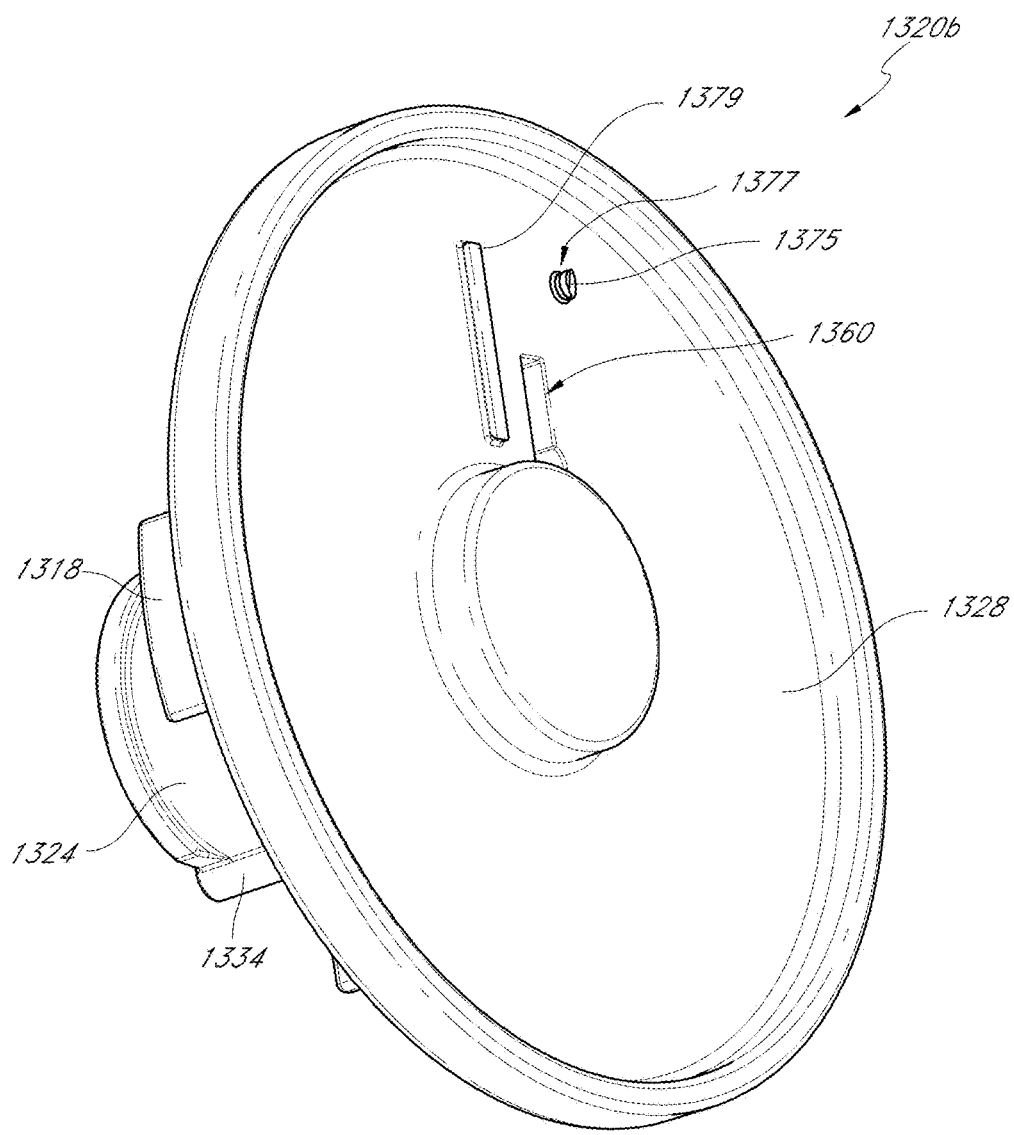
FIG. 11F is a bottom perspective view of another example embodiment of a retainer housing.

FIG. 11F is a bottom perspective view of another example embodiment of a retainer housing 1320, which shows some optional changes versus the retainer housing 1320 of FIG. 11E, but which may still be used with the hub assembly 1300. In the embodiment illustrated in FIG. 11F, the end wall 1328 of the retainer housing 1320 includes a protrusion 1375, which may interact with the groove 1373 in the arm 1358 to inhibit the movement of the arm 1358, for example as described herein with respect to FIG. 11E. The retainer housing 1320 also includes a slot or aperture 1377 proximate to the peak side of the protrusion 1375. During coupling of the hand-maneuverable release mechanism 1350, a side of the groove 1373 may at least partially compress the protrusion 1375 into the slot 1377 and/or the slot 1377 may allow flexure of the protrusion 1375. Once the protrusion 1375 is in the groove 1373, the peak of the protrusion 1375 can inhibit the arm 1358 from rotating clockwise (e.g., past the position illustrated in FIG. 11I). In the embodiment illustrated in FIG. 11F, the end wall 1328 of the retainer housing 1320 includes a stop or barricade 1379, which may inhibit the arm 1358 from rotating counter-clockwise (e.g., past the position illustrated in FIG. 11H). Embodiments comprising neither, one, or both of the aperture 1377 and the stop 1379 are also possible.

In the embodiment illustrated in FIG. 11F, the retainer housing 1320 does not include a spacer 1348, but includes a guiderail 1334. In some embodiments, the retainer housing 1320 may include a spacer 1348 and not a guiderail 1334. The guiderail 1334 may be a recess configured to interact with a protrusion in a wheel, may extend only part of the length of the spacer 1348 and/or wheel mounting sleeve 1324, and other combinations described herein. In the embodiment illustrated in FIG. 11F, the retainer housing 1320 does not include mock or false release mechanisms, which may, for example reduce costs by reducing material used for the retainer housing 1320 and/or may allow a user to apply their own ornamental pattern.

Figure 11G:
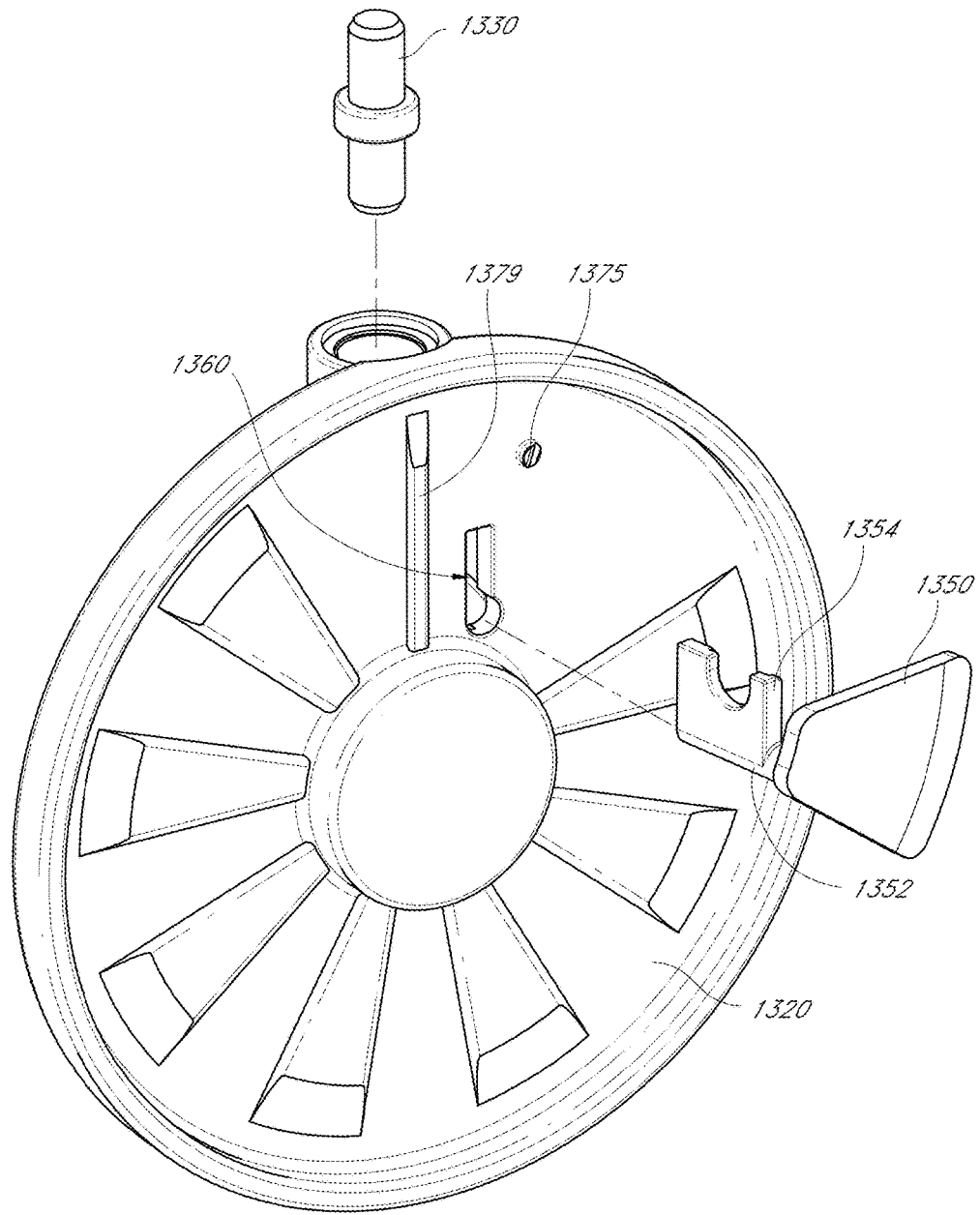
FIGS. 11Gi-11Giii are perspective views of an example embodiment of at least a portion of a method of assembling a hub assembly.

FIGS. 11Gi-11Giii are perspective views of an example embodiment of at least a portion of a method of assembling a hub assembly 1300. The hub assembly 1320 illustrated in FIGS. 11Gi-11Giii includes a stop 1379, but does not include a slot 1377. The end wall 1328 of the hub assembly 1320 illustrated in FIGS. 11Gi-11Giii includes a plurality of mock release mechanisms 1362, although the shapes of the arm 1358 and the mock release mechanisms 1362 are different than the shapes of the arm 1358 and the mock release mechanisms 1362 illustrated in FIG. 11E. Many shapes are possible, for function or for ornamentation. In FIG. 11Gi, the hand-maneuverable release mechanism 1350 is almost inserted into the slot 1360. In the illustrated embodiment, a portion of the hand-maneuverable release mechanism 1350 fits into the slot 1360 like a key into a key-hole. Once the hand-maneuverable release mechanism 1350 is inserted into the slot 1360, the hand-maneuverable release mechanism 1350 can rotate counter-clockwise, as illustrated in FIG. 11Gii. The arm 1358 slides over the protrusion 1375 (e.g., by the arm 1358 flexing outward and/or the protrusion 1375 flexing inward, which may be increased by the addition of a slot 1377), and the protrusion 1375 fits into the groove 1373. In some embodiments, the retainer housing 1320 does not include a protrusion 1375, and the arm 1358 is rotated without initial resistance. After the action in FIG. 11Giii, the retaining element 1330 is positioned in the pin sleeve 1332. Once the retaining element 1330 is in place, the hand-maneuverable release mechanism 1350 may be inhibited from freely rotating. Although not illustrated, a biasing element 1340 may then be positioned in the pin sleeve 1332, and a restraining element 1338 then optionally may be positioned to at least partially occlude the pin sleeve 1332 and coupled to the retainer housing 1320 (e.g., by ultrasonic welding, adhesive, threads, etc.).

Figure 11H:
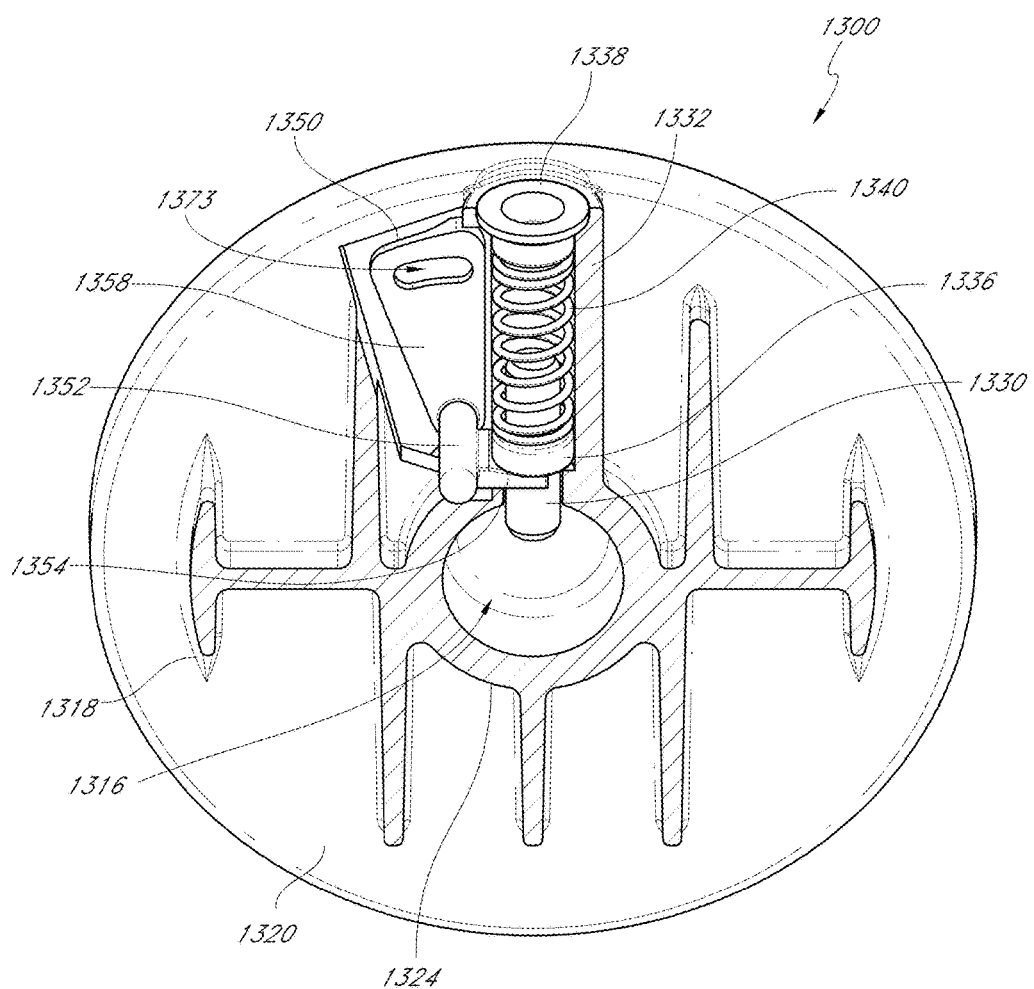
FIG. 11H is a top perspective, partial cross-sectional, and partial cutaway view of the hub assembly of FIG. 11A along the line 11F-11F of FIG. 11B.
Figure 111:
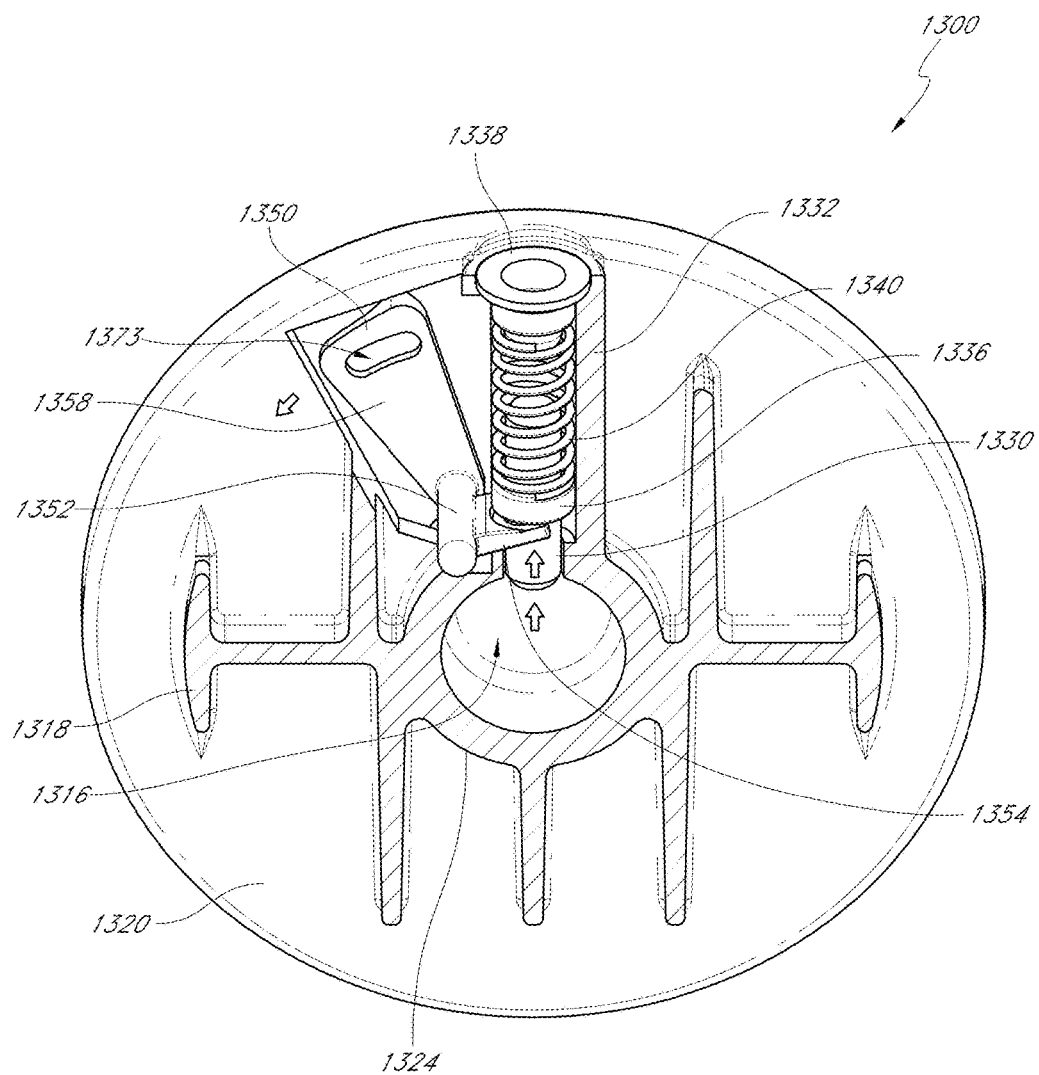

FIG. 11H is a top perspective, partial cross-sectional, and partial cutaway view of the hub assembly of FIG. 11A along the line 11F-11F of FIG. 11B. The retainer housing 1320 includes a pin sleeve 1332 at least partially housing some of the other components of the hub assembly 1300. A retaining element 1330 in the pin sleeve 1332 is configured to operatively engage a groove 702 (FIGS. 1, 3B, and 6A-6C) in an axle 700 (FIGS. 1, 3B, and 6A-6C) inserted in the sleeve bore 1316. In some embodiments, the retaining element 1330 comprises a pin. In certain embodiments, an axle 700 has a chamfered end 704 (FIGS. 1, 3B, and 6A-6C)

such that the retaining element 1130 is transversely displaced relative to the movement of the axle 700. In certain embodiments, the retaining element 1330 is shaped (e.g., chamfered) such that it is transversely displaced relative to the movement of an axle 700 (e.g., without a chamfered end). In some embodiments, the retaining element 1330 is configured (e.g., dimensioned) to reduce (e.g., decrease, minimize, prevent) rubbing of the sides of the groove 702 in the axle 700 by the sides of the retaining element 1330. In some embodiments, the retaining element 1330 comprises metal (e.g., stainless steel), which is may be more resistant to damage from typical usage of a wheel assembly comprising the hub assembly 1300 than plastic. Metal may also be better suited to shock loading and vibration than plastic. Other materials (e.g., plastic) are also possible. The retaining element 1330 optionally includes a lip 1336. The optional lip 1336 and the lifter 1354 can interact to inhibit the retaining element 1330 from exiting the pin sleeve 1332 into the axle bore 1316. Other shapes and types of retaining elements 1330 are also possible, including those that can aid in engaging the retaining element 1330 with the biasing element 1340 and/or the hand-maneuverable release mechanism 1350 (e.g., as described with respect to FIG. 5G).

A biasing element 1340 in the pin sleeve 1332 is configured to bias the retaining element 1330 towards the axle bore 1316. The biasing element 1340 may comprise a coil spring (e.g., as illustrated in FIGS. 11H and 11I), a leaf spring, and the like. In some embodiments, the biasing element 1340 comprises metal (e.g., stainless steel), which is may be more resistant to damage from typical usage of a wheel assembly comprising the hub assembly 1300 than plastic, and which may be better suited to shock loading and vibration than plastic. Other materials (e.g., plastic) are also possible. Other shapes and types of biasing elements 1340 are also possible. In certain embodiments, the retaining element 1330 and the biasing element 1340 are disposed in a cartridge that can be disposed in the pin sleeve 1332. The addition of layers such as a cartridge body would not depart from the invention disclosed herein. In some embodiments, the biasing element 1340 within the pin sleeve 1332 is in a relaxed position (e.g., the biasing element 1340 only applies force to the retaining element 1330 and the restraining element 1338 upon being compressed). In certain embodiments, the biasing element 1340 within the pin sleeve 1332 is in a compressed state such that the biasing element 1340 applies force to the retaining element 1330 and the restraining element 1338 regardless of the position of the retaining element 1330. The restraining element 1338 is stationary, but the retaining element 1330 can move longitudinally within the pin sleeve 1332 and compress the biasing element 1340.

In some embodiments, a restraining element 1338 is configured to inhibit the retaining element 1330 and/or the biasing element 1340 from exiting the pin sleeve 1332, at least prior to coupling the hub assembly 1300 to a wheel. The restraining element 1338 may comprise a plug, a threaded plug, a deformation in the pin sleeve 1332, a plurality of ledges extending radially into the pin sleeve 1332, a disc insertable in a slot in the pin sleeve 1332, and the like. The omission of the restraining element 1338, for example so that the biasing element 1340 would abut a wall of a wheel, would not depart from the invention disclosed herein.

In some embodiments, the hand-maneuverable release mechanism 1350 interacts with a retaining element 1330 via a lip 1336 of the retaining element 1330. In certain embodiments, a lifter 1354 and/or another portion of the hand-maneuverable release mechanism 1350 is positioned under a lip 1336 of a retaining element 1330. Other embodiments (e.g., those discussed with respect to FIGS. 5A-5P) may also be used.

To detach the hub assembly 1300 from an axle 700, the hand-maneuverable release mechanism 1350 may be manipulated by pushing the arm 1358 towards the axle bore 1316 (e.g., clockwise looking from the side of FIG. 11A, towards the axle bore 1316, or radially inwardly) such that the protrusion 1375 abuts the other end of the groove 1373, which causes the rod 1266 to rotate (e.g., counter-clockwise looking from the side of FIG. 13B), and the lifter 1354 to angle away from the axle bore 1316 or radially outward. Manipulation of the hand-maneuverable release mechanism 1350 causes the hand-maneuverable release mechanism 1350 to longitudinally displace the retaining element 1330 at least partially out (e.g., entirely out) of the axle bore 1316, allowing an axle 700 to be removed from the axle bore 1316. FIG. 11I is a top perspective, partial cross-sectional, and partial cutaway view of the hub assembly of FIG. 11A along the line 11F-11F of FIG. 11B with the hand-maneuverable release mechanism 1350 in a release position (e.g., a position in which an axle 700 may be removed from the axle bore 1316).

Figure 12A:
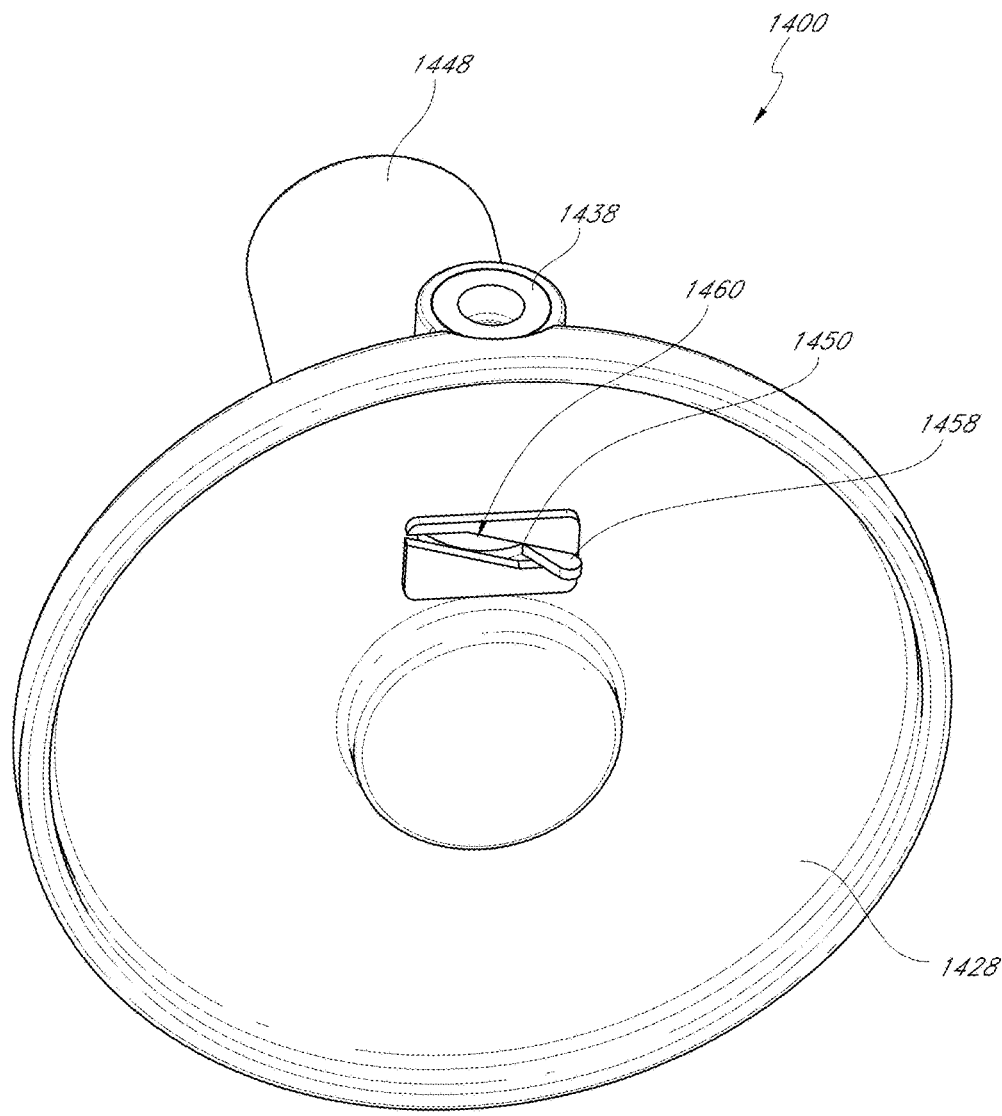
FIG. 12A is a top perspective view of a side of yet still another example embodiment of a hub assembly.
Figure 12B:
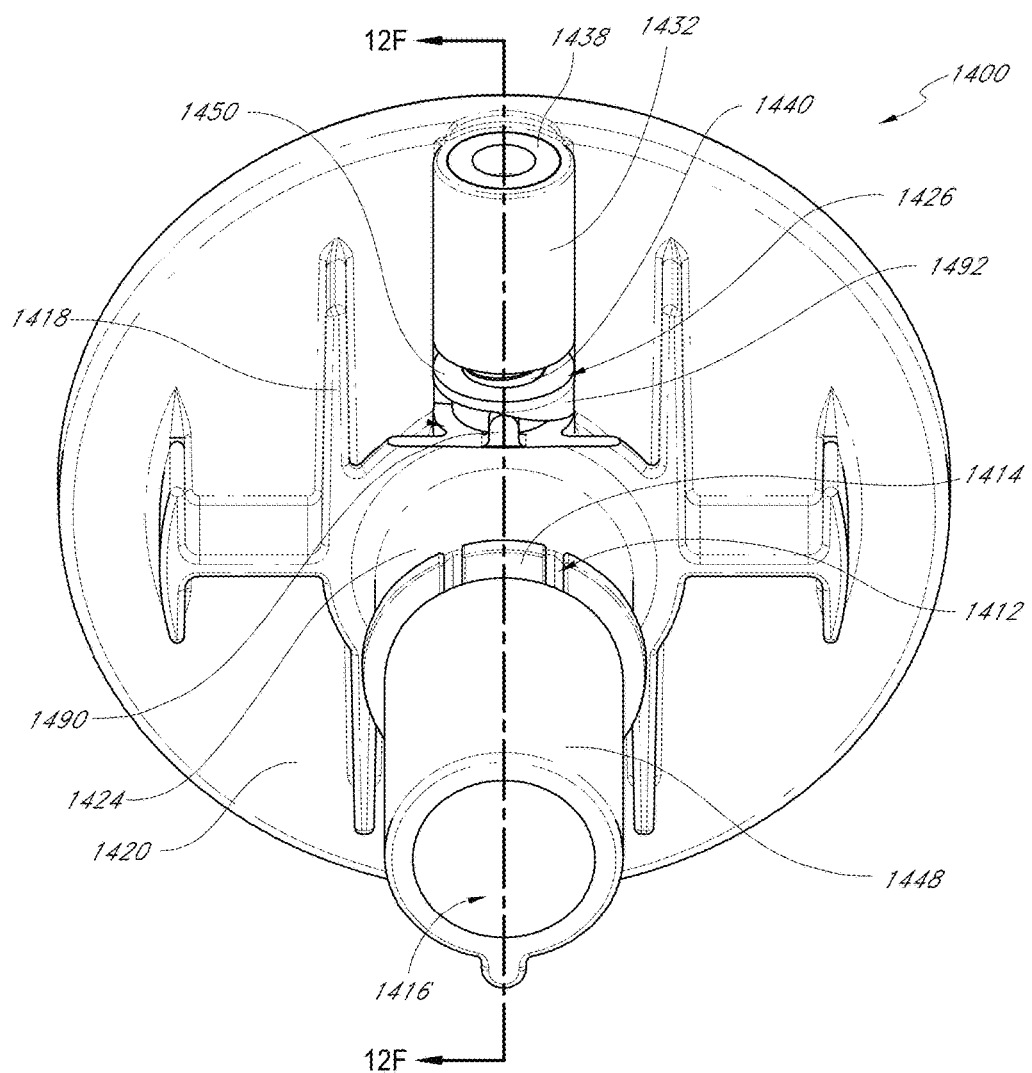
FIG. 12B is a top perspective view of another side of the hub assembly of FIG. 12A.

FIG. 12A is a top perspective view of a side of a yet further example embodiment of a hub assembly 1400 (e.g., an "outer" side when the hub assembly 1400 is mounted to a cart 100 via an axle 700). FIG. 12B is a top perspective view of another side of the hub assembly 1400 of FIG. 12A (e.g., an "inner" side when the hub assembly 1400 is mounted to a cart 100 via an axle 700). The hub assembly 1400 may comprise a retainer housing 1420, a retaining element 1430 (FIGS. 12E-12G), a biasing element 1440 (FIGS. 12F and 12G), a restraining element 1438, a hand-maneuverable release mechanism 1450, and the like, for example as described herein. The retainer housing 1420 may include a wheel mounting sleeve 1424 at least partially defining an axle bore 1416, a pin sleeve 1432, a lifting projection 1490, a spacer 1448, a guiderail 1434, a plurality of raised projections 1418, and the like, for example as described herein.

The lifting projection 1490 in FIG. 12B may be rounded or arcuate in shape. As discussed herein, the lifting projection 1490 remains stationary when the hand-maneuverable release mechanism 1450 rotates. Due to the design of the hand-maneuverable release mechanism 1450 discussed herein, the lifting projection 1490 causes the hand-maneuverable release mechanism 1450 to move away from the axle bore 1416 or radially outward. The rise of the hand-maneuverable release mechanism 1450 causes the retaining element 1430 to move away from the axle bore 1416 or radially outward.

Figure 12C:
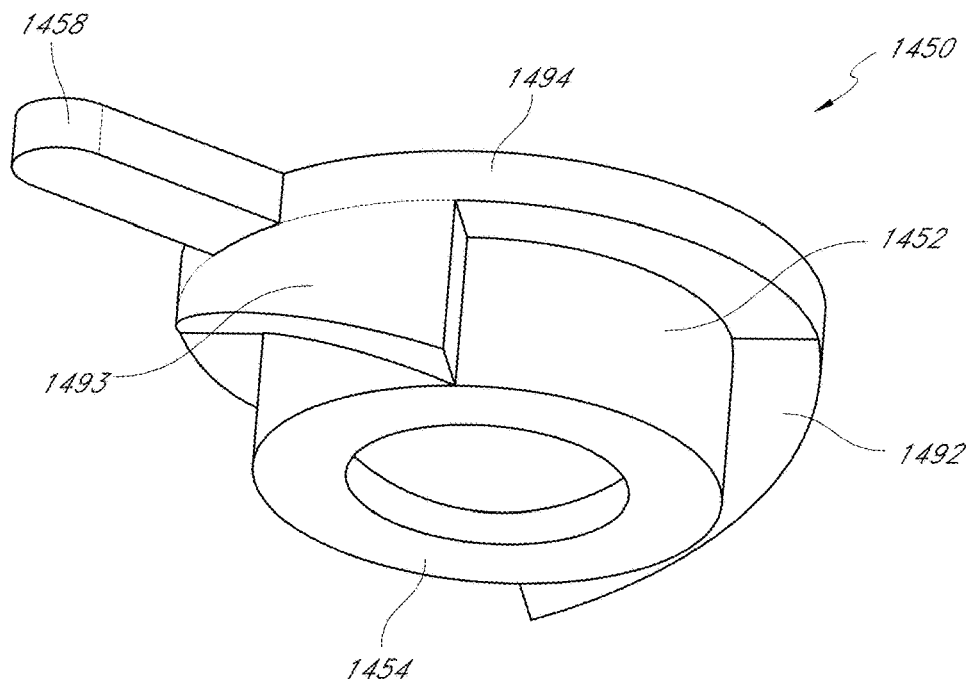
FIG. 12C is a bottom perspective view of still another example embodiment of a hand-maneuverable release mechanism.
Figure 12D:
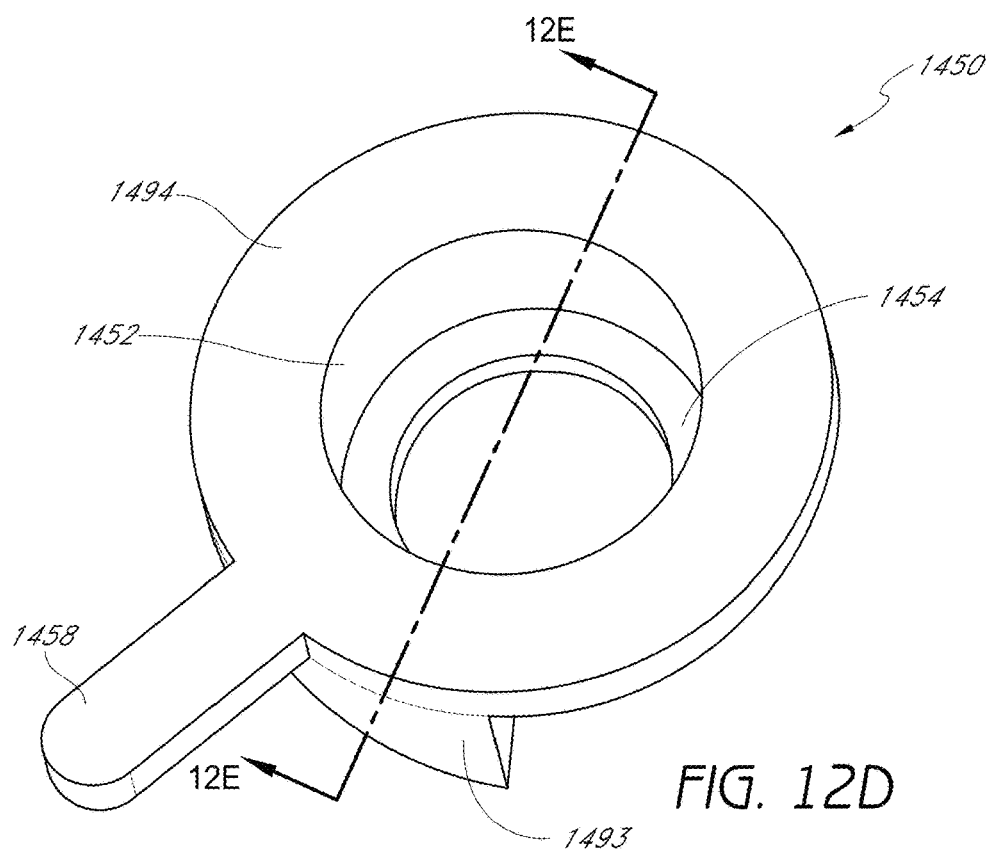
FIG. 12D is a top perspective view of the hand-maneuverable release mechanism of FIG. 12C.
Figure 12E:
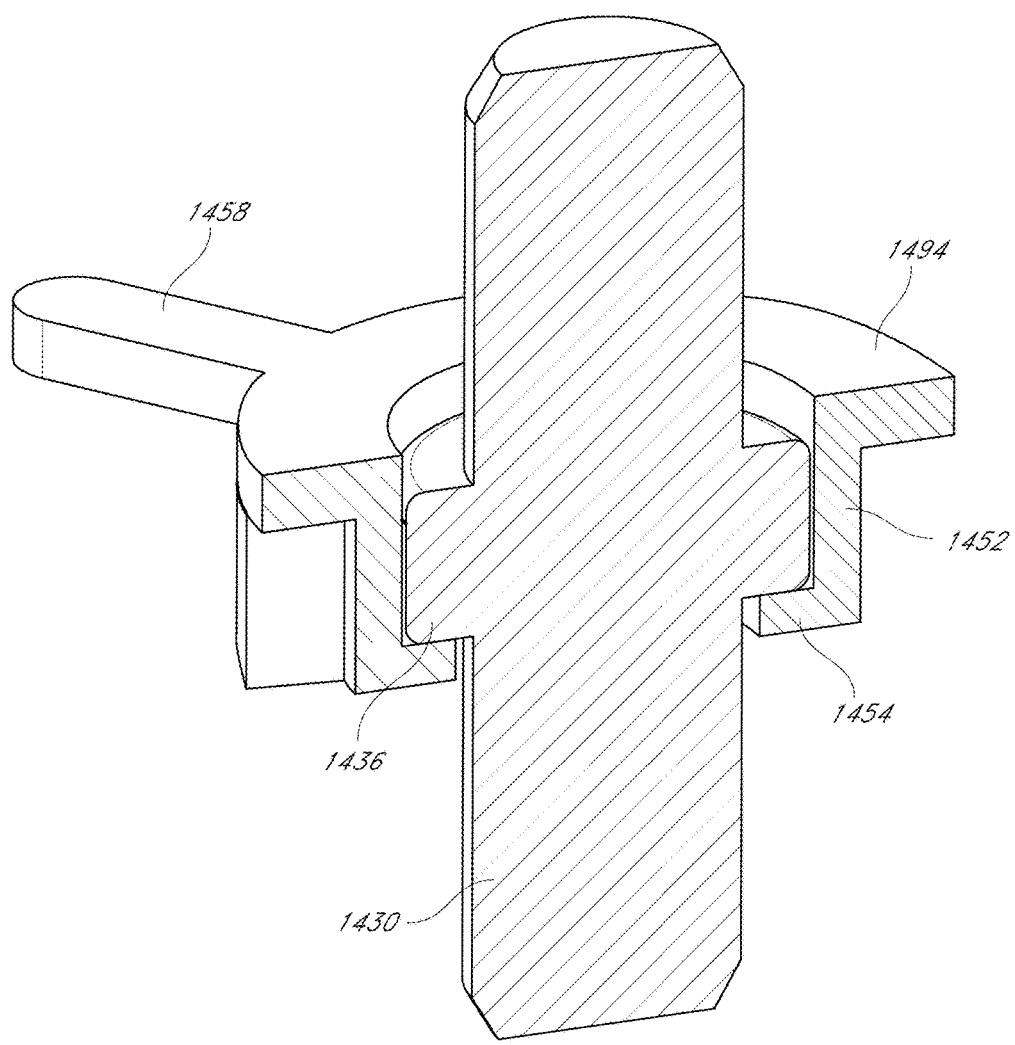
FIG. 12E is a cross-sectional view of a pin and the hand-maneuverable release mechanism of FIG. 12C along the line 12E-12E of FIG. 12D.

FIG. 12C is a bottom perspective view of another example embodiment of a hand-maneuverable release mechanism 1450, which may be used in combination with the hub assembly 1400 in FIG. 12A. FIG. 12D is a top perspective view of the hand-maneuverable release mechanism 1450 of FIG. 12C. The hand-maneuverable release mechanism 1450 includes an arm or protrusion 1458, which may be manipulated diagonally upward or radially outward, a lifter 1454, which can act on a retaining element 1430 (e.g., lifting a retaining element 1430 away from the axle bore 1416), a body 1452, and an angular or ramped portion 1492. The angular or ramped portion 1492 extends from the body 1452 of the hand-maneuverable release mechanism 1450. When the hand-maneuverable release mechanism 1450 is rotated (e.g., in a clockwise manner looking through the pin sleeve 1432), the ramped portion 1492 interacts with the projection 1490 of the retainer housing 1420 to cause the hand-maneuverable release mechanism 1450 to move away from the axle bore 1416 or radially outward. The lifter 1454 acts on the retaining element 1430 such that the retaining element 1430 also moves away from the axle bore or radially outward. In some embodiments, the hand-maneuverable release mechanism 1450 includes one ramped portion 1492 and the retainer housing 1420 includes one projection 1490, for example to reduce materials and/or manufacturing complexity. In some embodiments, the hand-maneuverable release mechanism 1450 includes a plurality of ramped portions 1492 and 1493 and the retainer housing 1420 includes a plurality of projections 1490, for example to even out the forces across the hand-maneuverable release mechanism 1450. The body may include an upper lip 1494 that connects the arm 1458 to the body 1452. FIG. 12E is a cross-sectional view of a retaining element 1430 and the hand-maneuverable release mechanism 1450 along the line 12E-12E of FIG. 12D. FIG. 12E illustrates an example interaction between the retaining element 1430 and/or a lip 1436 thereon and the lifter 1492. The hand-maneuverable release mechanism 1450 may comprise plastic, metal, wood, rubber, combinations thereof, etc. The hand-maneuverable release mechanism 1450 may be integrally formed or may comprise a plurality of components coupled together.

In some embodiments, the hand-maneuverable release mechanism 1450 may be accessed and/or manipulated on the side of the hub assembly opposite the axle bore 1416 (e.g., the "outer side" illustrated in FIG. 12A) by the arm 1458. The ability of a hand-maneuverable release mechanism 1450 to be accessed and/or manipulated on the "outer side" of the hub assembly 1400 may allow for the use of the hub assembly 1400 with existing wheel molds (e.g., wheel molds not including cutouts (protrusions in a mold) specific to hub assemblies comprising a hand-maneuverable release mechanism). In an assembled hub assembly 1400, the arm 1458 extends through a slot 1460 in the retainer housing 1420. In some embodiments, the arm 1458 includes a projection (e.g., parallel to the end wall 1428) that at least partially covers or occludes the slot 1460 in the retainer housing 1420. Such a projection may inhibit dirt and/or debris from entering a conduit of the pin sleeve 1432, which could otherwise interfere with the operation of the components. In some embodiments, the hand-maneuverable release mechanism 1450 may be accessed and/or manipulated on the same side of the hub assembly as the axle bore 1416 (e.g., the "inner side" illustrated in FIG. 12B) by the arm 1458. In a wheel assembly comprising certain such hub assemblies 1400, the arm 1458 may extend through a cutout in the wheel.

In some embodiments in which the hand-maneuverable release mechanism 1450 comprises plastic, the hand-maneuverable release mechanism 1450 is injection molded. Plastic hand-maneuverable release mechanisms 1450 may be more versatile (e.g., more easily able to include multiple features than could be stamped from a sheet of metal, more easily changed by changing a mold and/or removing pieces, etc.) and/or less expensive to produce than metal hand-maneuverable release mechanisms 1450. In some embodiments, a hand-maneuverable release mechanism 1450 comprising plastic includes certain buttressing features to improve durability and/or performance. In some embodiments, buttressing features may influence changes in certain other components of an associated hub assembly 1400 and/or wheel assembly (e.g., for clearance). In certain embodiments, the thickness of a lifter 1454 and/or the angled or ramped portion 1492 comprising plastic may be greater than the thickness of a lifter 1454 and/or the angled or ramped portion 1492 comprising metal, for example to inhibit the parts of the lifter 1454 from bending or breaking upon interaction with a retaining element 1430.

Referring again to FIG. 12B, in some embodiments, the hand-maneuverable release mechanism 1450 may be inserted into the pin sleeve 1432 through a channel 1426 in the pin sleeve 1432 that is transverse or substantially transverse to the longitudinal axis of the pin sleeve 1432, even if a longitudinal dimension is greater than a radial dimension (e.g., in contrast to the channels 426, 926, 1026 described herein, which are illustrated as extending substantially parallel to the longitudinal axis of the pin sleeve 432, 932, 1032).

Figure 12F:
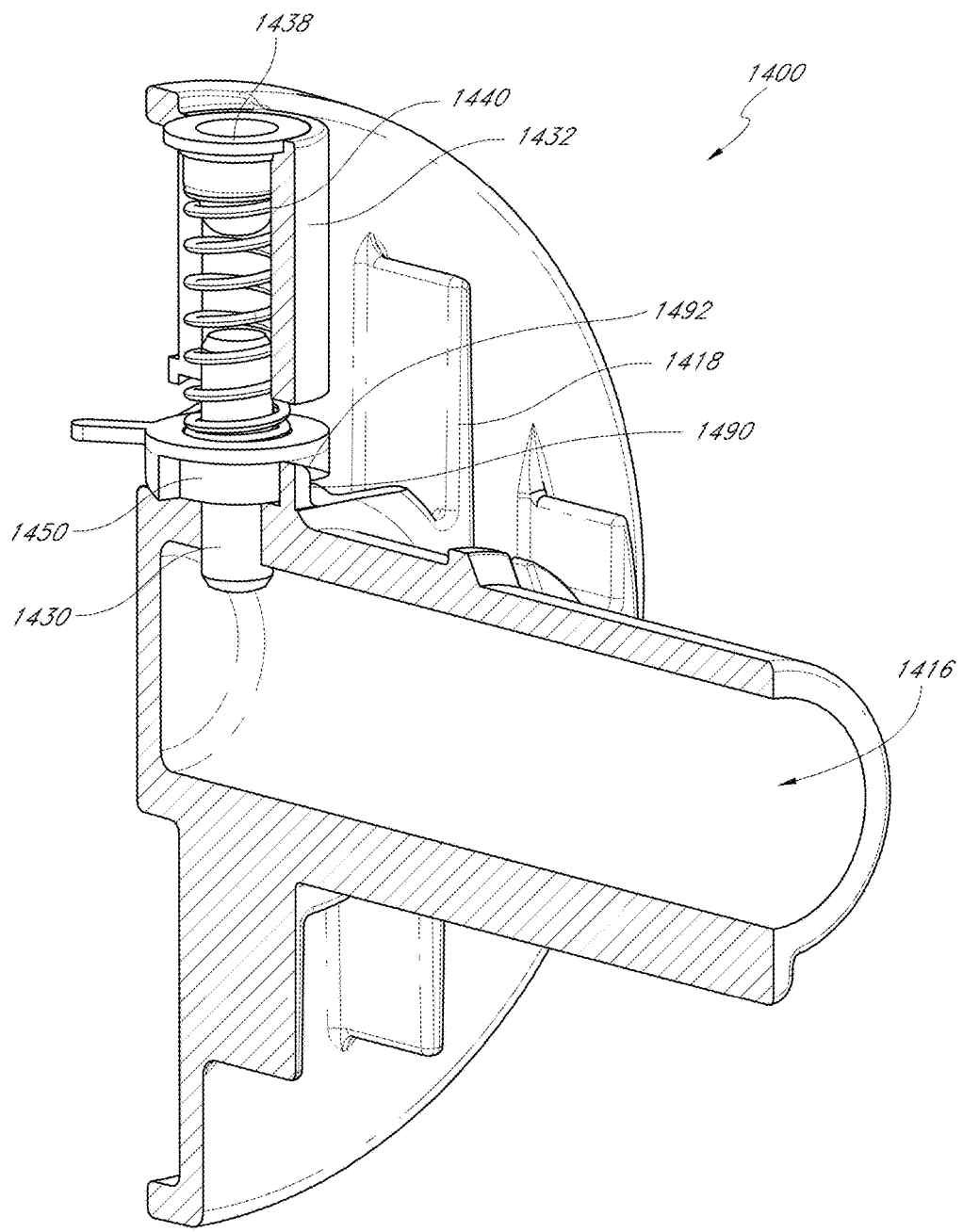
FIG. 12F is a side perspective and partial cross-sectional view of the hub assembly of FIG. 12A along the line 12F-12F of FIG. 12B.

FIG. 12F is a side perspective and partial cross-sectional view of the hub assembly 1400 of FIG. 12A along the line 12F-12F of FIG. 12B. The retainer housing 1420 includes a pin sleeve 1432 at least partially housing some of the other components of the hub assembly 1400. A retaining element 1430 in the pin sleeve 1432 is configured to operatively engage a groove 702 (FIGS. 1, 3B, and 6A-6C) in an axle 700 (FIGS. 1, 3B, and 6A-6C) inserted in the sleeve bore 1416. In some embodiments, the retaining element 1430 comprises a pin. In certain embodiments, an axle 700 has a chamfered end 704 (FIGS. 1, 3B, and 6A-6C) such that the retaining element 1130 is transversely displaced relative to the movement of the axle 700. In certain embodiments, the retaining element 1430 is shaped (e.g., chamfered) such that it is transversely displaced relative to the movement of an axle 700 (e.g., without a chamfered end). In some embodiments, the retaining element 1430 is configured (e.g., dimensioned) to reduce (e.g., decrease, minimize, prevent) rubbing of the sides of the groove 702 in the axle 700 by the sides of the retaining element 1430. In some embodiments, the retaining element 1430 comprises metal (e.g., stainless steel), which is may be more resistant to damage from typical usage of a wheel assembly comprising the hub assembly 1400 than plastic. Metal may also be better suited to shock loading and vibration than plastic. Other materials (e.g., plastic) are also possible. The lip 1436 of the retaining element 1430, the lifter 1454, and/or the angled or ramped projection 1492 of the hand-maneuverable release mechanism 1450 can interact to inhibit the retaining element 1430 from exiting the pin sleeve 1432 into the axle bore 1416. Other shapes and types of retaining elements 1430 are also possible, including those that can aid in engaging the retaining element 1430 with the biasing element 1440 and/or the hand-maneuverable release mechanism 1450 (e.g., as described with respect to FIG. 5G).

Figure 12G:
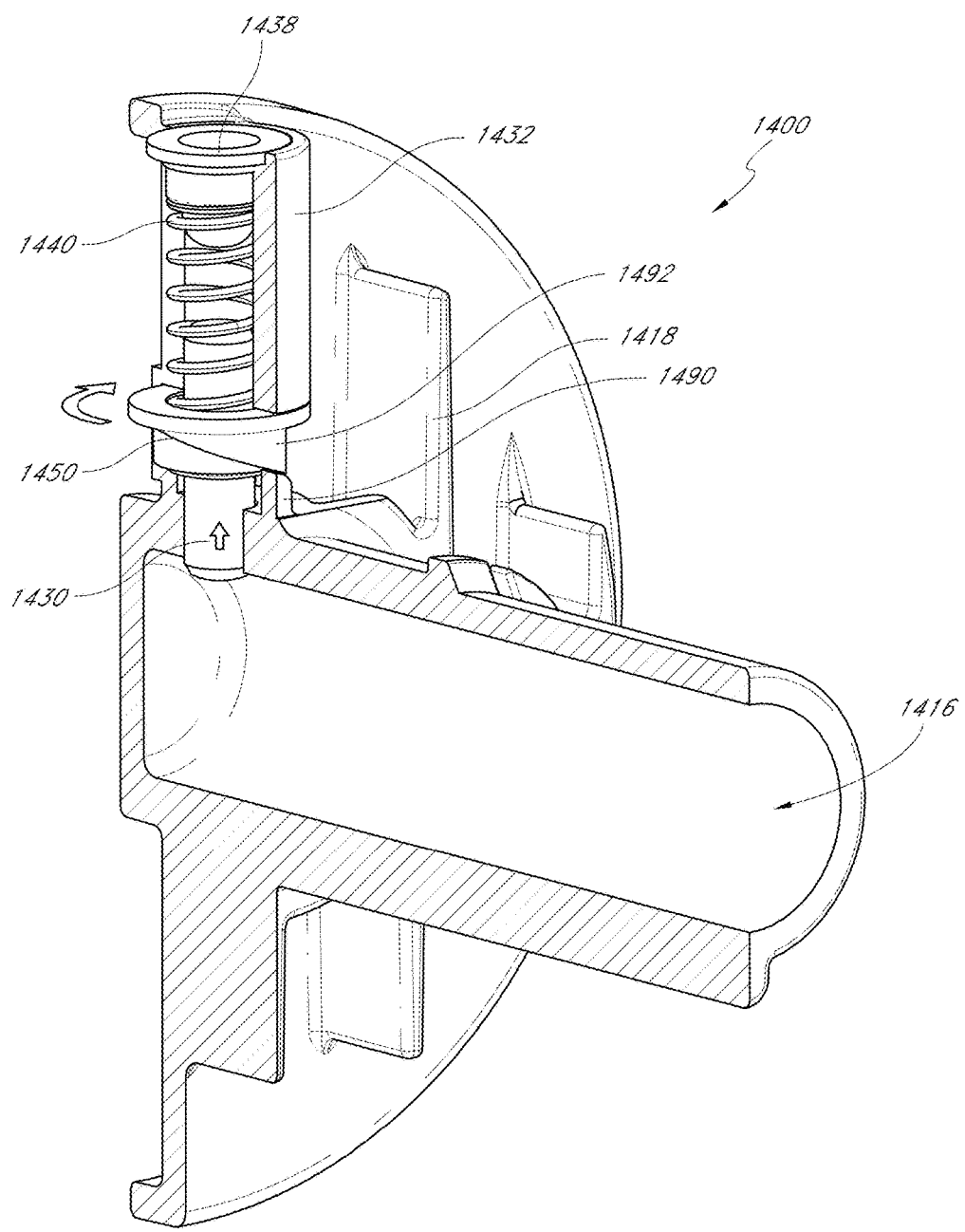
FIG. 12G is a side perspective and partial cross-sectional view of the hub assembly of FIG. 12A along the line 12F-12F of FIG. 12B with a hand-maneuverable release mechanism in a release position.

A biasing element 1440 in the pin sleeve 1432 is configured to bias the retaining element 1430 towards the axle bore 1416. The biasing element 1440 may comprise a coil spring (e.g., as illustrated in FIGS. 12F and 12G), a leaf spring, and the like. In some embodiments, the biasing element 1440 comprises metal (e.g., stainless steel), which is may be more resistant to damage from typical usage of a wheel assembly comprising the hub assembly 1400 than plastic, and which may be better suited to shock loading and vibration than plastic. Other materials (e.g., plastic) are also possible. Other shapes and types of biasing elements 1440 are also possible. In certain embodiments, the retaining element 1430 and the biasing element 1440 are disposed in a cartridge that can be disposed in the pin sleeve 1432. The addition of layers such as a cartridge body would not depart from the invention disclosed herein. In some embodiments, the biasing element 1440 within the pin sleeve 1432 is in a relaxed position (e.g., the biasing element 1440 only applies force to the retaining element 1430 and the restraining element 1438 upon being compressed). In certain embodiments, the biasing element 1440 within the pin sleeve 1432 is in a compressed state such that the biasing element 1440 applies force to the retaining element 1430 and the restraining element 1438 regardless of the position of the retaining element 1430. The restraining element 1438 is stationary, but the retaining element 1430 can move longitudinally within the pin sleeve 1432 and compress the biasing element 1440.

In some embodiments, a restraining element 1438 is configured to inhibit the retaining element 1430 and/or the biasing element 1440 from exiting the pin sleeve 1432, at least prior to coupling the hub assembly 1400 to a wheel. The restraining element 1438 may comprise a plug, a threaded plug, a deformation in the pin sleeve 1432, a plurality of ledges extending radially into the pin sleeve 1432, a disc insertable in a slot in the pin sleeve 1432, and the like. The omission of the restraining element 1438, for example so that the biasing element 1440 would abut a wall of a wheel, would not depart from the invention disclosed herein.

In some embodiments, the hand-maneuverable release mechanism 1450 interacts with a retaining element 1430 via a lip 1436 of the retaining element 1430. In certain embodiments, a lifter 1454 of the hand-maneuverable release mechanism 1450 is positioned under a lip 1436 of a retaining element 1430. Other embodiments (e.g., those discussed with respect to FIGS. 5A-5P) may also be used.

To detach the hub assembly 1400 from an axle 700, the hand-maneuverable release mechanism 1450 may be rotated (e.g., clockwise looking through the pin sleeve 1432) by pushing the arm 1458 diagonally upward and to the left (e.g., from the side and orientation of FIG. 12A), away from the axle bore 1416, or radially outward, which causes the ramped portion 1492 to interact with the lifting projection 1490 to translate lateral movement of the arm and/or rotational movement of the body 1452 into longitudinal movement of the lifter 1454 away from the axle bore. Manipulation of the hand-maneuverable release mechanism 1450 causes the hand-maneuverable release mechanism 1450 to longitudinally displace the retaining element 1430 at least partly out (e.g., entirely out) of the axle bore 1416. FIG. 12G is a side perspective and partial cross-sectional view of the hub assembly 1400 of FIG. 12A along the line 12F-12F of FIG. 12B with the hand-maneuverable release mechanism 1450 in a release position (e.g., a position in which an axle 700 may be removed from the axle bore 1416). In some embodiments, rotation of the hand-maneuverable release mechanism 1450 is at least partially limited by interaction between the arm 1458 and the sides of the slot 1460. In some embodiments, rotation of the hand-maneuverable release mechanism 1450 is at least partially limited by interaction between the upper lip 1494 and the pin sleeve 1432 (e.g., as illustrated in FIG. 12G). In some embodiments, rotation the hand-maneuverable release mechanism 1450 it limited by interaction between a projection or stopping surface on the hand-maneuverable release mechanism 1450 and/or the retainer housing 1420.

Figure 12H:
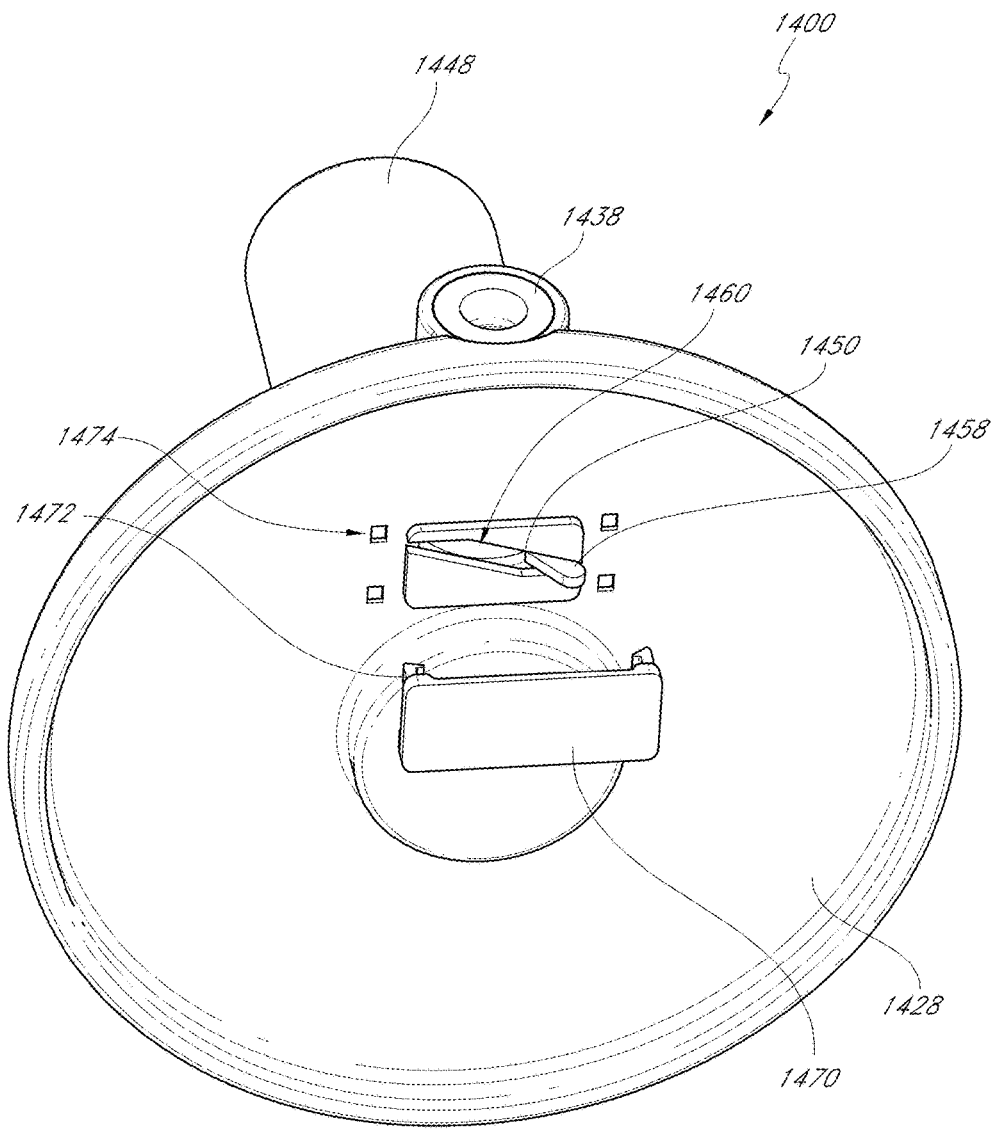
FIG. 12H is a top perspective and partially exploded view of another example embodiment of a hub assembly.

FIG. 12H is a top perspective and partially exploded view of another example embodiment of a hub assembly 1400. In the embodiment illustrated in FIG. 12H, the hub assembly comprises a cover or façade 1470. The cover 1470 may inhibit dirt and/or debris from entering the pin sleeve 1432 through the slot 1460, which could otherwise interfere with operation of the components of the hub assembly 1400. In some embodiments, the cover 1470 is hand-removable, for example so that operation of the hand-maneuverable release mechanism 1450 is entirely possible without a tool (e.g., no tool is first used to remove the cover 1470). FIG. 12H illustrates an example of a hand-removable cover 1470, which includes hooks 1472 configured to interact with slots 1474 in the retainer housing 1420. Other mechanisms for attachment and removal of the cover 1470 are also possible. In some embodiments, operation of the hand-maneuverable release mechanism 1450 is possible without a tool before a cover 1470 is placed over the hand-maneuverable release mechanism 1450, for example after a wheel assembly comprising the hub assembly 1400 is coupled to an axle 700 after distribution. Covers are also possible for the other embodiments of hub assemblies described herein.

In some embodiments, a plurality of hand-maneuverable release mechanisms may be used on the same hub assembly. For example, a hub assembly may comprise a first hand-maneuverable release mechanism (e.g., as described herein) configured to engage an axle at a first circumferential position and a second hand-maneuverable release mechanism (e.g., as described herein) configured to engage the axle at a second circumferential position circumferentially spaced from the first circumferential position. The first and second circumferential positions may be about 90° apart, about 180° apart, or any other spacing suitable for the application. In some embodiments, releasing the hub assembly from the axle comprises manipulating both the first and second hand-maneuverable release mechanism so that the pins associated therewith are retracted at the same time, for example due to at least partially simultaneous action. More than two hand-maneuverable release mechanisms are also possible (e.g., three hand-maneuverable release mechanisms circumferentially spaced by about 120°, etc.). The plurality of hand-maneuverable release mechanisms may each be the same or different. For example, a first hand-maneuverable release mechanisms may be a first type of first hand-maneuverable release mechanism (e.g., pull up, push down, swipe, on inside of wheel, on outside of wheel, or any of the embodiments described herein or modifications thereof) and a second hand-maneuverable release mechanisms may be a second type of hand-maneuverable release mechanism (e.g., pull up, push down, swipe, on inside of wheel, on outside of wheel, or any of the embodiments described herein or modifications thereof). A plurality of hand-maneuverable release mechanisms may prevent accidental wheel removal, which may be particularly important, for example, when the wheel is part of a child's toy. Varying the type and/or position of the hand-maneuverable release mechanisms on the same wheel may enhance this advantage, for example because the user would need to know or figure out how to operate two release mechanisms, and to do so at least partially simultaneously such that the both pins are retracted to allow wheel removal.

In some embodiments, the hub assembly and wheel described herein may be a single integrated component. For example, referring again to FIG. 2C, rather than the retainer housing 208 and the wheel 202 being separate pieces, the retainer housing 208 and the wheel 202 may be a single integral piece. In certain such integrated embodiments, the features described herein may be modified to accommodate integration. For example, the pin sleeve may extend through the portion of the wheel shown covering the restraining element such that the restraining element is couplable to the integrated wheel. For another example, the pin sleeve may extend substantially across a radius of the wheel, and the restraining element may be coupled to the integrated wheel proximate to a perimeter or circumference of the wheel (e.g., by sonic welding, adhesion, threads, etc.). In certain such embodiments, the restraining element may be secured by a different tread material (e.g., by multi-shot molding, by stretching a separate tread piece around the wheel, etc.). In some embodiments, a different tread material can itself act as the restraining element (e.g., by holding down the biasing element during multi-shot molding, by stretching a separate tread piece around the wheel, etc.). In certain such embodiments, an elongate spacer such as a rod or hollow straw may extend at least partially through the pin sleeve between the restraining element and the biasing element. In some embodiments, the restraining element may comprise the elongate spacer. For yet another example, surface features such as the annular rib 422, the sleeve bore 212, etc. that configured to couple the retainer housing to the wheel may be modified or omitted. For still another example, certain modifications to the integrated retainer housing and wheel such as cutouts may be formed for assembly and/or operation of locking components such as hand-maneuverable release mechanisms.

Figure 13A:
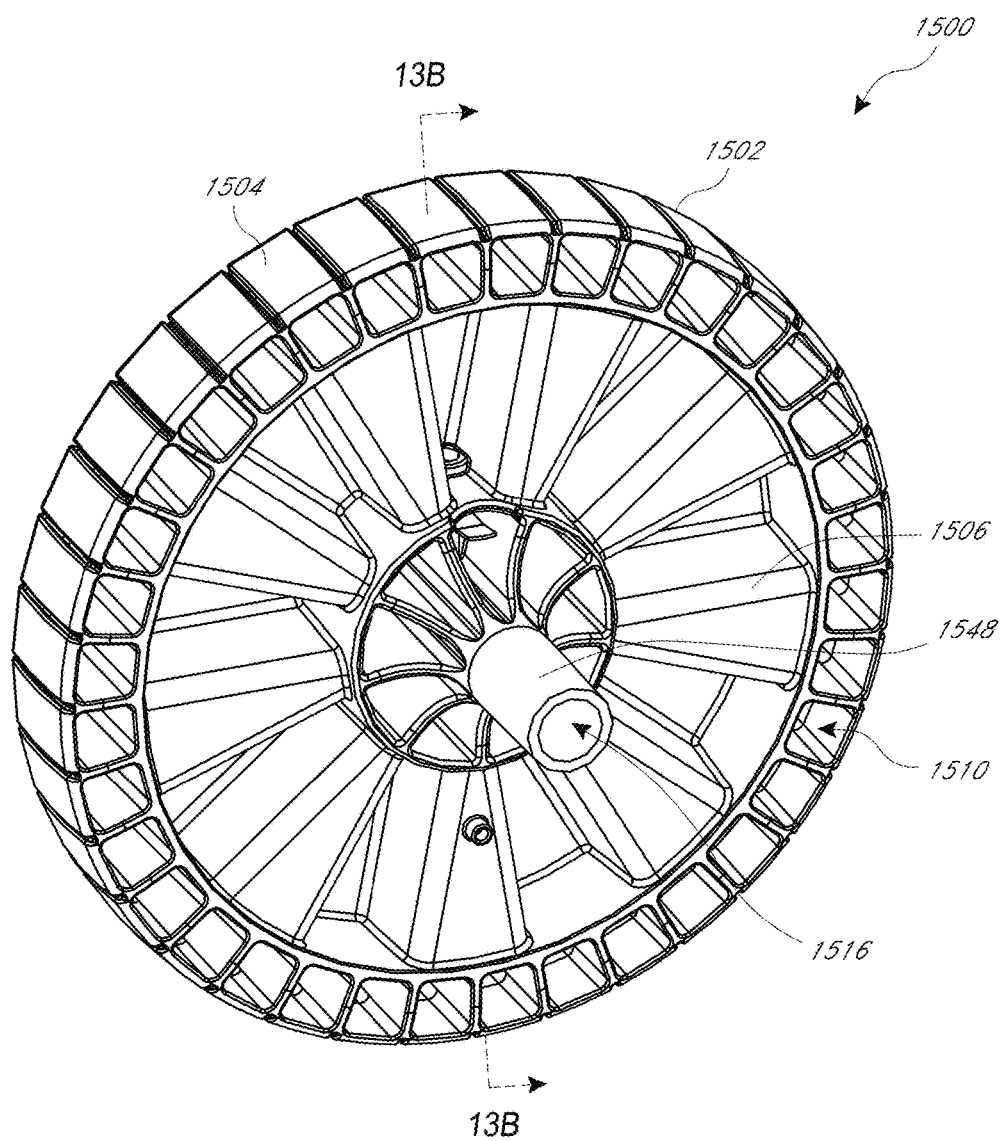
FIG. 13A is a top perspective view of a side of an example embodiment of an integrated wheel assembly.

FIG. 13A is a top perspective view of a side of an example embodiment of an integrated wheel assembly 1500 (e.g., an "inner" side when the wheel assembly 1500 is mounted to a cart 100 via an axle 700.) The wheel 1502 of the wheel assembly 1500 illustrated in FIG. 13A is injection molded. In some embodiments, the wheel of the wheel assembly 1500 is blow molded or molded using other processes (e.g., rotational or compression molding, or combinations of molding processes). In certain embodiments, tread 1504 and/or spokes 1506 are integrally formed during the molding process. The tread 1504 can help the wheel 1502 to frictionally engage a surface during rolling movement (e.g., if coupled to an axle in a manner in which axle rotation causes rotation of the wheel assembly 1500) and/or can enhance the appearance of the wheel 1502 (e.g., as a decorative feature). In some embodiments, the wheel 1502 comprises a smooth tread. Rolling surfaces of wheels, for example being smooth or including treads 1504, may be integrated into the molding process or may be formed in a multi-step process known as multi-shot molding. The spokes 1506 can help evenly distribute forces acting on the wheel 1502 and/or can enhance the appearance of the wheel 1502. Other features of the wheel 1502 may also be integrally formed by modifying the mold. The injection molding process can form corrugated and/or hollow interior surfaces 1510 that can reduce the amount of material used in creation of the wheel 1502. Certain recesses 1510 can provide strength by being certain shapes. In certain embodiments, the wheel 1502 comprises plastic (e.g., high density polyethylene (HDPE) (e.g., high molecular weight HDPE)). In some embodiments, the wheel assembly 1500 comprises a material such as wood, metal, rubber, combinations thereof, etc.

Figure 13B:
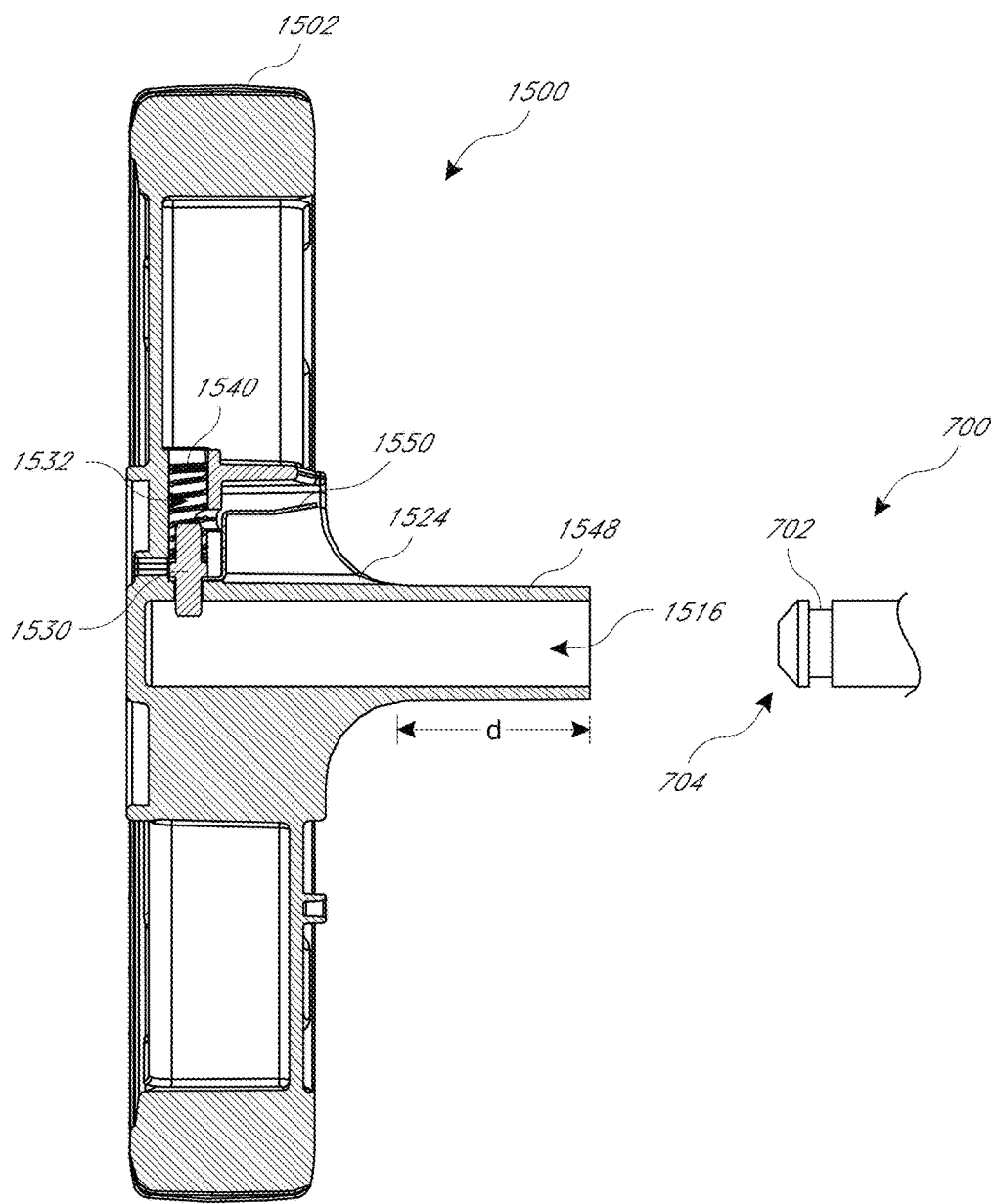
FIG. 13B is a cross-sectional view of the wheel assembly of FIG. 13A along the line 13B-13B line of FIG. 13A.

FIG. 13B is cross-sectional view of the wheel assembly 1500 of FIG. 13A along the line 13B-13B of FIG. 13A. In the integrated wheel assembly 1500 illustrated in FIGS. 13A and 13B, the wheel 1502 includes an axle bore 1516 and a pin sleeve 1532. A retaining element 1530 and a biasing element 1540 are at least partially within the pin sleeve 1532.

The axle bore 1516 is configured to receive an axle 700 such that the wheel assembly 1500 can be removably mounted to an axle 700. In some embodiments, the axle bore 1516 is at least partially defined by a wheel mounting sleeve 1524. In some embodiments, the wheel mounting sleeve 1524 and/or the axle bore 1516 may be centered within the wheel 1502 such that an axle 700 inserted into the wheel mounting sleeve 1524 and/or the axle bore 1516 can uniformly rotate.

In some embodiments, the wheel assembly comprises a spacer 1548. In some embodiments, the axle bore 1516 is at least partially defined by the spacer 1548. In some embodiments, the axle bore 1516 is defined by the wheel mounting sleeve 1524 and the spacer 1548. The spacer 1548 is configured to space the wheel assembly 1500 from the cart body 102 by at least a distance d. The distance d may be between about 0.25 inches and about 3 inches (approx. between about 0.6 cm and about 7.6 cm), between about 0.5 inches and about 3 inches (approx. between about 1.2 cm and about 7.6 cm), between about 1 inch and about 3 inches (approx. between about 2.5 cm and about 7.6 cm), combinations thereof, and the like. Other distances d are also possible (e.g., greater than about 3 inches (greater than approx. about 7.6 cm), less than about 0.25 inches (less than approx. about 0.6 cm)). The spacer 1548 restricts the longitudinal movement of the wheel assembly 1500 once mounted to the cart 100 by the axle 700, inhibiting or preventing the wheel assembly 1500 other than the spacer 1548 from coming into contact with the cart 100. By inhibiting or preventing contact between the wheel assembly 1500 other than the spacer 1548 and the cart 100, the spacer 1548 can reduce friction that could result from such contact. Friction between the wheel 1502 of the wheel assembly 1500 and the cart 100 could cause damage to the wheel 1502 and/or the cart 100, and/or could impede rotation of the wheel assembly 1500 and/or movement of the cart 100.

Figure 13C:
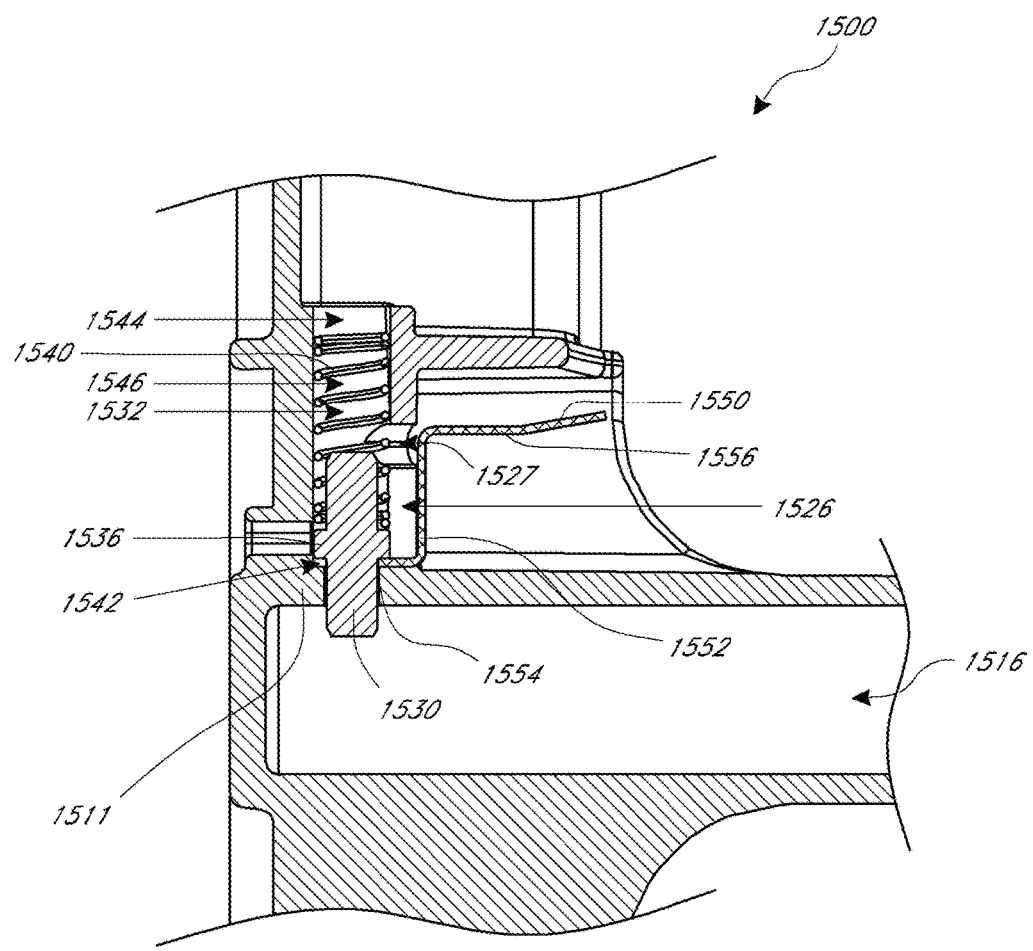
FIG. 13C is a cross-sectional view of a portion of the wheel assembly of FIG. 13A along the line 13B-13B of FIG. 13A.

FIG. 13C is a magnified cross-sectional view of a portion of the wheel assembly 1500 of FIG. 13A along the line 13B-13B of FIG. 13A. The pin sleeve 1532 includes a first end 1542, a second end 1544, and a conduit 1546 between the first end 1542 and the second end 1544. The first end 1542 optionally includes a shoulder 1511 extending into the conduit 1546.

The retaining element 1530 is at least partially within the conduit 1546 of the pin sleeve 1532. The retaining element 1530 is configured to operatively engage a groove 702 in an axle 700. In some embodiments, the retaining element 1530 comprises a pin. In certain embodiments, an axle 700 has a chamfered end 704 such that the retaining element 1530 is transversely displaceable upon longitudinal movement of the axle 700 into the axle bore 1516. In certain embodiments, the retaining element 1530 is shaped (e.g., chamfered) such that it is transversely displaceable upon the movement of an axle 700 (e.g., without a chamfered end) into the axle bore 1516. In some embodiments, the retaining element 1530 is configured (e.g., dimensioned) to reduce (e.g., decrease, minimize, prevent) rubbing of the sides of the groove 702 in the axle 700 by the sides of the retaining element 1530. In some embodiments, the retaining element 1530 comprises metal (e.g., stainless steel), which may be more resistant to damage from typical usage of the integrated wheel assembly 1500 than plastic. Metal may also be better suited to shock loading and vibration than plastic. However, other materials (e.g., plastic) are also possible.

The retaining element 1530 optionally includes a lip 1536 that is wider than the shoulder 1511. The optional lip 1536 and shoulder 1511 can interact to inhibit the retaining element 1530 from exiting the first end 1542 of the pin sleeve 1532. In wheel assemblies comprising a retaining element without a lip and a retainer housing without a shoulder, the retaining element may be pushed by the biasing element 1540 into the axle bore 1516, where it may become lost (e.g., by becoming displaced from the wheel assembly) or damaged (e.g., by being crushed by an axle 700), although some embodiments described herein can avoid these issues. A portion of the retaining element 1530 below the lip 1532 is in the axle bore 1516 and is not within the conduit 1546 of the pin sleeve 1532. Other shapes and types of retaining elements 1530 are also possible. For example, the retaining element 1530 may be shaped to always have a certain orientation within the conduit 1546 (e.g., having a flat side that inhibits rotation of the retaining element 1530 within the conduit 1546 (e.g., a flat side on the lip 1536, a flat side above the lip 1536, and/or a flat side below the lip 1536)). Such embodiments may be useful for proper engagement of a partially chamfered retaining element 1530 with a non-chamfered axle 700. For another example, the lip 1536 may be longitudinally thicker, which can stabilize the retaining element 1530 by reducing the chance of the retaining element 1530 from pivoting within the conduit 1546. For another example, the retaining element 1530 may be truncated above the lip 1536, for example to reduce weight and/or material costs. Other possible shapes for the retaining element 1530 include those that can aid in engaging the retaining element 1530 with the biasing element 1540 and/or the hand-maneuverable release mechanism 1550 (e.g., as described with respect to FIG. 5F).

The biasing element 1540 is at least partially within the conduit 1546 of the pin sleeve 1532. The biasing element 1540 is configured to bias the retaining element 1530 towards the axle bore 1516. The biasing element 1540 may comprise a coil spring (e.g., as illustrated in FIG. 13C), a leaf spring, and the like. In some embodiments, the biasing element 1540 comprises metal (e.g., stainless steel), which may be more resistant to damage from typical usage of the wheel assembly 1500 than plastic and which may be better suited to shock loading and vibration than plastic. However, other materials (e.g., plastic) are also possible. Other shapes and types of biasing elements 1540 are also possible.

The integrated wheel assembly 1500 further comprises a hand-maneuverable release mechanism 1550 for convenient removal of the integrated wheel assembly 1500 from an axle 700. The hand-maneuverable release mechanism 1550 is configured to displace the retaining element 1530 away from the axle bore 1516. The hand-maneuverable release mechanism 1550 illustrated in FIG. 13C comprises a tab 1556 or other means for user interaction, a lifter 1554, which interacts with the retaining element 1530, and a connector 1552 connecting the lifter 1554 and the tab 1556. Additional examples of hand-maneuverable release mechanisms 1550, some of which are described in detail with respect to FIGS. 5A-5P and FIGS. 9C, 10C, 11C, and 12C, can include an angled connector, no connector, different shapes and configurations of lifters, guide arms, and/or different shapes and configurations of tabs.

Figure 13D:
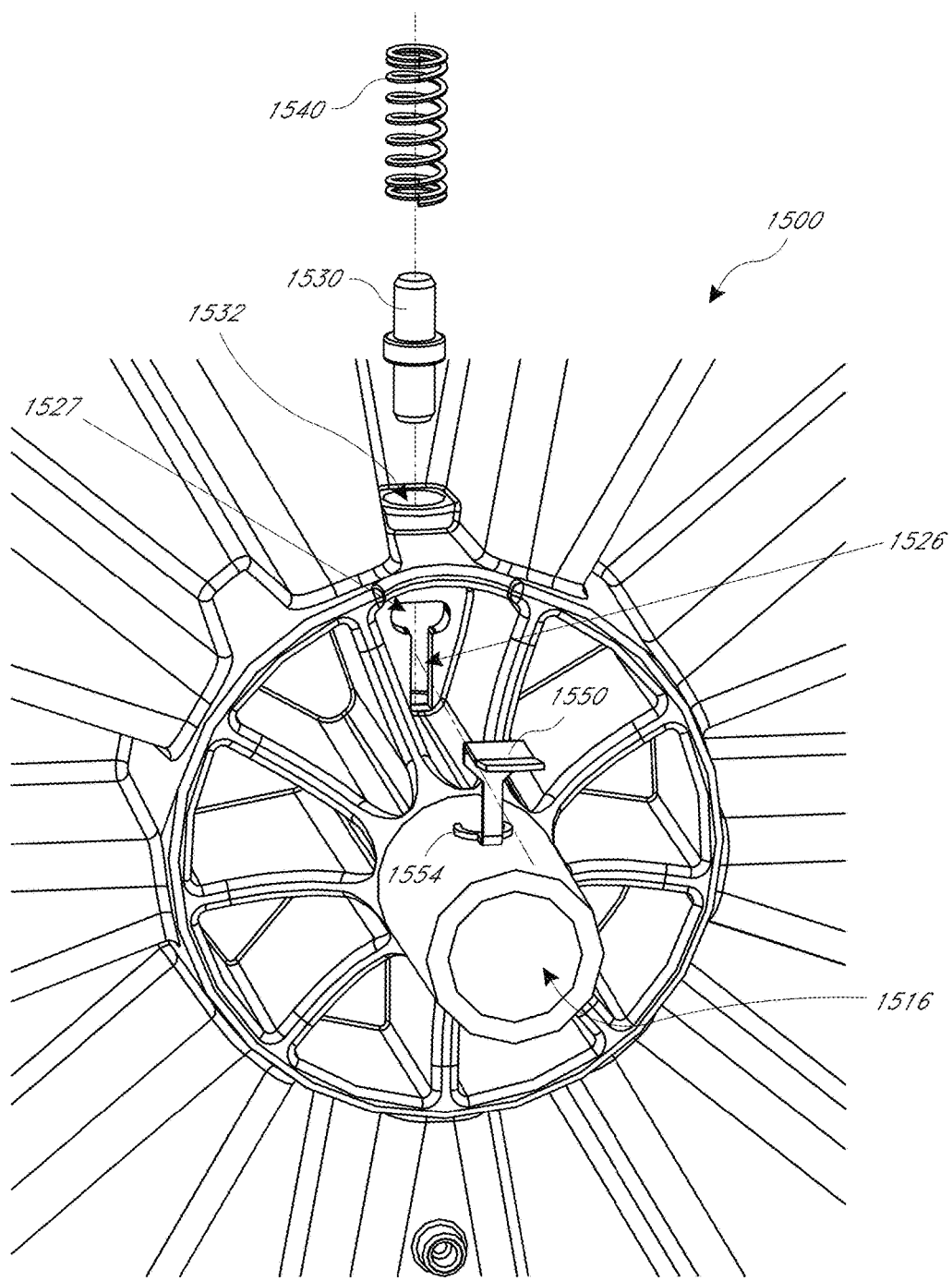
FIG. 13D is an exploded perspective view of a portion of the wheel assembly of FIG. 13A.

FIG. 13D is an exploded perspective view of the wheel assembly 1500 of FIG. 13A. The wheel assembly 1500 includes a pin sleeve 1532 and an axle bore 1516. The pin sleeve 1532 comprises an orifice 1527 and an axial channel 1526 extending from the orifice 1527 towards the axle bore 1516. The method of assembly illustrated in FIG. 13D comprises inserting a portion (e.g., two prongs of a lifter 1554, as illustrated in FIG. 5A) of a hand-maneuverable release mechanism 1550 through the orifice 1527 (e.g., with the prongs parallel to the axle bore 1516 or tilted towards the second end 1544 of the pin sleeve 1532) until the portion is in the pin sleeve 1532. Once the portion of the hand-maneuverable release mechanism 1550 is through the orifice 1527, the hand-maneuverable release mechanism 1550 can be lowered down the axial channel 1526, away from the orifice 1527, towards the axle bore 1516. In some embodiments, the hand-maneuverable release mechanism 1550 can be inserted into the pin sleeve 1532 through the orifice 1527 without subsequently needing to be rotated or turned in a clockwise or counter-clockwise direction. A retaining element 1530 may then be positioned in the pin sleeve 1532. In some embodiments, for example when the retaining element 1530 and hand-maneuverable release mechanism 1550 are similar to the elements illustrated in FIG. 5G, lowering of the hand-maneuverable release mechanism 1550 may be after engagement with the retaining element 1530. Once the retaining element 1530 is in the pin sleeve 1532, a biasing element 1540 may be positioned in the pin sleeve 1532. While not illustrated in FIG. 13D, after the biasing element 1540 is in the pin sleeve 1532, the second end 1544 of the pin sleeve 1532 may be deformed or otherwise occluded with a restraining element (e.g., a restraining element 1538a, 1538b, 1538c, 1538d as discussed herein).

In some embodiments, the pin sleeve 1532 includes an axial channel 1526 extending between the first end 1542 of the pin sleeve 1532 and the second end 1544 of the pin sleeve 1532. In some embodiments, the axial channel 1526 extends all the way through the second end 1544 of the pin sleeve 1532, which may allow the lifer 1554 of the hand-maneuverable release mechanism 1550 to slide towards the axle bore 1516 from the second end 1544 of the pin sleeve 1532. In some embodiments, a portion of the hand-maneuverable release mechanism 1550 (e.g., prongs of the lifter 1554, as illustrated in FIG. 5A) is inserted into the pin sleeve 1532 (e.g., proximate to the first end 1542; e.g., through the channel 1526) and rotated until the portion is roughly or substantially parallel to the axle bore 1516, until the hand-maneuverable release mechanism 1550 does not exit the pin sleeve 1532 by pulling in a direction away from the pin sleeve 1532, and/or until the lifter 1554 can interact with the retaining element 1530. Other methods of assembling a wheel assembly 1500 are also possible.

The second end 1544 of the pin sleeve 1532 illustrated in FIGS. 13A-13D has the same diameter as the rest of the pin sleeve 1532 above the shoulder 1511. If the wheel rotates 180°, the biasing element 1540, the retaining element 1530, and/or the hand-maneuverable release mechanism 1550 may exit the second end 1544 of the pin sleeve 1532. In some embodiments, the integrated wheel assembly 1500 further comprises a restraining element (e.g., the restraining element 1538a, 1538b, 1538c, 1538d) that is configured to inhibit the biasing element 1540, the retaining element 1530, and/or the hand-maneuverable release mechanism 1550 from exiting the second end 1544 of the pin sleeve 1532. The restraining element may comprise a plug, a threaded plug, a deformation in the pin sleeve 1532, a plurality of ledges extending radially into the pin sleeve 1532, a disc insertable in a slot in the pin sleeve 1532, and the like. The omission of the restraining element, for example using a spring coupled to (e.g., adhered to, welded to, under a tab of, etc.) the first end 1542 of the pin sleeve 1540 and coupled to (e.g., adhered to, welded to, under a tab of, etc.) the retaining element 1530 and pulling the retaining element 1530 towards the axle bore 1516, would not depart from the invention disclosed herein.

Figure 13E:
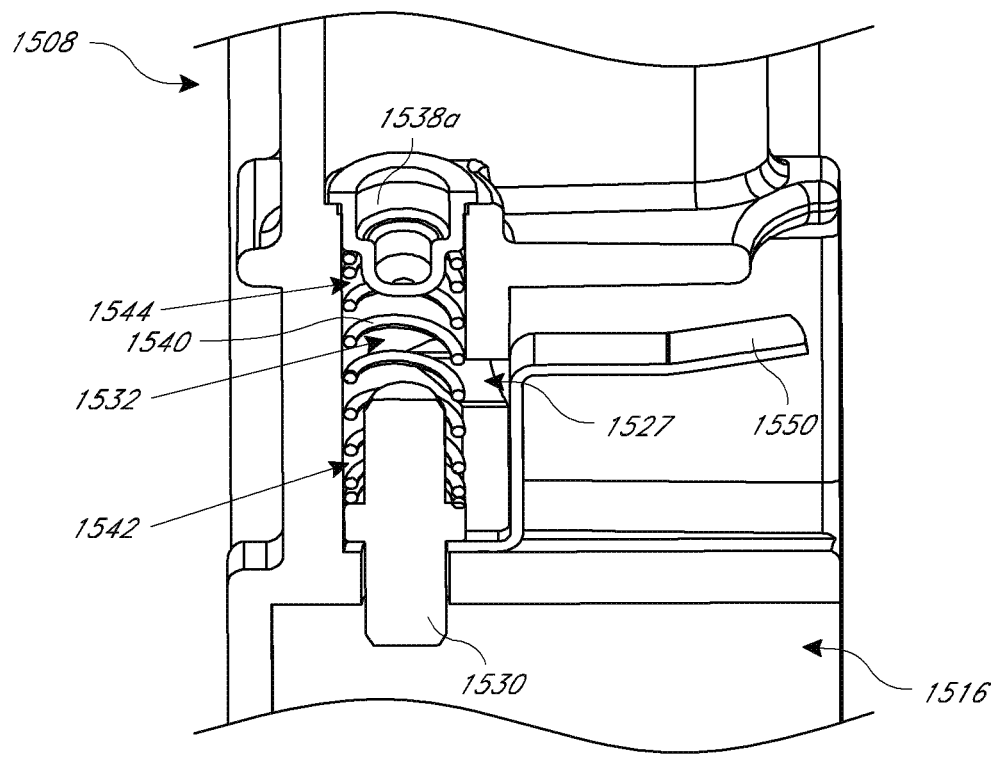
FIG. 13E is a cross-sectional view of a portion of an example embodiment of a wheel assembly.

FIG. 13E is a magnified cross-sectional view of a portion of an example embodiment of a wheel assembly 1508 comprising a retaining element 1538a including a plug. After the release mechanism 1550, the retaining element 1530, and the biasing element 1540 are at least partially within the pin sleeve 1532, the second end 1544 of the pin sleeve 1532 may be at least partially occluded with a plug 1538a or other occluding object. In some embodiments, the plug 1538a may be adhered (e.g., welded (e.g., ultrasonically welded), glued, pressure fit, combinations thereof, and the like) in the pin sleeve 1532. In some embodiments, the plug 1538*a* may comprise threading configured to mate with corresponding threading in the pin sleeve 1532, or to act as a screw (cutting into the pin sleeve 1532). In some embodiments, the plug 1538*a* may comprise plastic, metal, wood, rubber, combinations thereof, etc.

Figure 13F:
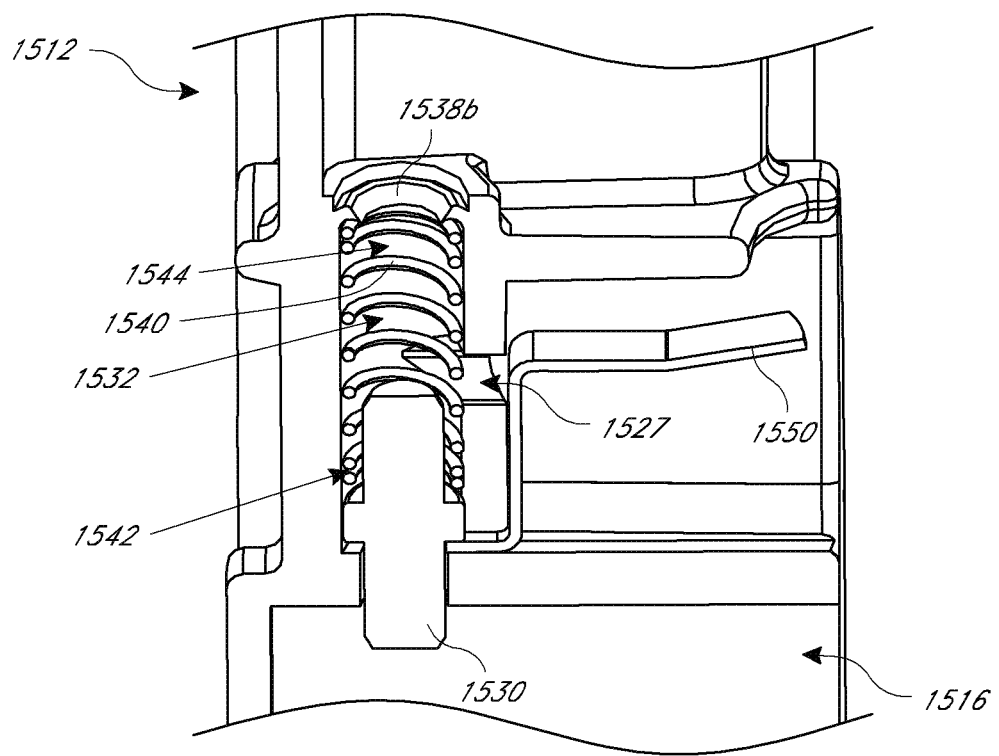
FIG. 13Fi is a cross-sectional view of a portion of another example embodiment of a wheel assembly.

FIG. 13Fi is a magnified cross-sectional view of a portion of another example embodiment of a wheel assembly 1512 comprising a restraining element 1538*b* including a deformation or an indentation in the pin sleeve 1532 (e.g., proximate to the second end 1544 of the pin sleeve 1532). After the release mechanism 1550, the retaining element 1530, and the biasing element 1540 are at least partially within the pin sleeve 1532, the second end 1544 of the pin sleeve 1532 is deformed (e.g., heat deformed and/or pressure deformed). The pressure used to create the deformations may be applied in a downward fashion from the second end 1544 of the pin sleeve 1532 towards the first end 1542, from a side of the pin sleeve 1532, radially inward to the pin sleeve 1532, combinations thereof, and the like. For example, certain features of the wheel 1502 may make certain types of occlusion more or less possible, effective, and/or convenient. The deformation 1538*b* is configured to prevent the retaining element 1530 from exiting the second end 1544 of the pin sleeve 1532 (e.g., by being narrower than the biasing element 1540 such that the biasing element 1540 is mechanically engaged therewith). The deformation 1538*b* may be all around the pin sleeve 1532, in a single location, in a plurality of locations, etc. In the embodiment illustrated in FIG. 13Fi, the restraining element 1538*b* comprises an annular deformation that extends around the entire circumference or substantially the entire circumference of the pin sleeve 1532. A circular or cylindrical piston pushing down on the second end 1544 of the pin sleeve 1532 may be used to create an annular deformation 1538*b*. In some embodiments, an annular deformation 1538*c* may include protrusions extending further into the pin sleeve 1532 (e.g., as illustrated in the wheel assembly 1514 of FIG. 13Fii). A square or pyramidal-headed piston pushing down on the second end 1544 of the pin sleeve may be used to create an annular deformation 1538*c* with protrusions.

Figure 13G:
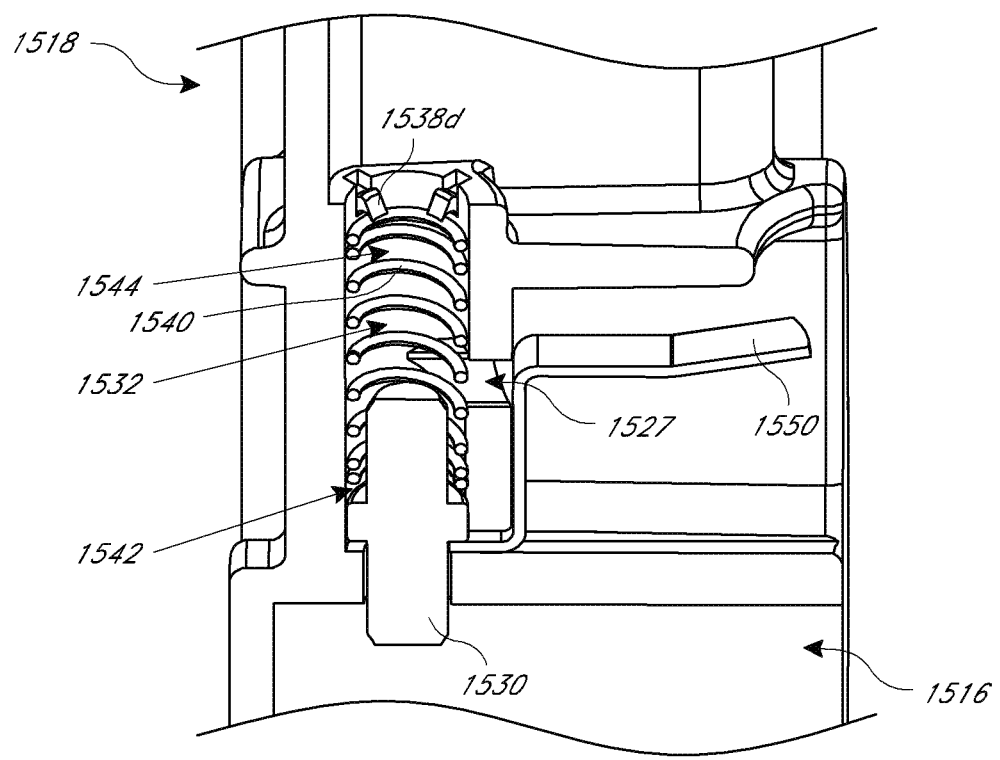
FIG. 13G is a magnified cross-sectional view of a portion of still another example embodiment of a wheel assembly.

FIG. 13G is a magnified cross-sectional view of yet another example embodiment of a wheel assembly 1518 comprising a restraining element 1538*d* including a plurality of legs. The plurality of legs 1538*d* may be formed by deformation after forming the pin sleeve 1532 (e.g., heat deformed and/or pressure deformed) and/or during molding the pin sleeve 1532. In some embodiments, the restraining element 1538*d* includes four legs that are spaced by about 90° around a circumference of the pin sleeve 1532 (e.g., as illustrated in FIG. 13G, showing two of the four legs). FIG. 13G also illustrates how the legs 1538*d* may be formed by shifting material radially inwardly and away from the sides of the pin sleeve 1532.

In some embodiments in which the restraining element (e.g., the restraining element 1538*a*, 1538*b*, 1538*c*, 1538*d*) includes a deformation, the second end 1544 of the pin sleeve 1532 may comprise features prior to the deformation to reduce stress after deformation. For example, the second end 1544 of the pin sleeve 1532 may include additional material in some loci (e.g., being outwardly flared such that upon deformation the flared material is substantially straightened) and/or the second end 1544 of the pin sleeve 1532 may include less material in some loci (cut-outs to reduce compression stresses after deformation). Other devices and methods for occluding the pin sleeve 1532 are also possible (e.g., a disc inserted through a slot (e.g., the orifice 1527, a slot proximate to the second end 1544 of the pin sleeve 1532) in the pin sleeve 1532).

In certain embodiments, the retaining element 1530 and the biasing element 1540 are in a cartridge that can be disposed in the pin sleeve 1532. The addition of layers such as a cartridge body would not depart from the invention disclosed herein. In some embodiments, the biasing element 1540 within the pin sleeve 1532 is in a relaxed position (e.g., the biasing element 1540 only applies force to the retaining element 1530 and the restraining element (e.g., the restraining element 1538*a*, 1538*b*, 1538*c*, 1538*d*) upon being compressed). In certain embodiments, the biasing element 1540 within the pin sleeve 1532 is in a compressed state such that the biasing element 1540 applies force to the retaining element 1530 and the restraining element (e.g., the restraining element 1538*a*, 1538*b*, 1538*c*, 1538*d*) regardless of the position of the retaining element 1530. The restraining element (e.g., the restraining element 1538*a*, 1538*b*, 1538*c*, 1538*d*) is stationary, but the retaining element 1530 can move longitudinally within the pin sleeve 1532 and compress the biasing element 1540.

In some embodiments, two or more of the internal elements of the wheel assembly 1500 may be integrated. For example, the retaining element 1530 and the biasing element 1540 may comprise a single piece of plastic or metal or two pieces of plastic or metal that are coupled (e.g., welded, adhered, mechanically connected). For another example, the biasing element 1540 and the restraining element (e.g., the restraining element 1538*a*, 1538*b*, 1538*c*, 1538*d*) may comprise a single piece of plastic or metal or two pieces of plastic or metal that are coupled (e.g., welded, adhered). For yet another example, the retaining element 1530, the biasing element 1540, and the restraining element (e.g., the restraining element 1538*a*, 1538*b*, 1538*c*, 1538*d*) may comprise a single piece of plastic or metal, or multiple pieces of plastic or metal that are coupled (e.g., welded, adhered). For still another example, the retaining element 1530 and the hand-maneuverable release mechanism 1550 may comprise a single piece of plastic or metal or two pieces of plastic or metal that are coupled (e.g., welded, adhered). For still yet another example, the retaining element 1530, the hand-maneuverable release mechanism 1550, and the biasing element 1540 may comprise a single piece of plastic or metal, or multiple pieces of plastic or metal that are coupled (e.g., welded, adhered). Other combinations are also possible.

The components of the integrated wheel assembly 1500, 1508, 1512, 1514, 1516 and their interaction may be the same as or similar to the components of the wheel assemblies described above and/or embodied in FIGS. 1 and 2A-2E; the hub assemblies described herein and/or embodied in FIGS. 3A-3E, 4, 7A-11B, 11H-12B, and 12F-12H; the release mechanisms described above and/or embodied in FIGS. 5A-5P, 11C-11D, and 12C-12E; the retainer housings described above and embodied in FIGS. 11E-11F; the axle assemblies described above and/or embodied in FIGS. 6A-6C; and/or the methods of assembly described above and/or embodied in FIGS. 11Gi-11Giii. Furthermore, each of the embodiments described in relation to the wheel assembly 1500, 1508, 1512, 1514, 1518 may also be used for the hub assemblies discussed herein.

Some removable wheel assemblies include a wheel fork or other appendage that is separate from the wheel, and include a hand-maneuverable release mechanism in the appendage. Such wheel assemblies do not include, for example, a hub assembly including a retaining element configured to operatively engage a groove in an axle. Rather, the axle is integrated into the wheel assembly and is engaged on each side by the wheel fork. Wheel forks are generally used in applications in which frequent wheel rotation orthogonal to the direction that the wheel spins may be desired (e.g., chairs, shopping carts, baby strollers, etc.), but can add cost and complexity. Some other removable wheel assemblies include an integrated grooved axle (e.g., non-removably affixed at the center of the wheel assembly) or other grooved protrusion, and include the device to which the wheel assembly is attached includes a hand-maneuverable release mechanism. Such wheel assemblies do not include a hand-maneuverable release mechanism because it is the device that includes the hand-maneuverable release mechanism. An integrated axle may limit the number of devices with which a wheel assembly is compatible, for example because the integrated axle needs to properly fit into the particular device. The hub assemblies and wheel assemblies described herein can reduce cost and/or complexity by integrating a hand-maneuverable release mechanism into the hub assembly, which for example includes a retaining element configured to operatively engage a groove in a non-integrated axle.

Certain Embodiments

1. A hub assembly comprising:
a retainer housing including:
   an axle sleeve including an axle bore configured to receive an axle; and
   a pin sleeve including a first end, a second end, and a conduit between the first end and the second end, the first end in fluid communication with the axle bore;
a retaining element within the conduit of the pin sleeve, the retaining element configured to operatively engage a groove in an axle;
a biasing element within the conduit of the pin sleeve and configured to bias the retaining element towards the axle bore; and
a hand-maneuverable release mechanism configured to displace the retaining element away from the axle bore.
2. The hub assembly of Embodiment 1, wherein the release mechanism is on a same side of the hub assembly as the axle bore.
3. The hub assembly of Embodiment 1, wherein the release mechanism is on an opposite side of the hub assembly from the axle bore.
4. The hub assembly of Embodiment 3, wherein the retainer housing includes an end wall including a stop.
5. The hub assembly of Embodiment 3 or 4, wherein the retainer housing includes a protrusion configured to interact with a groove in the hand-maneuverable release mechanism.
6. The hub assembly of any of Embodiments 3-5, further comprising a cover coupled to the retainer housing.
7. The hub assembly of any of Embodiments 1-6, wherein the retainer housing includes an end wall including a plurality of false release mechanisms.
8. The hub assembly of any of Embodiments 1-7, wherein the release mechanism includes:
a tab configured to be manipulated by a hand of a user; and
a lifter configured to interact with the retaining element, the lifter connected to the tab, wherein movement of the tab is configured to cause movement of the lifter.
9. The hub assembly of Embodiment 8, wherein the release mechanism further comprises a connector coupled to the tab and coupled to the lifter.
10. The hub assembly of Embodiment 9, wherein the connector is substantially orthogonal to the tab and to the lifter.
11. The hub assembly of Embodiment 9, wherein the connector is substantially non-orthogonal to the tab and to the lifter.
12. The hub assembly of Embodiment 11, wherein the connector is connected to at least one of the tab and the lifter at an obtuse angle.
13. The hub assembly of any of Embodiments 8-12, wherein the release mechanism further comprises a guide arm coupled to the tab.
14. The hub assembly of any of Embodiments 8-13, wherein the lifter is at least partially in an aperture in the retaining element.
15. The hub assembly of any of Embodiments 8-13, wherein the lifter includes an arcuate member at least partially surrounding the retaining element.
16. The hub assembly of Embodiment 15, wherein the arcuate member totally surrounds the retaining element.
17. The hub assembly of any of Embodiments 8-13, wherein the lifter includes a fork including a prong on at least one side of the retaining element.
18. The hub assembly of Embodiment 17, wherein the fork includes prongs on two sides of the retaining element.
19. The hub assembly of any of Embodiments 8-18, wherein the tab includes a weakened portion.
20. The hub assembly of Embodiment 19, wherein the tab is configured to bend along the weakened portion.
21. The hub assembly of Embodiment 19 or 20, wherein the tab is configured to break along the weakened portion.
22. The hub assembly of any of Embodiments 8-21, wherein the lifter is substantially parallel to the axle bore.
23. The hub assembly of any of Embodiments 8-21, wherein the lifter is substantially orthogonal to the axle bore.
24. The hub assembly of any of Embodiments 8-13, wherein the lifter at least partially covers a portion of the retaining element.
25. The hub assembly of Embodiment 14, wherein the retaining element comprises a lip and wherein the portion of the retaining element comprises the lip.
26. The hub assembly of any of Embodiments 8-15, wherein the lifter completely covers the retaining element.
27. The hub assembly of any of Embodiments 13-15, wherein the tab is substantially orthogonal to the retaining element.
28. The hub assembly of any of Embodiments 13-15, wherein the tab is substantially non-orthogonal to the retaining element.
29. The hub assembly of any of Embodiments 8-17, wherein the release mechanism further comprises an arm coupled to the tab.
30. The hub assembly of Embodiment 29, wherein the release mechanism further comprises a projection coupled to the tab.
31. The hub assembly of Embodiment 30, wherein the projection includes a groove configured to interact with a projection extending from the retainer housing.
32. The hub assembly of any of Embodiments 29-31, wherein the arm is on the opposite side of the retainer housing from the axle bore.
33. The hub assembly of any of Embodiments 29-31, wherein the arm is on the opposite side of the retainer housing from the axle bore.
34. The hub assembly of any of Embodiments 8-31, wherein the release mechanism is integrated with the retaining element in a hand-maneuverable retaining element.

35. The hub assembly of any of Embodiments 1-7, wherein the release mechanism includes:
a body;
an arm extending outwardly from the body;
a ramped portion extending downward from the body; and
a lifter extending inwardly from the body.

36. The hub assembly of Embodiment 35, wherein the retainer housing includes a lifting projection configured to interact with the ramped portion.

37. The hub assembly of Embodiment 36, wherein upon movement of the arm, the ramped portion interacts with the lifting projection to translate the movement of the arm into longitudinal movement of the lifter away from the axle bore.

38. The hub assembly of any of Embodiments 1-37, wherein the release mechanism is configured to displace the retaining element upon manipulation of a tab away from the axle bore.

39. The hub assembly of any of Embodiments 1-38, wherein the release mechanism is configured to displace the retaining element upon manipulation of a tab towards the axle bore.

40. The hub assembly of any of Embodiments 1-39, wherein the release mechanism comprises metal.

41. The hub assembly of any of Embodiments 1-40, wherein the release mechanism comprises plastic.

42. The hub assembly of any of Embodiments 1-41, wherein the release mechanism comprises buttressing features.

43. The hub assembly of any of Embodiments 1-42, wherein the retainer housing includes a bearing surface configured to increase leverage between the release mechanism and the retaining element.

44. The hub assembly of any of Embodiments 1-43, wherein the retainer housing includes a tool passageway.

45. The hub assembly of Embodiment 44, wherein the retainer housing includes a tamper-evident membrane covering the tool passageway.

46. The hub assembly of Embodiment 44 or 45, wherein the tool passageway is on an opposite side of the hub assembly from the release mechanism.

47. The hub assembly of any of Embodiments 1-46, wherein the retaining element includes a lip configured to interact with the release mechanism.

48. The hub assembly of Embodiment 47, wherein the first end of the pin sleeve includes a shoulder extending into the conduit and wherein the lip is wider than the shoulder.

49. The hub assembly of any of Embodiments 1-48, further comprising a restraining element configured to inhibit at least one of the retaining element and the biasing element from exiting the second end of the pin sleeve.

50. The hub assembly of Embodiment 49, wherein the restraining element includes a tail configured to at least partially occlude a channel in the pin sleeve.

51. The hub assembly of any of Embodiments 1-50, wherein the retainer housing includes a spacer configured to space the hub assembly from a cart body.

52. The hub assembly of Embodiment 51, wherein the spacer comprises a guiderail.

53. The hub assembly of any of Embodiments 1-52, wherein the axle sleeve comprises a guiderail.

54. A hub assembly comprising:
a retaining element configured to operatively engage a groove in an axle;
a hand-maneuverable release mechanism configured to displace the retaining element away from the groove in an axle; and
a tool passageway configured to permit tooled access to the retaining element.

55. A conveyance comprising the hub assembly of any of Embodiments 1-54.

56. A wheel assembly comprising:
a wheel; and
the hub assembly of any of Embodiments 1-54 inserted in the wheel.

57. The wheel assembly of Embodiment 56, wherein the release mechanism is at least partially obscured by the wheel.

58. The wheel assembly of Embodiment 56 or 57, wherein the biasing element abuts a portion of the wheel.

59. A conveyance comprising the wheel assembly of any of Embodiments 56-58.

60. The conveyance of Embodiment 59, wherein the release mechanism is modifiable to inhibit manipulation upon coupling to the conveyance.

61. An axle assembly comprising:
an axle;
the wheel assembly of any of Embodiments 56-58 coupled to the axle;
a second wheel assembly coupled to the axle, the second wheel assembly comprising:
a wheel; and
a hub assembly including:
a retainer housing including:
an axle sleeve including an axle bore configured to receive an axle; and
a pin sleeve including a first end, a second end, and a conduit between the first end and the second end, the first end in fluid communication with the axle bore;
a retaining element within the conduit of the pin sleeve, the retaining element configured to operatively engage a groove in an axle; and
a biasing element within the conduit of the pin sleeve and configured to bias the retaining element towards the axle bore.

62. The axle assembly of Embodiment 61, wherein the retainer housing of the second wheel assembly includes a tool passageway.

63. A conveyance comprising the axle assembly of Embodiment 61 or 62.

64. The conveyance of any of Embodiments 59, 60, and 63, wherein the conveyance is a refuse cart.

65. A method of manufacturing a hub assembly, the method comprising:
providing a retainer housing including:
an axle sleeve including an axle bore configured to receive an axle; and
a pin sleeve including a first end, a second end, and a conduit between the first end and the second end, the first end in fluid communication with the axle bore, the first end including a shoulder extending into the conduit;
at least partially inserting a hand-maneuverable release mechanism in the pin sleeve;
positioning a retaining member in the pin sleeve, the retaining element configured to secure a wheel on an axle by operatively engaging a groove in the axle; and
positioning a biasing element in the pin sleeve, the biasing element configured to bias the retaining member towards the axle bore.

66. The method of Embodiment 65, wherein at least partially inserting the release mechanism in the pin sleeve comprises sliding a portion of the release mechanism along a channel in the pin sleeve.

67. The method of Embodiment 65, wherein at least partially inserting the release mechanism in the pin sleeve comprises:
  inserting a portion of the release mechanism in channel in the pin sleeve; and
  rotating the release mechanism.

68. The method of any of Embodiments 65-67, wherein positioning the retaining member in the pin sleeve is after at least partially inserting the release mechanism in the pin sleeve.

69. The method of any of Embodiments 65-68, further comprising forming the retainer housing.

70. The method of any of Embodiments 65-69, further comprising occluding the second end of the pin sleeve.

71. The method of any of Embodiments 65-70, further comprising coupling the hub assembly to a wheel to form a wheel assembly.

72. The method of Embodiment 71, further comprising forming the wheel.

73. The method of any of Embodiments 65-72, further comprising coupling the wheel assembly to a conveyance.

74. The method of any of Embodiments 65-72, further comprising coupling the wheel assembly to an axle.

75. The method of Embodiment 74, further comprising coupling a second wheel assembly to the axle.

76. The method of Embodiment 74 or 75, further comprising removing the wheel assembly from the axle.

77. The method of Embodiment 76, further comprising re-coupling the wheel assembly to the axle.

78. A method of removing a hub assembly from an axle, the method comprising:
  manually manipulating a tab of a release mechanism to cause a retaining member to at least partially extend out of an axle bore of a retainer housing.

79. The method of Embodiment 78, wherein manipulating the tab includes moving the tab radially outward.

80. The method of Embodiment 78, wherein manipulating the tab includes moving the tab radially inward.

81. The method of Embodiment 78, wherein manipulating the tab includes rotating the tab.

82. The method of Embodiment 81, wherein rotating the tab is in a plane substantially orthogonal to the axle bore.

83. A wheel assembly comprising:
  a wheel including
    an axle bore, and
    a pin sleeve including
      a first end in fluid communication with the axle bore,
      a second end, and
      a conduit between the first end and the second end;
  a retaining member in the conduit and configured to operatively engage a groove in an axle;
  a biasing element in the conduit and configured to bias the retaining member towards the axle bore; and
  a hand maneuverable release mechanism configured to displace the retaining element away from the axle bore.

84. The wheel assembly of Embodiment 83, further comprising a restraining element configured to inhibit the biasing element from exiting the second end of the pin sleeve.

85. The wheel assembly of Embodiment 84, wherein the restraining element comprises a plug mechanically coupled to the second end of the pin sleeve.

86. The wheel assembly of Embodiment 84, wherein the restraining element comprises a deformation in the pin sleeve.

87. The wheel assembly of Embodiment 86, wherein the deformation is proximate to the second end of the pin sleeve.

88. The wheel assembly of Embodiment 86 or 87, wherein the deformation extends substantially around a circumference of the pin sleeve.

89. The wheel assembly of any of Embodiments 86-88, wherein the deformation comprises one or more protrusions extending into the pin sleeve.

90. The wheel assembly of any of Embodiments 86-89, wherein the deformation comprises a single deformation.

91. The wheel assembly of any of Embodiments 86-89, wherein the deformation comprises a plurality of deformations.

92. The wheel assembly of any of Embodiments 86-91, wherein the deformation comprises a plurality of legs extending into the conduit.

93. The wheel assembly of Embodiment 92, wherein the plurality of legs comprises four legs that are spaced by about 90° around a circumference of the pin sleeve.

94. The wheel assembly of any of Embodiments 83-93, wherein the release mechanism is on a same side of the wheel assembly as the axle bore.

95. The wheel assembly of Embodiment 83-93, wherein the release mechanism is on an opposite side of the wheel assembly from the axle bore.

96. The wheel assembly of any of Embodiments 83-95, wherein the release mechanism includes:
  a tab configured to be manipulated by a hand of a user; and
  a lifter configured to interact with the retaining element, the lifter connected to the tab, wherein movement of the tab is configured to cause movement of the lifter.

97. The wheel assembly of Embodiment 96, wherein the release mechanism further comprises a connector coupled to the tab and coupled to the lifter.

98. The wheel assembly of Embodiment 97, wherein the connector is substantially orthogonal to the tab and to the lifter.

99. The wheel assembly of Embodiment 97, wherein the connector is substantially non-orthogonal to the tab and to the lifter.

100. The wheel assembly of Embodiment 99, wherein the connector is connected to at least one of the tab and the lifter at an obtuse angle.

101. The wheel assembly of any of Embodiments 96-100, wherein the release mechanism further comprises a guide arm coupled to the tab.

102. The wheel assembly of any of Embodiments 96-100, wherein the lifter is at least partially in an aperture in the retaining element.

103. The wheel assembly of any of Embodiments 96-100, wherein the lifter includes an arcuate member at least partially surrounding the retaining element.

104. The wheel assembly of Embodiment 103, wherein the arcuate member totally surrounds the retaining element.

105. The wheel assembly of any of Embodiments 96-100, wherein the lifter includes a fork including a prong on at least one side of the retaining element.

106. The wheel assembly of Embodiment 105, wherein the fork includes prongs on two sides of the retaining element.

107. The wheel assembly of any of Embodiments 96-106, wherein the tab includes a weakened portion.

108. The wheel assembly of Embodiment 107, wherein the tab is configured to bend along the weakened portion.

109. The wheel assembly of Embodiment 107 or 108, wherein the tab is configured to break along the weakened portion.

110. The wheel assembly of any of Embodiments 96-109, wherein the lifter is substantially parallel to the axle bore.

111. The wheel assembly of any of Embodiments 96-109, wherein the lifter is substantially orthogonal to the axle bore.

112. The wheel assembly of any of Embodiments 96-111, wherein the lifter at least partially covers a portion of the retaining element.

113. The wheel assembly of Embodiment 112, wherein the retaining element comprises a lip and wherein the portion of the retaining element comprises the lip.

114. The wheel assembly of any of Embodiments 96-113, wherein the lifter completely covers the retaining element.

115. The wheel assembly of any of Embodiments 96-114, wherein the tab is substantially orthogonal to the retaining element.

116. The wheel assembly of any of Embodiments 96-114, wherein the tab is substantially non-orthogonal to the retaining element.

117. The wheel assembly of any of Embodiments 96-116, wherein the release mechanism further comprises an arm coupled to the tab.

118. The wheel assembly of Embodiment 117, wherein the release mechanism further comprises a projection coupled to the tab.

119. The wheel assembly of Embodiment 118, wherein the projection includes a groove configured to interact with a projection extending from the wheel.

120. The wheel assembly of any of Embodiments 117-119, wherein the arm is on the opposite side of the wheel from the axle bore.

121. The wheel assembly of any of Embodiments 117-119, wherein the arm is on the opposite side of the wheel from the axle bore.

122. The wheel assembly of any of Embodiments 96-121, wherein the release mechanism is integrated with the retaining element in a hand-maneuverable retaining element.

123. The wheel assembly of any of Embodiments 83-95, wherein the release mechanism includes:
a body;
an arm extending outwardly from the body;
a ramped portion extending downward from the body; and
a lifter extending inwardly from the body.

124. The wheel assembly of Embodiment 123, wherein the retainer housing includes a lifting projection configured to interact with the ramped portion.

125. The wheel assembly of Embodiment 124, wherein upon movement of the arm, the ramped portion interacts with the lifting projection to translate the movement of the arm into longitudinal movement of the lifter away from the axle bore.

126. The wheel assembly of any of Embodiments 83-125, wherein the release mechanism is configured to displace the retaining element upon manipulation of a tab away from the axle bore.

127. The wheel assembly of any of Embodiments 83-125, wherein the release mechanism is configured to displace the retaining element upon manipulation of a tab towards the axle bore.

128. The wheel assembly of any of Embodiments 83-127, wherein the release mechanism comprises metal.

129. The wheel assembly of any of Embodiments 83-128, wherein the release mechanism comprises plastic.

130. The wheel assembly of any of Embodiments 83-129, wherein the release mechanism comprises buttressing features.

131. The wheel assembly of any of Embodiments 83-130, wherein the retainer housing includes a bearing surface configured to increase leverage between the release mechanism and the retaining element.

132. The wheel assembly of any of Embodiments 83-131, wherein the retainer housing includes a tool passageway.

133. The wheel assembly of Embodiment 132, wherein the retainer housing includes a tamper-evident membrane covering the tool passageway.

134. The wheel assembly of Embodiment 132 or 133, wherein the tool passageway is on an opposite side of the wheel assembly from the release mechanism.

135. The wheel assembly of any of Embodiments 83-134, wherein the retaining element includes a lip configured to interact with the release mechanism.

136. The wheel assembly of Embodiment 135, wherein the first end of the pin sleeve includes a shoulder extending into the conduit and wherein the lip is wider than the shoulder.

137. The wheel assembly of any of Embodiments 83-136, wherein the wheel includes a spacer configured to space the wheel assembly from a cart body.

138. The wheel assembly of Embodiment 137, wherein the spacer comprises a guiderail.

139. The wheel assembly of any of Embodiments 83-138, wherein the axle sleeve comprises a guiderail.

140. The wheel assembly of any of Embodiments 83-139, wherein the release mechanism is at least partially obscured by the wheel.

141. A conveyance comprising the wheel assembly of any of Embodiments 83-140.

142. The conveyance of Embodiment 141, wherein the release mechanism is modifiable to inhibit manipulation upon coupling to the conveyance.

143. An axle assembly comprising:
an axle;
the wheel assembly of any of Embodiments 83-140 coupled to the axle;
a second wheel assembly coupled to the axle, the second wheel assembly comprising:
a wheel including
an axle bore, and
a pin sleeve including
a first end in fluid communication with the axle bore,
a second end, and
a conduit between the first end and the second end;
a retaining member in the conduit and configured to operatively engage a groove in an axle;
a biasing element in the conduit and configured to bias the retaining member towards the axle bore; and
a hand maneuverable release mechanism configured to displace the retaining element away from the axle bore.

144. The axle assembly of Embodiment 143, wherein the retainer housing of the second wheel assembly includes a tool passageway.

145. A conveyance comprising the axle assembly of Embodiment 143 or 144.

146. The conveyance of any of Embodiments 141, 142, and 145, wherein the conveyance is a refuse cart.

147. A method of making a wheel assembly, the method comprising:
deforming a pin sleeve of a wheel, the wheel assembly including, in the pin sleeve, a retaining element, a biasing element, and a hand-maneuverable release mechanism configured to displace the retaining element away from the axle bore, the wheel including an axle bore in fluid communication with another end of the pin sleeve and a conduit extending between the end and the another end, wherein after deforming the pin sleeve the biasing element is inhibited from exiting the end of the pin sleeve.

148. The method of Embodiment 147, further comprising inserting a portion of the hand-maneuverable release mechanism in the pin sleeve through an orifice in the pin sleeve prior to deforming the end of the pin sleeve.

149. The method of Embodiment 147, further comprising inserting a portion of the hand-maneuverable release mechanism in the pin sleeve, wherein inserting the portion comprises:
 inserting the portion of the hand-maneuverable release mechanism through a channel in the pin sleeve; and
 rotating the hand-maneuverable release mechanism.

150. The method of any of Embodiments 147-149, wherein deforming the pin sleeve comprises forming a deformation proximate to the end of the pin sleeve.

151. The method of any of Embodiments 147-149, wherein deforming the pin sleeve comprises deforming substantially around a circumference of the pin sleeve.

152. The method of any of Embodiments 147-151, wherein deforming the pin sleeve comprises forming one or more protrusions extending into the pin sleeve.

153. The method of any of Embodiments 147-151, wherein deforming the pin sleeve comprises forming a plurality of legs extending into the conduit.

154. The method of Embodiment 153, wherein forming the plurality of legs comprises spacing the legs by about 90° around a circumference of the pin sleeve.

155. The method of any of Embodiments 147-154, further comprising forming the wheel.

156. The method of any of Embodiments 147-155, further comprising coupling the wheel assembly to a conveyance.

157. The method of any of Embodiments 147-156, further comprising coupling the wheel assembly to an axle.

158. The method of Embodiment 157, further comprising coupling a second wheel assembly to the axle.

159. The method of Embodiment 157 or 158, further comprising removing the wheel assembly from the axle.

160. The method of Embodiment 159, further comprising re-coupling the wheel assembly to the axle.

161. A method of removing a wheel assembly from an axle, the method comprising:
 manually manipulating a tab of a release mechanism to cause a retaining member to at least partially extend out of an axle bore of a wheel.

162. The method of Embodiment 161, wherein manipulating the tab includes moving the tab radially outward.

163. The method of Embodiment 161, wherein manipulating the tab includes moving the tab radially inward.

164. The method of Embodiment 161, wherein manipulating the tab includes rotating the tab.

165. The method of Embodiment 165, wherein rotating the tab is in a plane substantially orthogonal to the axle bore.

166. A method of making a wheel assembly, the method comprising:
 occluding a pin sleeve of a wheel, the wheel assembly including, in the pin sleeve, a retaining element, a biasing element, and a hand-maneuverable release mechanism configured to displace the retaining element away from the axle bore, the wheel including an axle bore in fluid communication with another end of the pin sleeve and a conduit extending between the end and the another end, wherein after occluding the pin sleeve the biasing element is inhibited from exiting the end of the pin sleeve.

167. The method claim of Embodiment 166, wherein occluding the pin sleeve comprises deforming the pin sleeve.

168. The method claim of Embodiment 166, wherein occluding the pin sleeve comprises mechanically coupling a plug to the end of the pin sleeve.

169. A method of making a wheel assembly comprising:
 forming a wheel comprising an axle bore and a pin sleeve, wherein the pin sleeve includes a first end in fluid communication with the axle bore, a second end, and a conduit between the first end and the second end;
 inserting a portion of a hand maneuverable release mechanism into the pin sleeve;
 inserting a retaining element into the pin sleeve; and
 inserting a biasing element into the pin sleeve.

170. The method of Embodiment 169, further comprising occluding the second end of the pin sleeve to inhibit the biasing element from exiting the second end of the pin sleeve.

171. The method of Embodiment 169, wherein the occluding comprises deforming the pin sleeve.

Although this invention has been disclosed in the context of certain embodiments and examples, it will be understood by those skilled in the art that the invention extends beyond the specifically disclosed embodiments to other alternative embodiments and/or uses of the invention and obvious modifications and equivalents thereof. For example, while disclosed herein primarily in the context of attaching hub assemblies, wheel assemblies, and wheels to grooved axles, the pin-and-spring and hand-maneuverable release mechanisms may be suitable for fastening other sets of components together (e.g., modular plastic and/or metal components such as the top any bottom halves of plastic pallets, base and walls of a portable toilet, toy parts, etc.). In addition, while several variations of the embodiments of the invention have been shown and described in detail, other modifications, which are within the scope of this invention, will be readily apparent to those of skill in the art based upon this disclosure. It is also contemplated that various combinations or sub-combinations of the specific features and aspects of the embodiments may be made and still fall within the scope of the invention. It should be understood that various features and aspects of the disclosed embodiments can be combined with, or substituted for, one another in order to form varying modes of the embodiments of the disclosed invention. Thus, it is intended that the scope of the invention herein disclosed should not be limited by the particular embodiments described above.

What is claimed is:

1. A wheel assembly comprising:
 an axle bore configured to receive an axle;
 a pin sleeve including a first end in fluid communication with the axle bore, a second end, and a conduit between the first end and the second end;
 a retaining member at least partially in the conduit of the pin sleeve, the retaining member configured to operatively engage a groove in the axle and comprising a chamfered end extending into the axle bore, the chamfered end shaped to transversely displace the retaining member upon movement of the axle into the axle bore;
 a biasing element at least partially in the conduit, the biasing element configured to bias the retaining member towards the axle bore; and a hand maneuverable release mechanism configured to displace the retaining element away from the axle bore, the hand maneuverable release mechanism remaining with the wheel assembly during operation of the wheel assembly, wherein the hand maneuverable release mechanism comprises a tab configured to be manipulated by a hand of a user, and wherein the hand maneuverable release mechanism is configured to displace the retaining element away from the axle bore upon radially inward movement of the tab.

2. The wheel assembly of claim 1, wherein the retaining member comprises a pin.

3. The wheel assembly of claim 1, further comprising a restraining element configured to prevent the retaining member from exiting the second end of the pin sleeve.

4. The wheel assembly of claim 3, wherein the restraining element comprises a deformation.

5. The wheel assembly of claim 4, wherein the deformation comprises a plurality of ledges.

6. The wheel assembly of claim 1, wherein the mechanism comprises
a lifter at least partially and non-removably in the second sleeve, the lifter configured to interact with the retaining element, the lifter connected to the tab, wherein movement of the tab is configured to cause movement of the lifter; and
a connector coupled to the tab and coupled to the lifter.

7. The wheel assembly of claim 1, further comprising a bearing surface configured to increase leverage between the release mechanism and the retaining element.

8. A wheel assembly comprising:
an axle bore configured to receive an axle;
a pin sleeve including a first end in fluid communication with the axle bore, a second end, and a conduit between the first end and the second end;
a retaining member at least partially in the conduit of the pin sleeve, the retaining member configured to operatively engage a groove in the axle, the retaining member shaped to move towards the second end of the pin sleeve upon movement of the axle into the axle bore;
a biasing element at least partially in the conduit, the biasing element configured to bias the retaining member towards the axle bore; and
a hand maneuverable release mechanism configured to displace the retaining element away from the axle bore, the hand maneuverable release mechanism remaining with the wheel assembly during operation of the wheel assembly, the mechanism comprising:
a tab configured to be manipulated by a hand of a user;
a lifter at least partially and non-removably in the pin sleeve, the lifter configured to interact with the retaining element, the lifter connected to the tab, wherein movement of the tab is configured to cause movement of the lifter; and
a connector coupled to the tab and coupled to the lifter, the retaining element including a lip configured to interact with the release mechanism, the connector substantially orthogonal to at least one of the tab and the lifter.

9. The wheel assembly of claim 8, wherein the retaining member includes a groove.

10. The wheel assembly of claim 8, wherein the retaining member comprises a pin.

11. The wheel assembly of claim 8, wherein the first end of the pin sleeve includes a shoulder extending into the conduit, wherein the retaining member includes a lip wider than the shoulder, and wherein the lip and the shoulder interact to prevent the retaining member from exiting the first end of the pin sleeve.

12. The wheel assembly of claim 8, further comprising a restraining element configured to prevent the retaining member from exiting the second end of the pin sleeve.

13. The wheel assembly of claim 12, wherein the restraining element comprises a deformation.

14. The wheel assembly of claim 13, wherein the deformation comprises a plurality of ledges.

15. The wheel assembly of claim 8, wherein the retaining member comprises a chamfered end extending into the axle bore.

16. The wheel assembly of claim 8, further comprising a bearing surface configured to increase leverage between the release mechanism and the retaining element.

17. A wheel assembly comprising:
an axle bore configured to receive an axle;
a pin sleeve including a first end in fluid communication with the axle bore, a second end, and a conduit between the first end and the second end;
a retaining member at least partially in the conduit of the pin sleeve, the retaining member configured to operatively engage a groove in the axle and comprising a chamfered end extending into the axle bore, the chamfered end shaped to transversely displace the retaining member upon movement of the axle into the axle bore;
a biasing element at least partially in the conduit, the biasing element configured to bias the retaining member towards the axle bore; and
a hand maneuverable release mechanism configured to displace the retaining element away from the axle bore, the hand maneuverable release mechanism remaining with the wheel assembly during operation of the wheel assembly, the mechanism comprising:
a tab configured to be manipulated by a hand of a user;
a lifter at least partially and non-removably in the pin sleeve, the lifter configured to interact with the retaining element, the lifter connected to the tab, wherein movement of the tab is configured to cause movement of the lifter;
a connector coupled to the tab and coupled to the lifter; and
a bearing surface configured to increase leverage between the release mechanism and the retaining element.

18. The wheel assembly of claim 17, wherein the retaining member includes a groove.

19. The wheel assembly of claim 17, wherein the retaining member comprises a pin.

20. The wheel assembly of claim 17, wherein the first end of the pin sleeve includes a shoulder extending into the conduit, wherein the retaining member includes a lip wider than the shoulder, and wherein the lip and the shoulder interact to prevent the retaining member from exiting the first end of the pin sleeve.

21. The wheel assembly of claim 17, further comprising a restraining element configured to prevent the retaining member from exiting the second end of the pin sleeve.

22. The wheel assembly of claim 21, wherein the restraining element comprises a deformation.

23. The wheel assembly of claim 22, wherein the deformation comprises a plurality of ledges.

24. The wheel assembly of claim 17, wherein the lifter comprises a fork including prongs on two sides of a lip of the retaining element.

* * * * *